(12) United States Patent
Radhakrishnan

(10) Patent No.: US 8,726,341 B2
(45) Date of Patent: *May 13, 2014

(54) APPARATUS AND METHOD FOR DETERMINING RESOURCE TRUST LEVELS

(75) Inventor: Rakesh Radhakrishnan, Ashburn, VA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/479,560

(22) Filed: May 24, 2012

(65) Prior Publication Data

US 2013/0047204 A1 Feb. 21, 2013

Related U.S. Application Data

(63) Continuation-in-part of application No. 13/210,101, filed on Aug. 15, 2011.

(51) Int. Cl.
H04L 29/06 (2006.01)

(52) U.S. Cl.
USPC .................................. 726/1; 726/9; 726/20

(58) Field of Classification Search
CPC .. H04L 9/3234; H04L 63/105; H04L 63/0807
USPC ................. 713/159, 172–174, 182, 185–186; 705/65–79; 726/9, 20
See application file for complete search history.

(56) References Cited

U.S. PATENT DOCUMENTS

| 6,308,274 | B1 | 10/2001 | Swift |
| 7,434,252 | B2 | 10/2008 | Ballinger et al. |
| 7,594,258 | B2 | 9/2009 | Mao et al. |
| 7,607,015 | B2 * | 10/2009 | Fascenda ...................... 713/171 |
| 7,774,830 | B2 | 8/2010 | Dillaway et al. |
| 7,924,709 | B2 | 4/2011 | Lynn |
| 8,205,092 | B2 | 6/2012 | Stokes |

(Continued)

FOREIGN PATENT DOCUMENTS

| WO | PCT/US12/50100 | 8/2012 |
| WO | PCT/US12/50110 | 8/2012 |

(Continued)

OTHER PUBLICATIONS

PCT Notification of Transmittal of the International Search Report and the Written Opinion of the International Searching Authority, or the Declaration including the Search History; PCT/US12/50541; Oct. 23, 2012.

(Continued)

*Primary Examiner* — Farid Homayounmehr
*Assistant Examiner* — Lizbeth Torres-Diaz
(74) *Attorney, Agent, or Firm* — Michael A. Springs

(57) ABSTRACT

According to one embodiment, an apparatus may receive a first resource token indicating that access to a resource has been requested. The apparatus may determine the value of an access value associated with at least one resource token in response to the determination that the plurality of resource tokens comprises the at least one resource token. The apparatus may determine that the value of the access value is insufficient to grant access to the resource. The apparatus may determine, in response to the determination that the value of the access value is insufficient to grant access to the resource, that access to the resource should be denied.

18 Claims, 67 Drawing Sheets

(56) References Cited

U.S. PATENT DOCUMENTS

| | | | |
|---|---|---|---|
| 2003/0101348 A1* | 5/2003 | Russo et al. | 713/185 |
| 2006/0206931 A1* | 9/2006 | Dillaway et al. | 726/9 |
| 2008/0120699 A1* | 5/2008 | Spear | 726/4 |
| 2008/0263662 A1 | 10/2008 | Cheng et al. | |
| 2009/0300711 A1 | 12/2009 | Tokutani et al. | |
| 2011/0314530 A1 | 12/2011 | Donaldson | |
| 2012/0036550 A1 | 2/2012 | Rodriguez et al. | |
| 2013/0047240 A1 | 2/2013 | Radhakrishnan | |

FOREIGN PATENT DOCUMENTS

| | | |
|---|---|---|
| WO | PCT/US12/50227 | 8/2012 |
| WO | PCT/US12/50233 | 8/2012 |
| WO | PCT/US12/50237 | 8/2012 |
| WO | PCT/US12/50521 | 8/2012 |
| WO | PCT/US12/50537 | 8/2012 |
| WO | PCT/US12/50541 | 8/2012 |
| WO | PCT/US12/50547 | 8/2012 |
| WO | PCT/US12/50560 | 8/2012 |

OTHER PUBLICATIONS

U.S. Appl. No. 13/209,935, filed Aug. 15, 2011, Radhakrishnan.
U.S. Appl. No. 13/210,075, filed Aug. 15, 2011, Radhakrishnan.
U.S. Appl. No. 13/210,139, filed Aug. 15, 2011, Radhakrishnan.
U.S. Appl. No. 13/210,120, filed Aug. 15, 2011, Radhakrishnan.
U.S. Appl. No. 13/210,222, filed Aug. 15, 2011, Radhakrishnan.
U.S. Appl. No. 13/210,101, filed Aug. 15, 2011, Radhakrishnan.
U.S. Appl. No. 13/210,167, filed Aug. 15, 2011, Radhakrishnan.
U.S. Appl. No. 13/210,113, filed Aug. 15, 2011, Radhakrishnan.
U.S. Appl. No. 13/210,145, filed Aug. 15, 2011, Radhakrishnan.
U.S. Appl. No. 13/210,164, filed Aug. 15, 2011, Radhakrishnan.
U.S. Appl. No. 13/210,220, filed Aug. 15, 2011, Radhakrishnan.
U.S. Appl. No. 13/210,277, filed Aug. 15, 2011, Radhakrishnan.
U.S. Appl. No. 13/210,246, filed Aug. 15, 2011, Radhakrishnan.
U.S. Appl. No. 13/210,213, filed Aug. 15, 2011, Radhakrishnan.
U.S. Appl. No. 13/210,262, filed Aug. 15, 2011, Radhakrishnan.
U.S. Appl. No. 13/210,276, filed Aug. 15, 2011, Radhakrishnan.
U.S. Appl. No. 13/210,289, filed Aug. 15, 2011, Radhakrishnan.
U.S. Appl. No. 13/479,489, filed May 24, 2012, Radhakrishnan.
U.S. Appl. No. 13/222,055, filed Aug. 31, 2011, Radhakrishnan.
U.S. Appl. No. 13/479,482, filed May 24, 2012, Radhakrishnan.
U.S. Appl. No. 13/479,464, filed May 24, 2012, Radhakrishnan.
U.S. Appl. No. 13/479,516, filed May 24, 2012, Radhakrishnan.
U.S. Appl. No. 13/479,509, filed May 24, 2012, Radhakrishnan.
U.S. Appl. No. 13/479,698, filed May 24, 2012, Radhakrishnan.
U.S. Appl. No. 13/479,498, filed May 24, 2012, Radhakrishnan.
U.S. Appl. No. 13/479,580, filed May 24, 2012, Radhakrishnan.
U.S. Appl. No. 13/479,667, filed May 24, 2012, Radhakrishnan.
U.S. Appl. No. 13/479,619, filed May 24, 2012, Radhakrishnan.
U.S. Appl. No. 13/479,616, filed May 24, 2012, Radhakrishnan.
U.S. Appl. No. 13/479,633, filed May 24, 2012, Radhakrishnan.
U.S. Appl. No. 13/479,491, filed May 24, 2012, Radhakrishnan.
U.S. Appl. No. 13/479,533, filed May 24, 2012, Radhakrishnan.
U.S. Appl. No. 13/479,554, filed May 24, 2012, Radhakrishnan.
U.S. Appl. No. 13/479,462, filed May 24, 2012, Radhakrishnan.
U.S. Appl. No. 13/479,452, filed May 24, 2012, Radhakrishnan.
U.S. Appl. No. 13/479,454, filed May 24, 2012, Radhakrishnan.
U.S. Appl. No. 13/479,480, filed May 24, 2012, Radhakrishnan.
*Protegrity Tokenization: Securing Sensitive Data for PCI, HIPAA and Other Data Security Initiatives*; 13 pages, Mar. 2011.

\* cited by examiner

APPARATUS AND METHOD FOR DETERMINING RESOURCE TRUST LEVELS

RELATED APPLICATION

This application is a continuation-in-part application of pending U.S. patent application Ser. No. 13/210,101 entitled "Method and Apparatus for Making Token-Based Access Decisions", filed Aug. 15, 2011.

TECHNICAL FIELD

This disclosure relates generally to tokenization and, more specifically, to determining trust levels.

BACKGROUND

A security system may control a user's access to a resource. To gain access to the resource, the user may provide the security system with credentials, such as a user ID and a password. The security system may examine these credentials and various other factors such as, for example, factors associated with the user, the user's device, and the network environment in deciding whether to grant or deny access to the user. The security system may also perform several other functions related to the user's access to the resource.

SUMMARY OF THE DISCLOSURE

According to one embodiment, an apparatus may store a plurality of token-based rules. A token-based rule may facilitate access to a resource. The apparatus may further store a plurality of resource tokens associated with the resource. The apparatus may receive a first resource token indicating that access to the resource has been requested and determine, based at least in part upon the first resource token, at least one token-based rule from the plurality of token-based rules. The at least one token-based rule may associate an access value with at least one resource token. The access value may indicate the risk associated with granting access to the resource. The at least one token-based rule may condition access to the resource upon the value of the access value. The apparatus may determine that the plurality of resource tokens comprises the at least one resource token. The apparatus may determine, based at least in part upon the at least one token-based rule, the value of the access value associated with the at least one resource token in response to the determination that the plurality of resource tokens comprises the at least one resource token. The apparatus may determine, based at least upon the at least one token-based rule, that the value of the access value is insufficient to grant access to the resource. The apparatus may determine, in response to the determination that the value of the access value is insufficient to grant access to the resource, that access to the resource should be denied.

Certain embodiments may provide one or more technical advantages. A technical advantage of one embodiment includes faster and more efficient determination of trust levels. Certain embodiments of the invention may include none, some, or all of the above technical advantages. One or more other technical advantages may be readily apparent to one skilled in the art from the figures, descriptions, and claims included herein.

BRIEF DESCRIPTION OF THE FIGURES

For a more complete understanding of the present invention and its features and advantages, reference is now made to the following description, taken in conjunction with the accompanying drawings, in which.

DETAILED DESCRIPTION OF THE FIGURES

Embodiments of the present invention and its advantages are best understood by referring to FIGS. 1 through 36, like numerals being used for like and corresponding parts of the various drawings.

Figure 1:
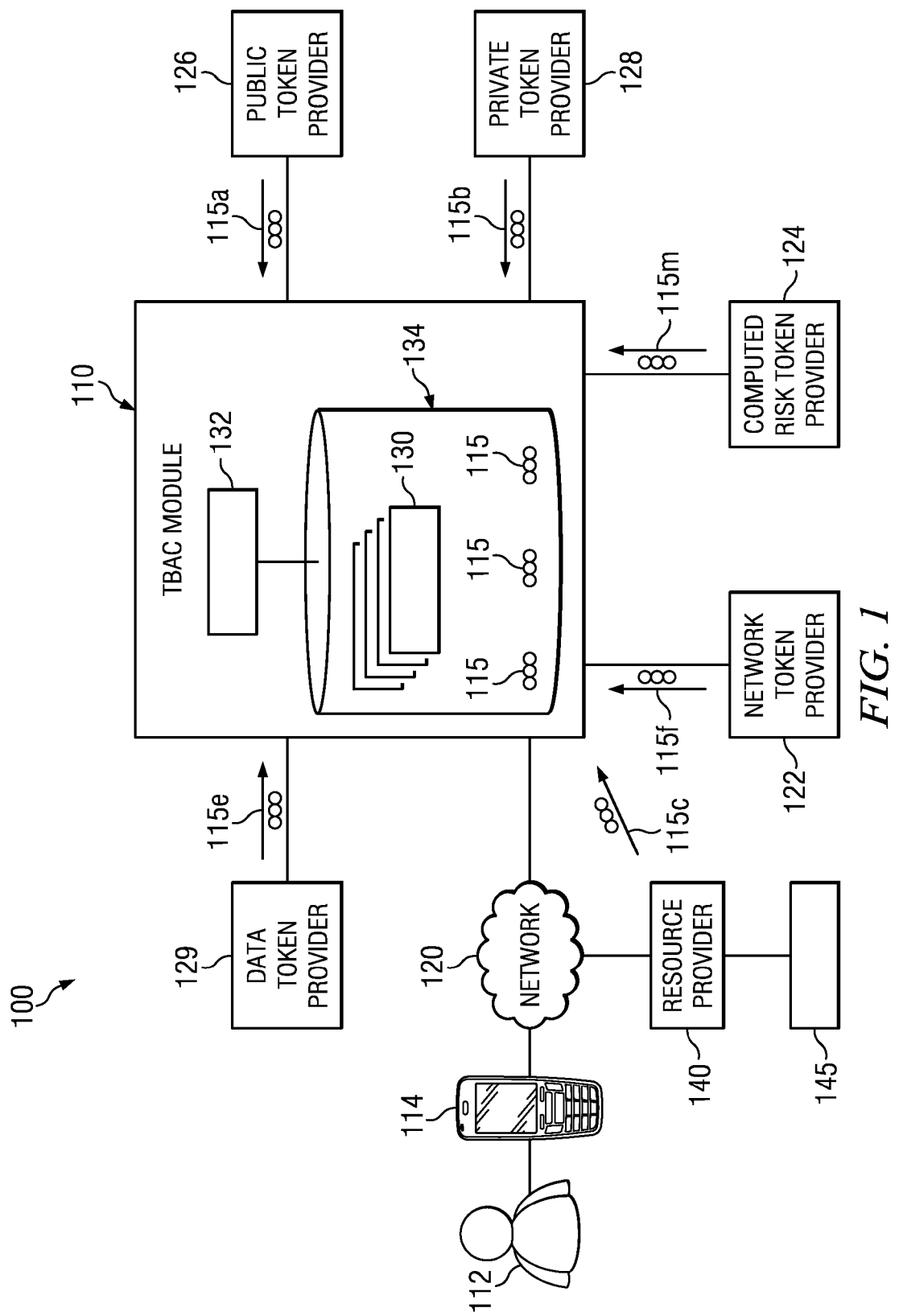
FIG. 1 illustrates a system for controlling access to a resource.

FIG. 1 illustrates a system 100 for controlling access to a resource 145. As provided in FIG. 1, system 100 may include a device 114, a network 120, a TBAC module 110, a resource provider 140, a network token provider 122, a computed risk token provider 124, a public token provider 126, and a private token provider 128. Device 114, resource provider 140, and TBAC module 110 may be coupled to network 120. In general, TBAC module 110 may use tokens 115 to control access by a user 112 to a resource 145 provided by resource provider 140. When user 112 uses device 114 to request a resource 145 from resource provider 140, TBAC module 110 may intercept the request and determine if user 112 should be granted access to the resource 145. TBAC module 110 may make this determination by examining tokens 115 from various token providers. Tokens 115 may provide TBAC module 110 with information associated with user 112, device 114, and network 120. After examining tokens 115, TBAC module 110 may grant access, deny access or condition access to the resource 145. Although this disclosure describes system 100 including specific elements, this disclosure contemplates system 100 including any suitable elements to perform the described operations of system 100. For example, system 100 may include more token providers than the ones listed above. System 100 may also operate across several networks 120.

In particular embodiments, system 100 may be operable to make token-based access decisions in lieu of attribute-based access decisions. For example, system 100 may examine and process tokens 115 in determining whether to grant a user 112 access to a resource 145. System 100 may also communicate and receive communications in the form of tokens 115. In particular embodiments, tokens 115 may represent a plurality of properties, qualities, or features, also known as attributes, belonging to a user 112, a device 114, a network 120, or a resource 145. A token 115 may represent hundreds or even thousands of attributes. Although this disclosure describes tokens 115 representing attributes of particular elements, this disclosure contemplates tokens 115 representing attributes of any element of system 100. In particular embodiments, tokens 115 may also represent a plurality of other tokens 115. In this manner, system 100 may use tokens 115 to communication information about attributes and other tokens 115.

Tokens 115 may be generated by TBAC module 110 and the various token providers, such as for example, the public token provider 126. Each token 115 may have a type that depends upon the source of the token 115. As an example and not by way of limitation, token 115 may be a public token 115a, private token 115b, resource token 115c, risk token 115m, data token 115e, or network token 115f pursuant to the particular token provider that generated the token 115. Although this disclosure describes token 115 being of particular types, this disclosure contemplates tokens 115 being of any suitable type to perform the operations of system 100. Specific token types will be discussed further below. Because system 100 is a token-based system, system 100 may process a plurality of attributes and tokens 115 in the form of a token 115 rather than separately processing the individual attributes or tokens 115. In this manner, system 100 may make more efficient and quicker access decisions.

System 100 may include a user 112 and device 114. As an example and not by way of limitation, device 114 may be a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 100. Device 114 may also include a user interface, such as a display, a microphone, keypad, or other appropriate terminal equipment usable by user 112. In particular embodiments, device 114 may be configured to request and consume resources 145 provided by resource provider 140. In some embodiments, an application executed by device 114 may request and consume the resource 145. Although this disclosure describes device 114 with respect to particular types of devices, this disclosure contemplates device 114 being any suitable device.

In particular embodiments, device 114 may be operable to send information to identify device 114 to other system 100 components. As an example and not by way of limitation, device 114 may send a MAC address, IP address, and/or device name to identify device 114 to system 100 components. Although this disclosure describes device 114 sending particular types of information used to identify device 114, this disclosure contemplates device 114 sending any suitable information used to identify device 114. In particular embodiments, device 114 may be operable to send information to verify device 114 is compliant to consume a requested resource 145. As an example and not by way of limitation, device 114 may send an OS version, firmware version, and/or operating speed. Although this disclosure describes device 114 sending particular types of information used to verify the compliance of device 114, this disclosure contemplates device 114 sending any suitable information used to verify the compliance of device 114.

User 112 may use device 114 to send information to identify or authenticate user 112 to other system 100 components. As an example and not by way of limitation, user 112 may send a user ID and/or a password. Although this disclosure describes user 112 using device 114 to send particular types of information used to identify user 112, this disclosure contemplates user 112 using device 114 to send any suitable information used to identify user 112.

System 100 includes network 120. Device 114 may communicate with TBAC module 110 and resource provider 140 through network 120. This disclosure contemplates any suitable network 120 operable to facilitate communication between the components of system 100, such as device 114 and TBAC module 110. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

System 100 includes resource provider 140. Resource provider 140 may be operable to provide resources 145 to be consumed by device 114. As an example and not by way of limitation, resource provider 140 may provide device 114 an instance of an application from a cloud. As another example, resource provider 140 may provide computing power and send the results of a computation to device 114. Resource 145 may also be, for example, a service, an application, or a virtual machine. In particular embodiments, resource provider 140 may be operable to send resource tokens 115c to TBAC module 110. Resource tokens 115c may identify the types of resources 145 provided by resource provider 140. Resource tokens 115c may also identify the types of resources 145 requested by device 114. As an example and not by way of limitation, a particular resource token 115c may indicate that resource provider 140 has been requested to provide a financial application to device 114. Resource provider 140 may further include a policy enforcement point. In particular embodiments, the policy enforcement point may restrict or exclude user 112 from accessing a resource 145 until TBAC module 110 grants access to user 112.

System 100 may include public token provider 126, network token provider 122, computed risk token provider 124, private token provider 128, and data token provider 129. These token providers may provide TBAC module 110 with particular types of tokens 115. Public token provider 126 may provide public tokens 115a (standardized and non-standardized), such as for example, Kerberos and SAML tokens. Network token provider 122 may provide network tokens 115f used to determine the status, vulnerability, congestion, etc. of network 120. Private token provider 128 may provide private tokens 115b, such as for example, custom tokens and private key tokens. Data token provider 129 may provide data tokens 115e, such as for example, tokens 115 representing social security numbers, dates, or email addresses. Computed risk token provider 124 may calculate risk tokens 115m indicating the risk associated with granting user 112 and/or device 114 access to a requested resource 145 over network 120. When an element of device 114 or network 120 changes, computed risk token provider 124 may update the risk token 115m associated with granting access to resource 145.

Each token 115 may represent a set of attributes that describe user 112, device 114, network 120, or an action or set of actions performed by user 112. It may take hundreds or thousands of attributes to fully describe user 112, device 114, network 120, and a set of actions performed by user 112. Because of the large number of attributes used, it may be faster and more efficient to examine tokens 115, that embody or represent a set or group of attributes, rather than the individual attributes when making a determination of whether to grant or deny access to a resource or service. In particular embodiments, system 100 may provide more efficient access control because system 100 makes access decisions based on tokens 115 rather than attributes. Because an access decision may depend upon thousands of attributes, the access decision may be quickened if system 100 examined tokens 115 that were abstracted from groups of attributes. By examining tokens 115 rather than attributes, TBAC module 110 may focus on processing access rules rather than identifying attributes and attribute relationships.

In particular embodiments, tokens 115 may include metadata based on the attributes and/or set of attributes represented by token 115. Because of the large number of attributes that a token 115 may represent, it may be more efficient to condense or abstract particular attributes into metadata. In this manner, system 100 may examine multiple attributes in a condensed form. As an example and not by way of limitation, a token 115 may be used to represent the health status, gender, and age group of a user 112. These attributes may be condensed and/or abstracted into one or more forms of metadata.

For example, token 115 may represent a color that represents these attributes. The color green may mean that user 112 is a sick boy. The color blue may mean that user 112 is a sick girl. The color yellow may mean that user 112 is a healthy adult man. The color red may mean that user 112 is a healthy elderly woman. In this example, system 100 may determine the health status, gender, and age range of user 112 by observing a color rather than values for these attributes. Although this disclosure describes condensing and/or abstracting particular attributes into particular forms of metadata, this disclosure contemplates abstracting and/or condensing any number and combination of attributes into any number and combination of forms of metadata.

In particular embodiments, because tokens 115 may condense and/or abstract attributes into forms of metadata, tokens 115 may also be cryptic. This means that particular forms of translation, mapping, and/or decryption may be necessary for system 100 to understand the information represented by token 115. To continue the previous example, if system 100 determines that a token 115 represents the color green, system 100 may not understand that token 115 indicates that user 112 is a sick boy unless there is a mapping between colors and health status, gender, and age range. If system 100 performs the mapping, then the color represented by token 115 will carry meaning. Otherwise, the meaning will not be understood. In this manner, the information that token 115 represents (e.g. health status and gender) may be safeguarded even if token 115 were intercepted maliciously. Although this disclosure describes system 100 handling a cryptic token 115 in a particular manner, this disclosure contemplates system 100 handling a cryptic token 115 in any appropriate manner including the application of any number and combination of forms of decryption.

In particular embodiments, tokens 115 may provide assurance that attributes are authentic and accurate. Tokens 115 may provide this assurance by representing attributes associated with access control along with other attributes. As an example and not by way of limitation, a token 115 may represent an authentication attribute indicating that user 112 has performed a form of authentication such as biometric authentication. Token 115 may further represent attributes associated with user 112 such as age and gender. When system 100 examines token 115, system 100 may be provided assurance that the age and gender represented by token 115 is authentic and accurate because token 115 also represents that user 112 has performed biometric authentication. In this manner, system 100 may be provided assurance that the information represented by token 115 is authentic and accurate. Although this disclosure describes token 115 providing assurance in a particular manner, this disclosure contemplates token 115 providing assurance in any appropriate manner.

In particular embodiments, tokens 115 may provide real-time information with respect to an element of system 100. This means that the information provided by token 115 may be current, and that the information represented by token 115 may be updated to represent the current state of an element of system 100. As an example and not by way of limitation, token 115 may represent the location of user 112. As user 112 moves from location to location, token 115 may update to represent the current location of user 112. In particular embodiments, updating token 115 may include system 100 receiving a new or updated version of token 115. In this manner, system 100 may examine token 115 to track the current location of user 112. Although this disclosure describes providing real-time information with respect to a particular attribute, this disclosure contemplates token 115 providing real-time information with respect to any number and combination of attributes.

When particular changes occur in user 112, device 114, network 120, or resource provider 140, the various token providers, device 114, or resource provider 140 may generate and send a new token 115 to TBAC module 110. The new token 115 may represent the state of user 112, device 114, network 120, or resource provider 140 after the change. The new token 115 may trigger TBAC module 110 to perform a particular process or action in response to the new state. As an example and not by way of limitation, if user 112 attaches a peripheral device, such as a USB drive, to device 114, then device 114 may generate and send a new token 115 to TBAC module 110 to indicate the presence of the peripheral device, and computed risk token provider 124 may calculate and send TBAC module 110 a new risk token 115g taking into account the presence of the peripheral device. In response, TBAC module 110 may produce an error or terminate the session if the new risk token 115g indicates the peripheral device presents an unacceptable risk.

In particular embodiments, system 100 may include TBAC module 110. TBAC module 110 may include a processor 132 coupled to a memory 134. TBAC module 110 may be coupled to and may receive tokens 115 from public token provider 126, network token provider 122, computed risk token provider 124, and private token provider 128. TBAC module 110 may examine tokens 115 from the various token providers to determine if user 112 and device 114 should be granted access to a resource 145 or service.

TBAC module 110 may include memory 134. Memory 134 may store, either permanently or temporarily, data, operational software, or other information for processor 132. Memory 134 may include any one or a combination of volatile or non-volatile local or remote devices suitable for storing information. For example, memory 134 may include random access memory (RAM), read only memory (ROM), magnetic storage devices, optical storage devices, or any other suitable information storage device or a combination of these devices. Memory 134 may store tokens 115 and any relationships amongst the tokens 115. In particular embodiments, memory 134 may further store sets of token-based rules 130. Rules 130 may direct how TBAC module 110 responds to a particular set of received tokens 115.

Memory 134 may store four particular sets of token-based rules 130, each corresponding to a particular operation of TBAC module 110. The first set of rules 130 is the container chaining rules discussed with respect to FIGS. 2 and 3. The second set of rules 130 is the attribute aggregation and assimilation rules discussed with respect to FIGS. 4 and 5. The third set of rules 130 is the attribute abstraction rules discussed with respect to FIGS. 6 and 7. The fourth set of rules 130 is the tabular trust and transaction rules discussed with respect to FIGS. 8-10.

Each set of rules 130 may facilitate a function of the TBAC module 110. For example, the tabular trust and transaction rules may facilitate the grant or denial of access to a resource 145 by TBAC module 110.

TBAC module 110 may include processor 132. Processor 132 may control the operation and administration of TBAC module 110 by processing information received from network 120 and memory 134. Processor 132 may include any hardware and/or software that operates to control and process information. For example, processor 132 may examine a set of tokens 115 and apply a token-based rule 130 associated with the set of tokens 115. Processor 132 may be a programmable logic device, a microcontroller, a microprocessor, any suitable processing device, or any suitable combination of the preceding.

In operation, TBAC module 110 may perform four primary functions: chaining containers, aggregating attributes, abstracting attributes, and making access decisions. In chaining containers, TBAC module 110 may examine a set of tokens 115 to determine if a device 114 is capable of consuming a requested resource 145.

This function will be discussed further with respect to FIGS. 2 and 3. In aggregating attributes, TBAC module 110 may retrieve, as tokens 115, the attributes required to grant access to a particular resource 145. This function will be discussed further with respect to FIGS. 4 and 5. In abstracting attributes, TBAC module 110 may communicate a plurality of tokens 115 to be used in the computing of a risk token 115m. This function will be discussed further with respect to FIGS. 6 and 7. In making an access decision, TBAC module 110 may examine a plurality of tokens 115 to determine whether to grant access, deny access, or condition access to a resource 145. This function will be discussed further with respect to FIGS. 8-10. In addition, TBAC module 110 may perform four other categories of functions as described in this disclosure. The first category of functions pertains to user 112: re-authentication, combining authentication methods, reassigning privileges, and packet prioritization. During re-authentication, TBAC module 110 may prompt user 112 for a one-time password generated using the personal information of the user 112. This function will be discussed further with respect to FIGS. 11 and 12. During combining authentication methods, TBAC module 110 may examine multiple authentication methods to determine if a particular combination of authentication methods leads to the assignment of a privilege to user 112. This function will be discussed further with respect to FIGS. 13 and 14. During reassigning privileges, TBAC module 110 may detect a change that poses a risk associated with granting the user 112 a certain privilege, and may update the privileges accordingly. This function will be further discussed with respect to FIGS. 15 and 16. During packet prioritization, TBAC module 110 may prioritize the packets of a high priority user 112 over the packets of users 112 with a lower priority. This function will be further discussed with respect to FIGS. 17 and 18.

The second category of functions pertains to access decisions: conditioning, accessing related resources, real-time risk updating, combining risk ratings, transaction tagging, real-time authentication using subject token combinations, session validation, determining access values, exceptions, and end-to-end encryption. During conditioning, TBAC module 110 may determine any conditions associated with an access decision, and may communicate the conditions. This function will be further discussed with respect to FIGS. 19 and 20. During accessing related resources, TBAC module 110 may determine if a user 112 may access any resources 145 related to a requested resource 145. This function will be further discussed with respect to FIGS. 21 and 22. During real-time risk updating, TBAC module 110 may update the risk associated with granting a user 112 or device 114 access to a resource 145 in real-time, even as the device 114 may be consuming the resource 145.

This function will be discussed further with respect to FIGS. 23 and 24. During combining risk ratings, TBAC module 110 may examine multiple risk ratings associated with granting access to various resources to determine a composite risk associated with user 112 and device 114. This function will be discussed further with respect to FIGS. 25 and 26. During transaction tagging, TBAC module 110 may detect suspicious transactions and tag them for monitoring and isolation. This function will be discussed further with respect to FIGS. 27 and 28. During real-time authentication using subject token combinations, TBAC module 110 may determine missing forms of user and/or device authentication that need to be performed to grant access to a resource. This function will be discussed further with respect to FIGS. 39 and 40. During session validation, TBAC module 110 may generate and maintain session tokens 115j. This function will be discussed further with respect to FIGS. 41 and 42. To determine access values, TBAC module 110 may associate particular combinations of tokens 115 to particular access values, such as assurance level, trust level, integrity level, and risk level. Then, TBAC module 110 may make access decisions based on these access values. This function will be discussed further with respect to FIGS. 47-54. During exceptioning, TBAC module 110 may use tokens 115 to determine an exception to the token-based rules. TBAC module 110 may make an access decision based on the exception. This function will be discussed further with respect to FIGS. 55 and 56. During end-to-end encryption, TBAC module 110 may use tokens 115 to determine whether particular forms of encryption should be performed before access may be granted. This function will be discussed further with respect to FIGS. 57 and 58.

The third category of functions pertains to devices 114 and token providers: context caching and virtual machine recycling. During context caching, an attribute cache may be cleansed and updated based on tokens 115 involved in a risk computation. This function will be discussed further with respect to FIGS. 29 and 30. During VM recycling, TBAC module 110 may facilitate the recycling of stale virtual machines. This function will be discussed further with respect to FIGS. 31 and 32.

The fourth category of functions pertains to tokens 115: token termination, tamper detection, data tokenization, and transaction token handling. During token termination, TBAC module 110 may terminate and initialize tokens 115 for particular resources based on risk. This function will be discussed further with respect to FIGS. 33 and 34. During tamper detection, TBAC module 110 may detect if a token 115 has been tampered, and if so, may re-generate that token 115. This function will be discussed further with respect to FIGS. 35 and 36. During data tokenization, TBAC module 110 may determine whether a data token representing data should be generated, and if so, may initialize data tokenization by generating and transmitting messages to appropriate token providers. This function will be discussed further with respect to FIGS. 43 and 44. During transaction token handling, TBAC module 110 may receive a transaction token and determine whether to allow an associated transaction based on the risk that the transaction may be fraudulent. This function will be discussed further with respect to FIGS. 45 and 46. Although particular functions have been previewed above in conjunction with particular figures in order to organize the subject matter for the reader, it should be understood that the present disclosure contemplates any suitable number and combination of components and functions regardless of any specific reference to the figures.

The functions of the TBAC module 110 described herein may be performed by executing software stored in one or more non-transitory storage media, such as a computer-readable medium or any other suitable tangible medium. In particular embodiments, TBAC module 110 or any other suitable component such as, for example, processor 132, may execute software stored in the one or more storage media to perform any of the functions of the TBAC module 110 described herein.

In particular embodiments, because TBAC module 110 communicates and processes tokens 115 rather than attributes and because TBAC module 110 operates on multiple types of tokens 115 from different sources, rather than only one type of token (for example, a subject token 115b), TBAC module 110 may make quicker and more efficient decisions with more granularity and particularity as to user 112, device 114, network 120, and the requested resource 145. TBAC module 110 may consider a large number of attributes and tokens 115 by examining only a few tokens 115. This may reduce the processing time and memory profile associated with any particular operation. Further advantages may be readily apparent from the present disclosure.

Figure 2:
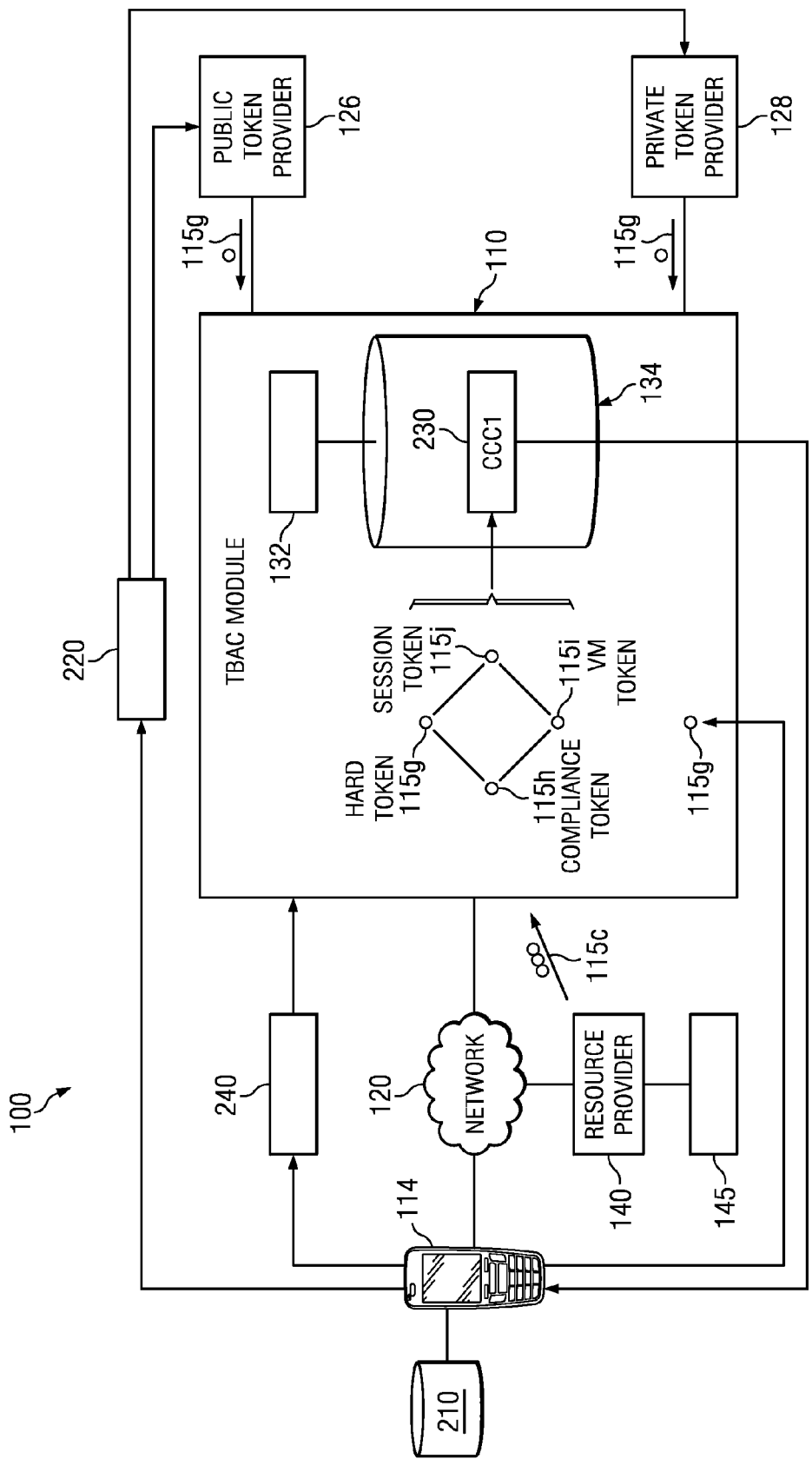
FIG. 2 illustrates the system of FIG. 1 chaining a container.
Figure 3:
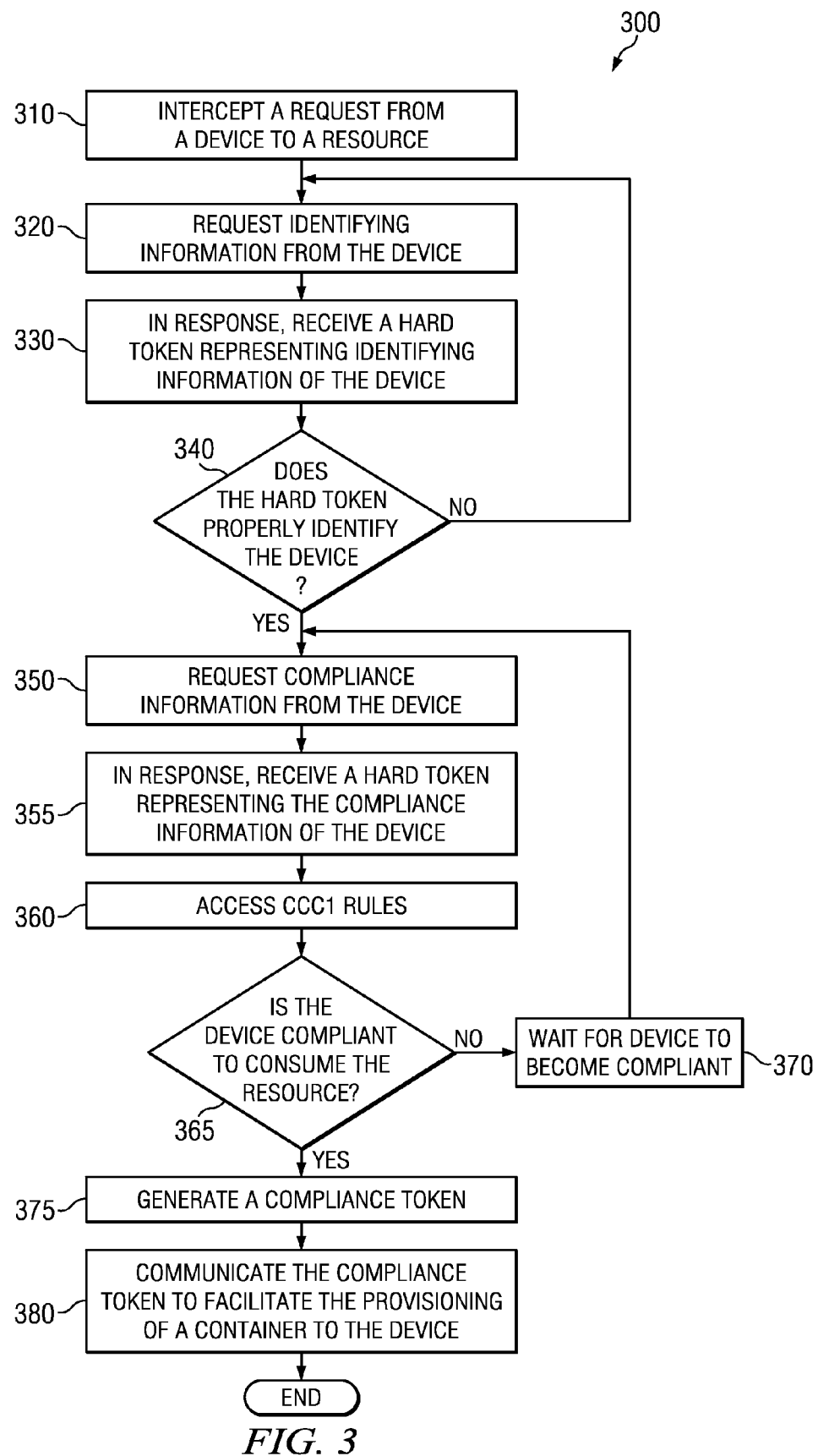
FIG. 3 is a flowchart illustrating a method of chaining a container using the system of FIG. 1.

FIGS. 2 and 3 illustrate how system 100 may perform the container chaining function to prepare a device 114 to consume a resource 145. Prior to granting device 114 access to the resource 145, device 114 is provisioned with an appropriate container 210 that is capable of facilitating access to and consumption of the resource 145. For example, the device 114 may be provisioned a container 210 that includes a virtual machine that can be used to consume the resource 145. Prior to provisioning such a container 210, however, system 100 ensures that the device 114 is compliant, among other things. This process of checking the compliance of the device 114 and subsequently provisioning a container 210 to the device 114 is referred to as container chaining and will be described in greater detail with respect to FIGS. 2 and 3.

When system 100 receives an initial request 240 from device 114 for access to a particular resource 145, system 100 may first identify device 114 and then verify that device 114 is compliant for consuming the requested resource 145. By identifying device 114 and verifying its compliance, system 100 may reduce the chances of granting device 114 access to a resource 145 it cannot consume. For example, if device 114 contains old versions of firmware or obsolete hardware, it may not be desirable to grant device 114 access to a resource 145 that requires updated firmware or to a resource 145 that requires fast processing speeds. After system 100 identifies device 114 and verifies that device 114 is compliant, system 100 may provision a container 210 to device 114. Container 210 may facilitate access to and consumption of the resource 145. In particular embodiments, system 100 may use tokens 115 to perform the container chaining function thereby increasing the speed and efficiency at which system 100 may perform the function.

FIG. 2 illustrates the system 100 of FIG. 1 chaining a container 210. As provided in FIG. 2, TBAC module 110 may direct the container chaining process. The first task is for TBAC module 110 to identify device 114. After device 114 requests a resource 145, represented by resource token 115c, from resource provider 140, TBAC module 110 may intercept the request 240 and request device 114 to identify itself. In response, device 114 may send identifying information 220 to a public token provider 126 or to a private token provider 128. As an example and not by way of limitation, device 114 may send a MAC address, an IP address, and/or a device name. Public token provider 126 or private token provider 128 may provide TBAC module 110 with a hard token 115g that represents the identifying information 220 sent by device 114. Although this disclosure describes hard token 115g representing particular information 220 used to identify device 114, this disclosure contemplates hard token 115g representing any suitable information 220 that identifies device 114, such as for example, information from Layer 2 of the Open Systems Interconnection (OSI) stack. Although this disclosure describes a singular hard token 115g representing identification information of device 114, this disclosure contemplates any number and combination of hard tokens 115g representing the identification information 220. Resource provider 140 may further send to TBAC module 110 resource token 115c representing resource 145. Although this disclosure describes a singular resource token 115c representing resource 145, this disclosure contemplates any number and combination of resource tokens 115c representing resource 145.

After TBAC module 110 identifies device 114, TBAC module 110 may verify the compliance of device 114 to reduce the chances of granting device 114 access to a resource 145 that device 114 cannot consume. TBAC module 110 may use container chaining (CCC1) rules 230 stored in memory 134 to facilitate verifying the compliance of device 114. TBAC module 110 may use hard token 115g and resource token 115c to access CCC1 rules 230. By using CCC1 rules 230, TBAC module 110 may verify the compliance of device 114 to consume the requested resource 145 and may facilitate the provisioning of container 210 to device 114. As an example and not by way of limitation, a particular CCC1 rule 230 may specify certain compliance criteria in order for a device 114 identified by hard token 115g to consume the resource 145 associated with resource token 115c. For example, CCC1 rule 230 may specify that device 114 contain particular versions of firmware or operating system, or that device 114 meet particular hardware requirements. TBAC module 110 may determine the particular CCC1 rule 230 using hard token 115g and resource token 115c. TBAC module 110 may determine the compliance criteria from the determined CCC1 rule 230. In particular embodiments, TBAC module 110 may request and in response, receive another hard token 115g representing the compliance information of device 114, and TBAC module 110 may verify device 114 is compliant by comparing the compliance information against the determined compliance criteria. As an example and not by way of limitation, a particular CCC1 rule 230 may specify that a device 114 should be operating a particular version of firmware in order to consume the resource 145. TBAC module 110 may receive another hard token 115g representing the firmware version of the device 114. TBAC module 110 may then verify that device 114 contains a valid version of firmware by comparing the firmware version of device 114 with the particular firmware version specified by CCC1 rule 230. In particular embodiments, TBAC module 110 may quarantine device 114 until device 114 verifies that it is compliant or capable of consuming the requested resource 145 pursuant to CCC1 rule 230. After verifying that device 114 is compliant, TBAC module 110 may generate or receive a compliance token 115h. TBAC module 110 may then correlate hard token 115g and compliance token 115h in order to associate device 114 with its compliance information.

After device 114 has been deemed compliant, TBAC module 110 may communicate the compliance token 115h to facilitate the provisioning of container 210 to device 114. Container 210 may facilitate the consumption of the resource 145. In particular embodiments, container 210 may include a virtual machine operable to execute an application that consumes the requested resource 145. The virtual machine may be an application that executes on device 114 to simulate the operation of another device or a cloud resource. After device 114 has been provisioned with container 210, TBAC module 110 may receive a virtual machine (VM) token 115i. TBAC module 110 may correlate VM token 215c with hard token 115*g* and compliance token 115*h* so that information associated with container 210 may be associated with device 114.

In particular embodiments, TBAC module 110 may generate and correlate a session token 115*j* with hard token 115*g*, compliance token 115*h*, and VM token 115*i* in order to associate device 114 and container 210 to a session. Resource token 115*c* may also be associated with session token 115*j*. Session token 115*j* may represent the session. In particular embodiments, the session may facilitate access by device 114 to the resource 145. After correlating hard token 115*g*, compliance token 115*h*, VM token 115*i*, and session token 115*j*, any changes that occur to device 114 or to container 210 may alter or terminate the session. As an example and not by way of limitation, if a virus or malware is detected on device 114, TBAC module 110 may detect a new or altered token 115 associated with device 114 and terminate the session associated with session token 115*j*. Upon termination of the session, container 210 may be released. As another example and not by way of limitation, if a peripheral device is attached to device 114, TBAC module 110 may detect a token 115 associated with the peripheral device, then TBAC module 110 may pause the session. TBAC module 110 may recheck the compliance of device 114 (i.e., to check if device 114 is allowed to consume the requested resource 145 when device 114 has a peripheral device attached). If device 114 is compliant, TBAC module 110 may continue the session associated with session token 115*j*. In particular embodiments, TBAC module 110 may communicate to device 114, by way of tokens 115, that a session has been terminated or paused.

In particular embodiments, TBAC module 110 may perform the container chaining function to verify that a device 114 is compliant to reduce the chances of granting device 114 access to a resource 145 that it cannot consume. Furthermore, verifying compliance may make it more probable that device 114 may consume the resource 145 at an acceptable pace. As an example and not by way of limitation, if device 114 included obsolete hardware, TBAC module 110 may deny access because granting access may lead to slow execution. In particular embodiments, because TBAC module 110 uses tokens 115 rather than attributes in performing the container chaining function, TBAC module 110 may quickly and efficiently verify that device 114 is compliant.

Although this disclosure describes TBAC module 110 performing certain actions with respect to FIG. 2, this disclosure contemplates the processor 132 and the memory 134 of the TBAC module 110 performing these actions. The illustration of system 100 in FIG. 2 does not specifically illustrate all of the elements from the illustration of system 100 in FIG. 1 so that particular aspects of system 100 may be emphasized. However, system 100 of FIG. 2 includes all the elements of system 100 in FIG. 1.

FIG. 3 is a flowchart illustrating a method 300 of chaining a container 210 using the system 100 of FIG. 1. TBAC module 110 may perform method 300. As provided in FIG. 3, TBAC module 110 may begin by intercepting a request 240 from a device 114 to a resource 145 in step 310. In response, TBAC module 110 may proceed to identify device 114. To identify device 114, TBAC module 110 may request identifying information 220 from the device 114 in step 320. Identifying information 220 may be a MAC address, an IP address, a device name, or any suitable information used to identify the device 114. In response to the request, TBAC module 110 may receive a hard token 115*g* in step 330. Hard token 115*g* may represent identifying information 220 of the device 114. In step 340, TBAC module 110 may determine if the hard token 115*g* properly identifies the device 114. If the hard token 115*g* does not properly identify the device 114, TBAC module 110 may return to step 320 to request identifying information 220 from the device 114. If the hard token 115*g* does properly identify the device 114, TBAC module 110 may consider device 114 identified and continue to verify the compliance of device 114.

TBAC module 110 may verify that device 114 is compliant to consume the resource. By verifying that device 114 is compliant, TBAC module 110 may reduce the chances of granting access to a resource 145 that device 114 cannot consume. TBAC module 110 may begin verifying compliance in step 350 by requesting compliance information from the device 114. Compliance information may indicate whether the device 114 is capable of consuming the requested resource 145. In response to the request, TBAC module 110 may receive a hard token 115*g* representing the compliance information of the device 114 in step 355. TBAC module 110 may then access CCC1 rules 230 in step 360 to compare the compliance information of the device 114 against compliance criteria specified by a particular CCC1 rule 230. In step 365, TBAC module 110 may determine, based on the CCC1 rule 230, whether the device 114 is compliant to consume the resource 145. If the device 114 is not compliant, TBAC module 110 may move to step 370 by waiting for the device 114 to become compliant. As an example and not by way of limitation, device 114 may be incompliant because the firmware in device 114 needs to be updated. TBAC module 110 may wait for device 114 to update its firmware before proceeding to the next step. If the device 114 becomes compliant, TBAC module 110 may return to step 350 and request compliance information from the device 114.

If the device 114 is compliant for the requested resource 145, TBAC module 110 may generate a compliance token 115*h* in step 375. The compliance token 115*h* may represent the compliance of device 114. TBAC module 110 may then conclude by communicating the compliance token 115*h* to facilitate the provisioning of a container 210 to the device 114 in step 380. In particular embodiments, the container 210 may facilitate access by the device 114 to the resource 145.

In particular embodiments, correlating hard tokens 115*g*, compliance tokens 115*h*, VM tokens 115*i*, resource tokens 115*c*, and session token 115*j*, may provide more efficient handling of the identification and verification of device 114. Rather than examining thousands of attributes used to identify device 114 and the requested resource 145, TBAC module 110 may examine session token 115*j* and the tokens 115 correlated with it to discover the state of device 114 and container 210. By following method 300, TBAC module 110 may more efficiently identify and verify device 114 for consuming the requested resource 145.

Figure 4:
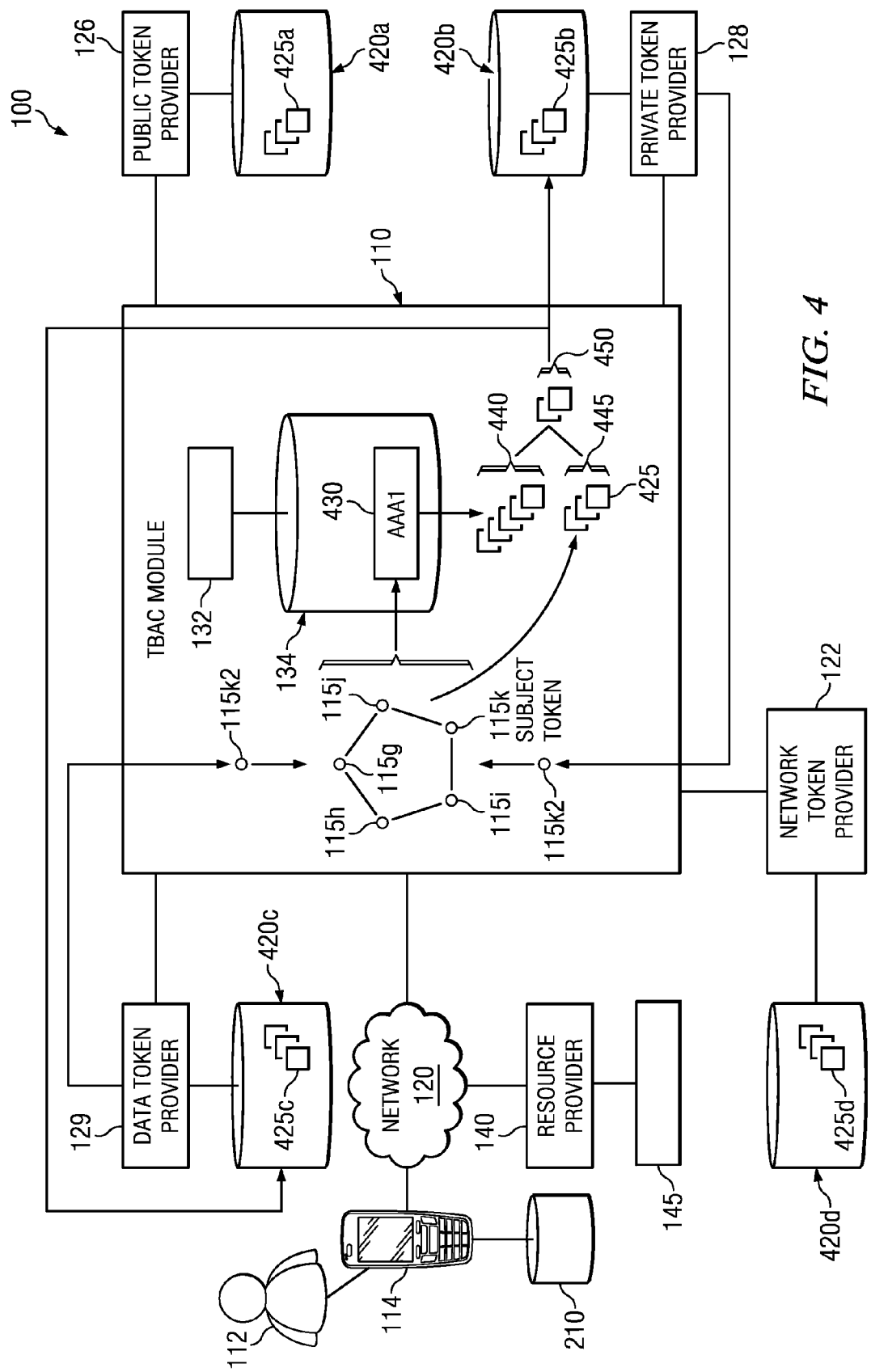
FIG. 4 illustrates the system of FIG. 1 aggregating attributes.
Figure 5:
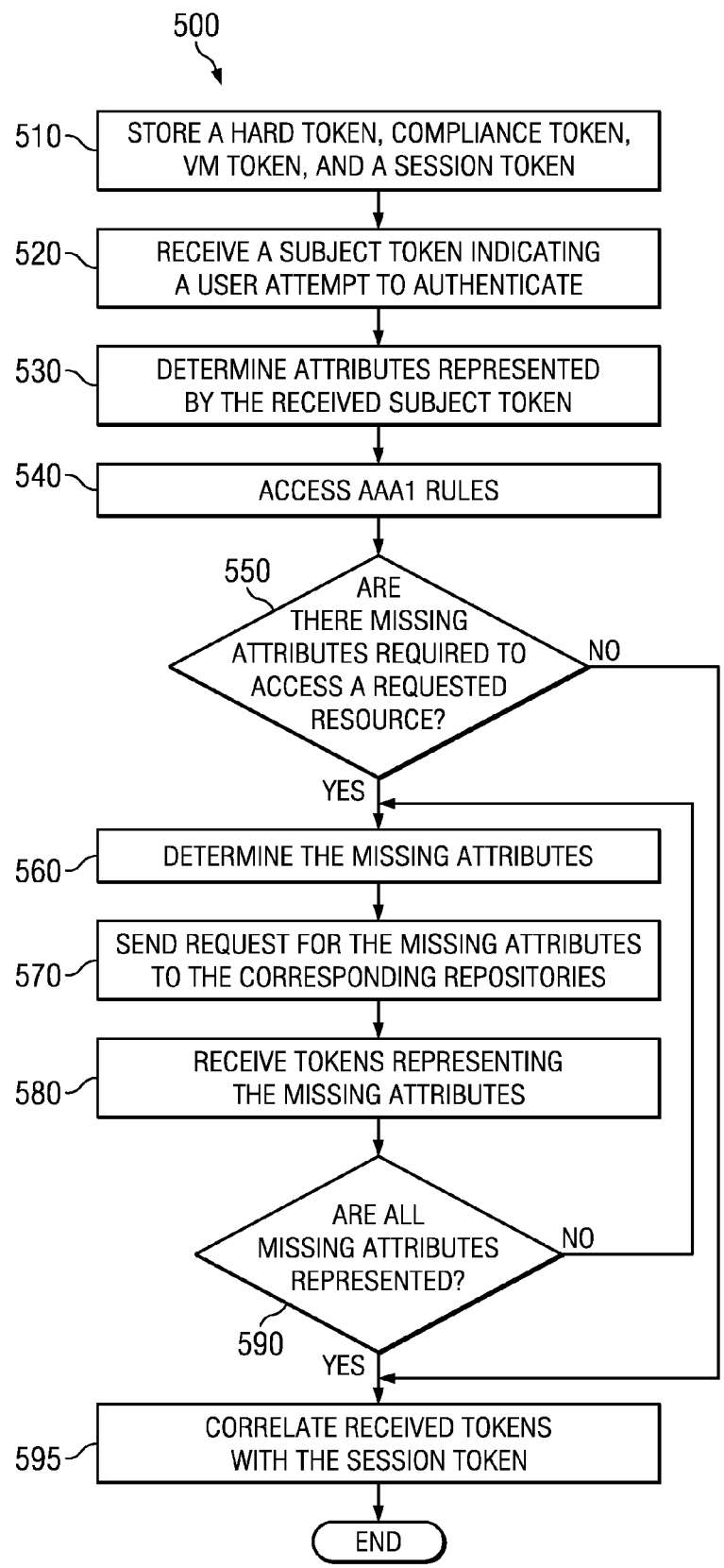
FIG. 5 is a flowchart illustrating a method of aggregating attributes using the system of FIG. 1.

FIGS. 4 and 5 illustrate how system 100 may perform the attribute aggregation function. In general, user 112 may be authenticated in order to access resource 112. During the authentication process, various properties, qualities, or features of user 112 may be examined. These properties, qualities, or features may be known as attributes 425. However, there may be thousands or millions of available attributes 425 that describe user 112, and resource 145 may not require all available attributes 425 be examined to grant access. If all available attributes 425 were considered, the authentication process may be slow and inefficient. The process by which TBAC module 110 determines and retrieves only those attributes 425 required to grant access to the resource 145 is known as attribute aggregation and is discussed in more detail with respect to FIGS. 4 and 5.

User 112 may begin the authentication process by providing authentication information, such as, for example, a user ID and a password, to gain access to a requested resource 145.

TBAC module 110 may receive a subject token 115k from the various token providers that represents the authentication information provided by user 112. However, resource provider 140 may require extra layers of authentication or extra authentication information associated with user 112 before resource provider 140 grants access to the requested resource 145. These extra layers of authentication or extra authentication information may be in the form of attributes 425 associated with user 112 stored in repositories 420a-d. One solution would be for TBAC module 110 to retrieve all the attributes 425 associated with user 112 from the repositories 420a-d. However, the resource provider 140 may not require all the attributes 425 associated with user 112 to grant access to the resource 145. As an example and not by way of limitation, resource provider 140 may require the age of the user 112, but not the location of the user 112 to grant access to resource 145. In particular embodiments, TBAC module 110 may determine, from an attribute aggregation (AAA1) rule 430, the set of attributes 440 required by resource provider 140 to grant access to resource 145. In particular embodiments, the set of attributes 440 may not be required to grant access to resource 145, but may be preferred or prioritized in making the determination to grant access to resource 145. TBAC module 110 may then determine from subject token 115k a set of attributes 445 already provided by user 112. TBAC module 110 may then determine, from the set of required attributes 440 and the set of provided attributes 445, a set of attributes 450 that are still missing and request only those attributes 425 from the repositories 420a-d. In particular embodiments, TBAC module 110 may provide faster and more efficient authentication by retrieving only the attributes 425 necessary to access the resource 145.

FIG. 4 illustrates the system 100 of FIG. 1 aggregating attributes 425. As provided in FIG. 4, TBAC module 110 may have correlated hard token 115g, compliance token 115h, and VM token 115i, among others, as appropriate, to session token 115j thus indicating that device 114 has been identified and verified compliant and that a container 210 has been provisioned to device 114 according to the container chaining function described with respect to FIGS. 2 and 3. User 112 may now initiate the authentication process by providing initial attributes, such as for example, initial authentication information to access a resource 145. Resource 145 may be represented by resource token 115c, which may also be sent to and stored in TBAC module 110. In particular embodiments, after the user 112 has provided initial authentication information, such as for example, a user ID and password, in the form of subject token 115k, TBAC module 110 may determine a set of required attributes 440 required to access the requested resource 145. System 100 may then inspect subject token 115k to determine a set of provided attributes 445. System 100 may then compare the set of provided attributes 445 and the set of required attributes 440 to determine a set of missing attributes 450. System 100 may then request the missing attributes from repositories 420a-d. System 100 may then receive at least one more subject token 115k representing the missing attributes from the various token providers, and correlate the at least one more subject token 115k to the session token 115j. In this manner, system 100 may provide a more efficient user authentication scheme by retrieving only the attributes 425 necessary to access the requested resource 145.

TBAC module 110 may determine the set of required attributes 440 using AAA1 rules 430 stored in memory 134. A particular AAA1 rule 430 may indicate a set of required attributes 440 required by resource provider 140 to grant user 112 access to a particular resource 145. In particular embodiments, TBAC module 110 may use a stored token 115, such as the resource token 115c, and the subject token 115k to determine the particular AAA1 rule 430. By using AAA1 rules 430, TBAC module 110 may determine and retrieve only those attributes 440 required to access resource 145. TBAC module 110 may examine the subject token 115k associated with user 112 to determine a set of provided attributes 445. TBAC module 110 may then determine a set of missing attributes 450 by comparing the set of required attributes 440 and the set of provided attributes 445. As an example and not by way of limitation, a particular AAA1 rule 430 may specify that accessing a particular resource 145 requires the time of login and the social security number of the user 112 in addition to the user ID and password of the user 112. However, subject token 115k may represent only the user ID and password of the user 112. In this case, TBAC module 110 may determine that the time of login and the social security number are in the set of missing attributes 450.

After determining the set of missing attributes 450, TBAC module 110 may request the missing attributes 450 from various corresponding repositories 420a-d. Each repository 420a-d may correspond with one of the various token providers. Each repository 420a-d may store attributes 425a-d associated with user 112. As an example and not by way of limitation, data repository 420c may store data attributes 425c associated with user 112 such as a social security number or telephone number. Each repository 420a-d may return, to a corresponding token provider, the attributes 425a-d requested by TBAC module 110. Each token provider may then generate and send a token 115 that represents the returned attributes 425 to TBAC module 110, such as for example, a new subject token 115k2. TBAC module 110 may then correlate the new subject token 115k2 to session token 115j. TBAC module 110 may further store the new subject token 115k2 in memory 134. Using the previous example, TBAC module 110 may determine the time of login and the social security number of the user 112 are in the set of missing attributes 450. TBAC module 110 may then request the time of login and the social security number from the corresponding repositories, such as for example, the data repository 420c. In response, the data repository 420c may return, to the data token provider 129, the social security number of the user. The data token provider 129 may generate a new subject token 115k2 representing the social security number of the user 112, and send the new subject token 115k2 to TBAC module 110. A similar process may be followed by the private repository 420b to return the time of login. In this manner, TBAC module 110 may provide a more efficient authentication scheme by retrieving only the attributes 440 required by resource provider 140 to access the requested resource 145.

Although this disclosure describes TBAC module 110 performing certain actions with respect to FIG. 4, this disclosure contemplates the processor 132 and the memory 134 of the TBAC module 110 performing these actions. The illustration of system 100 in FIG. 4 does not specifically illustrate all of the elements from the illustration of system 100 in FIG. 1 so that particular aspects of system 100 may be emphasized. However, system 100 of FIG. 4 includes all the elements of system 100 in FIG. 1.

FIG. 5 is a flowchart illustrating a method 500 of aggregating attributes 425 using the system 100 of FIG. 1. TBAC module 110 may perform method 500. As provided in FIG. 5, TBAC module 110 may begin by storing a hard token 115g, compliance token 115h, VM token 115i, and a session token 115j, among others, as appropriate, in step 510. These tokens 115 may be correlated and stored pursuant to the process discussed with respect to FIGS. 2 and 3. TBAC module 110 may continue by receiving a subject token 115k indicating a user attempt to authenticate in step 520. The subject token 115k may indicate a user attempt to authenticate by representing certain attributes 425 of the user 112 such as, for example, a user ID and password. TBAC module 110 may continue by determining the attributes 425 represented by the subject tokens 115k in step 530. These attributes 425 may be the set of provided attributes 445. TBAC module 110 may continue by accessing AAA1 rules 430 in step 540. AAA1 rules 430 may specify all the attributes 425 required to access resource 145. These specified attributes 425 may be the set of required attributes 440. In step 550, TBAC module 110 may determine from the set of required attributes 440 and the set of provided attributes 430 if there are missing attributes 450 required to access the requested resource 145. If there are no missing attributes 450, TBAC module 110 may conclude by correlating the subject token 115k to the session token 115j in step 595. However, in particular embodiments, the attributes 425 represented by the subject token 115k may not be sufficient to grant access to a requested resource 145. In that situation, method 500 may determine that there are missing attributes 450 in step 550. Accordingly, TBAC module 110 may determine the missing attributes 450 in step 560.

To retrieve the missing attributes 450, TBAC module 110 may continue by sending a request for the missing attributes 450 to the corresponding repositories 420a-d in step 570. In response to the request, method 500 may receive tokens 115 representing the missing attributes 450 in step 580. In step 590, TBAC module 110 may determine if, according to the AAA1 rules 430, all missing attributes 450 have been represented by the received tokens 115. If not, TBAC module 110 may return to step 560 and request the still missing attributes 450. If all missing attributes 450 have been represented by the received tokens 115, TBAC module 110 may conclude by correlating the received tokens 115 with the session token 115j in step 595. By performing method 500, TBAC module 110 may provide a more efficient authentication scheme by retrieving only the attributes 425 required by resource provider 140 to access the requested resource 145.

In particular embodiments, attribute aggregation allows system 100 to provide a faster and more efficient authentication process by determining and retrieving only the attributes 440 required to access resource 145. Furthermore, because TBAC module 110 processes all the attributes 425 using tokens 115, system 100 may perform the authentication process even faster than if it considered individual attributes 425.

Figure 6:
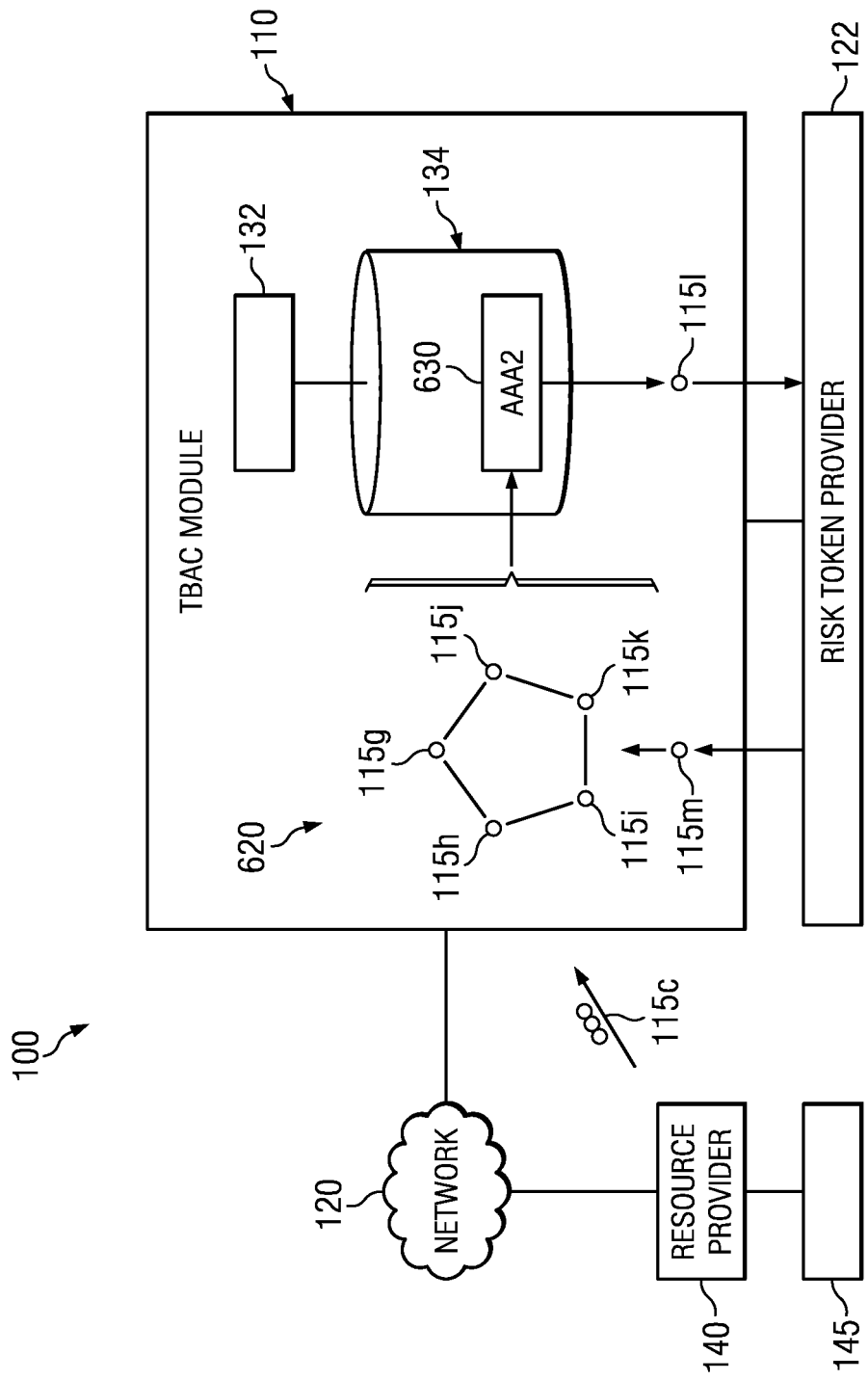
FIG. 6 illustrates the system of FIG. 1 performing attribute abstraction.
Figure 7:
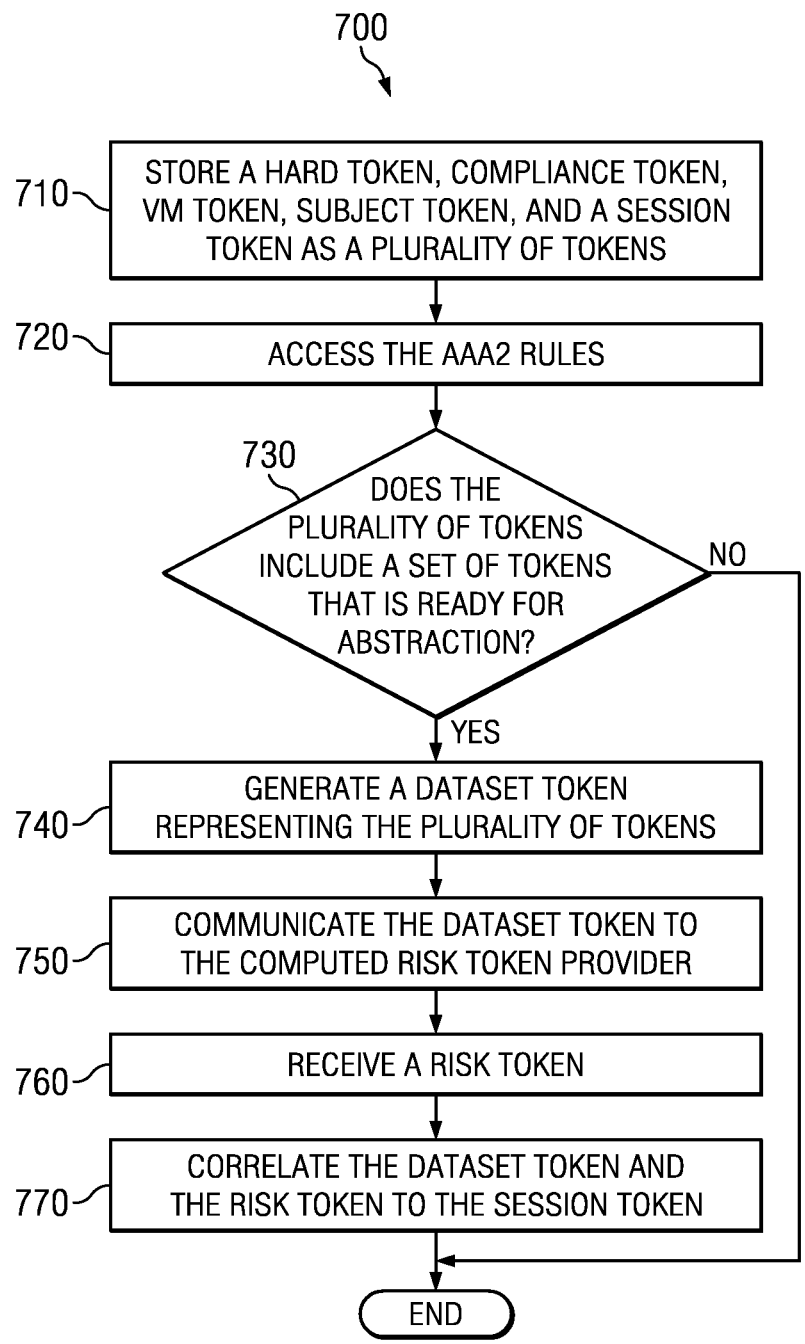
FIG. 7 is a flowchart illustrating a method of performing attribute abstraction using the system of FIG. 1.

FIGS. 6 and 7 illustrate how system 100 may perform the attribute abstraction function. In general, TBAC module 110 may facilitate the generation of new tokens 115 from a particular set of tokens 620, not just attributes 425. Prior to generating the new token 115, TBAC module 110 may determine whether the particular set of tokens 620 is present. If the particular set of tokens 620 is present, TBAC module may communicate the particular set of tokens 620 to a token provider. The token provider may generate the new token 115 that represents a particular aspect of the particular set of tokens 620. This process is known as attribute abstraction, which is discussed further with respect to FIGS. 6 and 7 in the context of generating a risk token 115m. Although this disclosure describes the attribute abstraction function using a particular context, this disclosure contemplates performing the attribute abstraction function in any suitable context.

TBAC module 110 may perform attribute abstraction to facilitate the generation of a risk token 115m. In particular embodiments, TBAC module may determine that a particular set of tokens 620 is ready for abstraction. Then, TBAC module 110 may generate a dataset token 115l representing the set of tokens 620, and communicate the dataset token 115l to the computed risk token provider 122. In response, the computed risk token provider 122 may compute and return a risk token 115m associated with the set of tokens 620.

FIG. 6 illustrates the system 100 of FIG. 1 performing attribute abstraction. As provided in FIG. 6, TBAC module 110 may store a hard token 115g, compliance token 115h, VM token 115i, and subject token 115k, among others, as appropriate. These tokens 115 may be correlated with session token 115j, also stored in TBAC module 110. TBAC module 110 may also receive and store resource token 115c from resource provider 140. In particular embodiments, resource tokens 115c may be correlated with session token 115j. In particular embodiments, these tokens 115 may form a set of tokens 620. To perform attribute abstraction, TBAC module 110 may determine whether the set of tokens 620 is ready for abstraction. As an example and not by way of limitation, TBAC module 110 may determine that the set of tokens 620 contains sufficient tokens 115 for a risk token 115m to be computed. In response to this determination, TBAC module 110 may communicate information about the set of tokens 620 to facilitate generation of the risk token 115m.

In particular embodiments, TBAC module 110 may store attribute abstraction (AAA2) rules 630 in memory 134. AAA2 rules 630 may specify when a particular set of tokens 620 is ready for abstraction. As an example and not by way of limitation, a particular AAA2 rule 630 may specify that a set of tokens 620 is ready for abstraction when the set of tokens 620 includes a subject token 115k, a hard token 115g, a compliance token 115h, a VM token 115i, and a session token 115j. If the particular set of tokens 620 includes those tokens 115, then TBAC module 110 may generate a dataset token 115l that represents the set of tokens 620. In particular embodiments, dataset token 115l may be used to communicate information about the set of tokens 620. The information about the set of tokens 620 may be used to perform attribute abstraction.

To complete the attribute abstraction process, TBAC module 110 may communicate the dataset token 115l to a token provider. In particular embodiments, TBAC module 110 may communicate the dataset token 115l to computed risk token provider 122. In response, computed risk token provider 122 may evaluate the set of tokens 620 represented by dataset token 115l and compute a risk associated with the set of tokens 620. As an example and not by way of limitation, the risk may be associated with granting user 112 (associated with subject token 115k) and device 114 (associated with hard token 115g) access to the resource 145 (associated with resource token 115c). Computed risk token provider 122 may generate a risk token 115m to represent the computed risk. Computed risk provider 122 may communicate the risk token 115m to TBAC module 110. When TBAC module 110 receives the risk token 115m, it may correlate it with session token 115j. In this manner, TBAC module 110 may perform attribute abstraction by taking a set of tokens 620 and abstracting another token 115, such as a risk token 115m, that represents a particular aspect associated with the set of tokens 620. In this example, the aspect is the risk associated with granting a user 112 access to a resource 145 associated with the set of tokens 620.

Although this disclosure describes TBAC module 110 performing certain actions with respect to FIG. 6, this disclosure contemplates the processor 132 and the memory 134 of the TBAC module 110 performing these actions. The illustration of system 100 in FIG. 6 does not specifically illustrate all of the elements from the illustration of system 100 in FIG. 1 so that particular aspects of system 100 may be emphasized. However, system 100 of FIG. 6 includes all the elements of system 100 in FIG. 1.

FIG. 7 is a flowchart illustrating a method 700 of performing attribute abstraction using the system 100 of FIG. 1. TBAC module 110 may perform method 700. TBAC module 110 may begin by storing a hard token 115g, compliance token 115h, VM token 115i, subject token 115k, and session token 115j, among others, as appropriate, as a plurality of tokens 115 in step 710. In particular embodiments, the plurality of tokens 115 may include a set of tokens 620 that is ready for abstraction. AAA2 rules 630 may be used to determine if the set of tokens 620 is present. In step 720, TBAC module 110 may access the AAA2 rules 630. Based on the AAA2 rules 630, TBAC module 110 may determine in step 730 whether the plurality of tokens 115 include a set of tokens 620 that is ready for abstraction. If the plurality of tokens 115 does not include a set of tokens 620 that is ready for abstraction, TBAC module 110 may conclude.

However, if the plurality of tokens 115 does include a set of tokens 620 that is ready for abstraction, TBAC module 110 may complete the attribute abstraction process. To begin, TBAC module 110 may generate a dataset token 115l representing the plurality of tokens 115 in step 740. TBAC module 110 may communicate the dataset token 115l to the computed risk token provider 122 in step 750. In response, the computed risk token provider 122 may compute a risk token 115m. In step 760, TBAC module 110 may receive the risk token 115m. TBAC module 110 may conclude in step 770 by correlating the dataset token 115l and the risk token 115m to the session token 115j.

In particular embodiments, by performing the attribute abstraction function, system 100 may represent information about tokens 115, not just attributes 425, in the form of tokens 115. In this manner, system 100 may make more robust access decisions. Furthermore, by representing information about multiple tokens 115 in a single token 115, such as a risk token 115m, system 100 may perform faster and more efficient evaluation of tokens 115.

Figure 8:
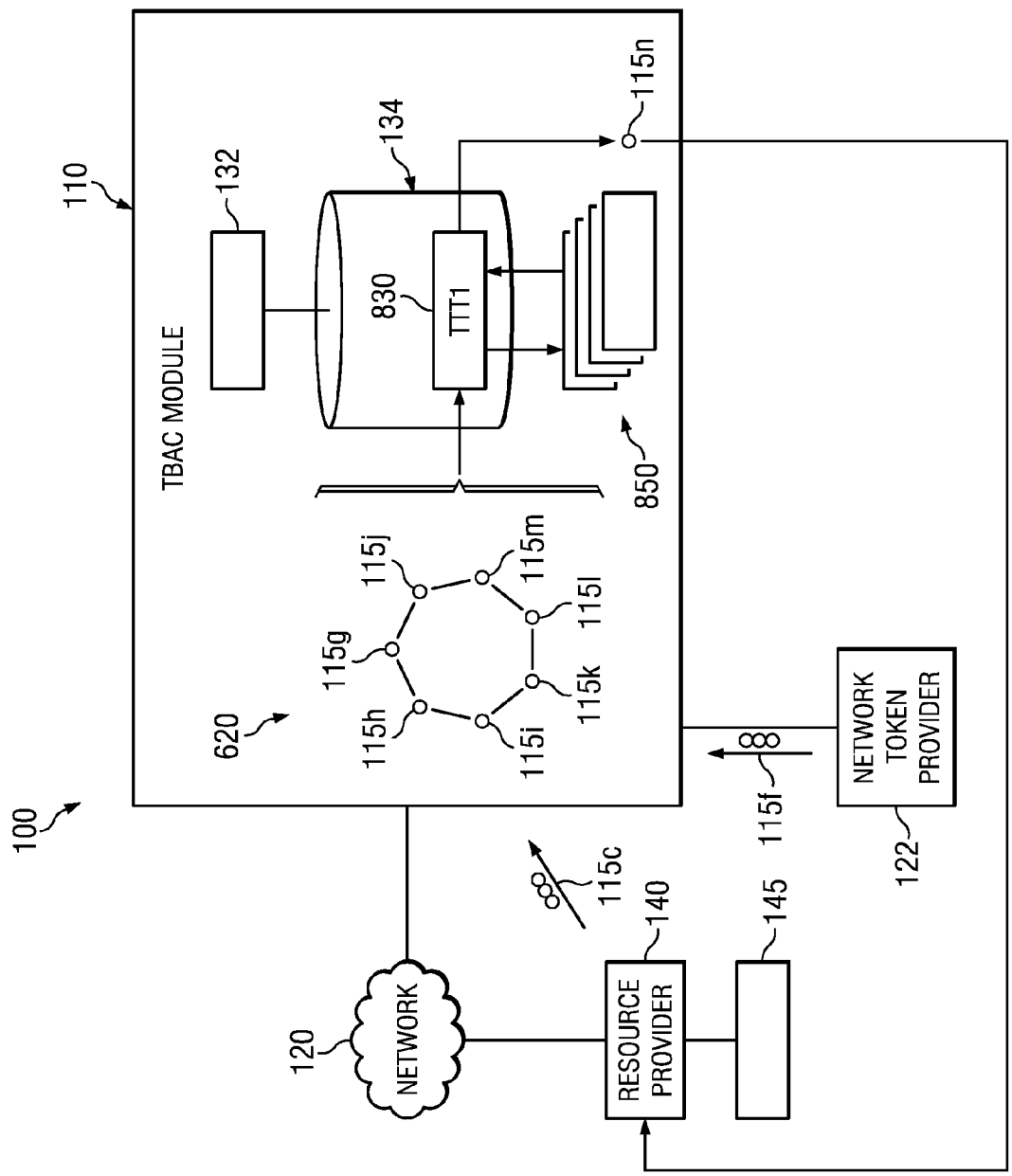
FIG. 8 illustrates the system of FIG. 1 making an access decision.
Figure 9:
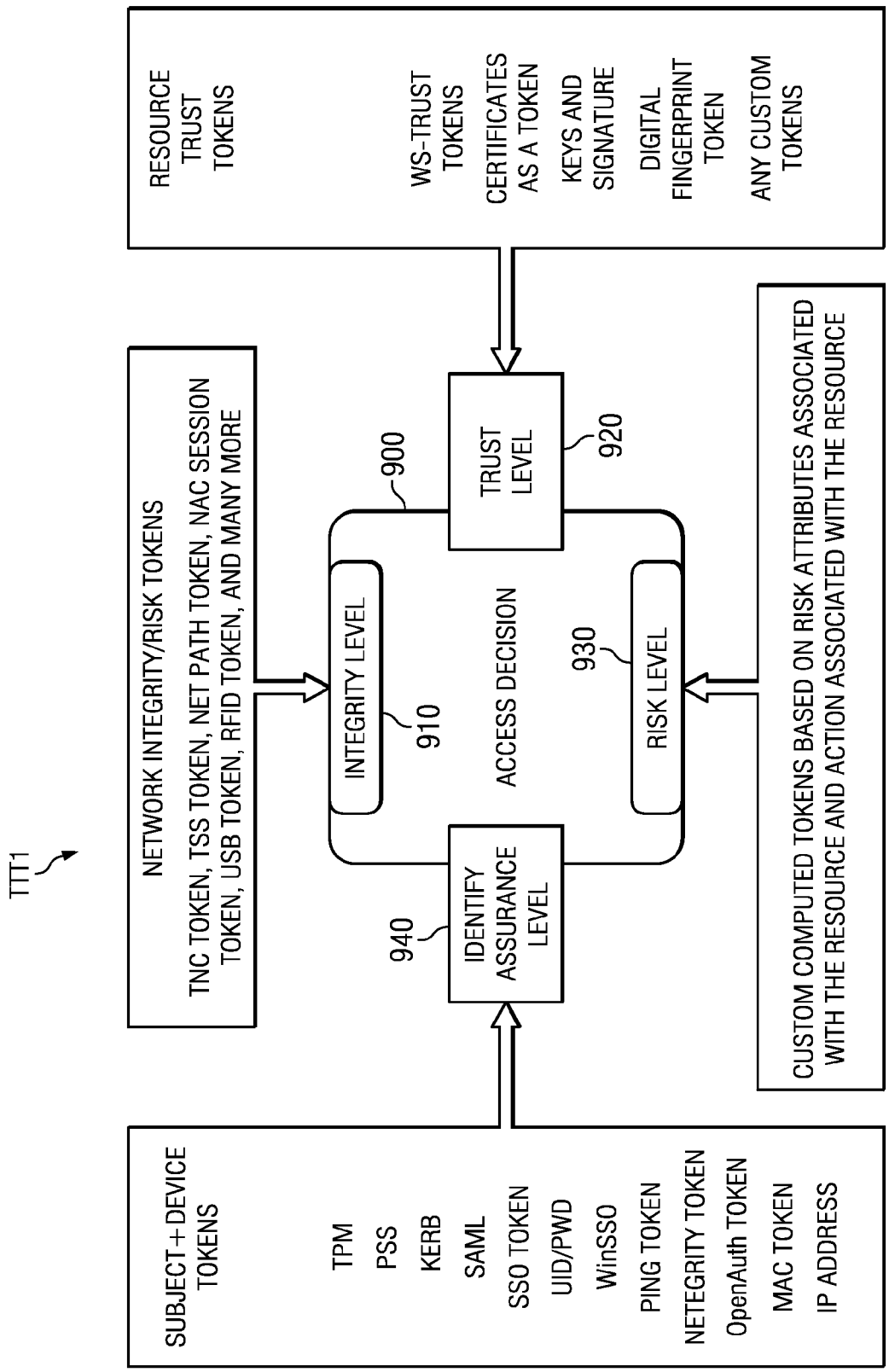
FIG. 9 illustrates the levels determined by the system of FIG. 1 in making an access decision.
Figure 10:
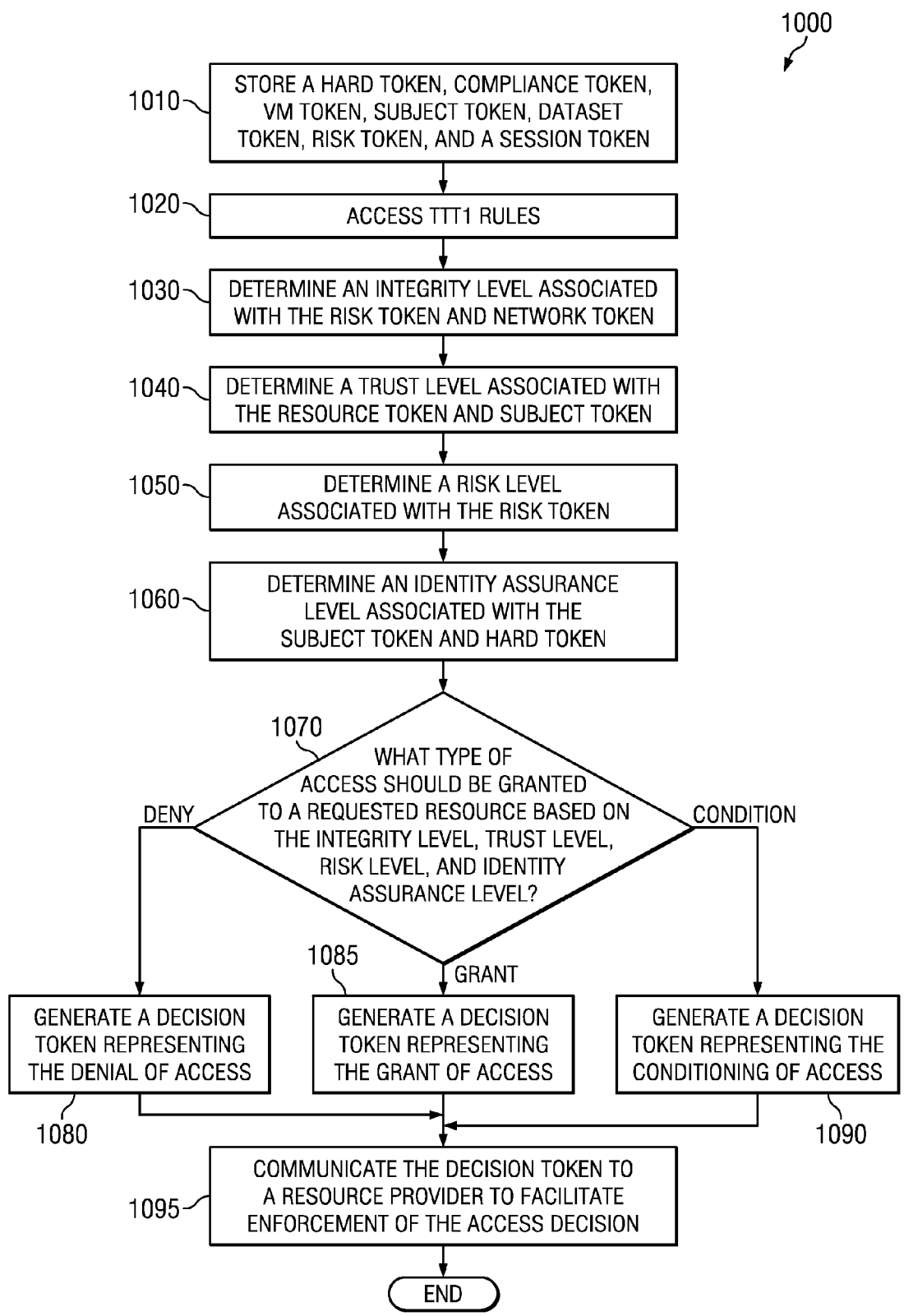
FIG. 10 is a flowchart illustrating a method of making an access decision.

FIGS. 8-10 illustrate how system 100 may make an access decision using tokens 115. In general, TBAC module 110 may determine whether to grant or deny a user 112 access to a resource 145. TBAC module 110 may also determine conditions to granting or denying access. This process of determining whether to grant or deny access and determining any conditions is referred to as making an access decision, which will be discussed further with respect to FIGS. 8-10.

TBAC module 110 may make an access decision by using levels 850 determined by tokens 115. In particular embodiments, TBAC module 110 may use tokens 115 to generate various levels 850 that indicate the security and risks posed by a user 112, a device 114, and/or a network 120. TBAC module 110 may then use these various levels 850 to make a decision to grant, deny, or condition access to the resource 145. TBAC module 110 may further generate a decision token 115n representing the decision to grant, deny, or condition access. TBAC module 110 may communicate the decision token 115n to facilitate enforcement of the access decision. In particular embodiments, by examining tokens 115 rather than attributes 425 in making an access decision, TBAC module 110 may increase the speed and efficiency of the decision-making process. By examining tokens 115, TBAC module 110 may also lighten the processing load on processor 132 and memory 134 by focusing more on making the access decision rather than on individual attributes 425 and the relationships between the attributes 425.

FIG. 8 illustrates the system 100 of FIG. 1 making an access decision. As provided in FIG. 8, TBAC module 110 may store hard token 115g, compliance token 115h, VM token 115i, subject token 115k, dataset token 115l, and risk token 115m, among others, as appropriate, as a set of tokens 620. TBAC module 110 may also include resource token 115c representing a resource 145 and network token 115f representing network 120 in the set of tokens 620. These tokens 115 may further be correlated with session token 115j pursuant to the functions described with respect to FIGS. 2-7. These tokens 115 may indicate that a user 112 is requesting access to the resource 145 over network 120. In particular embodiments, each token 115 may be associated with a layer in the Open Systems Interconnection (OSI) stack. As an example and not by way of limitation, network token 115f may be associated with Layer 3 of the OSI stack. As another example and not by way of limitation, hard token 115g may be associated with Layer 2 of the OSI stack. By using these tokens 115 in the set of tokens 620, TBAC module 110 may make an access decision when a user 112 requests access to a resource 145.

To make the access decision, TBAC module 110 may use the set of tokens 620 to access tabular trust and transaction (TTT1) rules 830 stored in memory 134. In particular embodiments, TTT1 rules 830 may specify various levels 850 associated with the set of tokens 620. As an example and not by way of limitation, TTT1 rules 830 may specify that risk token 115m may determine a risk level, and that the more risk represented by risk token 115m, the higher the risk level may be. These levels 850 and their association with particular tokens 115 will be described further with respect to FIG. 9. A particular TTT1 rule 830 may also specify an access decision associated with the various levels 850. As an example and not by way of limitation, a particular TTT1 rule 830 may specify that access may be denied if the risk level is above a certain threshold. TBAC module 110 may use a stored token 115, such as for example, the risk token 115m and the resource token 115c to determine a particular TTT1 rule 830. Based on the access decision specified in a particular TTT1 rule 830, TBAC module 110 may make a decision to grant, deny, or condition access to the resource 145. In particular embodiments, TBAC module 110 may then generate a decision token 115n representing an access decision.

In particular embodiments, the decision token 115n may be communicated by system 100 to facilitate enforcement of the access decision. As an example and not by way of limitation, TBAC module 110 may communicate the decision token 115n to the resource provider 140 to facilitate enforcement of the access decision. As another example and not by way of limitation, TBAC module 110 may communicate the decision token 115n to the device 114 to facilitate enforcement of the access decision. After receiving the decision token 115n, resource provider 140 or device 114 may enforce the access decision. If the decision token 115n represents a decision to grant access to the resource 145, then resource provider 140 may grant access to resource 145 after it receives decision token 115n. If decision token 115n represents a decision to deny access, then resource provider 140 may deny access to resource 145. By leveraging tokens 115, TBAC module 110 may make faster and more granular access decisions.

Although this disclosure describes TBAC module 110 performing certain actions with respect to FIG. 8 this disclosure contemplates the processor 132 and the memory 134 of the TBAC module 110 performing these actions. The illustration of system 100 in FIG. 8 does not specifically illustrate all of the elements from the illustration of system 100 in FIG. 1 so that particular aspects of system 100 may be emphasized. However, system 100 of FIG. 8 includes all the elements of system 100 in FIG. 1.

FIG. 9 illustrates the levels 850 determined by the system 100 of FIG. 1 in making an access decision 900. As provided in FIG. 9, access decision 900 may depend upon four types of levels: integrity levels 910, trust levels 920, risk levels 930, and identity assurance levels 940. Each type of level may take on a numerical value within a predefined range such as, for example, 0 to 9, with higher numbers indicating a higher level of integrity, trust, risk, or identity assurance. Each type of level 850 may depend upon particular tokens 115 stored in TBAC module 110. As an example and not by way of limitation, based on TTT1 rule 830, subject token 115$k$ and risk token 115$m$ may indicate a certain identity assurance level 940. In particular embodiments, the numerical value of any particular level 850 may depend upon the OSI layer associated with the particular tokens 115 associated with that level 850. As an example and not by way of limitation, a subject token 115$k$ representing an authentication method from Layer 2 of the OSI stack may influence the identity assurance level 940 more than a subject token 115$k$ representing an authentication method from Layer 7. Following will be a description of the various types of levels 850 and how they may be determined.

Integrity levels 910 may indicate the quality and/or security of network 120. A high integrity level may indicate that network 120 is safe from intrusion by hackers, viruses, or malware. A high integrity level may also indicate that communications over network 120 may not experience jitter or packet loss. In particular embodiments, integrity levels 910 may be determined from network tokens 115$f$ and risk tokens 115$m$. As an example and not by way of limitation, integrity levels 910 may depend upon a trusted network connect (TNC) token, a netpath token, and/or a network access control (NAC) session token. Although this disclosure describes integrity levels 910 depending on particular tokens 115, this disclosure contemplates integrity levels 910 depending upon any suitable tokens 115. As an example and not by way of limitation, TBAC module 110 may store a TNC token and a netpath token. TTT1 rule 830 may specify that the integrity level 910 is a 6 if a TNC token and a netpath token are present. Based on TTT1 rule 830, TBAC module 110 may determine that the integrity level 910 is a 6 because the TNC token and the netpath token are present. In particular embodiments, when TBAC module 110 receives a network token 115$f$ indicating a change in the network 120, TBAC module 110 may change integrity level 910 accordingly. The changed integrity level 910 may cause user 112 to be denied or granted access to a resource 145.

Trust levels 920 may indicate the level of authentication or security required or presented by resource 145. A high trust level may indicate that resource 145 is a risk-sensitive resource that requires more secure forms of authentication in order to be accessed by user 112. In particular embodiments, trust levels 920 may be determined from resource token 115$c$ and subject token 115$k$. As an example and not by way of limitation, trust levels 920 may depend upon trust tokens, certificates as tokens, keys and signatures, digital fingerprint tokens, and any custom tokens. As an example and not by way of limitation, TBAC module 110 may store a trust token and a certificate as a token. TTT1 rule 830 may specify that the trust level 920 is a 7 if a trust token and a certificate as a token are present. Based on TTT1 rule 830, TBAC module 110 may determine that the trust level 920 is a 7 because the trust token and the certificate as a token are present. Although this disclosure describes trust level 920 depending upon particular types of tokens, this disclosure contemplates trust level 920 depending upon any suitable types of tokens.

Risk levels 930 may indicate the overall risk associated with granting user 112 and device 114 access to resource 145 over network 120. A higher risk level may indicate that the user 112, device 114, and/or network 120 presents a higher security risk associated with accessing the resource 145. In particular embodiments, a higher risk level 930 may indicate that more secure forms of authentication may be required to access the resource 145. As an example and not by way of limitation, user 112 may gain access to resource 145 despite a high risk level 930 by providing higher levels of user authentication, for example, through biometric scans. Risk levels 930 may be determined from risk tokens 115$m$ computed from dataset token 115$l$, as described with respect to FIG. 6. In particular embodiments, risk level 930 may be adjusted. As an example and not by way of limitation, user 112 may lower risk level 930 by securing network 120. Although this disclosure describes risk level 930 depending upon particular types of tokens, this disclosure contemplates risk level 930 depending upon any suitable types of tokens.

Identity assurance level 940 may indicate the strength of authentication presented by user 112 and device 114. A higher identity assurance level 940 may indicate that user 112 has provided more secure forms of authentication. As an example and not by way of limitation, user 112 may raise identity assurance level 940 by performing biometric authentication. In particular embodiments, identity assurance levels 940 may depend upon subject tokens 115$k$ and hard tokens 115$g$. As an example and not by way of limitation, identity assurance levels 940 may depend upon Trusted Platform Module (TPM) tokens, Kerberos tokens, Security Assertion Markup Language (SAML) tokens, Single Sign-On (SSO) tokens, win SSO tokens, ping tokens, netegrity tokens, open authentication tokens, MAC tokens, IP address tokens, user ID tokens, and password tokens. As an example and not by way of limitation, TBAC module 110 may store a user ID token and a password token. TTT1 rule 830 may specify that the identity assurance level 940 is a 2 if a user ID token and a password token are present. Based on TTT1 rule 830, TBAC module 110 may determine that the identity assurance level 940 is a 2 because the user ID token and the password token are present. Although this disclosure describes identity assurance levels 940 depending upon particular types of tokens, this disclosure contemplates identity assurance levels 940 depending upon any suitable types of tokens.

In particular embodiments, TBAC module 110 may use the integrity level 910, trust level 920, risk level 930, and identity assurance level 940 to make, based on TTT1 rule 830, an access decision 900. As an example and not by way of limitation, TTT1 rule 830 may indicate that in order to grant access to a resource 145, integrity level 910, trust level 920, and identity assurance level 940 must be at least a 7. If, based on the tokens 115 correlated with session token 115$j$, the integrity level 910 is an 8, the trust level 920 is a 9, and the identity assurance level 940 is a 6, then TBAC module 110 will deny access to the resource 145. If, however, the integrity level 910 is an 8, the trust level 920 is a 9, and the identity assurance level 940 is a 7, then TBAC module 110 will grant access to the resource 145. In particular embodiments, TBAC module 110 may condition access to the resource 145. In such cases, TBAC module 110 may attach conditions to the decision grant or deny access to the resource 145. A more detailed description of conditioning access is provided with respect to FIGS. 19 and 20.

FIG. 10 is a flowchart illustrating a method 1000 of making an access decision 900. TBAC module 110 may perform method 1000. As provided in FIG. 10, TBAC module 110 may begin by storing a hard token 115g, compliance token 115h, VM token 115i, subject token 115k, dataset token 115l, risk token 115m, and a session token 115j, among others, as appropriate, in step 1010. TBAC module 110 may continue by accessing the TTT1 rules 830 in step 1020 to determine various levels 850. In step 1030, TBAC module 110 may determine, by the TTT1 rules 830, an integrity level 910 associated with risk token 115m and network token 115f. TBAC module 110 may continue by determining, by the TTT1 rules 830, a trust level 920 associated with resource token 115c and subject token 115k in step 1040. In step 1050, TBAC module 110 may determine, by the TTT1 rules 830, a risk level 930 associated with the risk token 115m in step 1040. TBAC module 110 may continue by determining, by the TTT1 rules 830, an identity assurance level 940 associated with subject token 115k and hard token 115a in step 1060. After the various levels 850 have been determined, TBAC module 110 may determine what type of access should be granted to a requested resource 145 based on the integrity level 910, trust level 920, risk level 930, and identity assurance level 940 in step 1070. If TBAC module 110 determines access should be denied, then TBAC module 110 may generate a decision token 115n representing the denial of access in step 1080. If access should be granted, then TBAC module 110 may generate a decision token 115n representing the grant of access in step 1085. If access should be conditioned, then TBAC module 110 may generate a decision token 115n representing the conditioning of access in step 1090. TBAC module 110 may conclude by communicating the decision token 115n to a resource provider 140 to facilitate enforcement of the access decision 900 in step 1070.

In particular embodiments, by examining tokens 115 rather than attributes 425 in making an access decision 900, TBAC module 110 may increase the speed and efficiency of the decision-making process. Furthermore, by examining tokens 115, TBAC module 110 may lighten the processing load on processor 132 and memory 134 by focusing more on making the access decision 900 rather than on individual attributes 425 and the relationships between the attributes 425.

Figure 11:
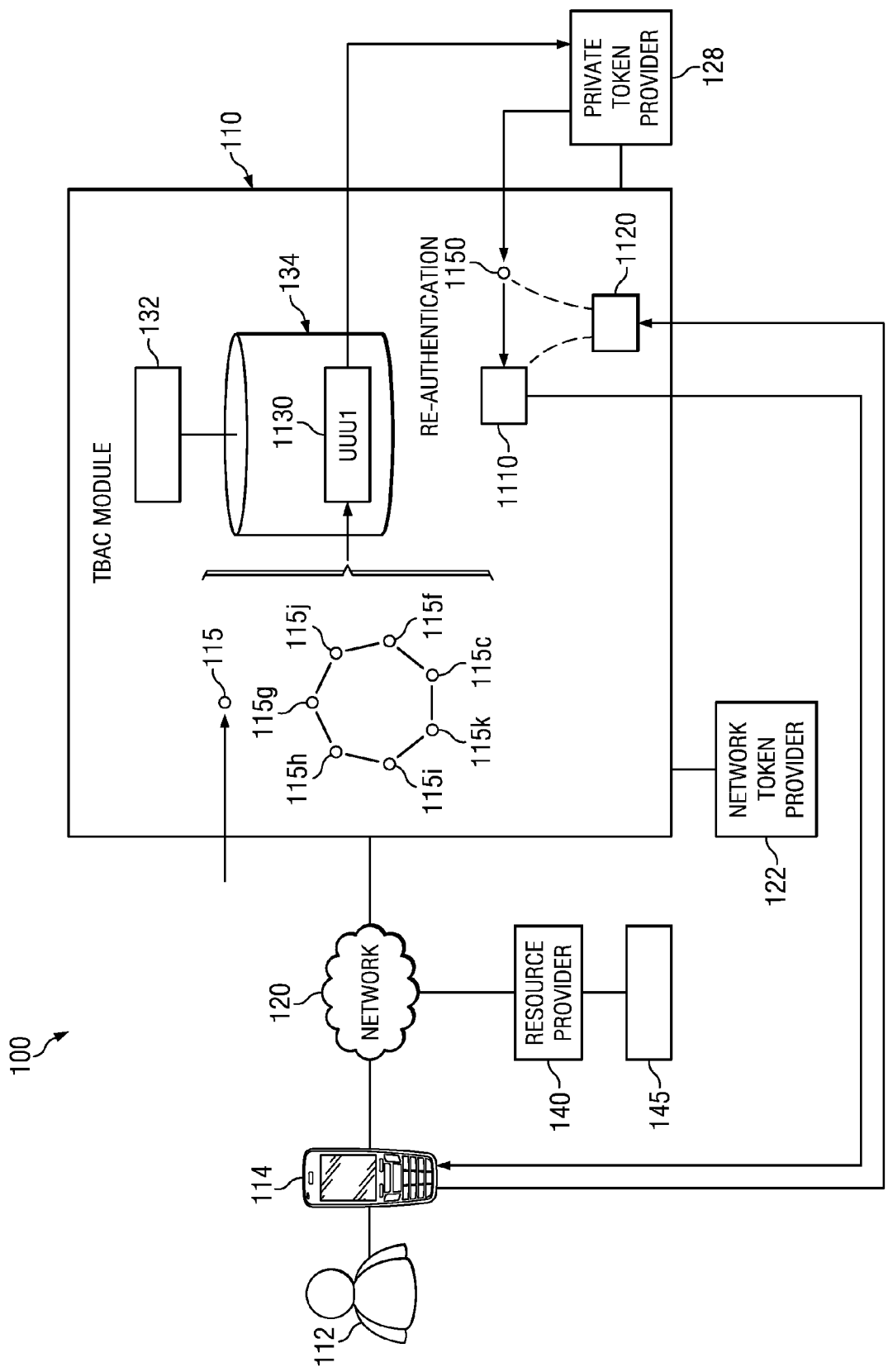
FIG. 11 illustrates the system of FIG. 1 re-authenticating a user.
Figure 12:
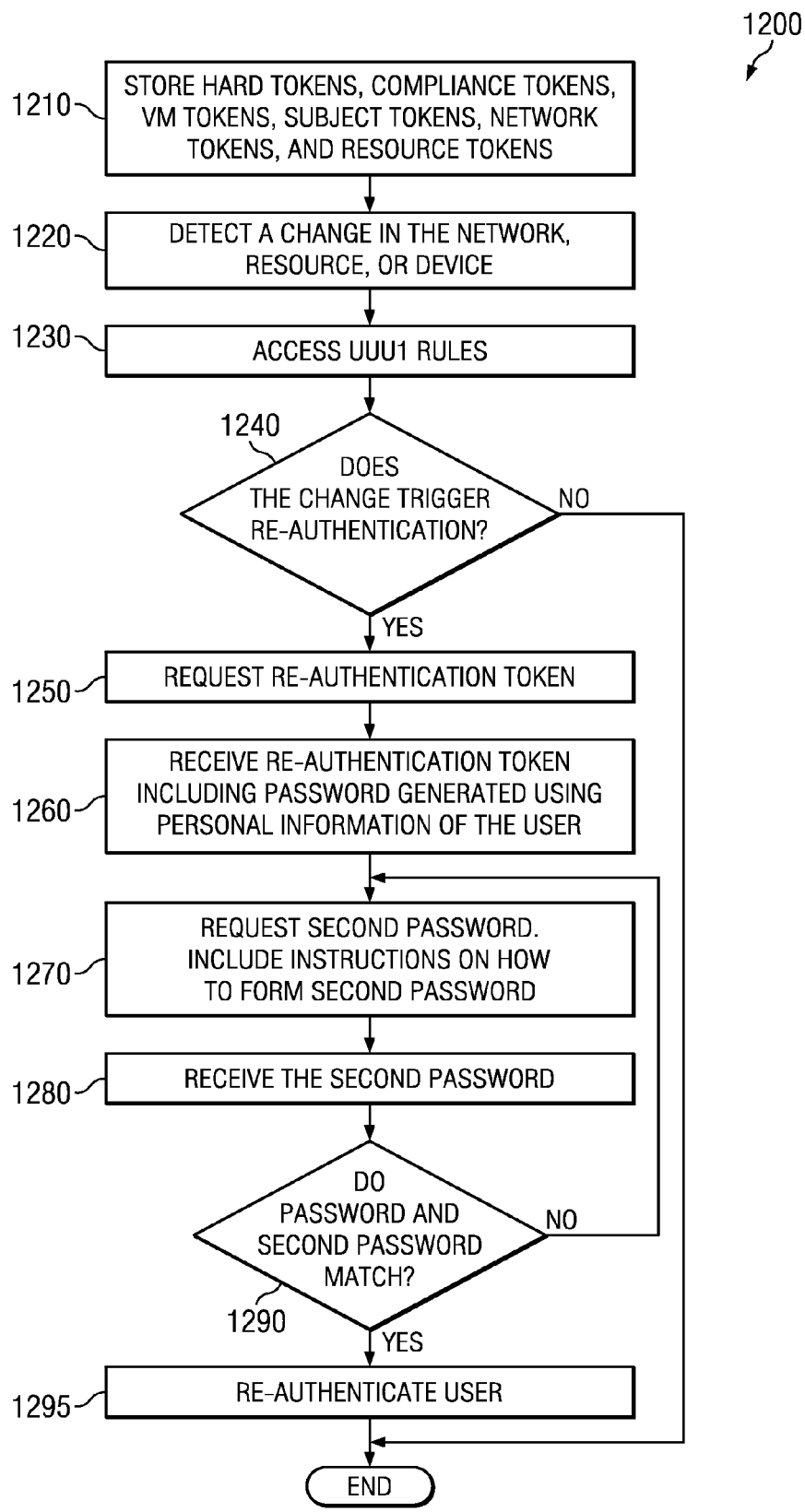
FIG. 12 is a flowchart illustrating a method of re-authenticating a user using the system of FIG. 1.

FIGS. 11 and 12 illustrate system 100 performing the re-authentication function. In general, TBAC module 110 may re-authenticate a user 112 when a change occurs that challenges or puts into question the integrity of the authentication of user 112. TBAC module 110 may determine that the change sufficiently challenges the integrity of the authentication of user 112. In response, TBAC module 110 may block the user 112 from accessing a resource and may request user 112 enter a password to regain access to the resource.

With regards to the re-authentication process, TBAC module 110 may request the password be a one-time password (that is, a subsequently generated password may not be the same as a previously generated password) generated using the personal information of the user 112. TBAC module 110 may then request user 112 to enter the one-time password. Included in the request 1110 may be a message instructing the user 112 how to form the one-time password. If the user 112 enters the one-time password correctly, then TBAC module 110 may consider the user 112 re-authenticated. This process of determining when a change sufficiently challenges the integrity of the authentication of the user 112 and the subsequent generation and request of a one-time password is referred to as re-authentication, which is discussed further with respect to FIGS. 11 and 12.

FIG. 11 illustrates the system 100 of FIG. 1 re-authenticating a user 112. As provided in FIG. 11, TBAC module 110 may store a plurality of token 115 to indicate that user 112 may be using device 114 to consume resource 145 over network 120. TBAC module 110 may receive a token 115 that indicates a change has occurred in network 120, resource 145, or device 114. As an example and not by way of limitation, token 115 may indicate that traffic over network 120 is experiencing jitter. As another example and not by way of limitation, token 115 may indicate that the access requirements of resource 145 may have changed. Although this disclosure describes token 115 indicating particular changes, this disclosure contemplates token 115 indicating any changes in network 120, resource 145, or device 114.

In response to detecting token 115, TBAC module 110 may access user re-authentication (UUU1) rules 1130 stored in memory 134. In particular embodiments, UUU1 rules 1130 may specify what changes indicated by token 115 trigger re-authentication. If a particular UUU1 rule 1130 specifies that the change indicated by token 115 triggers re-authentication, then TBAC module 110 may begin the re-authentication process. As an example and not by way of limitation, if token 115 indicates that network 120 is experiencing jitter and a particular UUU1 rule 1130 specifies that jitter should trigger the re-authentication process, then TBAC module 110 may initiate the re-authentication process.

TBAC module 110 may initiate the re-authentication process by requesting the generation of a password using the personal information of the user 112. TBAC module 110 may send the request to a token provider such as, for example, the private token provider 128. In response, the token provider may generate the password using personal information of the user 112. As an example and not by way of limitation, in response to the request, private token provider 128 may generate the password by appending the birth year of the user 112 to the last three digits of the social security number of the user 112. Although this disclosure describes the generation of the password using particular types of personal information, this disclosure contemplates the generation of the password using the age of the user 112, the number of children user 112 has, the age of the spouse of user 112, or any other suitable personal information. In particular embodiments, the password may be a one-time password, that is, a subsequently generated password may not be the same as a previously generated password. As an example and not by way of limitation, in response to a second request following the previously described request, private token provider 128 may generate another password that does not use the same information as the previously generated password.

In particular embodiments, after the token provider generates the password, the token provider may generate a re-authentication token 115o that represents the generated password. The token provider may then communicate the re-authentication token 115o to TBAC module 110. TBAC module 110 may use re-authentication token 115o to generate a request for a second password 1110. The request for the second password 1110 may include instructions on how to form the second password. As an example and not by way of limitation, if re-authentication token 115o includes a password that was generated by appending the birth year of the user 112 to the last three digits of the social security number of the user, then the request for the second password may include the message: "Please form the second password by appending your birth year to the last three digits of your social security number." In particular embodiments, TBAC module 110 may communicate the request for the second password 1110 to device 114. User 112 may view the request for the second password 1110 and enter the second password using device 114. Device 114 may send a response 1120 that includes the second password to TBAC module 110. TBAC module 110 may then compare the password represented by re-authentication token 115o and the second password included within the response 1120. If the password and the second password match, TBAC module 110 may consider user 112 re-authenticated. If they do not match, TBAC module 110 may terminate a session represented by session token 115j or TBAC module 110 may resend the request for the second password 1110 to device 114.

Although this disclosure describes TBAC module 110 performing certain actions with respect to FIG. 11, this disclosure contemplates the processor 132 and the memory 134 of the TBAC module 110 performing these actions. The illustration of system 100 in FIG. 11 does not specifically illustrate all of the elements from the illustration of system 100 in FIG. 1 so that particular aspects of system 100 may be emphasized. However, system 100 of FIG. 11 includes all the elements of system 100 in FIG. 1.

FIG. 12 is a flowchart illustrating a method 1200 of re-authenticating a user 112 using the system 100 of FIG. 1. TBAC module 110 may perform method 1200. As provided in FIG. 12, TBAC module 110 may begin by storing a hard token 115g, compliance token 115h, VM token 115i, subject token 115k, network token 115f, and resource token 115c, among others, as appropriate, in step 1210. The hard token 115g may be associated with a device 114. The resource token 115c may be associated with a resource 145. The network token 115f may be associated with a network 120. TBAC module 110 may continue by detecting a change in the network 120, resource 145, or device 114 in step 1220. In particular embodiments, TBAC module 110 may detect a token 115 representing the change. In response, TBAC module 110 may continue by accessing UUU1 rules 1130 in step 1230. In step 1240, TBAC module 110 may determine, based on UUU1 rules 1130, whether the change triggers re-authentication. If not, TBAC module 110 may conclude. If the change does trigger re-authentication, TBAC module 110 may continue to step 1250 to request a re-authentication token 115o.

In step 1260, TBAC module 110 may receive the re-authentication token 115o. In particular embodiments, the re-authentication token 115o may include a password generated using personal information of user 112. The password may be a one-time password. In step 1270, TBAC module 110 may request a second password. In the request for the second password, TBAC module 110 may include instructions on how to form the second password. In step 1280, TBAC module 110 may receive the second password. In step 1290, TBAC module 110 may determine if the password and the second password match. If not, TBAC module 110 may return to step 1270 and request the second password. In particular embodiments, TBAC module 110 may also conclude if the password and second password do not match. If the password and the second password do match, TBAC module 110 may continue to step 1295 to re-authenticate the user 112.

In particular embodiments, because TBAC module 110 uses tokens 115 to detect changes and to administer the re-authentication process, TBAC module 110 may leverage information from numerous sources such as the network 120, resource 145, and device 114 to accurately trigger the re-authentication process. Furthermore, because TBAC module 110 utilizes one-time passwords generated from the personal information of the user 112 during the re-authentication process, TBAC module 110 may provide a more secure re-authentication.

Figure 13:
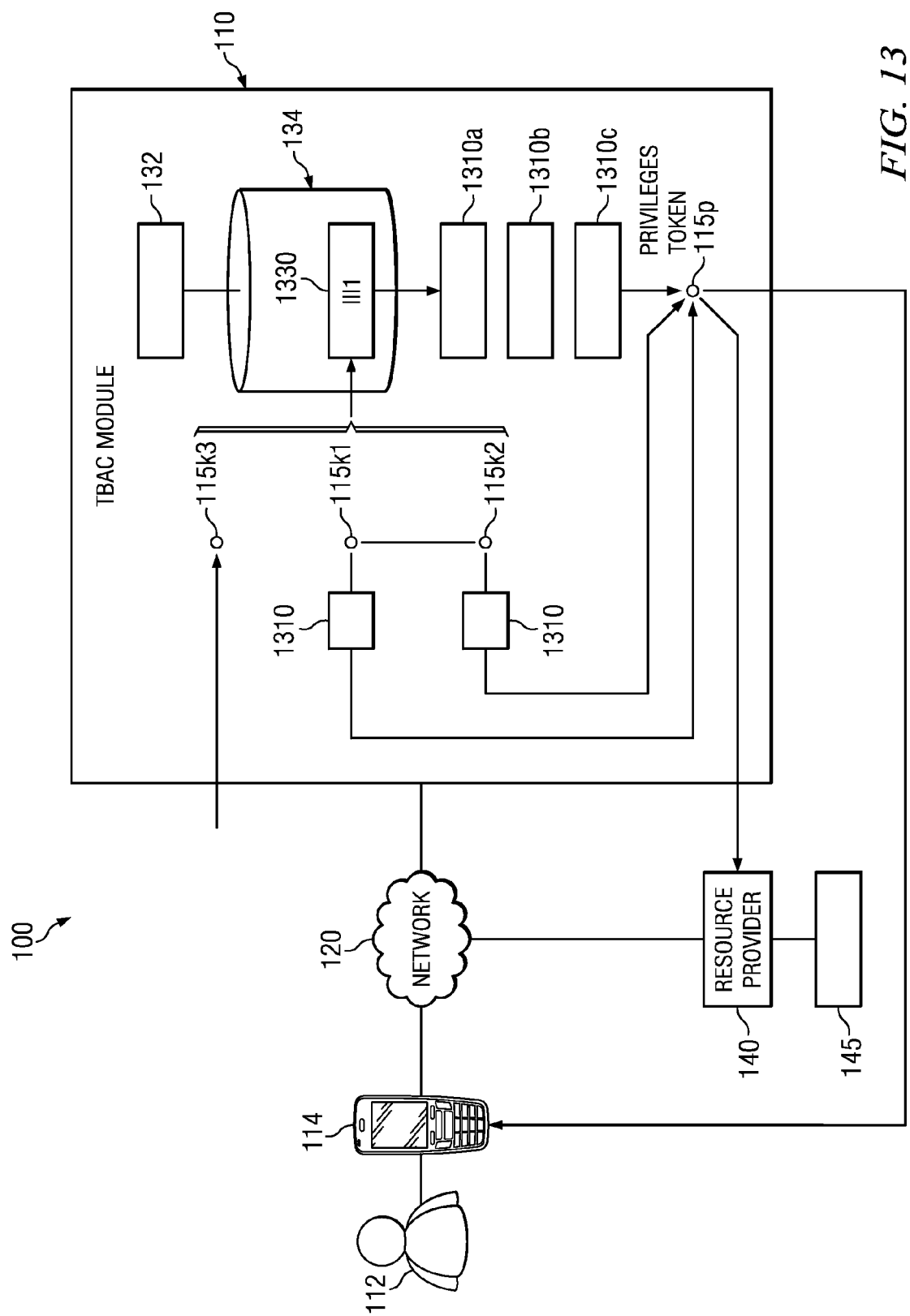
FIG. 13 illustrates the system of FIG. 1 combining authentication methods.
Figure 14:
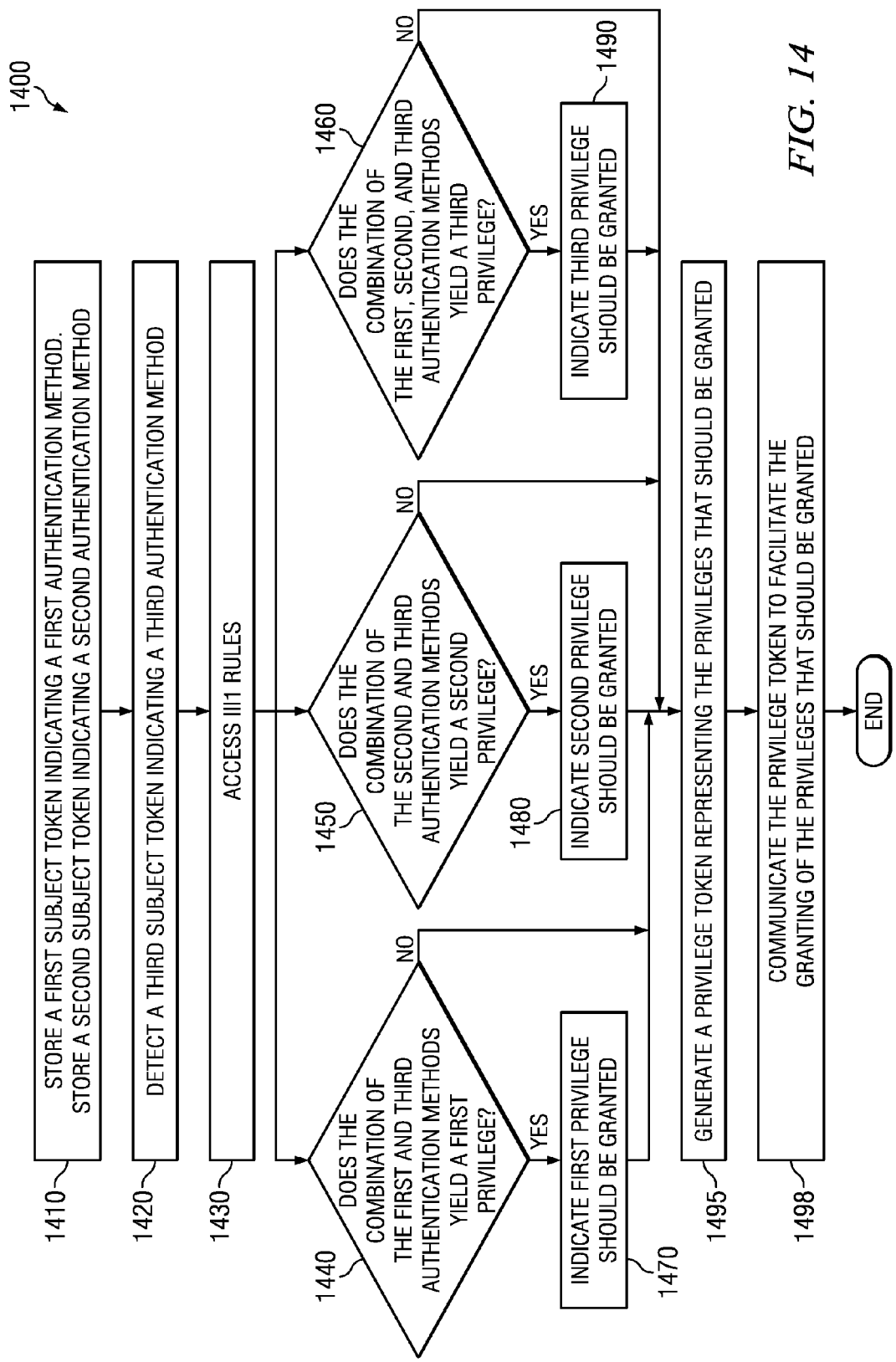
FIG. 14 is a flowchart illustrating a method of combining authentication methods using the system of FIG. 1.

FIGS. 13 and 14 illustrate the system 100 combining authentication methods. In general, a user 112 may perform multiple methods of authentication during any session. For each method of authentication performed, system 100 may grant the user 112 a privilege such as for example, an access right, edit right, or distribution right. System 100 may further grant the user 112 privileges based on combinations of authentication methods performed. The process of determining the particular combinations of authentication methods that yield the granting of privileges is referred to as combining authentication methods, which is discussed further with respect to FIGS. 13 and 14.

In particular embodiments, TBAC module 110 may store multiple subject tokens 115k that indicate a user 112 has performed multiple forms of authentication. Each form of authentication may be associated with the granting of a privilege 1310. TBAC module 110 may examine the multiple subject tokens 115k to determine if particular combinations of the subject tokens 115k may lead to the granting of privileges 1310. If a combination of the subject tokens 115k does lead to the granting of a privilege 1310, TBAC module 110 may generate a privilege token 115p to represent the privilege 1310. Privilege token 115p may then be communicated to facilitate the granting of the privilege 1310.

FIG. 13 illustrates the system 100 of FIG. 1 combining authentication methods. As provided in FIG. 13, TBAC module 110 may store a plurality of subject tokens 115k. As an example and not by way of limitation, TBAC module 110 may store a first subject token 115k1 and a second subject token 115k2. First subject token 115k1 may be correlated with second subject token 115k2. In particular embodiments, each subject token 115k may indicate a different authentication method as another subject token 115k. As an example and not by way of limitation, first subject token 115k1 may indicate that user 112 has been authenticated with a user ID and password, and second subject token 115k2 may indicate user 112 has been authenticated by providing correct answers to security questions. Because each subject token 115k indicates a particular authentication method, each subject token 115k may indicate a privilege 1310 or a set of privileges 1310 should be granted to user 112 for device 114. A privilege 1310 may grant a user 112 the ability to perform certain operations. As an example and not by way of limitation, a privilege 1310 may grant the user 112 access to a resource, the ability to edit the resource, and/or the ability to terminate the resource. Although this disclosure describes privilege 1310 granting the user 112 specific abilities, this disclosure contemplates privilege 1310 granting the user 112 any suitable ability.

In particular embodiments, TBAC module 110 may detect whether a combination of authentication methods indicated by multiple subject tokens 115k may yield the granting of a privilege 1310. Using the previous example, TBAC module 110 may detect a third subject token 115k3 indicating user 112 has performed a third authentication method such as a retina scan. TBAC module 110 may use the first subject token 115k1, the second subject token 115k2, and the third subject token 115k3 to access authentication method combination (III1) rules 1330 stored in memory 134. III1 rules 1330 may specify the combinations of authentication methods that yield the granting of privileges 1310. TBAC module 110 may use III1 rules 1330 to facilitate the granting of privileges 1310.

As an example and not by way of limitation, a particular III1 rule 1330 may specify a privilege 1310 or a set of privileges 1310 to be granted when a particular combination of authentication methods has been performed. Continuing the previous example, a particular III1 rule 1330 may indicate that the combination of the user ID and password authentication indicated by first subject token 115k1 and the retina scan authentication method indicated by third subject token 115k3 yields the granting of a first privilege 1310a. Another III1 rule 1330 may specify that the combination of the security questions authentication method indicated by second subject token 115*k*2 and the retina scan authentication method indicated by third subject token 115*k*3 yields the granting of a second privilege 1310*b*. Yet another III1 rule 1330 may specify that the combination of the user ID and password authentication method indicated by first subject token 115*k*1, the security questions authentication method indicated by second subject token 115*k*2, and the retina scan authentication method indicated by third subject token 115*k*3 yields the granting of a third privilege 1310*c*. Although this disclosure describes particular combinations of subject tokens 115*k* yielding certain privileges 1310, this disclosure contemplates any combination of any number of subject tokens 115*k* yielding any number of privileges 1310. TBAC module 110 may use these III1 rules 1330 to facilitate the granting of first privilege 1310*a*, second privilege 1310*b*, and third privilege 1310*c* to user 112.

To do so, TBAC module 110 may generate a privilege token 115*p* representing the privileges 1310 granted to user 112. Continuing the previous example, TBAC module 110 may generate a privilege token 115*p* representing first privilege 1310*a*, second privilege 1310*b*, and third privilege 1310*c* granted as a result of particular combinations of first subject token 115*k*1, second subject token 115*k*2, and third subject token 115*k*3. Privilege token 115*p* may also represent other privileges 1310 associated with the individual subject tokens 115*k*.

In particular embodiments, TBAC module 110 may communicate privilege token 115*p* to facilitate the granting of the privileges 1310 represented by privilege token 115*p*. As an example and not by way of limitation, TBAC module 110 may communicate privilege token 115*p* to a resource provider 140. In response, the resource provider 140 may grant user 112 first privilege 1310*a*, second privilege 1310*b*, and third privilege 1310*c* associated with particular combinations of first subject token 115*k*1, second subject token 115*k*2, and third subject token 115*k*3. In particular embodiments, TBAC module 110 may further correlate the privilege token 115*p* with the subject tokens 115*k*.

Although this disclosure describes TBAC module 110 performing certain actions with respect to FIG. 13, this disclosure contemplates the processor 132 and the memory 134 of the TBAC module 110 performing these actions. The illustration of system 100 in FIG. 13 does not specifically illustrate all of the elements from the illustration of system 100 in FIG. 1 so that particular aspects of system 100 may be emphasized. However, system 100 of FIG. 13 includes all the elements of system 100 in FIG. 1.

FIG. 14 is a flowchart illustrating a method 1400 of combining authentication methods using the system 100 of FIG. 1. TBAC module 110 may perform method 1400. As provided in FIG. 14, TBAC module 110 may begin by storing a first subject token 115*k*1 indicating a first authentication method and a second subject token 115*k*2 indicating a second authentication method in step 1410. As an example and not by way of limitation, the first authentication method may be a user ID and password and the second authentication method may be providing correct answers to a security question. TBAC module 110 may continue by detecting a third subject token 115*k*3 indicating a third authentication method in step 1420. Continuing the example, the third authentication method may be a retina scan.

TBAC module 110 may determine whether particular combinations of authentication methods lead to the granting of privileges 1310. To begin, TBAC module 110 may access III1 rules 1330 in step 1430. In steps 1440, 1450, and 1460, TBAC module 110 may determine based on III1 rules 1330 whether particular combinations of the first subject token 115*k*1, the second subject token 115*k*2, and the third subject token 115*k*3 yield the granting of particular privileges 1310. In step 1440, TBAC module 110 may determine that the combination of the first and third authentication methods yield the granting of a first privilege 1310*a*. In step 1450, TBAC module 110 may determine that the combination of the second and third authentication methods yield the granting of a second privilege 1310*b*. In step 1460, TBAC module 110 may determine the combination of the first, second, and third authentication methods yields the granting of a third privilege 1310*c*.

If TBAC module 110 determines that the first privilege 1310*a*, the second privilege 1310*b*, and/or the third privilege 1310*c* should be granted in steps 1440, 1450, and 1460, then TBAC module 110 may continue to steps 1470, 1480, and 1490 to indicate the first privilege 1310*a*, the second privilege 1310*b*, and/or the third privilege 1310*c* should be granted. TBAC module 110 may continue to step 1495 to generate a privilege token 115*p* representing the privileges 1310 that should be granted. TBAC module 110 may conclude at step 1498 by communicating the privilege token 115*p* to facilitate the granting of the privileges 1310 that should be granted.

In particular embodiments, because TBAC module 110 may examine particular combinations of authentication methods to determine if certain privileges 1310 should be granted, system 100 may provide a more robust process of determining and granting privileges 1310 to a user 112. Furthermore, because TBAC module 110 examines tokens 115 rather than attributes 425 to determine the granting of privileges 1310, TBAC module 110 may provide a faster and more efficient process of determining and granting privileges.

Figure 15:
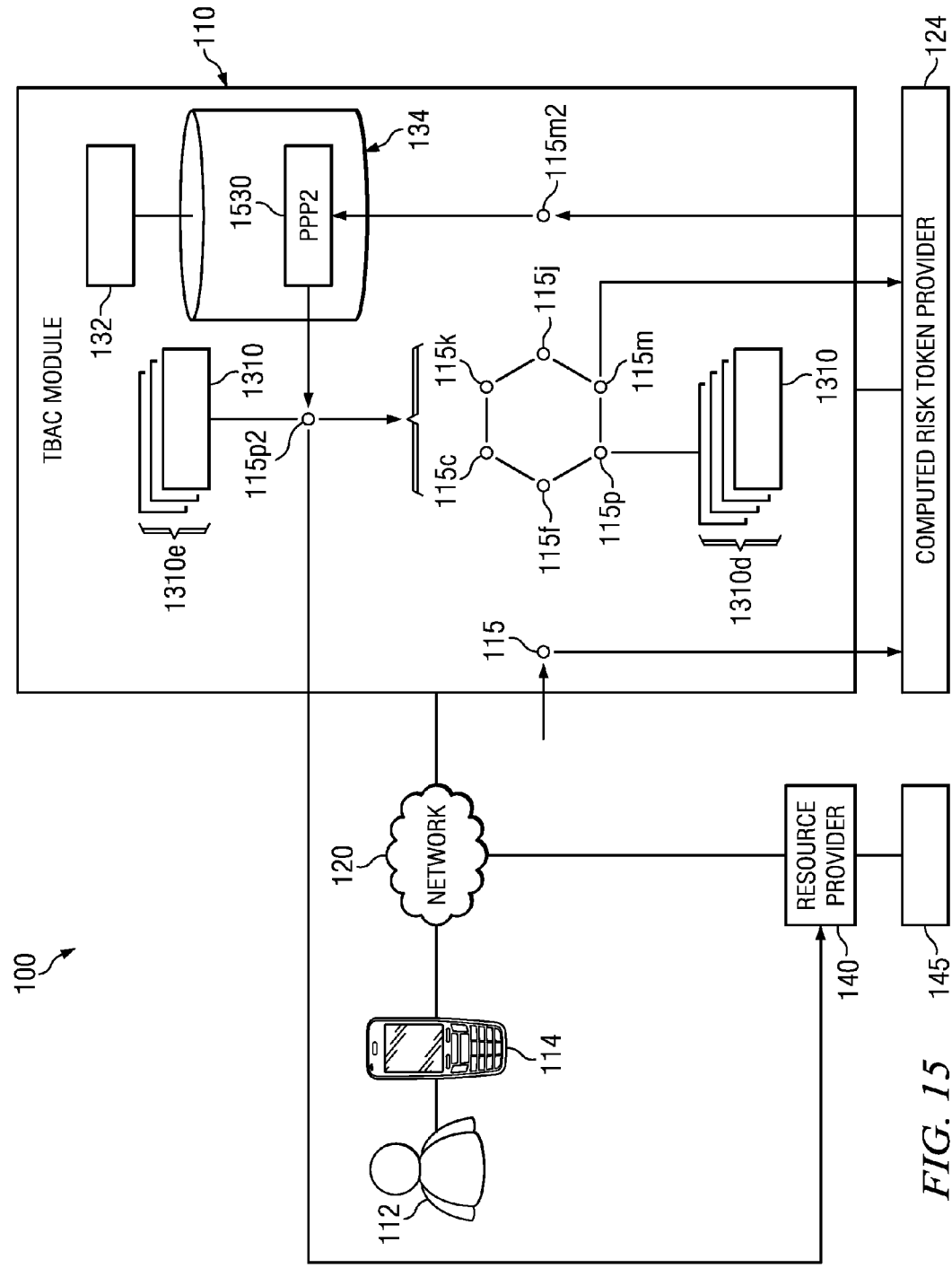
FIG. 15 illustrates the system of FIG. 1 reassigning privileges.
Figure 16:
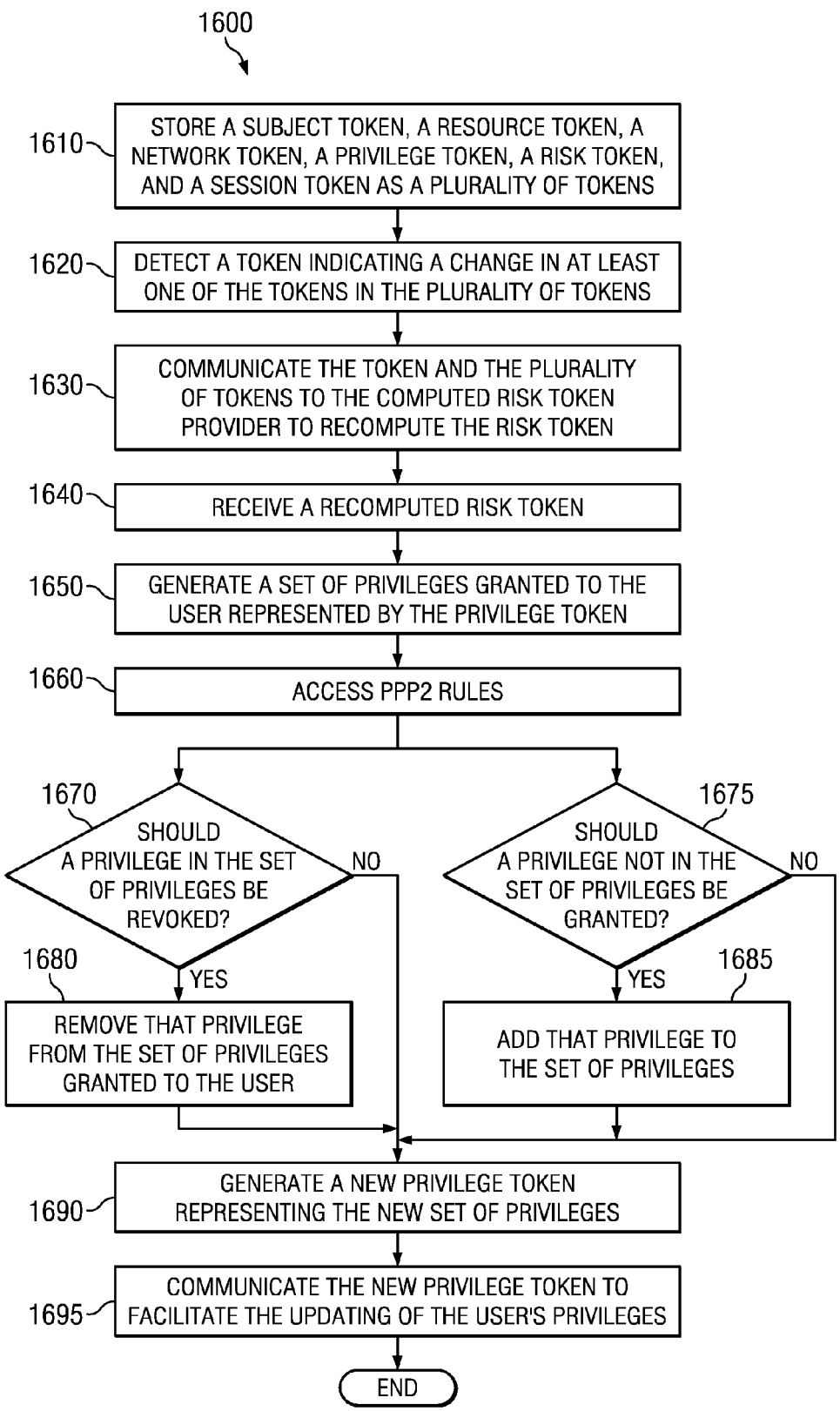
FIG. 16 is a flowchart illustrating a method of reassigning privileges using the system of FIG. 1.

FIGS. 15 and 16 illustrate system 100 reassigning privileges 1310. In general, a user 112 may be granted a privilege 1310 or set of privileges 1310, and these privileges 1310 may define what actions the user 112 may perform while accessing a resource 145. However, for security reasons, when changes occur in the system 100, the user 112 may be denied certain privileges 1310 based on those changes. The process of detecting a change and determining which privileges 1310 to deny or grant is referred to as reassigning privileges, which is discussed further with respect to FIGS. 15 and 16.

TBAC module 110 may be facilitating access by a user 112 to resource 145 over a network 120. User 112 may have been granted a privilege 1310 associated with accessing resource 145. However, when TBAC module 110 detects a change, for example in the network 120 or resource 145, it may not be safe for the user 112 to continue having the privilege 1310. TBAC module 110 may determine, based on the change, if the privilege 1310 should be denied. If the privilege should be denied, TBAC module 110 may generate a token 115 that, when communicated, may facilitate the denial of privilege 1310.

FIG. 15 illustrates the system 100 of FIG. 1 reassigning privileges 1310. As provided in FIG. 15, TBAC module 110 may store a subject token 115*k*, resource token 115*c*, network token 115*f*, risk token 115*m*, and privilege token 115*p*, among others, as appropriate. These tokens 115 may be correlated with a session token 115*j* to indicate that user 112 may be accessing a resource 145 through a session. Furthermore, resource token 115*p* may represent a set of privileges 1310 granted to user 112. Each privilege 1310 in the set of privileges 1310*d* may grant user 112 a certain ability while device 114 consumes resource 145. As an example and not by way of limitation, a privilege 1310 in the set of privileges 1310*d* may grant user 112 the ability to edit resource 145.

TBAC module 110 may be monitoring the session while user 112 is accessing resource 145. In particular embodiments, TBAC module 110 may receive a token 115 that indicates a change has occurred in system 100. This change may correspond to a change in any of the tokens 115 stored in TBAC module 110, and may affect the privileges 1310 granted to user 112. TBAC module 110 may determine the effect of the change on the set of privileges 1310d and facilitate the revoking and granting of privileges 1310 to user 112 pursuant to the privilege reassignment process.

TBAC module 110 may initiate the privilege reassignment process by communicating token 115 and risk token 115m to the computed risk token provider 124. In response, computed risk token provider 124 may recompute risk token 115m based on the change represented by token 115 to produce a recomputed risk token 115m2. Computed risk token provider 124 may communicate the recomputed risk token 115m2 to TBAC module 110.

TBAC module 110 may use the recomputed risk token 115m2 to facilitate the revoking and granting of privileges 1310. TBAC module 110 may use recomputed risk token 115m2 to access privilege reassignment (PPP2) rules 1530 stored in memory 134 to determine the privileges 1310 from the set of privileges 1310d that should be revoked and granted based on the risk associated with the change indicated by token 115. As an example and not by way of limitation, a particular PPP2 rule 1530 may specify that, based on the change, a privilege 1310 to edit resource 145 may be revoked and a privilege 1310 to email the resource 145 may be granted. TBAC module 110 may add to the set of privileges 1310d the privileges 1310 that should be granted, and remove from the set of privileges 1310d the privileges 1310 that should be revoked. Continuing the previous example, based on the particular PPP2 rule, TBAC module 110 may remove from the set of privileges 1310d the privilege 1310 to edit resource 145 and add to the set of privileges 1310d the privilege to email the resource 145.

TBAC module 110 may add and remove privileges 1310 from the set of privileges 1310d to form a new set of privileges 1310e. TBAC module 110 may generate a new privilege token 115p2 to represent the new set of privileges 1310e. TBAC module 110 may then communicate the new privilege token 115p2 to facilitate the reassignment of the new privileges 1310e to user 112. In particular embodiments, TBAC module 110 may communicate the new privilege token 115p2 to resource provider 140 to facilitate the granting and revoking of privileges 1310. In response, resource provider 140 may revoke the privileges 1310 that should be revoked and grant the privileges 1310 that should be granted. In this manner, TBAC module 110 may use tokens 115 to reassign privileges 1310 to user 112 during runtime. In particular embodiments, TBAC module 110 may further use recomputed risk token 115m2 to make an access decision 900 following the process discussed with respect to FIGS. 8-10.

Although this disclosure describes TBAC module 110 performing certain actions with respect to FIG. 15, this disclosure contemplates the processor 132 and the memory 134 of the TBAC module 110 performing these actions. The illustration of system 100 in FIG. 15 does not specifically illustrate all of the elements from the illustration of system 100 in FIG. 1 so that particular aspects of system 100 may be emphasized. However, system 100 of FIG. 15 includes all the elements of system 100 in FIG. 1.

FIG. 16 is a flowchart illustrating a method 1600 of reassigning privileges 1310 using the system 100 of FIG. 1. TBAC module 110 may perform method 1600. TBAC module 110 may begin by storing a subject token 115k, a resource token 115c, a network token 115f, a privilege token 115p, a risk token 115m, and a session token 115j, among others, as appropriate, as a plurality of tokens 115 in step 1610. In step 1620, TBAC module 110 may detect a token 115 indicating a change in at least one of the tokens 115 in the plurality of tokens 115. In response, TBAC module 110 may communicate the token 115 and the plurality of tokens 115 to the computed risk token provider 124 to recompute the risk token 115m in step 1630. TBAC module 110 may receive a recomputed risk token 115m2 in step 1640.

TBAC module 110 may begin reassigning privileges using the recomputed risk token 115m2. To begin, TBAC module 110 may generate a set of privileges 1310d granted to the user 112 represented by the privilege token 115p in step 1650. In step 1660, TBAC module 110 may access PPP2 rules 1530. In particular embodiments, TBAC module 110 may use the recomputed risk token 115m2 to access PPP2 rules 1530 to determine which privileges 1310 should be added to and removed from the set of privileges 1310d. In step 1670, TBAC module 110 may determine which privileges 1310 in the set of privileges 1310d should be revoked. In step 1680, TBAC module 110 may remove the privileges 1310 from the set of privileges 1310d that should be revoked. In step 1675, TBAC module 110 may determine which privileges 1310 not in the set of privileges 1310d should be granted. In step 1685, TBAC module 110 may add the privileges 1310 to the set of privileges 1310d that should be granted. By adding and removing privileges 1310, TBAC module 110 will produce a new set of privileges 1310e. TBAC module 110 may continue by generating a new privilege token 115p2 representing the new set of privileges 1310e. TBAC module 110 may conclude by communicating the new privilege token 115p2 to facilitate the updating of the privileges 1310 of the user 112.

In particular embodiments, because system 100 may detect when a privilege 1310 should be denied while user 112 is accessing resource 145, system 100 may provide a more robust and dynamic privileging process. Furthermore, because TBAC module 110 uses tokens 115 to reassign privileges, system 100 may perform privilege reassignment faster and more efficiently.

Figure 17:
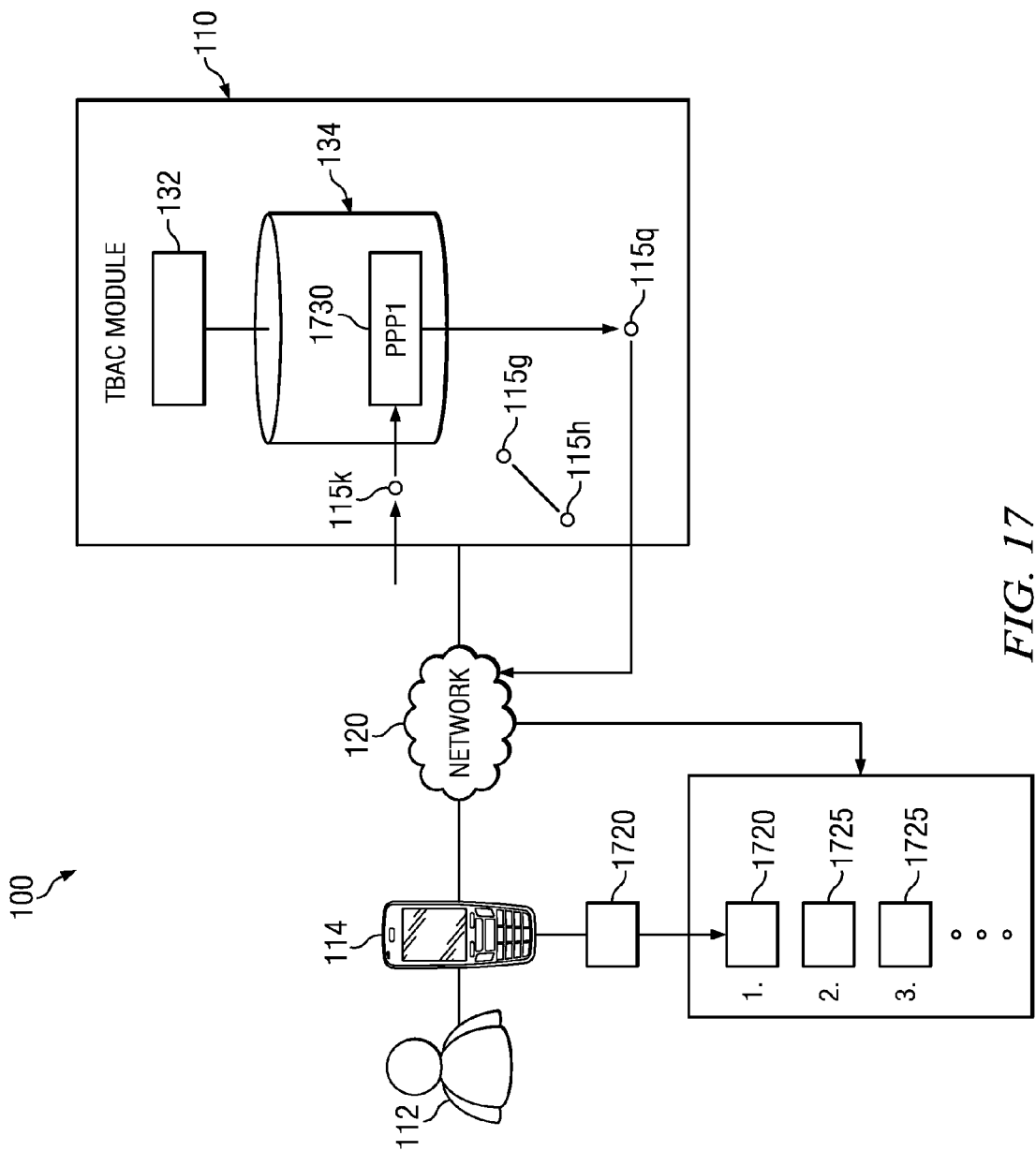
FIG. 17 illustrates the system of FIG. 1 prioritizing packets.
Figure 18:
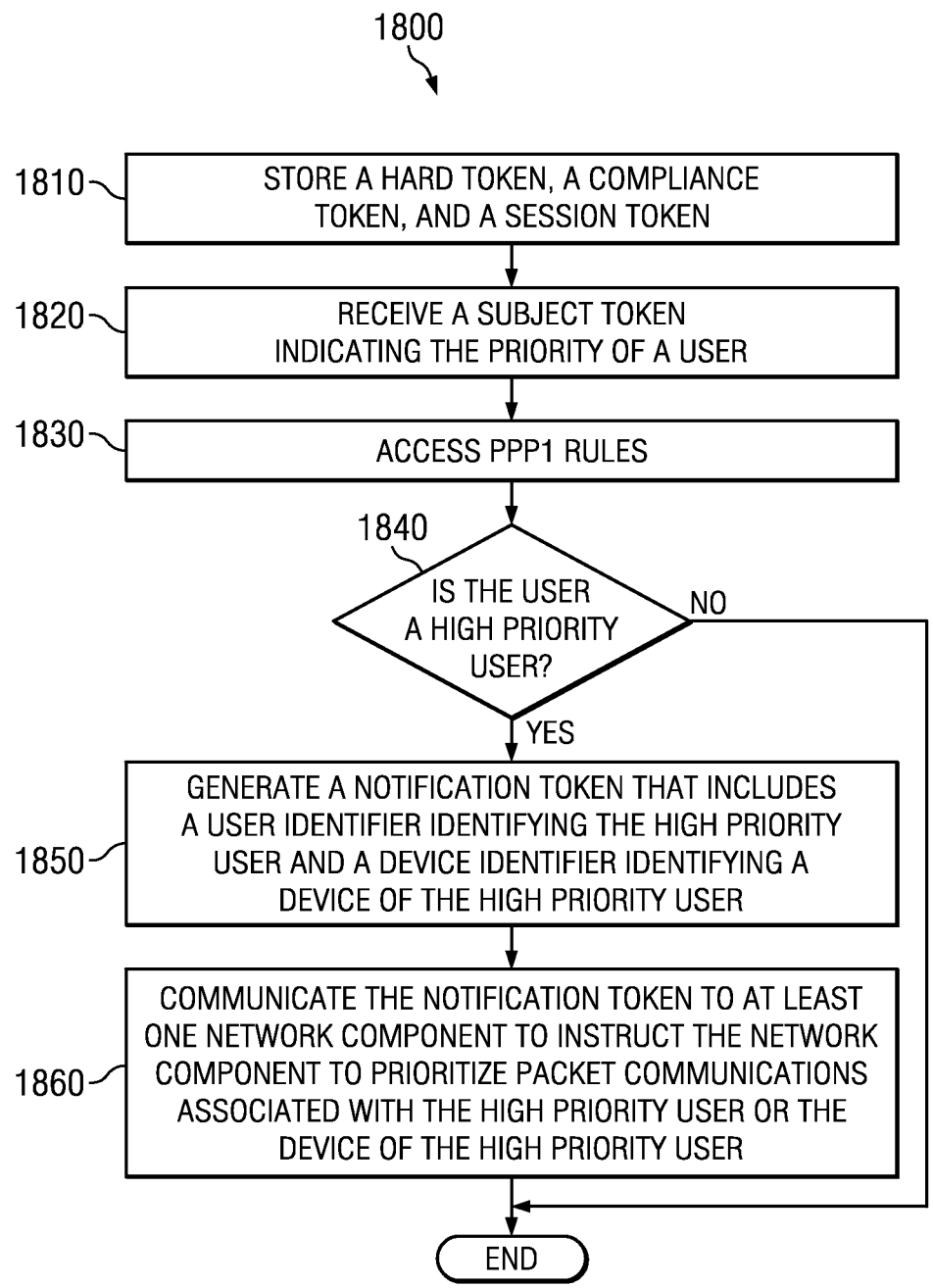
FIG. 18 is a flowchart illustrating a method of prioritizing packets using the system of FIG. 1.

FIGS. 17 and 18 illustrate system 100 performing packet prioritization. In general, some users 112 of system 100 may be more important than other users 112. It may be desirable to prioritize the tasks of the important users 112 over the tasks of the other users 112. To accomplish this, system 100 may prioritize packets 1725 by processing the network packets 1720 of the important users 112 before the network packets 1725 of the other users 112. The process of determining a user 112 is important and prioritizing the packets of the important user 112 is referred to as packet prioritization, which is discussed further with respect to FIGS. 19 and 20.

TBAC module 110 may facilitate access by a user 112 to a resource 145. TBAC module 110 may determine that user 112 is a high priority user and should have his packets processed before the packets of other users 112. TBAC module 110 may generate a token 115 to indicate that user 112 is a high priority user. TBAC module 110 may communicate the token 115 to facilitate the prioritization of the packets of user 112.

FIG. 17 illustrates the system 100 of FIG. 1 prioritizing packets 1725. As provided in FIG. 17, TBAC module 110 may store a hard token 115g (that may include a device identifier that identifies a device 114) and a compliance token 115h to indicate that device 114 is capable of consuming a resource 145. In particular embodiments, TBAC module 110 may receive a subject token 115k indicating the priority of user 112. As an example and not by way of limitation, subject token 115k may include a user identifier that indicates that user 112 is a high priority user. In particular embodiments, subject token 115k may be correlated with hard token 115g to associate the high priority user 112 with device 114. As an example and not by way of limitation, correlating the hard token 115g with the subject token 115k may indicate that the device 114 is being used by the high priority user 112.

TBAC module 110 may use subject token 115k to access packet prioritization (PPP1) rules 1730 stored in memory 134 to determine the priority of user 112. As an example and not by way of limitation, a particular PPP1 rule 1730 may specify that user 112 associated with subject token 115k should be prioritized above all other users 112 in the system 100. As a result, by applying the particular PPP1 rule 1730, TBAC module 110 may determine that the user 112 associated with subject token 115k is a high priority user 112 and that packets from the high priority user 112 should be processed before packets from any other user 112 of system 100.

TBAC module 110 may generate a notification token 115q indicating the priority of user 112. In particular embodiments, notification token 115q may include the user identifier associated with the high priority user 112 and the device identifier associated with the device 114 of the high priority user 112. Notification token 115q further include instructions on how to prioritize packet 1720 from user 112. As an example and not by way of limitation, if user 112 is a high priority user, notification token 115q may include instructions to prioritize packet 1720 from user 112. TBAC module 110 may then communicate notification token 115q to network 120. In particular embodiments, TBAC module 110 may communicate notification token 115q to a network component of network 120 such as, for example, a router, a switch, a gateway, or a server such as a secure token server. In response, network 120 may recognize packet 1720 from user 112 as a high priority packet 1720 and prioritize high priority packet 1720 over other packets 1725. As an example and not by way of limitation, network 120 may process high priority packets 1720 before it processes other packets 1725 even if the other packets 1725 arrived at network 120 prior to the high priority packet 1720.

In this manner, a process associated with the high priority user 112 may be prioritized over the process of another user 112. As an example and not by way of limitation, high priority user 112 may be authenticated prior to other users 112 because the packets 1720 of high priority user 112 are prioritized over the packets 1725 of other users 112. As another example and not by way of limitation, by prioritizing packets 1720 from high priority user 112, high priority user 112 may be authorized to access a resource 145 before other users 112 of the system 100. Although this disclosure describes prioritizing particular processes of high priority user 112, this disclosure contemplates prioritizing any suitable process of high priority user 112. In general, TBAC module 110 may communicate a session associated with the high priority user 112 to network 120 such that all packets 1720 associated with the session of the high priority user 112 may be prioritized over the packets 1725 of other users 112. TBAC module may further designate the session token 115j associated with the session as a high priority session token 115j.

As yet another example and not by way of limitation, TBAC module 110 may prioritize the provisioning of a container 210 to device 114 associated with the high priority user 112 by prioritizing the packets 1720 of the high priority user 112. TBAC module 110 may communicate a token 115 to facilitate the provisioning of a container 210 to device 114. Container 210 may include a virtual machine. If notification token 115q indicates that user 112 is a high priority user, network 120 may process the packets 1720 associated with token 115 before processing the packets 1725 of other users 112 of system 100. As a result, network 120 may facilitate the provisioning of the container 210 to device 114 before processing other packets 1725. As an example and not by way of limitation, if a high priority user 112 and another user 112 were both waiting for a container 210 to be provisioned to their devices 114, network 120 may prioritize the packets 1725 of the high priority user 112 thereby resulting in the provisioning of the container 210 to the high priority user 112 prior to provisioning of the container 210 to the other user 112. Although this disclosure describes TBAC module 110 performing certain actions with respect to FIG. 17, this disclosure contemplates the processor 132 and the memory 134 of the TBAC module 110 performing these actions. The illustration of system 100 in FIG. 17 does not specifically illustrate all of the elements from the illustration of system 100 in FIG. 1 so that particular aspects of system 100 may be emphasized. However, system 100 of FIG. 17 includes all the elements of system 100 in FIG. 1.

FIG. 18 is a flowchart illustrating a method 1800 of prioritizing packets 1725 using the system 100 of FIG. 1. TBAC module 110 may perform method 1800. As provided by FIG. 18, TBAC module 110 may begin by storing a hard token 115g, a compliance token 115h, and a session token 115j, among others, as appropriate, in step 1810. TBAC module 110 may continue by receiving a subject token 115k indicating the priority of a user 112 in step 1820. In particular embodiments, the subject token 115k may indicate the user 112 is a high priority user. In particular embodiments, in response to the determination that the user 112 is a high priority user, the session token 115j may be designated a high priority session token. TBAC module 110 may continue by accessing PPP1 rules 1730 in step 1830. In step 1840, TBAC module 110 may determine, based on PPP1 rules 1730, if the user 112 is a high priority user. If the user 112 is not a high priority user, TBAC module 110 may conclude.

If the user 112 is a high priority user, TBAC module 110 may initiate packet prioritization for the high priority user. To begin, TBAC module 110 generate a notification token 115q that includes a user identifier identifying the high priority user and a device identifier identifying a device 114 of the high priority user in step 1850. TBAC module 110 may conclude in step 1860 by communicating the notification token 115q to at least one network component to instruct the network component to prioritize packet communications associated with the high priority user or the device 114 of the high priority user.

In particular embodiments, by prioritizing the packets of certain users 112, system 100 may provide more dynamic functionality to users 112. Furthermore, because TBAC module 110 uses tokens 115 to facilitate packet prioritization, system 100 may be able to quickly and efficiently determine when to prioritize the packets of a certain user.

Figure 19:
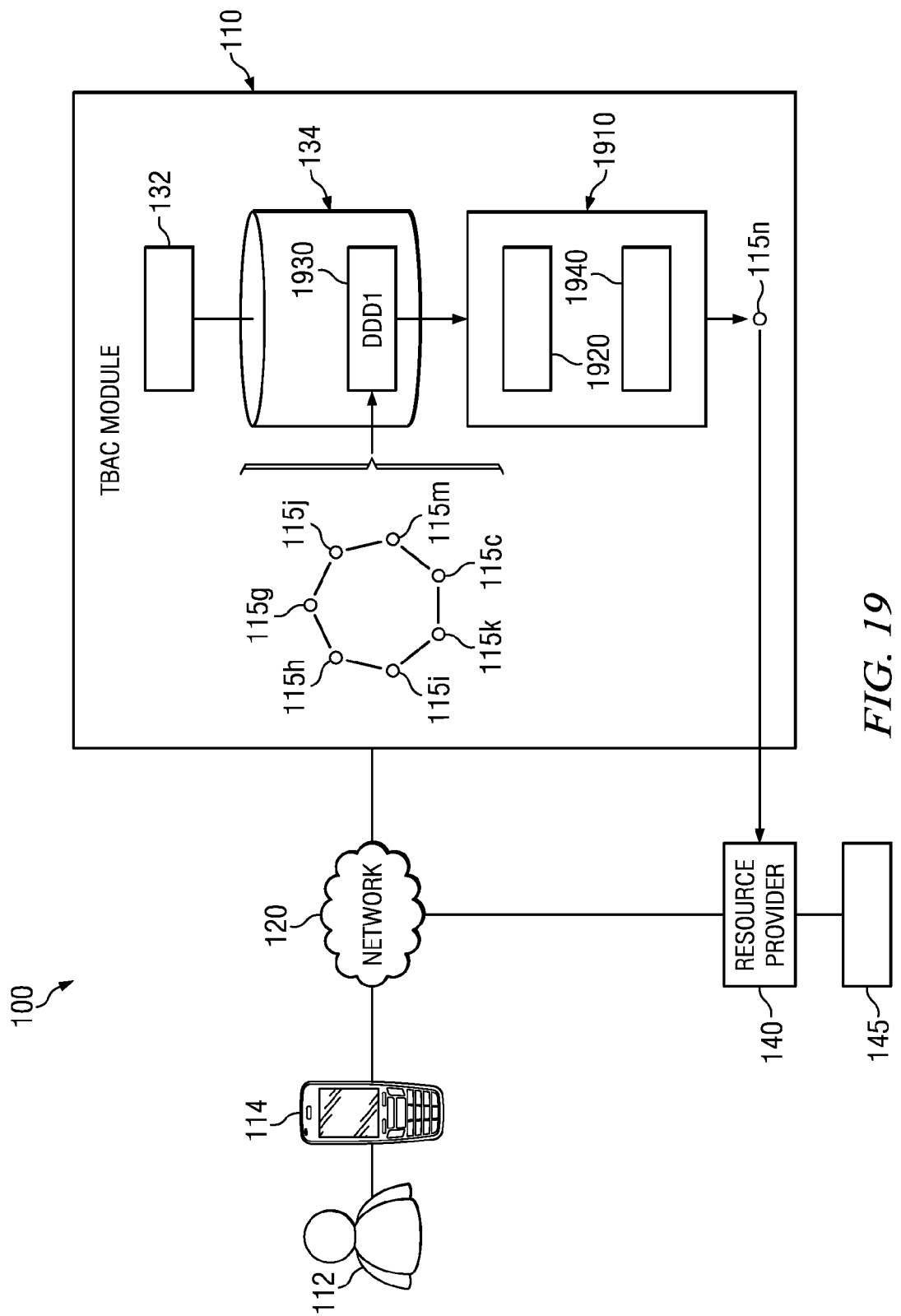
FIG. 19 illustrates the system of FIG. 1 conditioning an access decision.
Figure 20:
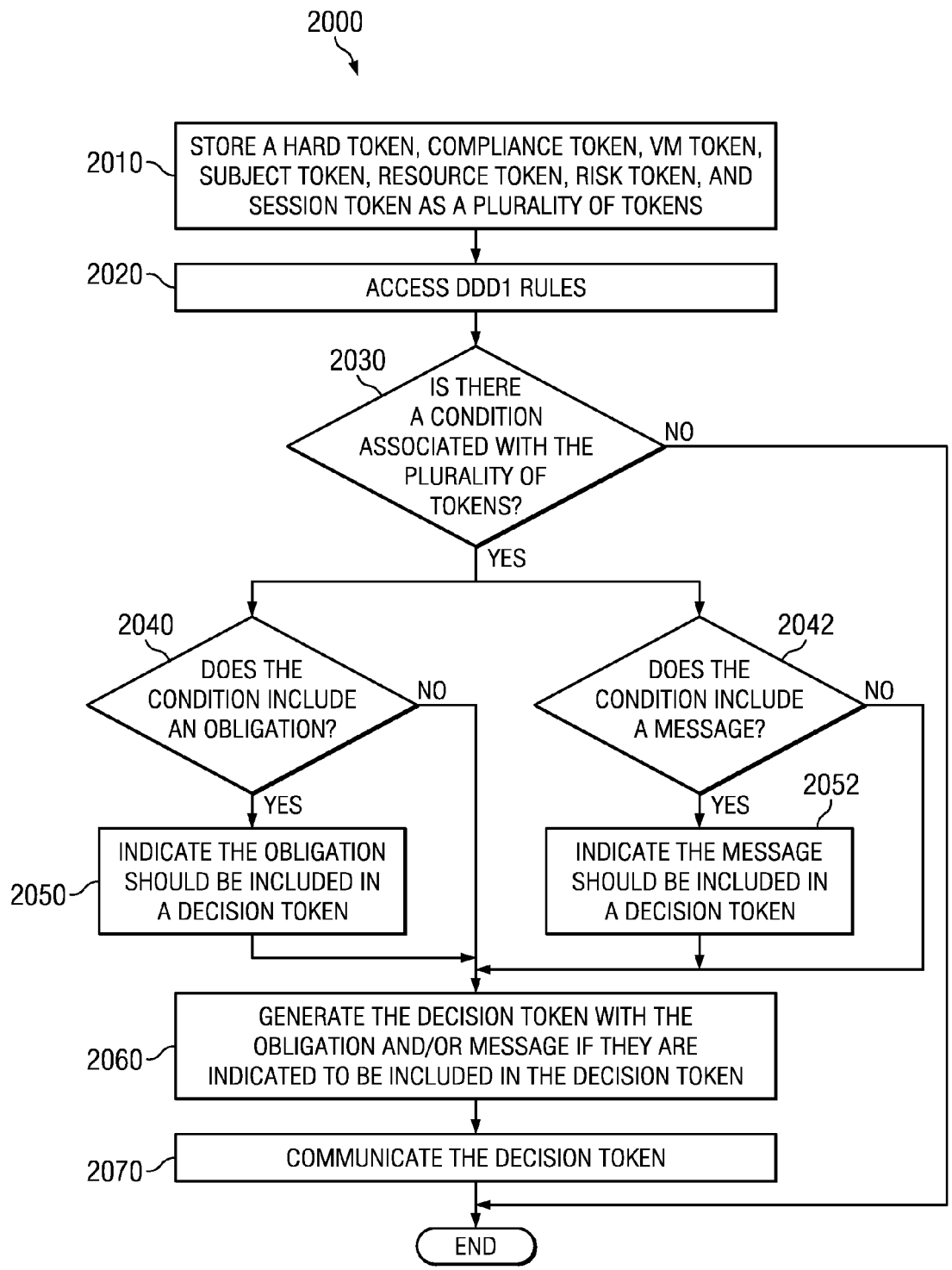
FIG. 20 is a flowchart illustrating a method of conditioning access decisions using the system of FIG. 1.

FIGS. 19 and 20 illustrate system 100 conditioning an access decision 900. In some instances, making an access decision 900 may be more complicated than granting or denying access. There may be conditions 1910 attached to those decisions. For example, a decision to deny may be accompanied with a condition 1910 that, if satisfied, may result in the granting of access. The process of determining conditions 1910 and communicating the conditions 1910 is referred to as conditioning, which is discussed further with respect to FIGS. 19 and 20.

TBAC module 110 may make an access decision 900 following the process discussed with respect to FIGS. 8-10. In addition to making a decision to grant or deny access, TBAC module 110 may determine conditions associated with the decision to grant or deny access. TBAC module 110 may generate a decision token 115n that represents the condition, and may communicate the decision token 115n to facilitate enforcement of the condition.

FIG. 19 illustrates the system 100 of FIG. 1 conditioning an access decision 900. As provided in FIG. 19, TBAC module 110 may store a hard token 115g, a compliance token 115h, a VM token 115i, a subject token 115k, a dataset token 115l, a risk token 115m, and a session token 115j, among others, as appropriate. These tokens 115 may indicate a user 112 is requesting access to a resource 145 over a network 120. Using these tokens 115, TBAC module 110 may make an access decision 900 following the process described with respect to FIGS. 8 through 10.

In addition to making an access decision 900, TBAC module 110 may determine a condition 1910 associated with the access decision 900. TBAC module 110 may use the stored tokens 115 to access conditioning (DDD1) rules 1930 stored in memory 134 to determine the condition 1910. A particular DDD1 rule 1930 may specify a condition 1910 associated with accessing a particular resource 145. In particular embodiments, the condition 1910 may include an obligation 1920, and/or a message 1940 associated with the access decision 900.

Condition 1910 may include an obligation 1920 to be fulfilled in conjunction with enforcing the access decision 900. In particular embodiments, obligation 1920 must be performed in conjunction with enforcing the access decision 900. As an example and not by way of limitation, obligation 1920 may indicate that resource provider 140 must synchronize its system clock with the network 120 clock before granting access to a resource 145. In certain embodiments, obligation 1920 may be optional with respect to enforcing the access decision 900. As an example and not by way of limitation, obligation 1920 may recommend that resource provider 140 may synchronize its system clock with the network 120 clock before granting access to a resource 145.

Obligation 1920 may indicate a task to be performed by a component of system 100 upon receiving the access decision 900 along with the obligation 1920. As an example and not by way of limitation, obligation 1920 may be synchronizing a system clock of the resource provider 140 with a clock on a network 120. Upon receiving the access decision 900 along with the obligation 1920 to synchronize a system clock, resource provider 140 may enforce the access decision 900 and synchronize its system clock with a clock on network 120. As another example and not by way of limitation, obligation 1920 may be initializing the logging of errors and performance metrics related with enforcing the access decision 900. Upon receiving the access decision 900 along with the obligation 1920, resource provider 140 may enforce the access decision 900 and initialize the logging of errors and performance metrics related with enforcing the access decision. As yet another example and not by way of limitation, obligation 1920 may be tracking transactions over network 120. Upon receiving the access decision 900 along with the obligation 1920, resource provider 140 may enforce the access decision 900 and begin tracking transactions associated with a requested resource 145.

Obligation 1920 may indicate a task to be performed by user 112 before access to the resource 145 may be granted. As an example and not by way of limitation, obligation 1920 may indicate that a peripheral device such as a USB drive is attached to device 114 and that the peripheral device should be removed before access may be granted to resource 145. During enforcement of an access decision 900, user 112 may be notified to remove the peripheral device. If user 112 removes the peripheral device from device 114, obligation 1920 may be satisfied and access to resource 145 may be granted to user 112. As another example, and not by way of limitation, obligation 1920 may indicate that information required to access resource 145 such as, for example, the birthday of the user 112 may be missing. If user 112 supplies the missing information, for example by entering the birthday into device 114, obligation 1920 may be satisfied and access to resource 145 may be granted.

Condition 1910 may include a message 1940. Message 1940 may provide an explanation for the access decision 900. As an example and not by way of limitation, if access to resource 145 was denied because user 112 was not of a particular age, message 1940 may state that access was denied because user 112 was not old enough. As another example and not by way of limitation, if access to resource 145 was granted because user 112 was exempt from an age restriction, message 1940 may state that access was granted because user 112 is exempt from the age restriction. Message 1940 may further provide instructions on how to fulfill obligation 1920. For example, if obligation 1920 indicates that user 112 should remove a USB drive attached to device 114 before access may be granted, message 1940 may instruct user 112 to remove the USB drive.

In particular embodiments, TBAC module 110 may generate a decision token 115n representing condition 1910. In certain embodiments, decision token 115n may also represent the access decision 900. TBAC module 110 may communicate decision token 115n to resource provider 140 to facilitate the enforcement of the access decision 900 and the condition 1910.

Although this disclosure describes TBAC module 110 performing certain actions with respect to FIG. 19, this disclosure contemplates the processor 132 and the memory 134 of the TBAC module 110 performing these actions. The illustration of system 100 in FIG. 19 does not specifically illustrate all of the elements from the illustration of system 100 in FIG. 1 so that particular aspects of system 100 may be emphasized. However, system 100 of FIG. 19 includes all the elements of system 100 in FIG. 1.

FIG. 20 is a flowchart illustrating a method 2000 of conditioning access decisions 900 using the system 100 of FIG. 1. TBAC module 110 may perform method 2000. As provided in FIG. 20, TBAC module 110 may begin by storing a hard token 115g, compliance token 115h, VM token 115i, subject token 115k, risk token 115m, and session token 115j, among others, as appropriate, as a plurality of tokens in step 2010. TBAC module 110 may continue by accessing DDD1 rules 1930 in step 2020. In step 2030, TBAC module 110 may determine if there is a condition 1910 associated with the plurality of tokens. If there is no condition 1910 associated with the plurality of tokens, TBAC module 110 may conclude.

If there is a condition 1910 associated with the plurality of tokens, TBAC module 110 may initiate conditioning. To begin, TBAC module 110 may continue to steps 2040 and 2042. In step 2040, TBAC module 110 may determine if the condition 1910 includes an obligation 1920. If the condition 1910 does include an obligation 1920, TBAC module 110 may continue to step 2050 to indicate the obligation 1920 should be included in a decision token 115n. In step 2042, TBAC module 110 may determine if the condition 1910 includes a message 1940. If the condition 1910 includes a message 1940, TBAC module 110 may continue to step 2052 to indicate the message 1940 should be included in a decision token 115n. TBAC module 110 may continue to step 2060 to generate the decision token 115n with the obligation 1920 and/or message 1940 if they are indicated to be included in the decision token 115n. TBAC module 110 may conclude in step 2070 by communicating the decision token 115n.

In particular embodiments, because system 100 may place conditions on access decisions 900, system 100 may make more robust access decisions 900. Furthermore, because TBAC module 100 uses tokens to perform conditioning, system 100 may make an access decision 900 quicker and more efficiently.

Figure 21:
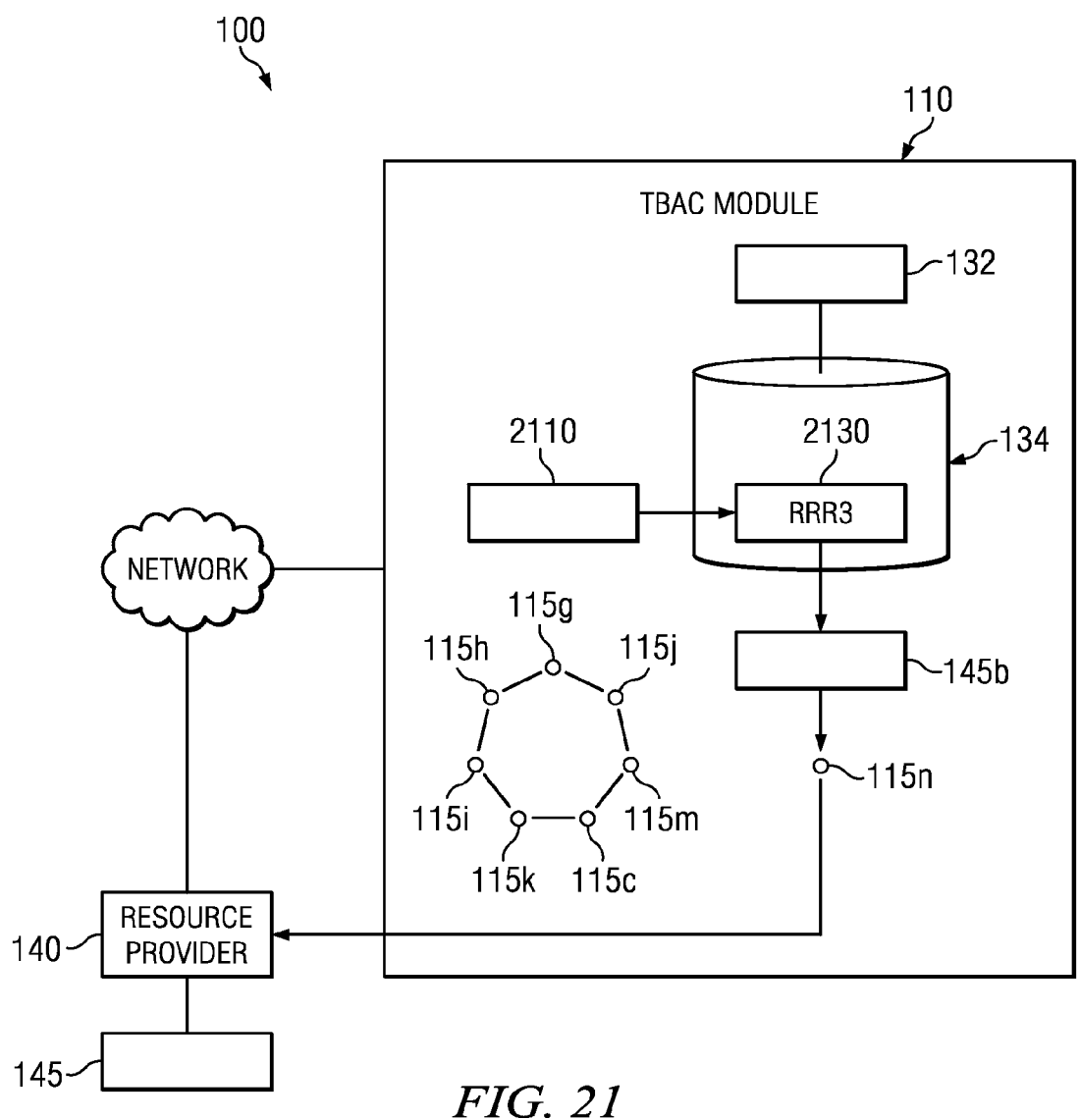
FIG. 21 illustrates the system of FIG. 1 making an access decision for a related resource.
Figure 22:
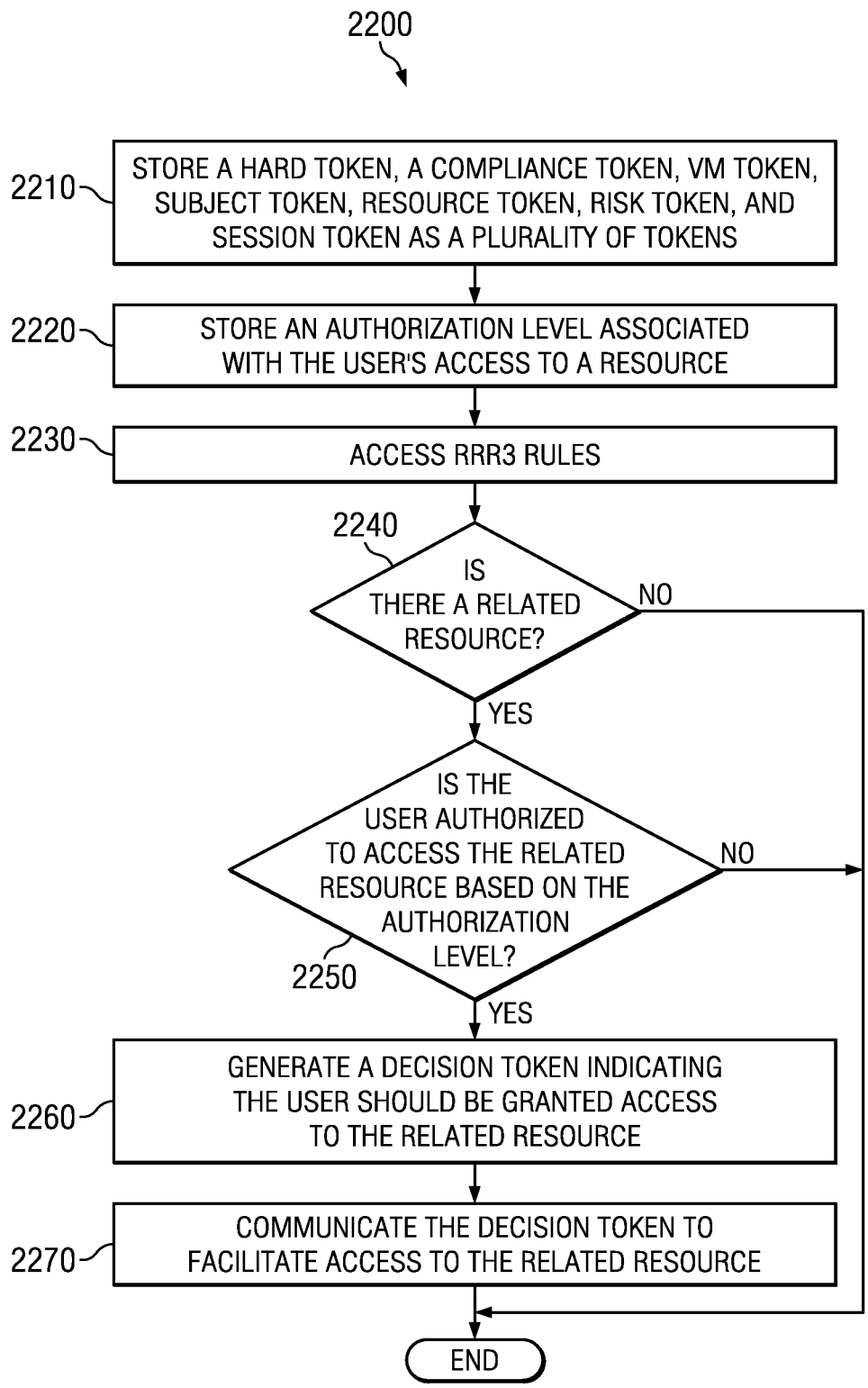
FIG. 22 is a flowchart illustrating a method of making an access decision for a related resource using the system of FIG. 1.

FIGS. 21 and 22 illustrate the system 100 accessing related resources 145b. In general, certain resources 145 may share a relationship with some related resources 145b. For example, a computer resource may include several sub-resources such as an email client, a word processor, and a browser. When system 100 determines whether a user 112 may access a resource 145, system 100 may also determine, based on access to the resource 145, whether there are any related resources 145b that user 112 may also access. This process of determining access to related resources 145b is discussed further with respect to FIGS. 21 and 22.

TBAC module 110 may make an access decision 900 for a resource 145 following the process discussed with respect to FIGS. 8-10. TBAC module 110 may also make an access decision 900 for any related resources 145b that share a relationship with the resource 145. For example, user 112 may frequently access the related resource 145b while the user 112 accesses the resource 145. TBAC module 110 may provide the user 112 with a better and more seamless user experience by determining access to the related resource 145b based on the access decision 900 for the resource 145.

FIG. 21 illustrates the system 100 of FIG. 1 making an access decision 900 for a related resource 145b. As provided in FIG. 21, TBAC module 110 may store hard token 115g, compliance token 115h, VM token 115i, subject token 115k, resource token 115c, risk token 115m, and session token 115j, among others, as appropriate. These tokens 115 may indicate that a user 112 is attempting to access a resource 145. TBAC module 110 may use these tokens 115 to make an access decision 900 following the process described with respect to FIGS. 8-10. In particular embodiments, while making the access decision 900, TBAC module 110 may determine an authorization level 2110 associated with access by the user 112 to the resource 145. The authorization level 2110 may be a numerical value. If the value of authorization level 2110 is above a certain threshold, then user 112 may be granted access to resource 145. In particular embodiments, TBAC module 110 may use the authorization level 2110 to determine if user 112 may be granted access to any related resources 145b that share a relationship with resource 145.

To accomplish this, TBAC module 110 may use authorization level 2110 to access resource relationship (RRR3) rules 2130 stored in memory 134. RRR3 rules 2130 may specify a related resource 145b that shares a relationship with the resource 145. As an example and not by way of limitation, a particular RRR3 rule 2130 may specify that resource 145 is a composite resource that includes several sub-resources, and related resource 145b may be a sub-resource of resource 145. As another example and not by way of limitation, a particular RRR3 rule 2130 may specify that related resource 145b is a frequently accessed resource in conjunction with accessing resource 145. Although this disclosure describes related resource 145b sharing particular relationships with resource 145, this disclosure contemplates related resource 145b sharing any suitable relationship with resource 145. Based on authorization level 2110, TBAC module 110 may determine that user 112 is authorized to access related resource 145b. As an example and not by way of limitation, TBAC module 110 may determine that the authorization level 2210 is an 8. If an authorization level 2110 of at least 7 is required to access the related resource 145b, then TBAC module 110 may grant access to the related resource 145. As another example and not by way of limitation, if resource 145 includes several sub-resources, one of which is related resource 145b, an authorization level 2210 of an 8 may be sufficient to access the related resource 145b, but it may not be sufficient to access other sub-resources of resource 145. In that case, user 112 may be granted access to related resource 145b, but other sub-resources may be hidden or inaccessible.

In particular embodiments, TBAC module 110 may generate a decision token 115n representing the determination that user 112 is authorized to access related resource 145b. TBAC module 110 may communicate decision token 115n to resource provider 140 to facilitate enforcement of the decision to grant access to the related resource 145b. In response, resource provider 140 may grant user 112 access to related resource 145b. In particular embodiments, TBAC module 110 may further receive a recomputed risk token 115m2 representing the risk associated with granting the user 112 access to the resource 145 and the related resource 145b. Recomputed risk token 115m2 may be computed based on access by the user 112 to resource 145 and related resource 145b, not just resource 145.

Although this disclosure describes TBAC module 110 performing certain actions with respect to FIG. 21, this disclosure contemplates the processor 132 and the memory 134 of the TBAC module 110 performing these actions. The illustration of system 100 in FIG. 21 does not specifically illustrate all of the elements from the illustration of system 100 in FIG. 1 so that particular aspects of system 100 may be emphasized. However, system 100 of FIG. 21 includes all the elements of system 100 in FIG. 1.

FIG. 22 is a flowchart illustrating a method 2200 of making an access decision 900 for a related resource 145b using the system 100 of FIG. 1. TBAC module 110 may perform method 2200. As provided in FIG. 22, TBAC module 110 may begin by storing a hard token 115g, compliance token 115h, VM token 115i, subject token 115k, resource token 115c, risk token 115m, and session token 115j, among others as appropriate as a plurality of tokens in step 2210. TBAC module 110 may continue by storing an authorization level 2110 associated with access by a user 112 to a resource 145 in step 2220. In particular embodiments, if the authorization level 2110 is above a certain threshold then user 112 may be granted access to the resource 145. TBAC module 110 may continue by accessing RRR3 rules 2130 in step 2230. In step 2240, method 2200 may determine, based on RRR3 rule 2130, if there is a related resource 145b that shares a relationship with the resource 145. If there is no related resource 145b, TBAC module 110 may conclude. If there is a related resource 145b, TBAC module 110 may continue to step 2250 to determine if the user 112 is authorized to access the related resource 145b based on the authorization level 2110. If the user is not authorized to access the related resource, TBAC module 110 may conclude. If the user 112 is authorized to access the related resource 145b, TBAC module 110 may continue to step 2260 to generate a decision token 115n indicating that user 112 should be granted access to the related resource 145b. TBAC module 110 may then conclude at step 2270 by communicating the decision token 115n to facilitate access to the related resource 145b.

In particular embodiments, because system 100 may determine access to related resources 145b, system 100 may provide a more seamless user experience for a user 112. Furthermore, because TBAC module 110 uses tokens to determine access to the related resources 145b, system 100 may determine access to the related resources 145b quicker and more efficiently.

Figure 23:
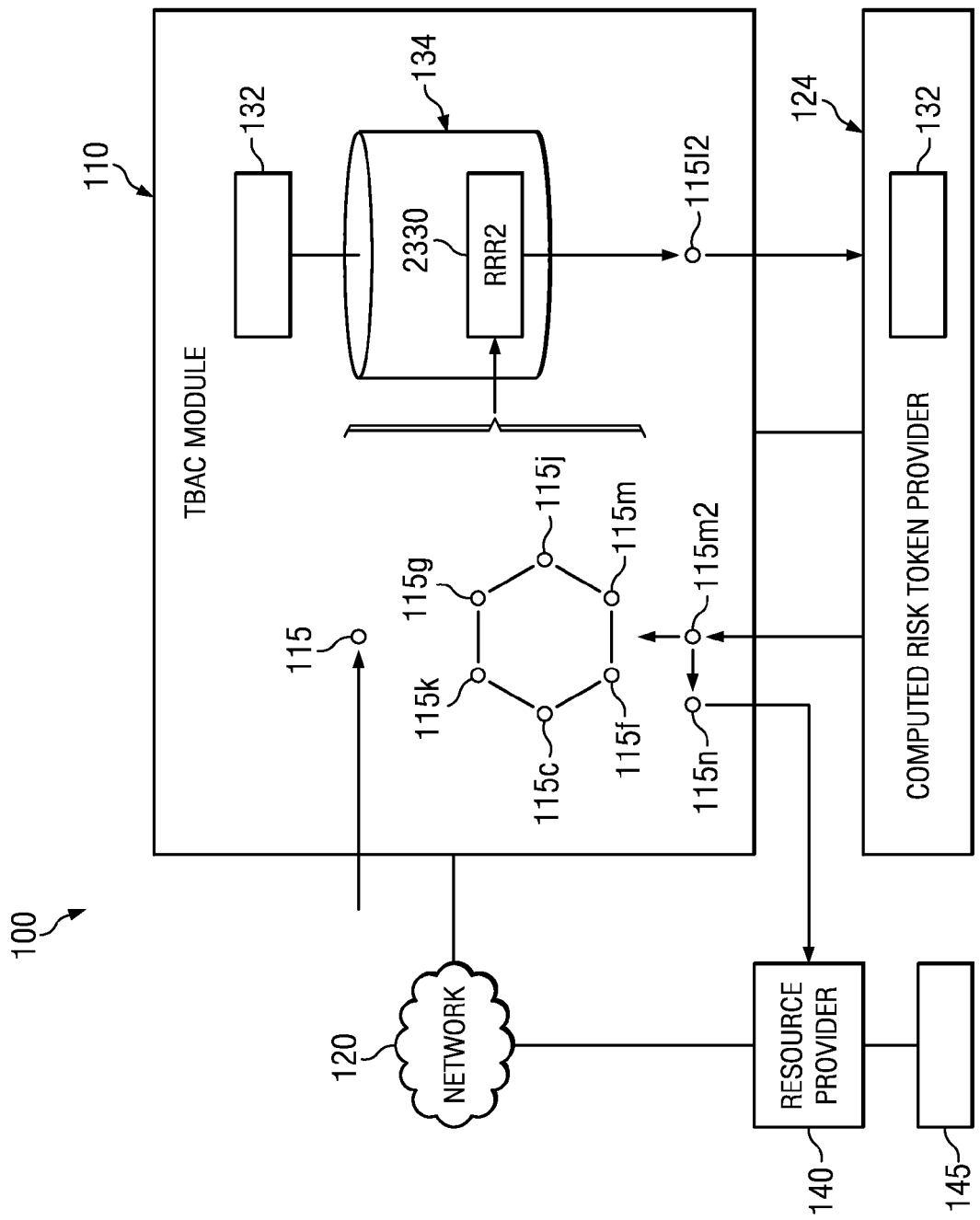
FIG. 23 illustrates the system of FIG. 1 updating risk in real-time.
Figure 24:
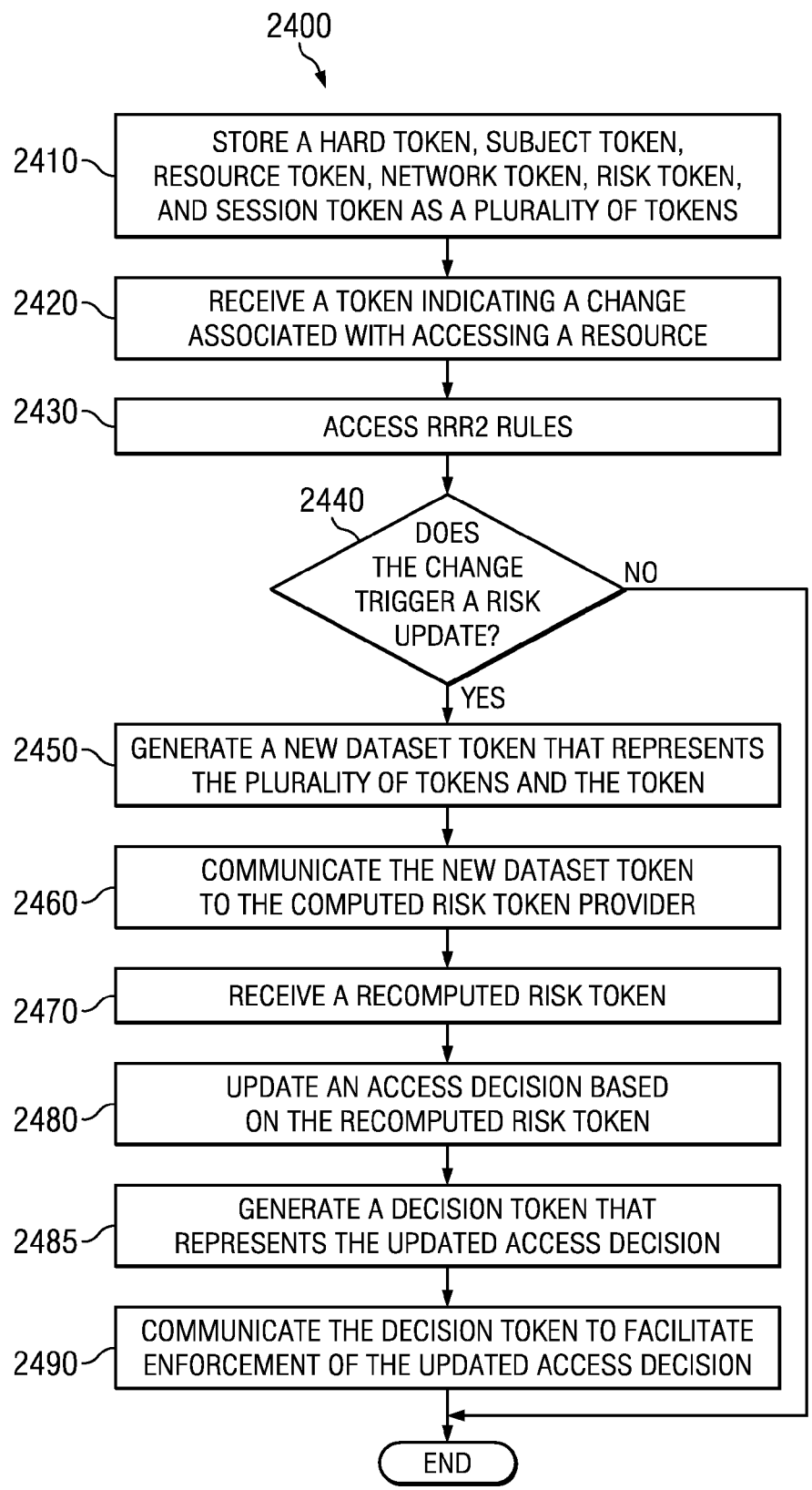
FIG. 24 is a flowchart illustrating a method of updating risk in real-time using the system of FIG. 1.

FIGS. 23 and 24 illustrate the system 100 performing a real-time risk update. In general, changes may occur in the system 100 while a user 112 is accessing a resource 145. These changes may pose risks, such as security risks, for the system 100, and access to the resource 145 may be cut off because of these risks. The process of detecting a change and determining the risk posed by the change is referred to as real-time risk updating, which is discussed further with respect to FIGS. 23 and 24.

TBAC module 110 may detect changes in system 100 while monitoring a session and determine whether those changes trigger a real-time risk update. If a change does trigger a real-time risk update, TBAC module 110 may request a real-time risk update in the form of a recomputed risk token 115m2. TBAC module 110 may then use the recomputed risk token 115m2 to make an access decision 900 following the process described with respect to FIGS. 8-10.

FIG. 23 illustrates the system 100 of FIG. 1 updating risk in real-time. As provided in FIG. 23, TBAC module 110 may store a hard token 115g, a subject token 115k, a resource token 115c, a network token 115f, a risk token 115m, and a session token 115j, among others as appropriate, as a plurality of tokens. The plurality of tokens may indicate a user 112 is accessing a resource 145 over network 120. TBAC module 110 may receive a token 115 that indicates a change associated with accessing a resource 145. In particular embodiments, token 115 may further indicate that a change has occurred to at least one token 115 in the plurality of tokens. In response to receiving token 115, TBAC module 110 may use token 115 and/or the plurality of tokens to access real-time risk (RRR2) rules 2330 stored in memory 134. In particular embodiments, RRR2 rules 2330 may specify which changes indicated by token 115 may trigger a risk update. As an example and not by way of limitation, a particular RRR2 rule 2330 may specify that jitter over network 120 may trigger a risk update. If token 115 indicates that network 120 is experiencing jitter, then token 115 may trigger a risk update.

To initiate the risk update, TBAC module 110 may generate a new dataset token 115/2 that represents the token 115 and the plurality of tokens. As an example and not by way of limitation, if token 115 is a network token 115f indicating that network 120 is experiencing jitter, then new dataset token 115/2 may indicate the presence of the network token 115f indicating jitter over the network 120. New dataset token 115/2 may further indicate the presence of the tokens 115 in the plurality of tokens. For example, new dataset token 115/2 may also indicate the presence of risk token 115m, which represents a risk associated with accessing the resource before the change. In this manner, new dataset token 115/2 may represent both the state of system 100 prior to the change and the change itself.

TBAC module 110 may communicate the new dataset token 115/2 to the computed risk token provider 124. In response, computed risk token provider 124 may include the change indicated by token 115 in recomputing the risk represented by risk token 115m. In this manner, the recomputed risk may represents the risk associated with continuing access to the resource with the change. After recomputing the risk, computed risk token provider 124 may generate a recomputed risk token 115m2 that represents the recomputed risk. In particular embodiments, computed risk token provider 124 may communicate the recomputed risk token 115m2 to TBAC module 110. In response, TBAC module 110 may incorporate recomputed risk token 115m2 into the plurality of tokens. As an example and not by way of limitation, TBAC module 110 may replace risk token 115m with recomputed risk token 115m2. As another example and not by way of limitation, TBAC module 110 may include recomputed risk token 115m2 into the plurality of tokens in addition to the risk token 115m.

In particular embodiments, the recomputed risk represented by recomputed risk token 115m2 may affect an access decision 900 previously made by TBAC module 110 following the process discussed with respect to FIGS. 8-10. In that case, TBAC module 110 may perform that process again with the recomputed risk token 115m2 to produce a new access decision 900. In particular embodiments, TBAC module 110 may generate a decision token 115n that represents the new access decision 900. TBAC module 110 may then communicate decision token 115n to facilitate enforcement of the new access decision 900. In particular embodiments, TBAC module 110 may communicate the decision token 115n to the resource provider 140.

Although this disclosure describes TBAC module 110 and computed risk token provider 124 performing certain actions with respect to FIG. 23, this disclosure contemplates the processor 132 and the memory 134 of the TBAC module 110 and the processor 132 of the computed risk token provider 124 performing these actions. The illustration of system 100 in FIG. 23 does not specifically illustrate all of the elements from the illustration of system 100 in FIG. 1 so that particular aspects of system 100 may be emphasized. However, system 100 of FIG. 23 includes all the elements of system 100 in FIG. 1.

FIG. 24 is a flowchart illustrating a method 2400 of updating risk in real time using the system 100 of FIG. 1. TBAC module 110 may perform method 2400. As provided by FIG. 24, TBAC module 110 may begin by storing a hard token 115g, subject token 115k, resource token 115c, network token 115f, risk token 115m, and session token 115j, among others as appropriate, as a plurality of tokens in step 2410. TBAC module 110 may continue by receiving a token 115 indicating a change associated with accessing a resource 145 in step 2420. In particular embodiments, the change may correspond with a change to a token 115 in the plurality of tokens. TBAC module 110 may continue by accessing RRR2 rules 2330 in step 2430. In step 2440, TBAC module 110 may determine if the change triggers a risk update. If the change does not trigger a risk update, TBAC module 110 may conclude.

If the change does trigger a risk update, TBAC module 110 may initiate the risk updating process. To begin, TBAC module 110 may generate a new dataset token 115/2 that represents the plurality of tokens and the token 115 that indicates the change in step 2450. In particular embodiments, new dataset token 115/2 may indicate the state of system 100 prior to the change and the change itself by representing the plurality of tokens and the token 115 that indicates the change. TBAC module 110 may continue to communicate the new dataset token 115/2 to the computed risk token provider 124 in step 2460. In response, computed risk token provider 124 may include the change represented by the token 115 in recomputing the risk represented by risk token 115m and generate a recomputed risk token 115m2 that represents the recomputed risk. In step 2470, TBAC module 110 may receive the recomputed risk token 115m2.

In particular embodiments, TBAC module 110 may continue to step 2480 to update an access decision 900 based on the recomputed risk token 115m2. TBAC module 110 may update the access decision 900 following the process discussed with respect to FIGS. 8-10. In step 2485, TBAC module 110 may generate a decision token 115n that represents the updated access decision 900. TBAC module 110 may conclude at step 2490 by communicating the decision token 115n to facilitate enforcement of the updated access decision 900.

In particular embodiments, because system 100 may perform real-time risk updates, system 100 may provide better security associated with accessing a resource 145. Furthermore, because TBAC module 110 uses tokens 115 to perform the real-time risk update, system 100 may provide faster and more efficient security.

Figure 25:
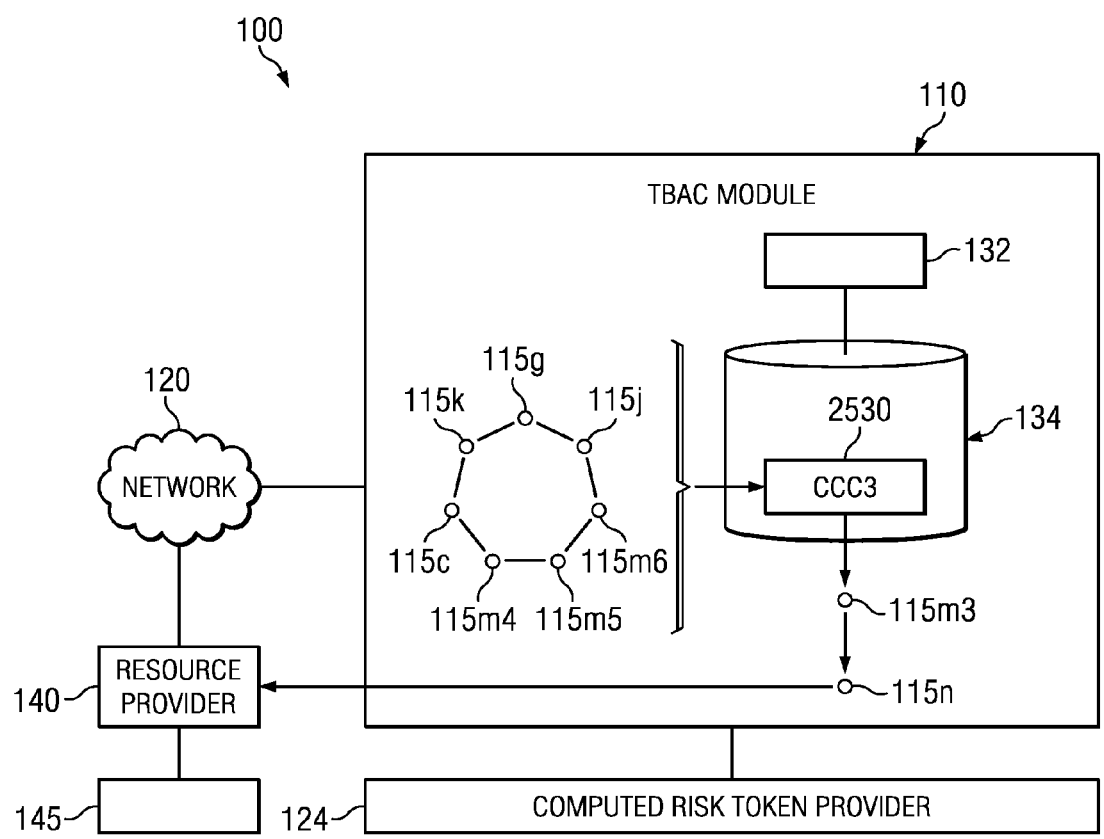
FIG. 25 illustrates the system of FIG. 1 combining risk ratings.
Figure 26:
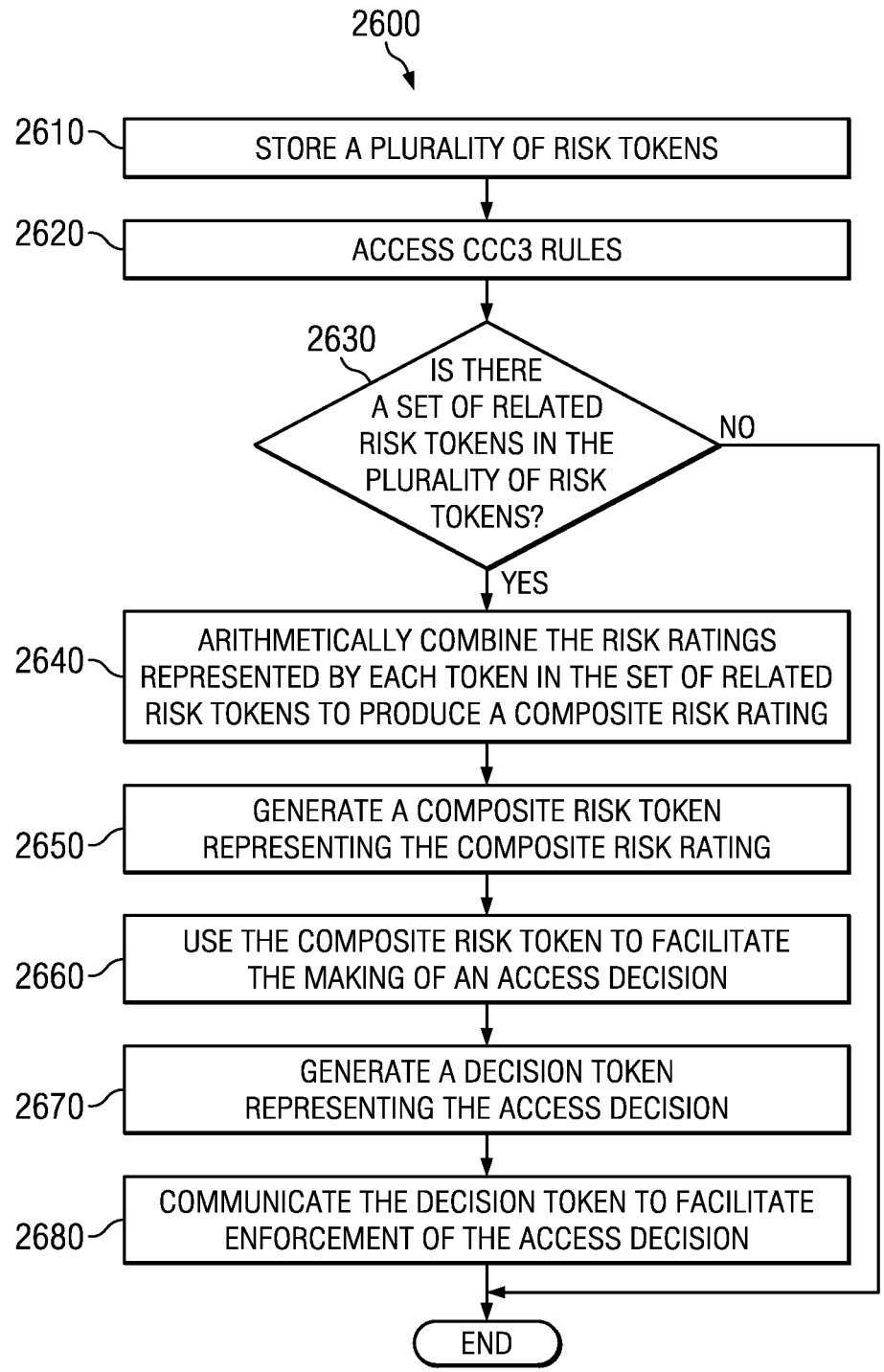
FIG. 26 is a flowchart illustrating a method of combining risk ratings using the system of FIG. 1.

FIGS. 25 and 26 illustrate the system 100 combining risk ratings. In general, during any session, a user 112 may perform several transactions. A particular transaction may have a risk associated with it that is different from the risk associated with another transaction. System 100 may determine if these risks are related and combine them to generate a clearer picture of the overall risk posed by user 112. This process of determining related risks and combining them is referred to as combining risk ratings, which is discussed further with respect to FIGS. 25 and 26.

TBAC module 110 may store multiple risk tokens 115m while monitoring a session. Each risk token 115m may represent a risk associated with a particular transaction. TBAC module 110 may determine which risks are related and combine the related risks into a composite risk token 115m3. TBAC module 110 may then use the composite risk token 115m3 to make an access decision 900 following the process described with respect to FIGS. 8-10.

FIG. 25 illustrates the system 100 of FIG. 1 combining risk ratings. As provided by FIG. 25, TBAC module 110 may store a hard token 115g, a subject token 115k, a resource token 115c, a first risk token 115m4, a second risk token 115m5, a third risk token 115m6, and a session token 115j, among others as appropriate as a plurality of tokens. In particular embodiments, first risk token 115m4, second risk token 115m5, and third risk token 115m6 may each represent a risk rating. The risk rating may be a numerical value that indicates a risk associated with granting a particular user 112 access to a particular resource 145. Although this disclosure describes a particular number of risk tokens 115m stored in TBAC module 110, this disclosure contemplates any number of risk tokens 115m stored in TBAC module 110.

In particular embodiments, particular combinations of the risk ratings represented by first risk token 115m4, second risk token 115m5, and/or third risk token 115m6 may provide more information about the risk associated with user 112 145. To determine these particular combinations, TBAC module 110 may use the first risk token 115m4, the second risk token 115m5, and the third risk token 115m6 to access risk combination (CCC3) rules 2530 stored in memory 134. In particular embodiments, a particular CCC3 rule 2530 may specify which risk tokens 115m may be related, and therefore may be combined to yield information about risk. As an example and not by way of limitation, the particular CCC3 rule 2530 may specify that the second risk token 115m5 and the third risk token 115m6 are related because they are associated with sub-resources 145b of a composite resource 145, and that therefore, the combination of the second risk token 115m5 and the third risk token 115m6 may yield information about the risk associated with granting access to another sub-resource 145b of the composite resource 145. Although this disclosure describes risk tokens 115m being related by resource 145, this disclosure contemplates risk tokens 115m being related in any suitable manner, including by user 112, network 120, an action performed by user 112, or any combination thereof.

For example, a particular CCC3 rule 2530 may specify that first risk token 115m4 and the second risk token 115m5 are related because they are associated with similar actions performed by user 112, such as for example, withdrawals from particular accounts of user 112, and that therefore, the combination of the first risk token 115m4 and the second risk token 115m5 may yield information about the risk associated with granting a withdrawal to user 112 for another account.

In particular embodiments, the particular CCC3 rule 2530 may further specify how to combine risk ratings. As an example and not by way of limitation, the particular CCC3 rule 2530 may specify that the risk rating represented by second risk token 115m5 and the risk rating represented by third risk token 115m6 should be arithmetically combined by a weighted average to produce a composite risk rating. In response, TBAC module 110 may produce a composite risk rating by computing the weighted average, indicated by the particular CCC3 rule 2530, of the risk ratings represented by second risk token 115m5 and third risk token 115m6. TBAC module 110 may then generate a composite risk token 115m3 that represents the composite risk rating. Although this disclosure describes combining risk ratings in a particular manner, this disclosure contemplates combining the risk ratings in any suitable manner.

In particular embodiments, TBAC module 110 may use the composite risk token 115m3 to facilitate the making of an access decision 900 following the process discussed with respect to FIGS. 8-10. As an example and not by way of limitation, if composite risk token 115m3 was computed from risk tokens 115m associated with different sub-resources 145b of a composite resource, TBAC module 110 may use composite risk token 115m3 to facilitate the making of an access decision 900 associated with access to another sub-resource 145b of the composite resource 145. As another example and not by way of limitation, if composite risk token 115m3 was computed from risk tokens 115m associated with a similar action, such as for example, a withdrawal from different accounts, TBAC module 110 may use composite risk token 115m3 to facilitate the making of an access decision 900 associated with the action, such as for example, a withdrawal from another account.

After making the access decision 900, TBAC module 110 may generate a decision token 115n that represents the access decision 900. TBAC module 110 may then communicate the decision token 115n to facilitate enforcement of the access decision 900. In particular embodiments, TBAC module 110 may communicate the decision token 115n to the resource provider 140 to facilitate enforcement of the access decision 900.

Although this disclosure describes TBAC module 110 performing certain actions with respect to FIG. 25, this disclosure contemplates the processor 132 and the memory 134 of the TBAC module 110 performing these actions. The illustration of system 100 in FIG. 25 does not specifically illustrate all of the elements from the illustration of system 100 in FIG. 1 so that particular aspects of system 100 may be emphasized. However, system 100 of FIG. 25 includes all the elements of system 100 in FIG. 1.

FIG. 26 is a flowchart illustrating a method 2600 of combining risk ratings using the system 100 of FIG. 1. TBAC module 110 may perform method 2600. As provided by FIG. 26, TBAC module 110 may begin by storing a plurality of risk tokens 115m in step 2610. TBAC module 110 may continue by accessing CCC3 rules 2530 in step 2620. In step 2630, TBAC module 110 may determine, based on CCC3 rules 2530, if there is a set of risk tokens 115m in the plurality of risk tokens 115m that are related according to the process described above with respect to FIG. 25. If there is not a set of related risk tokens 115m, TBAC module 110 may conclude.

If there is a set of related risk tokens 115m, TBAC module 110 may combine risk ratings. To begin, TBAC module 110 may arithmetically combine the risk ratings represented by each risk token 115m in the set of related risk tokens 115m to produce a composite risk rating in step 2640. As an example and not by way of limitation, TBAC module 110 may compute a weighted average of the risk ratings. TBAC module 110 may continue to generate a composite risk token 115m2 representing the composite risk rating in step 2650. In step 2660, TBAC module 110 may use the composite risk token 115m2 to facilitate the making of an access decision 900 following the process discussed with respect to FIGS. 8-10. TBAC module 110 may continue in step 2670 by generating a decision token 115n representing the access decision 900. TBAC module 110 may conclude by communicating the decision token 115n to facilitate enforcement of the access decision 900 in step 2680.

In particular embodiments, because system 100 may combine risk ratings, system 100 may make more robust access decisions 900. Furthermore, because TBAC module 110 uses tokens 115 to combine risk ratings, system 100 may generate an overall risk for a user 112 quicker and more efficiently.

Figure 27:
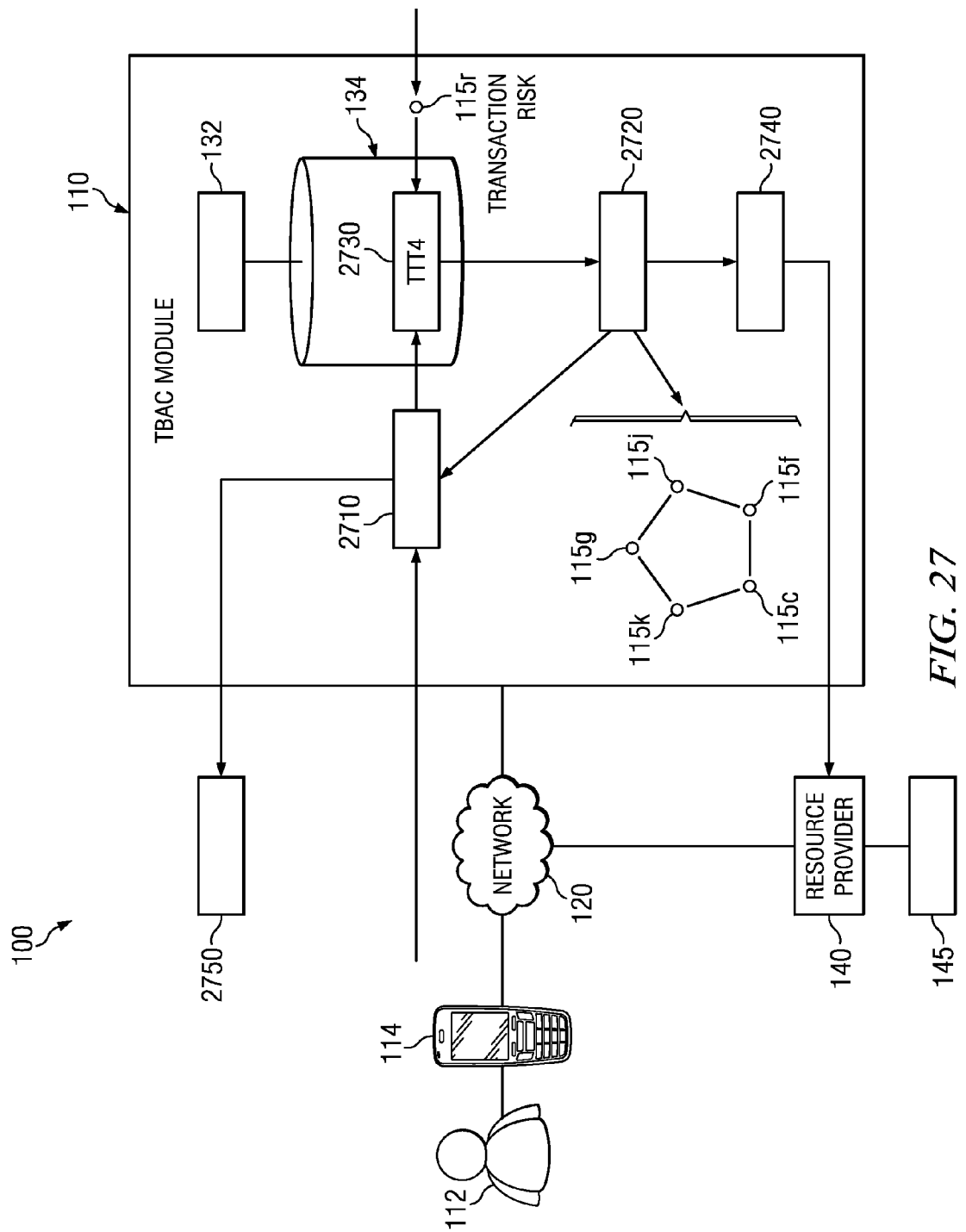
FIG. 27 illustrates the system of FIG. 1 tagging transactions.
Figure 28:
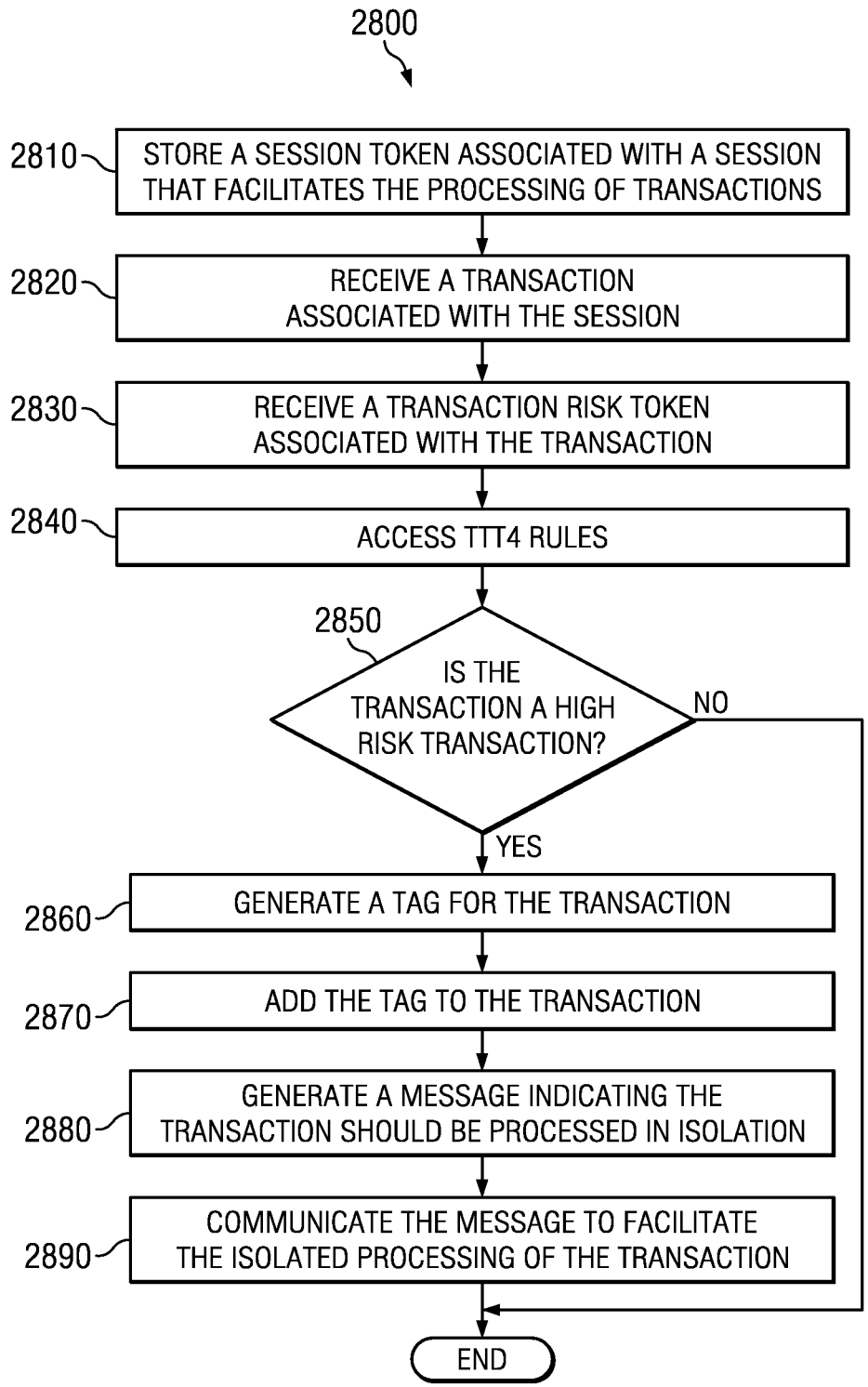
FIG. 28 is a flowchart illustrating a method of tagging transactions using the system of FIG. 1.

FIGS. 27 and 28 illustrate the system 100 tagging transactions 2710. In general, even a very trusted user 112 using a very secure network 120 and device 114 may sometimes perform a risky transaction 2710. In those situations, despite the security credentials of the user 112, it may be desirable to flag the transaction 2710 and monitor it closely. The process of determining when a transaction 2710 is risky and flagging and monitoring the transaction 2710 is referred to as transaction tagging, which is discussed further with respect to FIGS. 27 and 28.

TBAC module 110 may be monitoring a session that facilitates access by a user 112 to a resource 145 when TBAC module 110 detects the user 112 is attempting to perform a transaction 2710 that is risky. In response, TBAC module 110 may generate a tag 2720 that is added to the transaction 2710 and/or the tokens 115 associated with user 112. TBAC module 110 may further generate a message 2740 that indicates the transaction should be processed in isolation.

FIG. 27 illustrates the system 100 of FIG. 1 tagging transactions 2710. As provided in FIG. 27, TBAC module 110 may store a hard token 115g, a subject token 115k, a resource token 115c, a network token 115f, a session token 115j, and others as appropriate. Session token 115j may be associated with a session. In particular embodiments, the session may facilitate the processing of a transaction 2710. The transaction may represent an action taken by a user 112 against a resource 145. As an example and not by way of limitation, transaction 2710 may be a transfer of money from a domestic bank account to a foreign bank account. In particular embodiments, user 112 may attempt to perform the transaction 2710. As a result, TBAC module 110 may receive a transaction risk token 115r associated with the transaction 2710. Transaction risk token 115r may indicate a risk associated with processing the transaction 2710. As an example and not by way of limitation, if transaction 2710 represents an attempt to transfer money from a domestic bank account to a foreign bank account, transaction risk token 115r may indicate that transaction 2710 is a high risk transaction because of the potential for money laundering or tax evasion.

TBAC module 110 may use transaction 2710 and transaction risk token 115r to access transaction tagging (TTT4) rules 2730 stored in memory 134. In particular embodiments, TTT4 rules 2730 may specify when a transaction 2710 may be classified as a high risk transaction based on transaction risk token 115r. TBAC module 110 may use TTT4 rules 2730 to determine if a particular transaction 2710 is a high risk transaction. If the particular transaction 2710 is a high risk transaction, TBAC module 110 may initiate the transaction tagging process.

In particular embodiments, TBAC module 110 may initiate the transaction tagging process by generating a tag 2720. Tag 2720 may be added to transaction 2710 to indicate that the transaction 2710 is a high risk transaction. As an example and not by way of limitation, tag 2720 may be a ciphered value added to the syntax of the transaction 2710. Tag 2720 may also be added to a subject token 115k associated with user 112 or a resource token 115c associated with resource 145. In particular embodiments, tag 2720 may facilitate tracing of the transaction 2710. As an example and not by way of limitation, after tag 2720 has been added to transaction 2710, tag 2720 may act as a unique flag that identifies transaction 2710 wherever it may be processed. By following where tag 2720 appears, transaction 2710 may be traced at each step of its processing. By tracing the transaction 2710, it may be possible to remember and even recreate the steps taken to process transaction 2710. In particular embodiments, system 100 may further log the transaction 2710 in a database as it is being traced during processing.

In particular embodiments, if transaction 2710 is tagged as a high risk transaction, TBAC module 110 may generate a message 2740 that indicates that transaction 2710 should be processed in isolation. By isolating transaction 2710 as it is processed, it may be easier to trace transaction 2710 as it is processed. Message 2740 may indicate a processing unit 2750 that is isolated and capable of processing transaction 2710. As an example and not by way of limitation, message 2740 may indicate the location of an isolated server to which transaction 2710 may be sent for isolated processing. In particular embodiments, TBAC module 110 may communicate message 2740 to resource provider 140 to facilitate the transfer of transaction 2710 to an isolated processing unit 2750.

Although this disclosure describes TBAC module 110 performing certain actions with respect to FIG. 27, this disclosure contemplates the processor 132 and the memory 134 of the TBAC module 110 performing these actions. The illustration of system 100 in FIG. 27 does not specifically illustrate all of the elements from the illustration of system 100 in FIG. 1 so that particular aspects of system 100 may be emphasized. However, system 100 of FIG. 27 includes all the elements of system 100 in FIG. 1.

FIG. 28 is a flowchart illustrating a method 2800 of tagging transactions 2710 using the system 100 of FIG. 1. TBAC module 110 may perform method 2800. As provided by FIG. 28, TBAC module 110 may begin by storing a session token 115j associated with a session that facilitates the processing of transactions 2710 in step 2810. In step 2820, TBAC module 110 may receive a transaction 2710 associated with the session. TBAC module 110 may continue by receiving a transaction risk token 115r associated with the transaction 2710 in step 2830. TBAC module 110 may continue by accessing TTT4 rules 2730 in step 2840.

In step 2850, TBAC module 110 may determine, based on TTT4 rules 2730, if the transaction 2710 is a high risk transaction. If the transaction is not a high risk transaction, TBAC module 110 may conclude.

If the transaction 2710 is a high risk transaction, TBAC module 110 may initiate the transaction tagging process. To begin, TBAC module 110 may generate a tag 2720 for the transaction 2710 in step 2860. TBAC module 110 may continue by adding the tag 2720 to the transaction 2710 in step 2870. In particular embodiments, the tag 2720 may facilitate the tracing of the transaction 2710 as it is processed. In step 2880 TBAC module 110 may generate a message 2740 indicating the transaction 2710 should be processed in isolation. TBAC module 110 may conclude by communicating the message 2740 to facilitate the isolated processing of the transaction 270 in step 2890.

In particular embodiments, because system 100 may tag transactions 2710, system 100 may provide a more robust security system. Furthermore, because TBAC module 110 may use tokens 115 to tag transactions 2710, system 100 may securely process transactions 2710 quicker and more efficiently.

Figure 29:
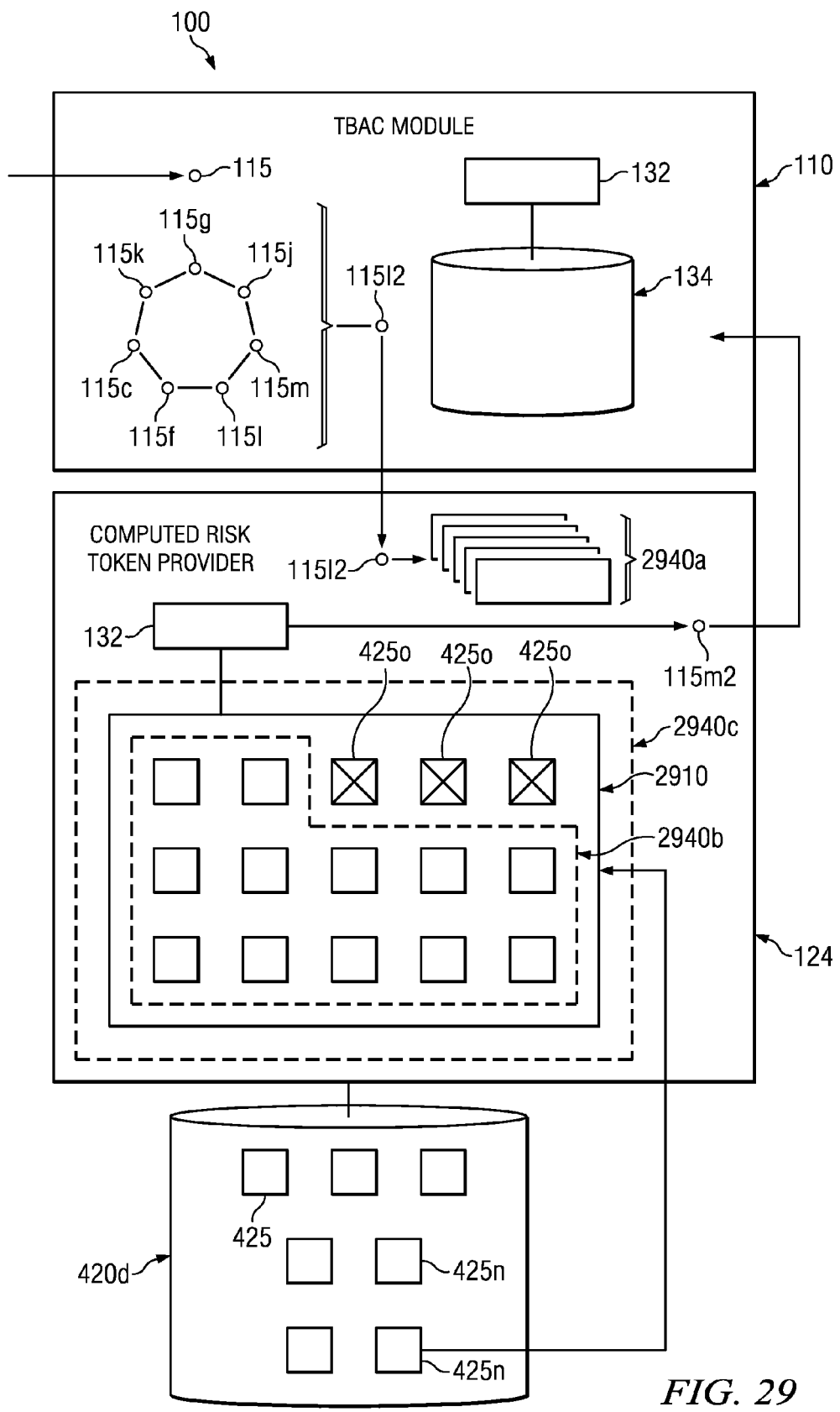
FIG. 29 illustrates the system of FIG. 1 performing context caching.
Figure 30:
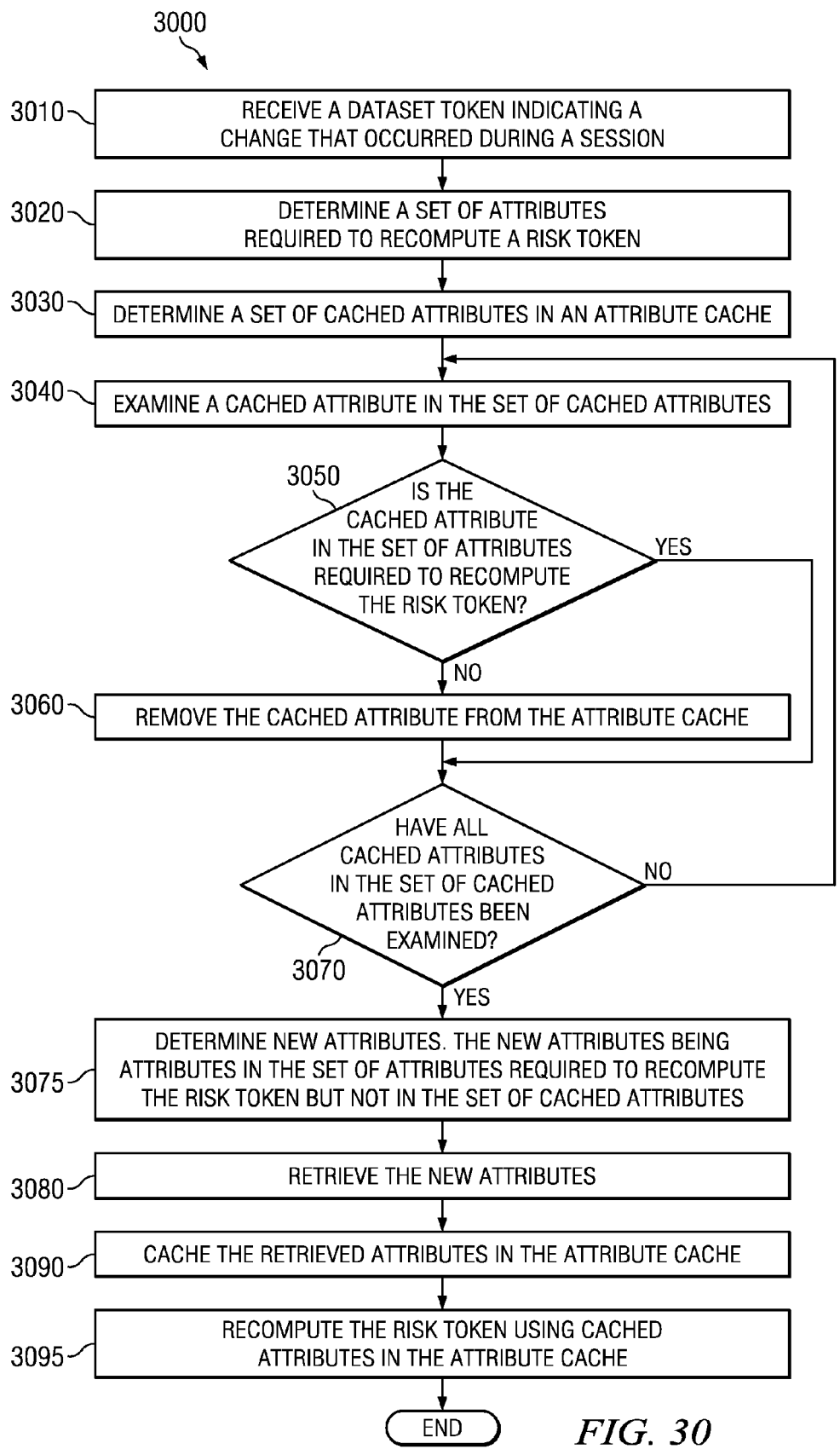
FIG. 30 is a flowchart illustrating a method of performing context caching using the system of FIG. 1.

FIGS. 29 and 30 illustrate the system 100 performing context caching. In general, a token provider may retrieve attributes 425 from a corresponding repository 420a-d and cache those attributes 425 in an attribute cache 2910. If the cache 2910 fills up, subsequently retrieved attributes 425 will need to replace old attributes 425o in the cache. The process of determining which attributes 425 are old and replacing the old attributes 425o with new attributes 425n is referred to as context caching, which is discussed further with respect to FIGS. 29 and 30.

Computed risk token provider 124 may contain an attribute cache 2910. Each time the computed risk token provider 124 computes a risk token 115m, it may retrieve attributes 425 from the risk repository 420d, and cache those attributes 425 in the attribute cache 2910. To avoid filling up the attribute cache 2910, the computed risk token provider 124 may determine, based on a received dataset token 115l, which cached attributes 425 are old and remove them from the attribute cache 2910. Although this disclosure describes context caching using the computed risk token provider 124, this disclosure contemplates context caching taking place in any suitable token provider.

FIG. 29 illustrates the system 100 of FIG. 1 performing context caching. As provided by FIG. 29, TBAC module 110 may be requesting computed risk token provider 124 to compute or recompute a risk token 115m. As an example and not by way of limitation, TBAC module 110 may be performing the real-time risk updating function discussed with respect to FIGS. 23 and 24. Although this disclosure describes TBAC module 110 performing a specific function involving the computed risk token provider 124, this disclosure contemplates TBAC module 110 performing any suitable function that involves computed risk token provider 124. As discussed with respect to FIGS. 23 and 24, TBAC module 110 may receive a token 115 that indicates a change that occurred during a session. TBAC module 110 may generate a new dataset token 115l2 and communicate the new dataset token 115l2 to the computed risk token provider 124. The new dataset token 115l2 may indicate a risk token 115m should be computed or recomputed.

In particular embodiments, computed risk token provider 124 may include an attribute cache 2910. Attribute cache 2910 may cache attributes 425 used in previous computations of a risk token 115m. Cached attributes 2940c may be used during subsequent computations of risk token 115m so that computed risk token provider 124 does not have to retrieve the cached attributes 2940c from a risk repository 420d. When computed risk token provider 124 computes a risk token 115m, computed risk token provider 124 may update attribute cache 2910 by removing old attributes 425o from and by adding new attributes 425n to attribute cache 2910.

To determine the old attributes 425o in attribute cache 2910, computed risk token provider 124 may examine a token 115 received from TBAC module 110. As an example and not by way of limitation, computed risk token provider 124 may receive a new dataset token 115l2 from TBAC module 110. New dataset token 115l2 may indicate a set of attributes 2940a required to compute or recompute a risk token 115m. New dataset token 115l2 may further include instructions on how to compute or recompute risk token 115m that may facilitate the updating of attribute cache 2910. Based on the indicated set of attributes 2940a and the instructions, computed risk token provider 124 may determine which cached attributes 2940c are not used in computing or recomputing the risk tokens 115m. Computed risk token provider 124 may then mark these attributes 425 as old. In particular embodiments, computed risk token provider 124 may consider old attributes 425o as forming an obsolete portion of the attribute cache 2910 and may remove the old attributes 425o from the attribute cache 210. In this manner, computed risk token provider 124 may ensure that attribute cache 2910 contains only attributes 425 that are in the set of attributes 2940a required to compute or recompute risk token 115m.

Computed risk token provider 124 may add new attributes 425n by retrieving them from risk repository 420d and adding them to attribute cache 2910. Computed risk token provider 124 may determine which attributes 425 to retrieve from risk repository 420d by examining the set of attributes 2940a required to compute or recompute risk token 115m and the set of attributes 2940b cached within attribute cache 2910 after the old attributes 425o have been removed. By examining the set of attributes 2940a and the set of attributes 2940b, computed risk token provider 124 may determine that attributes 425 that are in the set of attributes 2940a but not in the set of attributes 2940b. These determined attributes 425 are the new attributes 425n.

Computed risk token provider 124 may then retrieve the new attributes 425n from risk repository 420d and add the new attributes 425n to attribute cache 2910. In particular embodiments, computed risk token provider 124 may then use the attributes 425 cached within attribute cache 2910 to compute or recompute risk token 115m. As an example and not by way of limitation, computed risk token provider 124 may use the attributes 425 cached within attribute cache 2910 to generate a recomputed risk token 115m2 and communicate the recomputed risk token 115m2 to TBAC module 110.

Although this disclosure describes TBAC module 110 and computed risk token provider 124 performing certain actions with respect to FIG. 29, this disclosure contemplates the processor 132 and the memory 134 of the TBAC module 110 and the processor 132 of the computed risk token provider 124 performing these actions. The illustration of system 100 in FIG. 29 does not specifically illustrate all of the elements from the illustration of system 100 in FIG. 1 so that particular aspects of system 100 may be emphasized. However, system 100 of FIG. 29 includes all the elements of system 100 in FIG. 1.

FIG. 30 is a flowchart illustrating a method 3000 of performing context caching using the system 100 of FIG. 1. In particular embodiments, computed risk token provider 124 may perform TBAC module 110. As provided in FIG. 30, computed risk token provider 124 may begin by receiving a dataset token 115l indicating a change that occurred during a session in step 3010. Computed risk token provider 124 may continue by determining a set of attributes 2940a required to recompute a risk token 115m in step 3020. In step 3030, computed risk token provider 124 may determine a set of cached attributes 2940c in an attribute cache 2910.

To free up space in the attribute cache 2910, the old attributes 425o in the set of cached attributes 2940c may be removed. To do so, computed risk token provider 124 may continue by examining a cached attribute 425 in the set of cached attributes 2940c in step 3040. In step 3050, computed risk token provider 124 may determine if the cached attribute 425 is in the set of attributes 2940a required to recompute the risk token 115m. If the cached attribute 425 is in the set of attributes 2940a, then computed risk token provider 124 may leave the cached attribute 425 in the attribute cache 2910. If the cached attribute 425 is not in the set of attributes 2940a, computed risk token provider 124 may remove the cached attribute 425 from the attribute cache 2910 in step 3060.

Computed risk token provider 124 may then continue to step 3070 to determine if all cached attributes 425 in the set of cached attributes 2940c have been examined. If not, computed risk token provider 124 may return to step 3040 to examine another cached attribute 425. If all cached attributes 425 have been examined, computed risk token provider 124 may be sure that attribute cache 2910 contains only the set of attributes 2940b.

Before recomputing a risk token 115m, computed risk token provider 124 may retrieve the new attributes 425n from the risk repository 420d. To accomplish this, computed risk token provider 124 may determine the new attributes 425n by examining the set of attributes 2940a required to recompute the risk token 115m and the set of cached attributes 2940b in step 3075. The new attributes 425n will be the attributes in the set of attributes 2940a but not in the set of cached attributes 2940b. Computed risk token provider 124 may continue to step 3080 by retrieving the new attributes 425n. In step 3090, computed risk token provider 124 may cache the retrieved attributes 425n in the attribute cache 2910. Computed risk token provider 124 may then conclude by recomputing the risk token 115m using cached attributes 425 in the attribute cache 2910 in step 3095.

In particular embodiments, because system 100 may perform context caching, system 100 may provide more efficient caching of attributes 425. Furthermore, because system 100 uses tokens 115 to perform context caching, system 100 may make faster determinations regarding which attributes 425 to remove from the attribute cache 2910.

Figure 31:
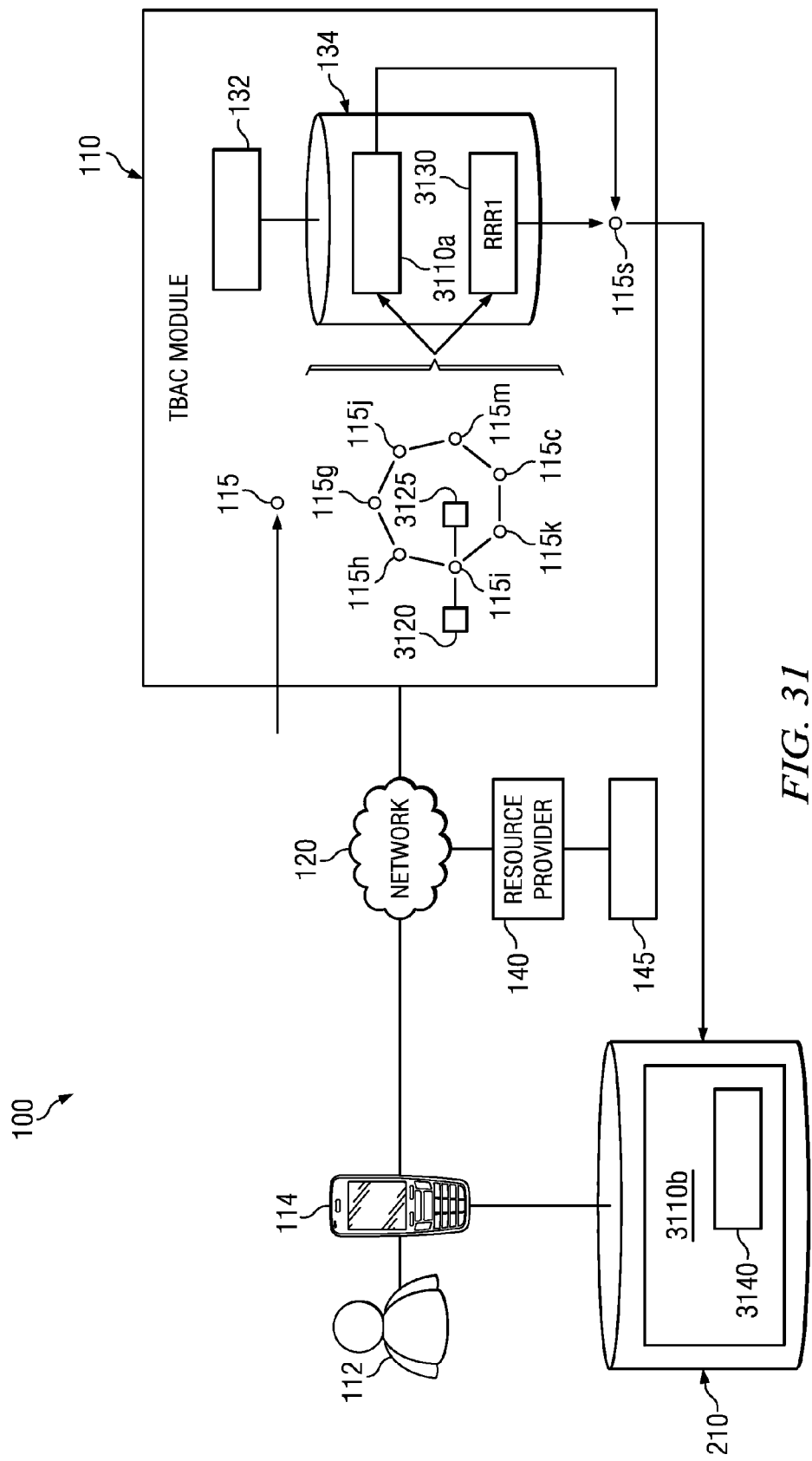
FIG. 31 illustrates the system of FIG. 1 performing virtual machine recycling.
Figure 32:
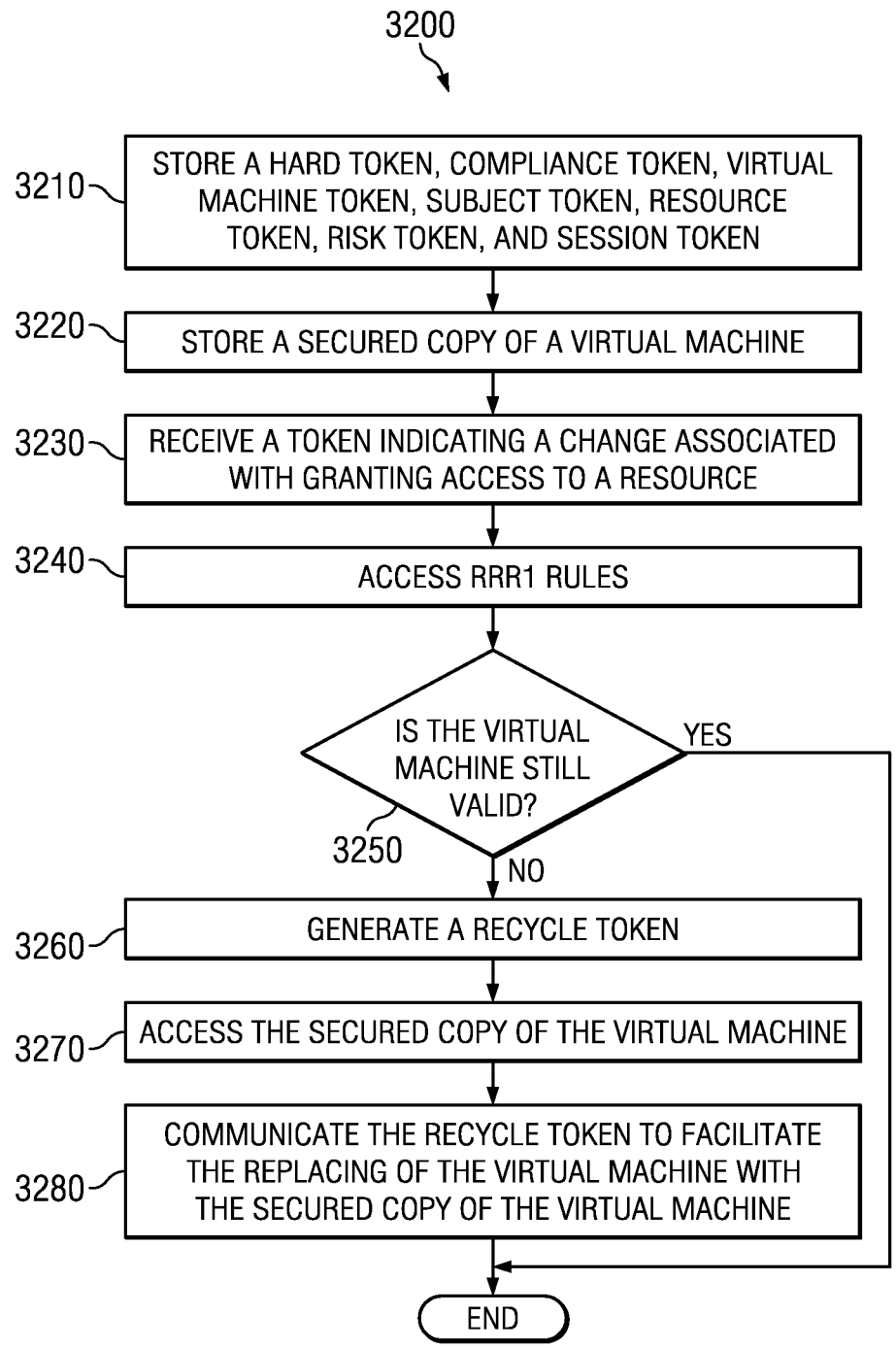
FIG. 32 is a flowchart illustrating a method of performing virtual machine recycling.

FIGS. 31 and 32 illustrate the system 100 recycling a virtual machine 3110b. In general, user 112 may consume a resource 145 through a virtual machine 3110b provisioned to device 114. Over time, virtual machine 3110b may need to be recycled, sometimes frequently. System 100 may determine when a particular virtual machine 3110b needs to be recycled and recycle the virtual machine 3110b accordingly. This recycling process is discussed further with respect to FIGS. 31 and 32.

TBAC module 110 may monitor virtual machine 3110b through a timestamp 3120 and a time threshold 3125. When TBAC module 110 determines, based on the timestamp 3120 and the time threshold 3125, that the virtual machine 3110b is stale, TBAC module 110 may generate a recycle token to facilitate the recycling of the virtual machine 3110b.

FIG. 31 illustrates the system 100 of FIG. 1 performing virtual machine recycling. As provided by FIG. 31, device 114 may have been provisioned with container 210. Container 210 may include a virtual machine 3110b executing a process 3140. Virtual machine 3110b may be executing process 3140 on device 114. TBAC module 110 may store a hard token 115g, a compliance token 115h, a VM token 115i, a subject token 115k, a resource token 115c, a risk token 115m, and a session token 115j, among others as appropriate. The VM token 115i may represent information associated with virtual machine 3110b. In particular embodiments, VM token 115i may include a timestamp 3120 associated with virtual machine 3110b and a time threshold 3125 associated with virtual machine 3110b. Timestamp 3120 may indicate the time at which virtual machine 3110b was established. Time threshold 3125 may indicate an amount of time after which virtual machine 3110b should be recycled. TBAC module 110 may use timestamp 3120 and time threshold 3125 to determine a time after which the virtual machine 3110b should be recycled. As an example and not by way of limitation, TBAC module 110 may add the time threshold 3125 to the timestamp 3120 to determine that time.

In particular embodiments, recycling virtual machine 3110b may include replacing virtual machine 3110b with a secured copy 3110a of virtual machine 3110b. Secured copy 3110a may have been generated and stored when virtual machine 3110b was established. Secured copy 3110a may be stored within memory 134. Although this disclosure describes secured copy 3110a being stored in TBAC module 110, this disclosure contemplates secured copy 3110a being stored in any suitable component. TBAC module 110 may receive a token 115 that indicates a change associated with granting access to a resource 145. As an example and not by way of limitation, token 115 may indicate user 112 is requesting access to resource 145. Prior to granting access to resource 145, TBAC module 110 may determine if device 114 has been provisioned a valid virtual machine 3110b. If the virtual machine 3110b is valid, access to the resource 145 may be granted. As another example and not by way of limitation, token 115 may be a hard token 115g associated with device 114 indicating the virtual machine 3110b may be invalid. Although this disclosure describes token 115 indicating particular changes, this disclosure contemplates token 115 indicating any suitable change. This change could include any suitable communication, process, token, etc in the system 100. In response to receiving token 115, TBAC module 110 may determine if the virtual machine 3110b is invalid.

To make the determination whether the virtual machine 3110b is valid, TBAC module 110 may use token 115 and VM token 115i to access VM recycling (RRR1) rules 3130. In particular embodiments, TBAC module 110 may apply RRR1 rules 3130 to determine if virtual machine 3110b is valid based on timestamp 3120 and time threshold 3125. As an example and not by way of limitation, RRR1 rules 3130 may specify that if the current time exceeds the time threshold 3125 added to timestamp 3120, then TBAC module 110 may determine that virtual machine 3110b is invalid. Although this disclosure describes TBAC module 110 determining the validity of VM 3110b in a particular manner, this disclosure contemplates TBAC module 110 determining the validity of virtual machine 3110b in any suitable manner. For example, TBAC module 110 may examine the status of a flag associated with virtual machine 3110b. The flag may be turned on when virtual machine 3110b becomes invalid. If TBAC module detects that the flag is on, TBAC module 110 may initiate the recycling process.

In response to a determination that the virtual machine 3110b is invalid, TBAC module 110 may initiate the virtual machine recycling process by generating a recycle token 115s. In particular embodiments, recycle token 115s may include instructions to recycle virtual machine 3110b and information associated with the secured copy 3110a of virtual machine 3110b. TBAC module 110 may communicate recycle token 115s to facilitate the recycling of virtual machine 3110b. After recycle token 115s has been communicated, virtual machine 3110b may begin recycling. In particular embodiments, virtual machine 3110b may be executing process 3140 when recycling is initiated. TBAC module 110 may wait for virtual machine 3110b to finish executing process 3140 before recycling. In some embodiments, rather than wait for process 3140 to finish, TBAC module 110 may facilitate the secure storage of a copy of the process 3140. After the virtual machine 3110*b* finishes recycling, TBAC module 110 may facilitate the recovery of the secured copy of the process 3140, and the recycled virtual machine 3110*b* may complete the process 3140.

To recycle virtual machine 3110*b*, virtual machine 3110*b* may be replaced with the secured copy 3110*a* of virtual machine 3110*b*. TBAC module 110 may send information about the location of the secured copy 3110*a* of virtual machine 3110*b* using recycle token 115*s*. Device 114 may download the secured copy 3110*a* of virtual machine 3110*b* from that location. After virtual machine 3110*b* has been recycled, timestamp 3120 and time threshold 3125 may be updated to reflect the recycling.

Although this disclosure describes TBAC module 110 performing certain actions with respect to FIG. 31, this disclosure contemplates the processor 132 and the memory 134 of the TBAC module 110 performing these actions. The illustration of system 100 in FIG. 31 does not specifically illustrate all of the elements from the illustration of system 100 in FIG. 1 so that particular aspects of system 100 may be emphasized. However, system 100 of FIG. 31 includes all the elements of system 100 in FIG. 1.

FIG. 32 is a flowchart illustrating a method 3200 of performing virtual machine recycling. TBAC module 110 may perform method 3200. As provided by FIG. 32, TBAC module 110 may begin by storing a hard token 115*g*, compliance token 115*h*, VM token 115*i*, subject token 115*k*, resource token 115*c*, risk token 115*m*, and session token 115*j*, among others as appropriate in step 3210. In particular embodiments, VM token 115*i* may be associated with a virtual machine 3110*b*. Virtual machine 3110*b* may be associated with a timestamp 3120 and a time threshold 3125. TBAC module 110 may continue by storing a secured copy 3110*a* of virtual machine 3110*b* in step 3220. At step 3230, TBAC module 110 may receive a token 115 indicating a change associated with granting access to a resource 145. As an example and not by way of limitation, token 115 may indicate that a user 112 is attempting to access resource 145.

In response, TBAC module 110 may access VM recycling (RRR1) rules 3130 in step 3240. In step 3250, TBAC module 110 may determine, based on RRR1 rules 3130, if the virtual machine 3110*b* is still valid. If the virtual machine 3110*b* is still valid, TBAC module 110 may conclude. If the virtual machine 3110*b* is not valid, TBAC module 110 may generate a recycle token 115*s* in step 3260. In particular embodiments, recycle token 115*s* may include the location of the secured copy 3110*a* of the virtual machine 3110*b*. TBAC module 110 may also access the secured copy 3110*a* of the virtual machine 3110*b* in step 3270. TBAC module 110 may conclude by communicating the recycle token 115*s* to facilitate the replacing of the virtual machine 3110*b* with the secured copy 3110*a* of the virtual machine 3110*b* in step 3280.

In particular embodiments, because system 100 may facilitate the recycling of virtual machine 3110*b*, system 100 may provide a faster and more seamless user experience to user 112. Furthermore, because TBAC module 110 uses tokens 115 to monitor virtual machine 3110*b*, system 100 may determine more quickly when a virtual machine 3110*b* needs to be recycled.

Figure 33:
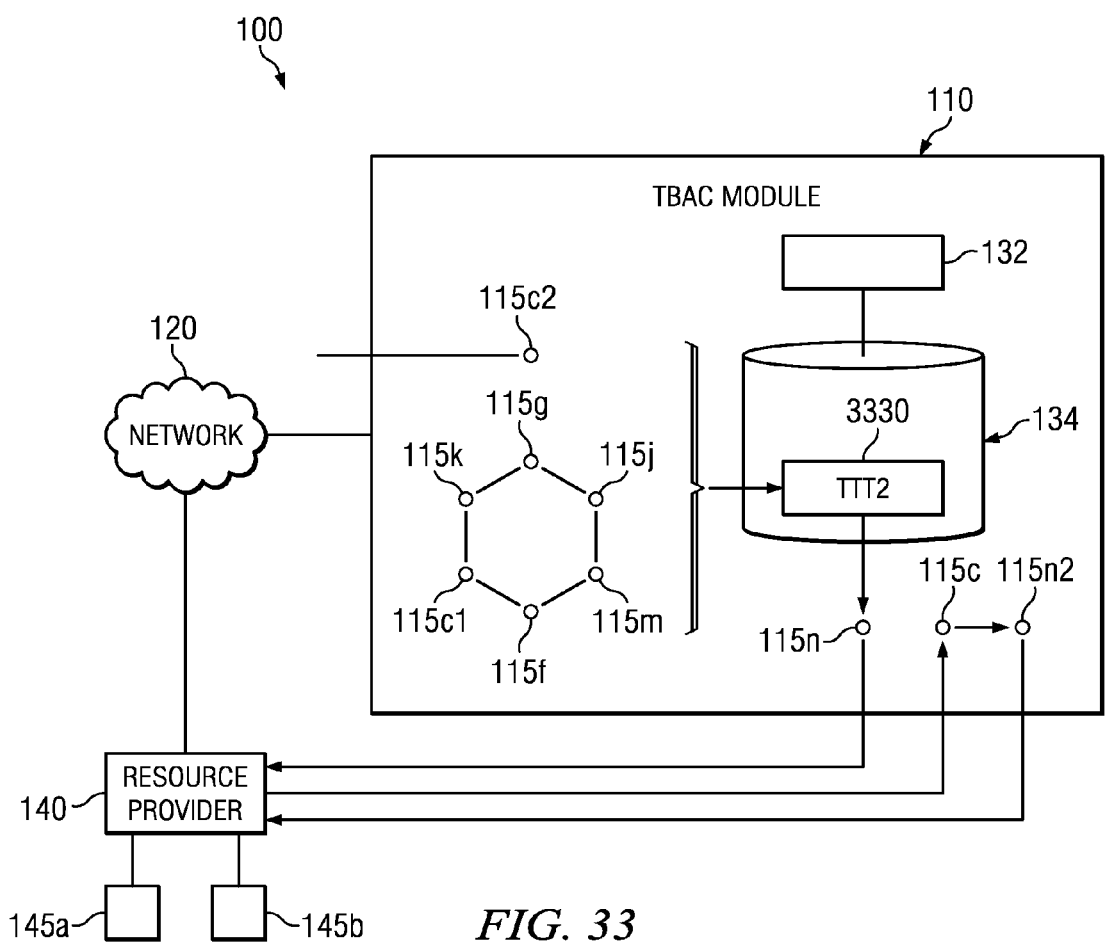
FIG. 33 illustrates the system of FIG. 1 performing token termination.
Figure 34:
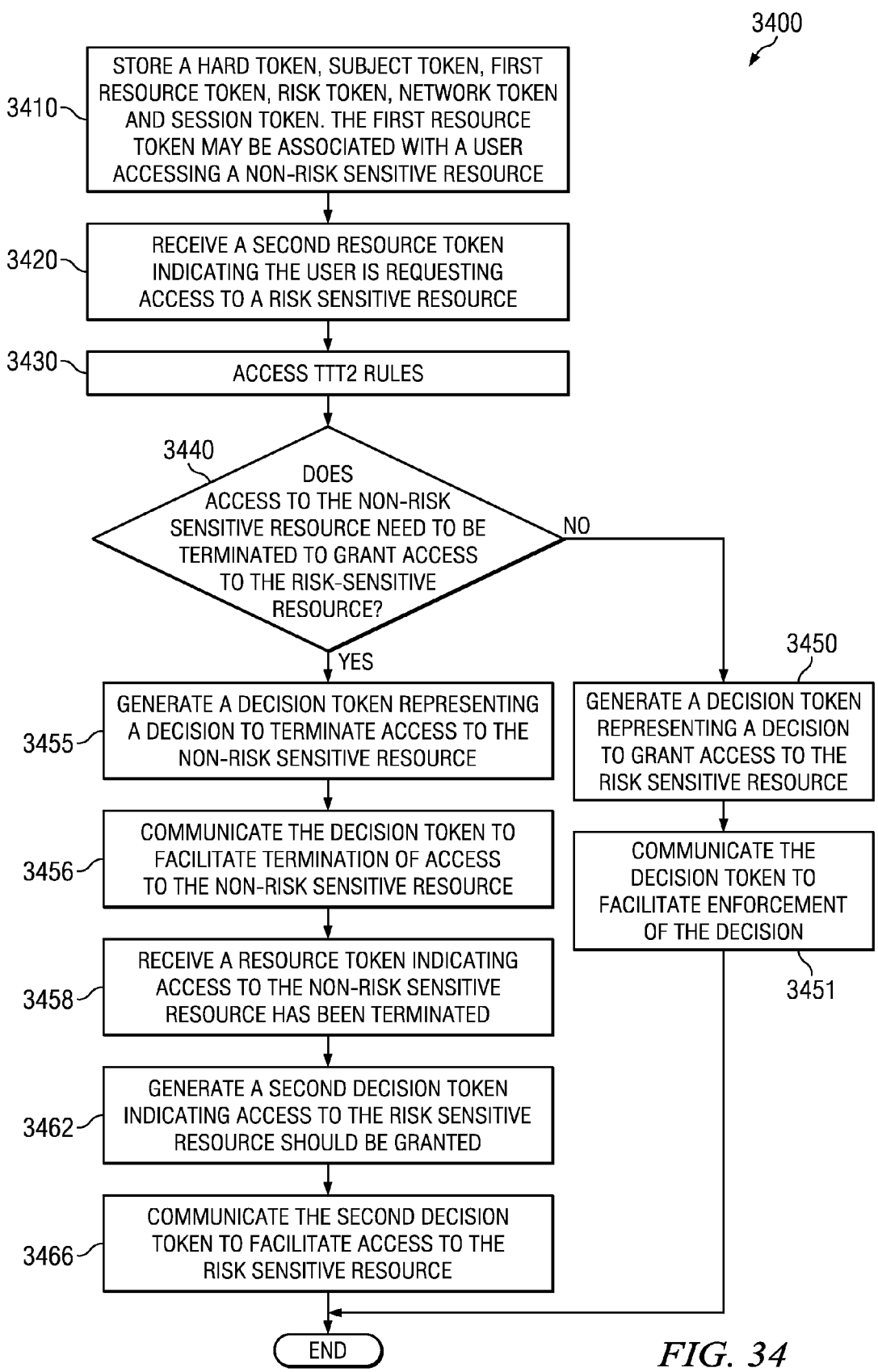
FIG. 34 is a flowchart illustrating a method of performing token termination using the system of FIG. 1.

FIGS. 33 and 34 illustrate the system 100 performing token termination. In general, a user 112 may perform some action that will block access to a resource 145. For example, accessing a resource 145 that contains numerous security holes may block access to another resource 145 that is sensitive to risk. The process of determining whether access to a resource 145 should be blocked and enforcing that determination is known as token termination, which is discussed further with respect to FIGS. 33 and 34.

TBAC module 110 may track which resources 145 are non risk sensitive resources 145*a* and which are risk sensitive resources 145*b*. If a user 112 requests access to a risk sensitive resource 145*b* while the user 112 is exposing security risks, TBAC module 110 may perform token termination to block user 112 from accessing the risk sensitive resource 145*b* until the security risks are remedied.

FIG. 33 illustrates the system 100 of FIG. 1 performing token termination. As provided by FIG. 33, TBAC module 110 may store a hard token 115*g*, subject token 115*k*, first resource token 115*c*1, network token 115*f*, risk token 115*m*, and session token 115*j*, among others as appropriate. First resource token 115*c*1 may be associated with a user 112 accessing a non-risk sensitive resource 145*a*. In particular embodiments, TBAC module 110 may receive a token 115 indicating a change associated with accessing a resource 145. As an example and not by way of limitation, the token 115 may be a second resource token 115*c*2 indicating that the user 112 is requesting access to a risk sensitive resource 145*b*. In particular embodiments, simultaneous access to non-risk sensitive resource 145*a* and risk sensitive resource 145*b* may not be allowed for security purposes. As an example and not by way of limitation, non-risk sensitive resource 145*a* may be a chat session and risk sensitive resource 145*b* may be a personal banking application. The chat session may contain security holes that leave the personal banking application vulnerable to potential hacks and malware. Therefore, it may not be desirable to grant simultaneous access to the chat session and the personal banking application.

When TBAC module 110 receives second resource token 115*c*2 indicating that a user 112 is requesting access to the risk sensitive resource 145*b*, TBAC module 110 may access token termination (TTT2) rules 3330 stored in memory 134 to determine if access to the non-risk sensitive resource 145*a* should be terminated prior to granting access to the risk sensitive resource 145*b*. In particular embodiments, a particular TTT2 rule 3330 may specify that accessing a non-risk sensitive resource 145*a* represented by first resource token 115*c*1 may pose a security risk if access to risk sensitive resource 145*b* was granted simultaneously. In this case, TBAC module 110 may determine, based on TTT2 Rules 3330, that access to the non-risk sensitive resource 145*a* should be terminated before granting access to risk sensitive resource 145*b* represented by second resource token 115*c*2.

TBAC module 110 may generate a decision token 115*n* representing the determination to terminate access to the non-risk sensitive resource 145*a*. TBAC module 110 may communicate the decision token 115*n* to facilitate the termination of access to the non-risk sensitive resource. In particular embodiments, after access to the non-risk sensitive resource 145*a* has been terminated, TBAC module 110 may receive a resource token 115*c* indicating that access to the non-risk sensitive resource has been terminated. In response, TBAC module 110 may generate a second decision token 115*n*2 indicating that access to the risk sensitive resource 145*b* should be granted. In particular embodiments, TBAC module 110 may also terminate the first resource token 115*c*1 in response to receiving the resource token 115*c*. TBAC module 110 may communicate the second decision token to facilitate the granting of access to the risk sensitive resource 145*b*. In particular embodiments, the second decision token 115*n*2 may be communicated to resource provider 140, which may grant access to the risk sensitive resource 145b after receiving the second decision token 115n2.

In particular embodiments, user 112 may be presented with the option to terminate access to the non-risk sensitive resource 145a. If the user 112 chooses not to terminate access to the non-risk sensitive resource 145a, the user 112 may be blocked from accessing the risk sensitive resource 145b.

In particular embodiments, user 112 may expose security risks through other means than by accessing a non-risk sensitive resource 145a. For example, user 112 may attach a peripheral device, such as a USB drive, to device 114. The peripheral device may present security risks. In that case, TBAC module 110 may receive a hard token 115g indicating that device 114 has a peripheral device attached. When user 112 requests access to risk sensitive resource 145b, TBAC module 110 may perform token termination to block access to the risk sensitive resource 145b until user 112 removes the peripheral device. In particular embodiments, user 112 may attach the peripheral device while user 112 is accessing the risk sensitive resource 145b. In that case, TBAC module 110 may detect the hard token 115g and in response, perform token termination to terminate access to the risk sensitive resource 145b until user 112 removes the peripheral device. After user 112 removes the peripheral device, TBAC module 110 may receive a second hard token 115g indicating that the peripheral device has been removed. TBAC module 110 may then generate a decision token 115n to facilitate access to the risk sensitive resource 145b.

Although this disclosure describes TBAC module 110 performing certain actions with respect to FIG. 33, this disclosure contemplates the processor 132 and the memory 134 of the TBAC module 110 performing these actions. The illustration of system 100 in FIG. 33 does not specifically illustrate all of the elements from the illustration of system 100 in FIG. 1 so that particular aspects of system 100 may be emphasized. However, system 100 of FIG. 33 includes all the elements of system 100 in FIG. 1. Although this disclosure describes particular user actions creating a security hole, there could be any number of different ways that a user's action, a resource parameter, a network condition, or any other characteristic of system 100 could create a security hole that needs to be addressed before a user may be granted access to a risk sensitive resource. This disclosure contemplates any of those potential security holes.

FIG. 34 is a flowchart illustrating a method 3400 of performing token termination. TBAC module 110 may perform the method 3400. As provided by FIG. 34, TBAC module 110 may begin by storing a hard token 115b, subject token 115k, first resource token 115c1, risk token 115m, network token 115f, and session token 115j, among others as appropriate in step 3410. The first resource token 115c1 may be associated with a user 112 accessing a non-risk sensitive resource 145a. TBAC module 110 may continue by receiving a second resource token 115c2 indicating the user 112 is requesting access to a risk sensitive resource 145b in step 3420. In response, TBAC module 110 may access TTT2 rules 3330 in step 3430. In step 3440, TBAC module 110 may determine, based on TTT2 rules 3330, if access to the non-risk sensitive resource 145a should be terminated before granting access to the risk sensitive resource 145b. If access to the non-risk sensitive resource need not be terminated, TBAC module 110 may continue to step 3450 to generate a decision token 115n representing a decision to grant access to the risk sensitive resource 145b. TBAC module 110 may then communicate the decision token 115n to facilitate enforcement of that decision in step 3451.

If access to the non-risk sensitive resource should to be terminated, then TBAC module 110 may generate a decision token 115n representing the decision to terminate access to the non-risk sensitive resource 145a in step 3455. TBAC module 110 may then communicate the decision token 115n to facilitate the termination of access to the non-risk sensitive resource 145a in step 3456. After access to the non-risk sensitive resource 145a has been terminated, TBAC module 110 may receive a resource token 115c indicating that access has been terminated in step 3458. In response to receiving the resource token 115c, TBAC module 110 may generate a second decision token 115n2 indicating access to the risk sensitive resource 145b should be granted in step 3462. TBAC module 110 may then communicate the second decision token 115n2 to facilitate access to the risk sensitive resource 145b in step 3466.

In particular embodiments, because system 100 may perform token termination, system 100 may provide a more robust security system that provides for blocking access based on the risk sensitivity of the resources. Furthermore, because TBAC module 110 may terminate tokens 115, system 100 may provide a faster and more efficient security system.

Figure 35:
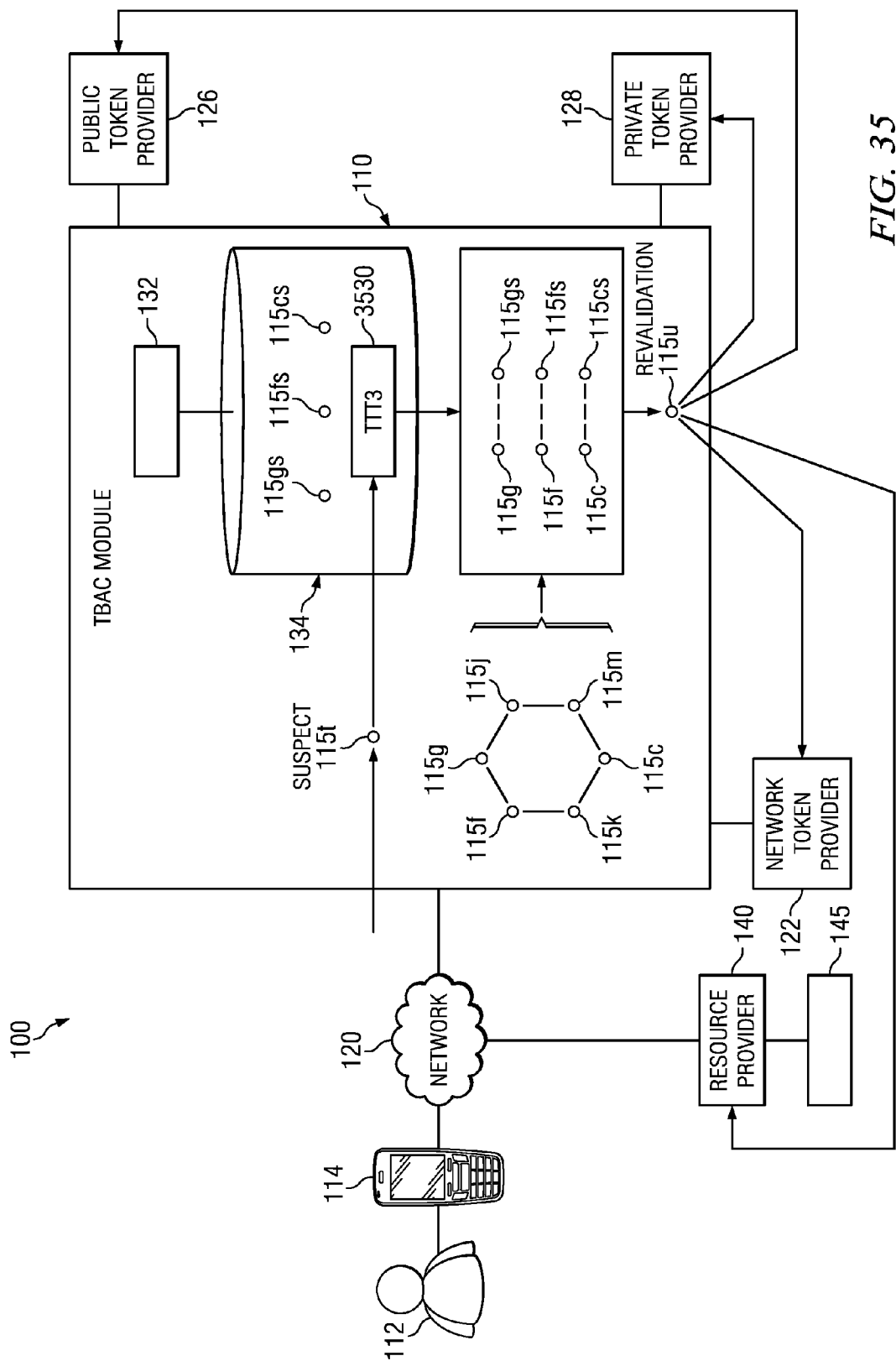
FIG. 35 illustrates the system of FIG. 1 detecting tampering.
Figure 36:
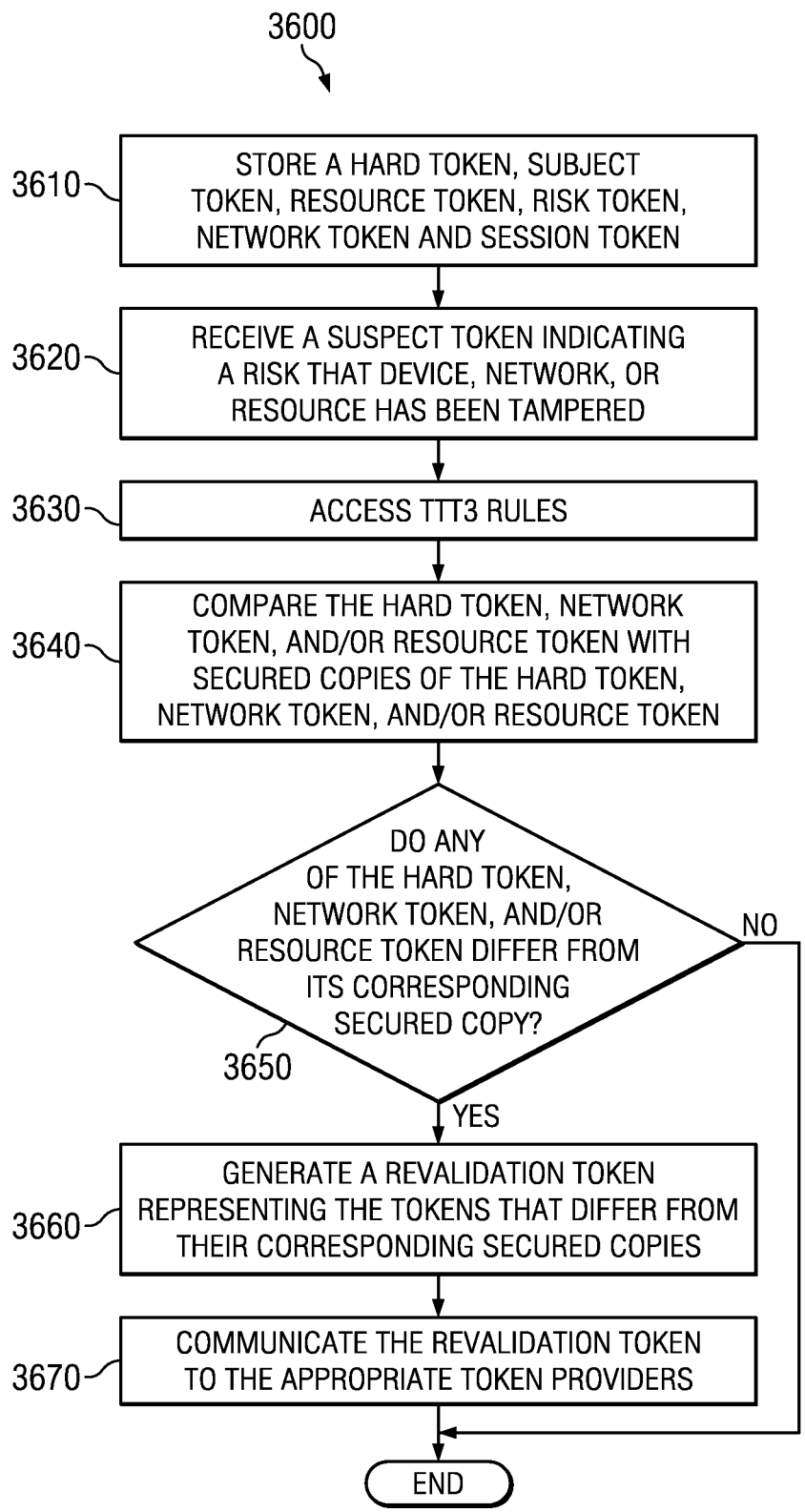
FIG. 36 is a flowchart illustrating a method of detecting tampering using the system of FIG. 1.

FIGS. 35 and 36 illustrate the system 100 performing tamper detection. In general, mechanical components of system 100 such as the device 114, network 120, or resource 145 may be the subject of attacks by viruses, malware, or hackers. When attacks happen, the tokens 115 associated with those mechanical components may be affected. System 100 may detect when those components may be attacked by examining the tokens 115 associated with those components. The process of detecting when those components have been affected is known as tamper detection, which is discussed further with respect to FIGS. 35 and 36.

TBAC module 110 may store tokens 115 associated with the mechanical components of system 100 as well as secured copies of those tokens. An attack on a component may affect the token 115 associated with that component. When a token 115 associated with a component changes, TBAC module 110 may compare the token 115 with its corresponding secured copy to determine if the component has been attacked.

FIG. 35 illustrates the system 100 of FIG. 1 detecting tampering. As provided in FIG. 35, TBAC module 110 may store a hard token 115g, a network toke 115f, a subject token 115k, a resource token 115c, a risk token 115m, and a session token 115j. Hard token 115g may be associated with a device 114. Network token 115f may be associated with network 120 and resource token 115c may be associated with a resource 145. Device 114 may be consuming resource 145 over network 120. Furthermore, hard token 115g, network token 115f, and resource token 115c may have corresponding secured copies 115gs, 115fs, and 115cs stored in memory 134. The secured copies 115gs, 115fs, and 115cs may have been generated when the corresponding tokens 115g, 115f, and 115c were first generated. Although this disclosure describes secured copies 115gs, 115fs, and 115cs stored in a particular component of system 100, this disclosure contemplates secured copies 115gs, 115fs, and 115cs stored in any suitable component of system 100.

In particular embodiments, TBAC module 110 may receive a suspect token 115t that indicates a risk that device 114, network 120, or resource 145 may have been tampered. Tampering may include any security breaches by viruses, malware, or hackers. As an example and not by way of limitation, suspect token 115t may indicate that device 114 has been infected with a virus. As another example and not by way of limitation, suspect token 115*t* may indicate that network 120 is beginning to distribute malware. As yet another example and not by way of limitation, suspect token 115*t* may indicate that resource 145 is being targeted in a denial of service attack. Tampering of the device 114, network 120, or resource 145 may result in a change in any of the hard token 115*g*, network token 115*f*, or resource token 115*c*.

TBAC module 110 may detect changes within hard token 115*g*, network token 115*f*, or resource token 115*c* that resulted from tampering. To detect these changes, TBAC module 110 may use suspect token 115*t* to access token tampering (TTT3) rules 3530 stored in memory 134. In particular embodiments, TTT3 rules 3530 may specify which tokens 115 of the hard token 115*g*, network token 115*f*, and resource token 115*c* may have been affect as a result of the risk indicated in suspect token 115*t*. TBAC module 110 may then compare the tokens 115 that may have been changed as a result of tampering with their corresponding secured copies. As an example and not by way of limitation, suspect token 115*t* may indicate a risk that malware may be causing a denial of service attack. In that situation, TTT3 rules 3530 may specify that network token 115*f* and resource token 115*c* should be compared with their corresponding secured copies 115*fs* and 115*cs*. If any differences that resulted from tampering are detected during the comparisons, TBAC module 110 may indicate that the token 115 containing that difference has been compromised. As an example and not by way of limitation, if network 120 is distributing malware but resource 145 is not experiencing a denial of service attack, then the comparisons may indicate that network token 115*f* is different from its corresponding secured copy 115*fs* and that that difference may have resulted from tampering (e.g., malware infection).

In particular embodiments, in response to the determination that a token 115 has been compromised as a result of tampering, TBAC module 110 may replace that token 115 with its corresponding secured copy. As an example and not by way of limitation, if network token 115*f* has been compromised as a result of tampering, TBAC module 110 may replace network token 115*f* with its corresponding secured copy 115*fs*. In certain embodiments, TBAC module 110 may replace the tampered token 115 by terminating the tampered token 115 and generating a new token 115 that matches the corresponding secured copy of the tampered token 115.

In particular embodiments, TBAC module 110 may perform additional checks to determine if a token 115 has been tampered. As an example and not by way of limitation, TBAC module 110 may detect that a Kerberos token 115 associated with device 114 may have been tampered. In addition to comparing the Kerberos token 115 with its corresponding secured copy, TBAC module 110 may verify the integrity of a ticket associated with the Kerberos token 115. If the ticket is valid, TBAC module 110 may treat the valid ticket as an indication that the Kerberos token 115 has not been tampered. If the ticket is invalid, TBAC module 110 may treat the invalid ticket as an indication that the Kerberos token 115 has been tampered.

In particular embodiments, TBAC module 110 may generate a revalidation token 115*u* to indicate which tokens 115 have been compromised as a result of tampering. As an example and not by way of limitation, if network token 115*f* has been compromised because network 120 is distributing malware, then revalidation token 115*u* may indicate that network token 115*f* has been compromised. In certain embodiments, TBAC module 110 may communicate revalidation token 115*u* to a token provider corresponding to the token 115 that was compromised as a result of tampering. As an example and not by way of limitation, TBAC module 110 may communicate revalidation token 115*u* to network token provider 122 if network token 115*f* was compromised as a result of tampering. In particular embodiments, revalidation token 115*u* may be communicated to computed risk token provider 124 to compute or recomputed a risk token 115*m*. As an example and not by way of limitation, if a network token 115*f* is discovered to have been tampered, the risk associated with granting access to a resource 145 over network 120 may increase. Computed risk token provider 124 may generate a risk token 115*m* representing that increase in risk. The risk token 115*m* may then be used to facilitate the making of an access decision 900 following the process described with respect to FIGS. 8-10. Although this disclosure describes TBAC module 110 performing certain actions with respect to FIG. 35, this disclosure contemplates the processor 132 and the memory 134 of the TBAC module 110 performing these actions. The illustration of system 100 in FIG. 35 does not specifically illustrate all of the elements from the illustration of system 100 in FIG. 1 so that particular aspects of system 100 may be emphasized. However, system 100 of FIG. 35 includes all the elements of system 100 in FIG. 1.

FIG. 36 is a flowchart illustrating a method 3600 of detecting tampering using the system 100 of FIG. 1. TBAC module 110 may perform method 3600. As provided in FIG. 36, TBAC module 110 may begin by storing a hard token 115*g*, subject token 115*k*, resource token 115*c*, risk token 115*m*, network token 115*f*, and session token 115*j* in step 3610. The hard token 115*g* may be associated with a device 114. The network token 115*f* may be associated with network 120. The resource token 115*c* may be associated with a resource 145. TBAC module 110 may receive a suspect token 115*t* indicating a risk that device 114, network 120, or resource 145 has been tampered in step 3620. In response to receiving the suspect token 115*t*, TBAC module 110 may access TTT3 rules 3530 in step 3630. TTT3 rules 3530 may specify which tokens 115 should be examined for potential tampering.

TBAC module 110 may then compare the hard token 115*g*, network token 115*f*, and/or resource token 115*c* with secured copies of the hard token 115*gs*, network token 115*fs*, and resource token 115*cs* in step 3640. In step 3650, TBAC module 110 may determine if any of the hard token 115*g*, network token 115*f*, and/or resource token 115*c* differ from its corresponding secured copy 115*gs*, 115*fs*, or 115*cs*. If none of the tokens 115 differ from its corresponding secured copy, TBAC module 110 may conclude. However, if any of the tokens differ from its corresponding secured copy, TBAC module 110 may proceed to step 3660 to generate a revalidation token 115*u* representing the tokens 115 that differ from their corresponding secured copies. TBAC module 110 may then conclude by communicating the revalidation token 115*u* to the appropriate token providers in step 3670. Communicating the revalidation token 115*u* may facilitate the replacement of a tampered token 115 with its corresponding secured copy.

In particular embodiments, because system 100 may detect tampering, system 100 may provide a more responsive and robust security system. Furthermore, because TBAC module 110 uses tokens to monitor components, system 100 may respond faster to any attacks on those components.

Figure 37:
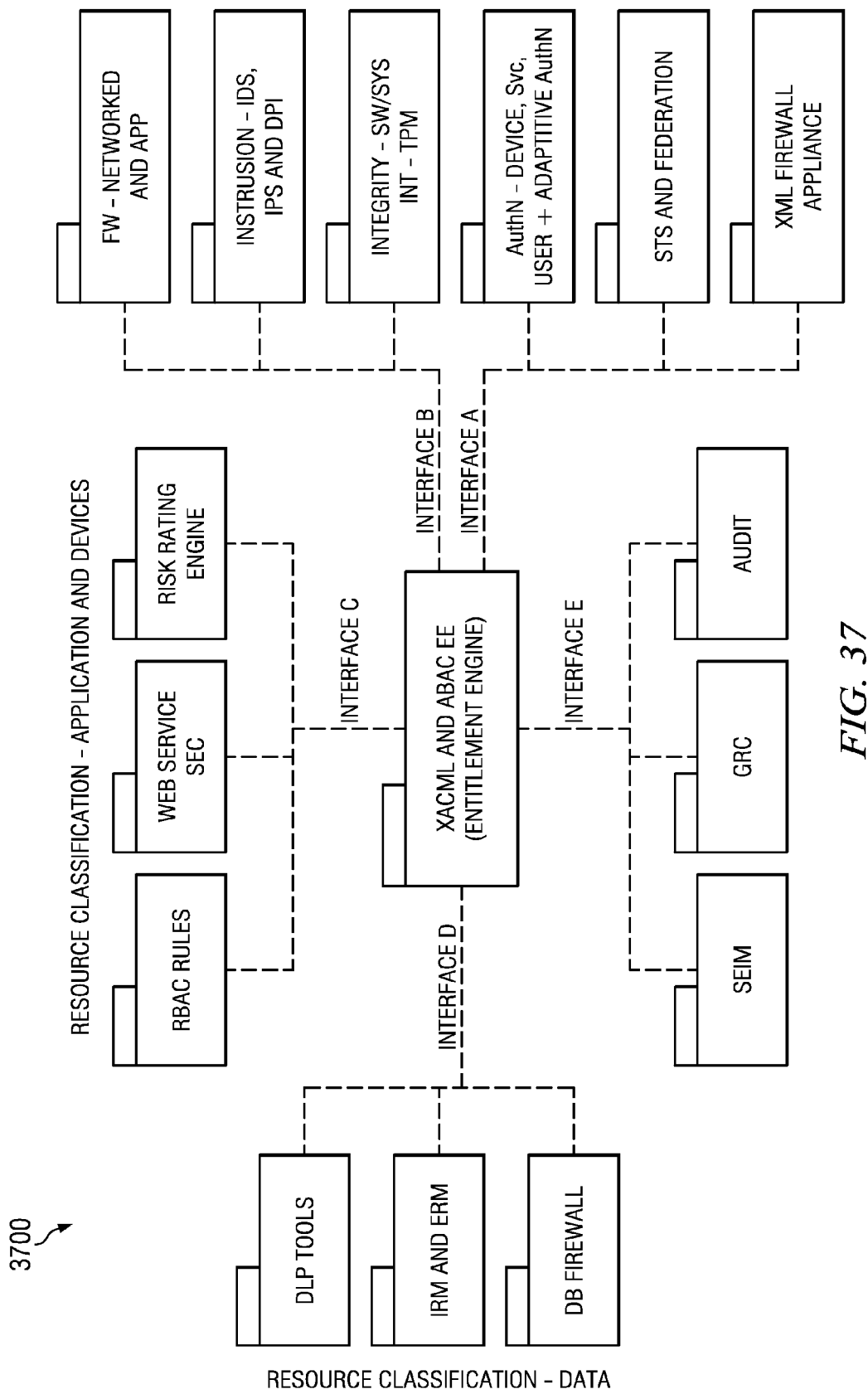
FIG. 37 is a high level architectural diagram of a system that does not use tokens to control access to a resource.
Figure 38:
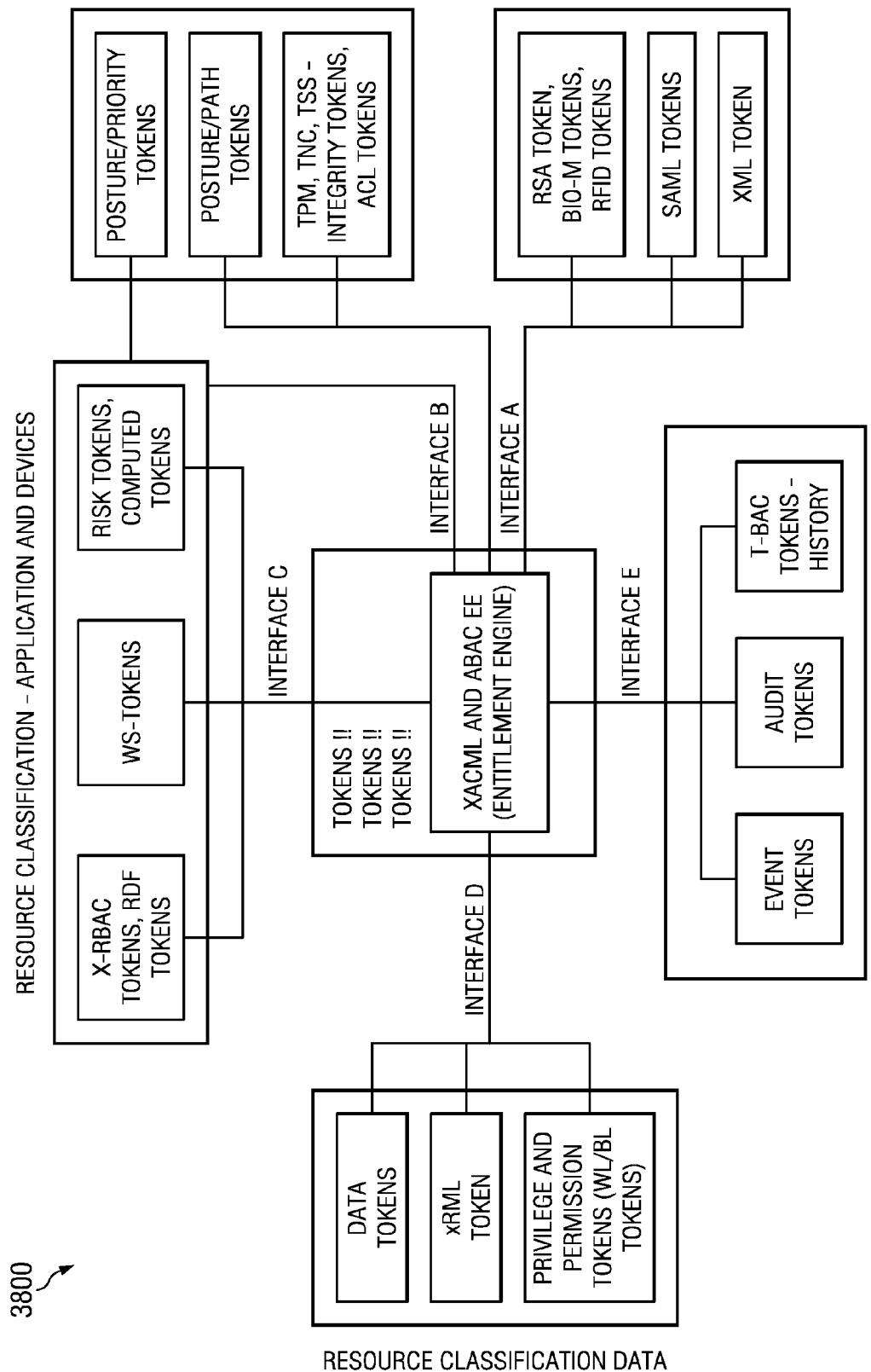
FIG. 38 is a high level architectural diagram of a system that uses tokens to control access to a resource.

FIGS. 37 and 38 are high level architectural diagrams of a system 3700 that does not use tokens 115 and of a system 3800 that does use tokens 115 respectively. System 3700 may include an Entitlement Engine that handles directly attributes 425 associated with Interfaces A-E. To augment system 3700 to use tokens 115, system 3800 may include an additional token layer that interacts with Interfaces A-E. The various interfaces and token layer will be discussed further with respect to FIGS. 37 and 38.

FIG. 37 is a high level architectural diagram of a system 3700 that does not use tokens 115 to control access to a resource 145. As provided in FIG. 37, the Entitlement Engine may make access decisions 900 by directly using attributes 425 associated with Interfaces A-E. Interface A may include attributes 425 associated with authentication (AuthN) such as for example, device 114, service, and user 112 authentication. Interface A may further include attributes 425 associated with STS and Federation and XML Firewall Appliance. Interface B may include attributes 425 associated with network 120 such as for example, firewalls, intrusion, and integrity. Interface C may include attributes 425 associated with risk (similar to the attributes 425 represented by risk token 115$m$). Interface D may include attributes 425 associated with data (similar to attributes 425 associated with data token provider 129). Interface E may include attributes 425 associated with access control management (akin to attributes 425 associated with privilege tokens 115$p$) such as for example, attributes 425 associated with Security Event and Incident Management (SEIM), Governance Risk & Compliance (GRC), and auditing.

FIG. 38 is a high level architectural diagram of a system 3800 that uses token 115 to control access to a resource 145. As provided by FIG. 38, system 3800 may add a layer that processes tokens 115 around the Entitlement Engine, which may now make access decisions 900 by using tokens 115 associated with Interfaces A-E. For example, Interface A may include tokens 115 associated with user 112 authentication, such as for example, biometric tokens, RFID tokens, Rivest, Shamir, Adelman (RSA) tokens, SAML tokens, and XML tokens. These tokens may be similar to subject tokens 115$k$. Interface B may include tokens 115 associated with network 120, such as for example, Posture/Priority tokens, Packet/Path tokens, TPM tokens, TNC tokens, Transaction Security System (TSS) tokens, Integrity tokens, and Access Control List (ACL) tokens. These tokens 115 may be similar to network tokens 115$f$. Interface C may include tokens 115 associated with risk, such as for example, risk tokens 115$m$. Interface D may include tokens 115 associated with data of user 112, such as for example, data tokens 115$e$. Interface D may further include xRML tokens and Privilege/Permission tokens. Interface E may include tokens 115 associated with access control management such as for example, Event tokens, Audit tokens, and T-BAC module 110 tokens.

In particular embodiments, system 3800 may provide several advantages over system 3700 by using tokens 115. First, system 3800 may be operable to align the function of tokens 115 with the appropriate OSI layer associated with the tokens 115. Second, system 3800 may leverage the advances made in token 115 technologies to improve security functions. Third, system 3800 may perform session control via session specific policies using tokens 115. Fourth, system 3800 may leverage the mapping of tokens 115 to attributes 425 for more efficient processing. Fifth, system 3800 may use tokens 115 to quickly and efficiently compute Identity Assurance levels 940, trust levels 920, integrity levels 910, and risk levels 930 to make access decisions 900.

Figure 39:
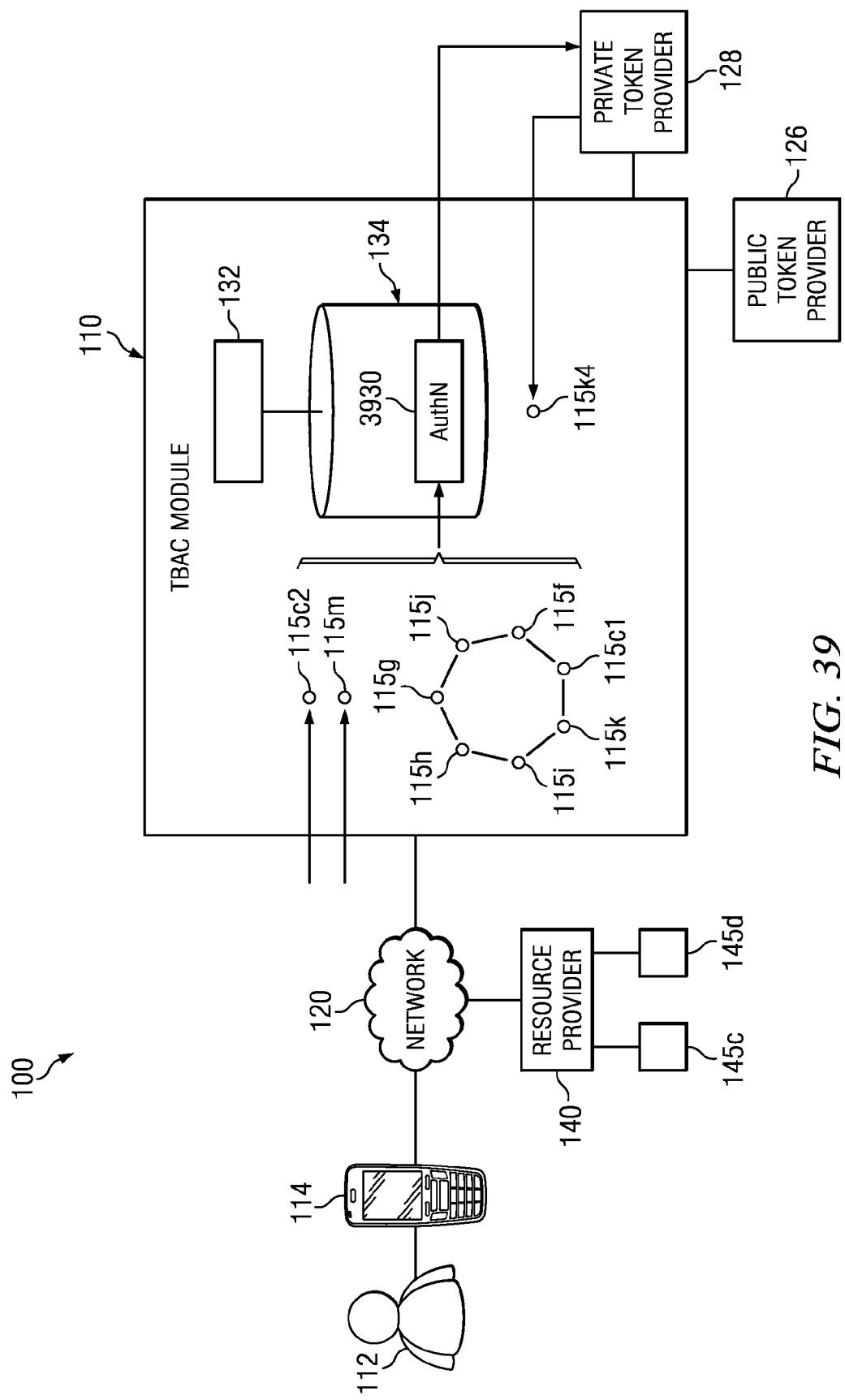
FIG. 39 illustrates the system of FIG. 1 performing real-time authentication using subject token combinations.
Figure 40:
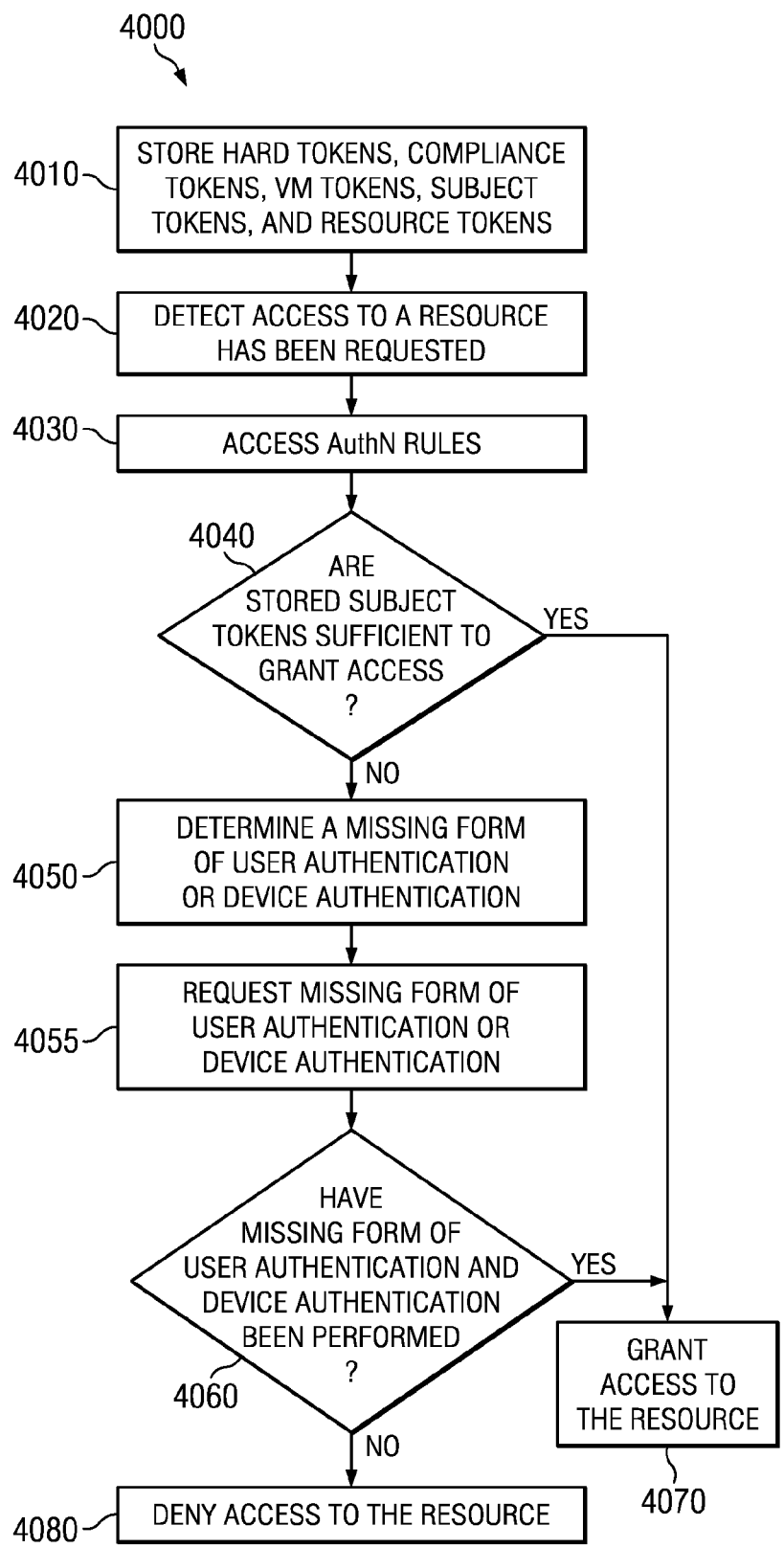
FIG. 40 is a flowchart illustrating a method of real-time authentication using subject token combinations.

FIGS. 39 and 40 illustrate the system 100 performing real-time authentication using subject token combinations. In general, during a session a user 112 may have already performed certain forms of authentication, and the user 112 may further request access to a resource 145. However, access to the resource 145 may require more forms or different forms of authentication than the user 112 has already provided. The process of determining which forms of authentication that user 112 still needs to perform to access resource 145 is known as real time authentication using subject token combinations, which is discussed further with respect to FIGS. 39 and 40.

TBAC module 110 may detect the request to access second resource 145$d$ while monitoring a session and determine whether the request for second resource 145$d$ requires authentication beyond what user 112 and device 114 have already provided. If TBAC module 110 determines that further authentication is required, TBAC module 110 may request the further authentication. TBAC module 110 may determine whether any subsequently provided authentication is sufficient to grant access to second resource 145$d$. If the later provided authentication is sufficient, access to second resource 145$d$ may be granted.

FIG. 39 illustrates the system 100 of FIG. 1 performing real-time authentication using subject token combinations. As provided in FIG. 39, TBAC module 110 may have correlated first resource token 115$c$1, subject token 115$k$, among others, as appropriate to session token 115$j$ thus indicating that user 112 and/or device 114 have been identified and have been granted access to first resource 145$c$. First resource token 115$c$1 may represent first resource 145$c$, and subject token 115$k$ may represent the authentication provided by user 112 and/or device 114 in order to access first resource 145$c$. In particular embodiments, multiple subject tokens 115$k$ may represent the authentication provided by user 112 and/or device 114 in order to access first resource 145$c$. User 112 and/or device 114 may request access to second resource 145$d$. In response, TBAC module 110 may receive a second resource token 115$c$2 and risk token 115$m$. Second resource token 115$c$2 may represent second resource 145$d$. Risk token 115$m$ may represent the risk associated with granting the user 112 or device 114 access to second resource 145$d$.

In particular embodiments, TBAC module 110 may store authN rules 3930 in memory 134. AuthN rules 3930 may specify when further authentication is required to access a resource 145. As an example and not by way of limitation, particular authN rules 3930 may specify that an extra form of authentication, such as biometric authentication, must be performed to grant access to second resource 145$d$. In that example, if TBAC module 110 has stored a subject token 115$k$ that indicates that user 112 or device 114 has performed biometric authentication, then access to second resource 145$d$ may be granted. However, if biometric authentication has not been performed, then TBAC module 110 may request user 112 or device 114 to perform biometric authentication before granting access to second resource 145$d$.

TBAC module 110 may use second resource token 115$c$2, risk token 115$m$, subject token 115$k$, among others as appropriate, to access authN rules 3930. In particular embodiments, TBAC module 110 may use these tokens 115 to determine at least one authN rule 3930 that applies to second resource 145$d$. The at least one authN rule 3930 may specify the subject tokens 115$k$ required to grant access to second resource 145$d$. In particular embodiments, these specified subject tokens 115$k$ may represent the forms of authentication that user 112 and/or device 114 have to perform to access second resource 145$d$. TBAC module 110 may compare the subject tokens 115$k$ specified by the at least one authN rule 3930 with the subject tokens already provided by user 112 and/or device 114 to determine a missing subject token 115$k$4. In particular embodiments, the missing subject token 115$k$4 may represent a form of user authentication and/or a form of device authentication that user 112 and/or device 114 have to perform to access second resource 145$d$. As an example and not by way of limitation, missing subject token 115k4 may represent biometric authentication. If TBAC module 110 determines that the missing form of user authentication and/or device authentication has been performed, then TBAC module 110 may grant access to second resource 145d.

Based on the determination of the missing subject token 115k4, TBAC module 110 may deny access to second resource 145d and request that the user 112 or device 114 perform the form of authentication represented by missing subject token 115k4. TBAC module 110 may receive missing subject token 115k4 from a token provider, such as for example, a public token provider 126 or private token provider 128. In particular embodiments, TBAC module 110 may generate and transmit a message to the device 114 stating that access to second resource 145d has been denied and indicating the missing form of user authentication and/or device authentication that needs to be performed in order for access to second resource 145d to be granted. The message may be in the form of a token 115, and TBAC module 110 may transmit the token 115 first to a token provider, such as the private token provider 128, en route to the device 114.

In response, user 112 or device 114 may perform the form of authentication represented by missing subject token 115k4. TBAC module 110 may then receive missing subject token 115k4 from a token provider such as private token provider 128 or public token provider 126. Receiving the missing subject token 115k4 may indicate to TBAC module 110 that the missing form of user authentication and/or device authentication has been performed. After receiving missing subject token 115k4, TBAC module 110 may determine that missing subject token 115k4 represents the form of authentication required to grant access to second resource 145d. TBAC module 110 may then associate missing subject token 115k4 with session token 115j and further grant access to second resource 145d.

The illustration of system 100 in FIG. 39 does not specifically illustrate all the elements from the illustration of system 100 in FIG. 1 so that particular aspects of system 100 may be emphasized. However, system 100 of FIG. 39 includes all the elements of system 100 in FIG. 1.

FIG. 40 is a flowchart illustrating a method 4000 of performing real-time authentication using subject token combinations. TBAC module 110 may perform method 4000. TBAC module 110 may begin by storing a hard token 115g, compliance token 115h, VM token 115i, subject token 115k, and first resource token 115c1, among others as appropriate, as a plurality of tokens 115 in step 4010. In particular embodiments, first resource token 115c1 may be associated with a first resource 145c to which TBAC module 110 has granted access. In step 4020, TBAC module 110 may detect that access to a second resource 145d has been requested. In response, TBAC module 110 may access authN rules 3930 in step 4030. AuthN rules 3930 may be used to determine if access to second resource 145d should be granted. Based on authN rules 3930, TBAC module 110 may determine if the stored subject token 115k is sufficient to grant access to second resource 145d in step 4040. If the stored subject token 115k is sufficient to grant access to second resource 145d, then TBAC module 110 may grant access to the second resource 145d in step 4070.

However, if the stored subject token 115k is not sufficient to grant access to second resource 145d, then TBAC module 110 may determine based on authN rules 3930 a missing form of user authentication or missing form of device authentication required to grant access to second resource 145d in step 4050. In particular embodiments, TBAC module 110 may then request the missing form of user authentication or the missing form of device authentication in step 4055. In response, TBAC module 110 may receive a missing subject token 115k4. Based on the missing subject token 115k4 and the authN rules 3930, TBAC module 110 may determine if the missing form of user authentication and the missing form of device authentication have been performed in step 4060. If the missing forms of authentication have not been performed, TBAC module 110 may deny access to the resource in step 4080. However, if the missing form of user authentication and/or the missing form of device authentication have been performed, then TBAC module 110 may grant access to the second resource 145d in step 4070.

In particular embodiments because TBAC module 110 may perform real-time authentication using subject token combinations, system 100 may provide a more robust process of determining access to multiple resources 145. Furthermore, because TBAC module 110 examines tokens 115 to determine access to multiple resources 145, TBAC module 110 may provide a faster and more efficient process of determining access to a resource 145.

Figure 41:
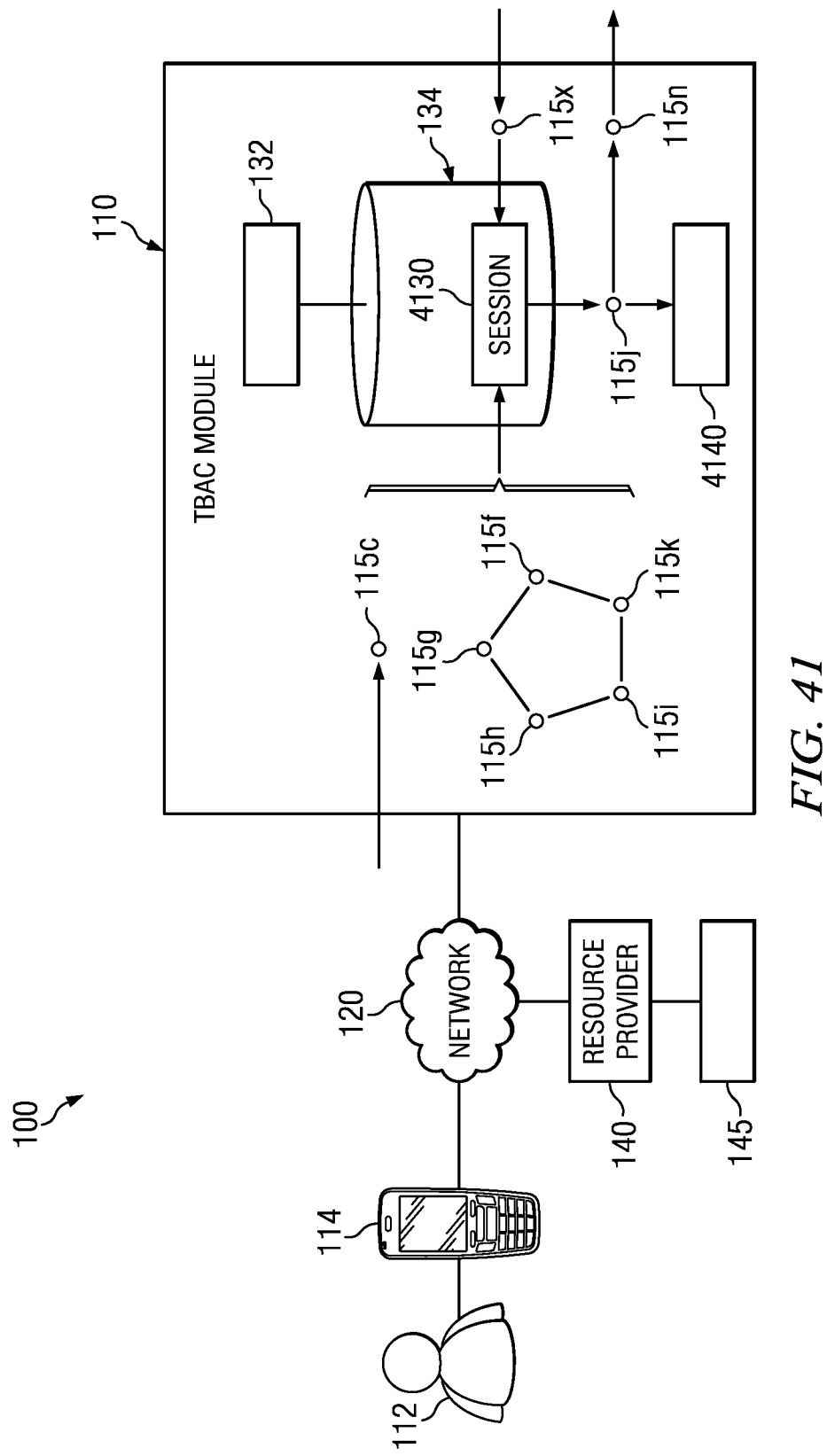
FIG. 41 illustrates the system of FIG. 1 performing session validation.
Figure 42:
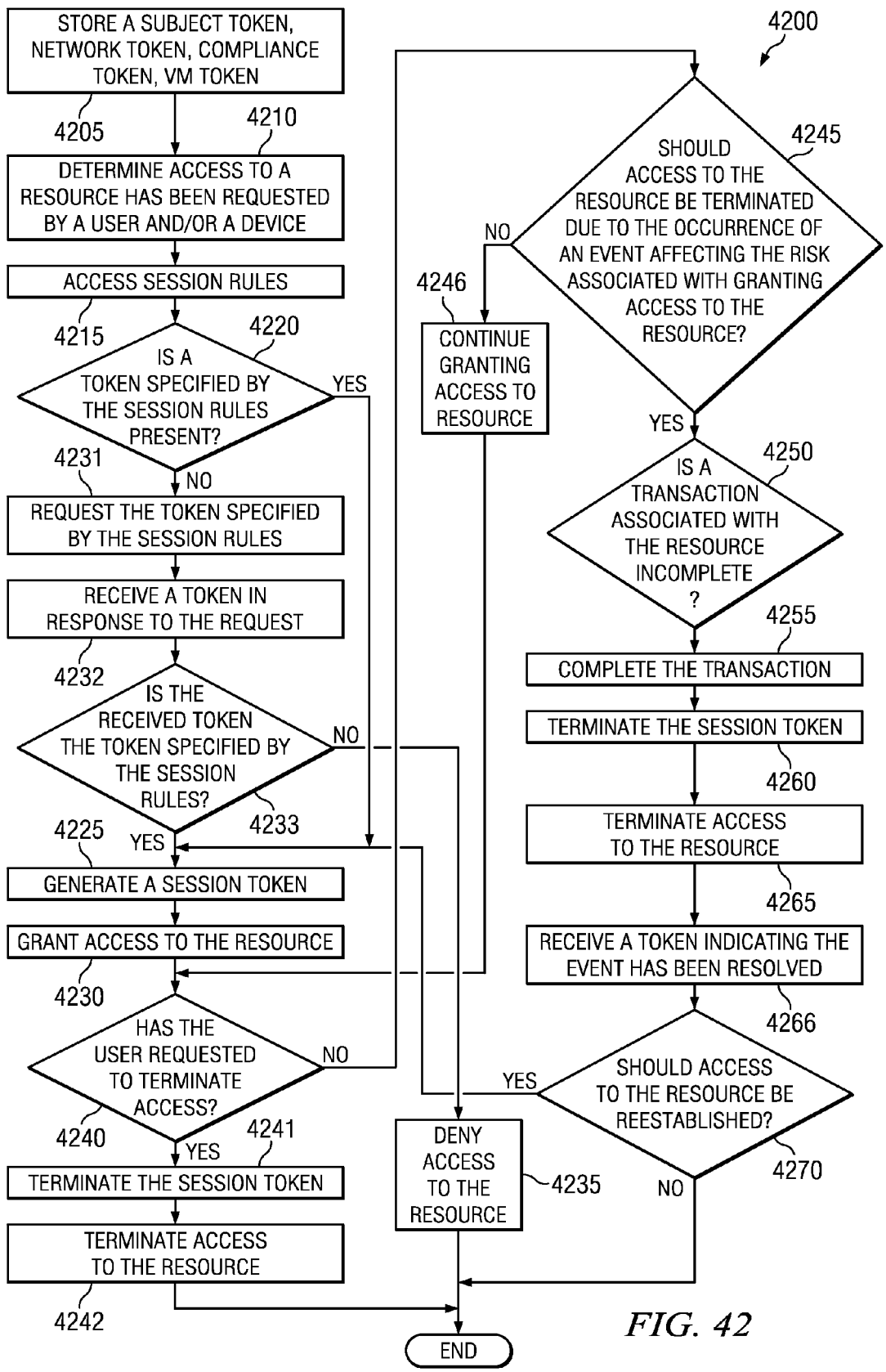
FIG. 42 is a flowchart illustrating a method of performing session validation.

FIGS. 41 and 42 illustrate the system 100 of FIG. 1 performing session validation. In general, access to resource 145 may be associated with a session. The process of generating and maintaining sessions is known as session validation, which will be discussed further with respect to FIGS. 41 and 42.

TBAC module 110 may generate a session token 115j in response to determining that access to a resource should be granted. TBAC module 110 may further determine that events that affect session 115j have occurred, and terminate the session and the corresponding session token 115j.

FIG. 41 illustrates the system 100 of FIG. 1 performing session validation. As provided by FIG. 41, TBAC module 110 may store subject token 115k, network token 115f, among others as appropriate. In particular embodiments, TBAC module 110 may receive resource token 115c indicating that a user 112 and/or device 114 have requested access to a resource 145. TBAC module 110 may determine that access to the resource has been requested in response to receiving resource token 115c.

In particular embodiments, TBAC module 110 may use session rules 4130 stored in memory 134 to determine whether access to resource 145 should be granted. TBAC module 110 may use subject token 115k, network token 115f, resource token 115c, among others as appropriate, to access session rules 4130. In particular embodiments, TBAC module 110 may use one or more of these tokens 115 to determine at least one session rule 4130 applicable to resource 145. The at least one session rule 4130 may specify conditions under which access to resource 145 may be granted. In particular embodiments, the at least one session rule 4130 may specify that access to resource 145 may be granted if a particular token 115 is present. For example, the at least one session rule 4130 may specify that access to resource 145 may be granted to user 112 if a subject token 115k indicating that user 112 has performed biometric authentication is present. As another example, the at least one session rule 4130 may specify that access to a resource 145 may be granted to user 112 if a subject token 115k indicating that user 112 is at a particular geographic location is present. Other examples of conditions specified by the at least one session rule 4130 will be discussed with respect to FIGS. 59-68.

TBAC module 110 may apply the at least one session rule 4130 and determine whether the condition specified by the at least one session rule 4130 has been met. For example, TBAC module 110 may determine whether the particular token 115 specified by the at least one session rule 4130 is present. If the particular token 115 is not present, TBAC module 110 may deny access to resource 145. In particular embodiments, TBAC module 110 may request the particular token 115 and receive a token 115 in response to that request. TBAC module 110 may then determine if the received token 115 is the particular token 115. If not, TBAC module 110 may deny access to resource 145. If the particular token 115 is already present or if the received token 115 is the particular token 115, TBAC module 110 may grant access to resource 145.

In particular embodiments, TBAC module 110 may further generate a session token 115j in response to the determination that the particular token 115 specified by the at least one session rule 4130 is present. The at least one session rule 4130 may specify how to generate session token 115j. In particular embodiments, the at least one session rule 4130 may specify that session token 115j should be generated based on particular tokens 115. For example, the at least one session rule 4130 may specify that session token 115j should be generated by hashing resource token 115c and subject token 115k. As another example, the at least one session rule 4130 may specify that session token 115j should be generated by hashing resource token 115c and network token 115f.

In particular embodiments, TBAC module 110 may apply the at least one session rule 4130 to generate session token 115j. For example, TBAC module 110 may hash resource token 115c and network token 115f to generate session token 115j. As another example, TBAC module 110 may hash resource token 115c and subject token 115k to generate session token 115j. Although this disclosure describes TBAC module 110 performing particular operations on particular tokens 115 to generate session token 115j, this disclosure contemplates TBAC module 110 performing any appropriate operation on any number and combination of tokens 115 to generate session token 115j. For example, TBAC module 110 may perform a logical union on three or more tokens 115 to generate session token 115j. As another example, TBAC module 110 may compress three or more tokens 115 to generate session token 115j.

In particular embodiments, TBAC module 110 may receive an event token 115x. Event token 115x may indicate the occurrence of an event affecting the risk associated with granting access to the resource 145. As an example and not by way of limitation, event token 115x may indicate that an unauthorized connection has been attempted. As another example and not by way of limitation, event token 115x may indicate that an element of system 100 has been infected by a virus. Although this disclosure describes event token 115x indicating particular events, this disclosure contemplates event token 115x indicating any appropriate event affecting the risk of granting access to resource 145. Further examples of events indicated by event token 115x will be discussed with respect to FIGS. 59-68. TBAC module 110 may determine that the event has occurred in response to receiving event token 115x.

In particular embodiments, the at least one session rule 4130 may specify that access to resource 145 should be terminated when event token 115x indicating that the event occurred is present. TBAC module 110 may apply the at least one session rule 4130 to determine that access to resource 145 should be terminated in response to receiving event token 115x. TBAC module 110 may then terminate the session token 115j associated with access to resource 145 in response to the determination that access to the resource 145 should be terminated. To terminate session token 115j, TBAC module 110 may delete session token 115j, uncorrelate session token 115j from subject token 115k, network token 115f, among others as appropriate; modify session token 115j to reflect termination of access to resource 145; and/or any other appropriate action with respect to session token 115j. TBAC module 110 may then terminate access to resource 145.

In particular embodiments, TBAC module 110 may handle a transaction 4140 prior to terminating access to resource 145. TBAC module 110 may determine prior to terminating access to resource 145 that there is an incomplete transaction 4140 associated with resource 145. In particular embodiments, TBAC module 110 may complete transaction 4140 before terminating access to resource 145. As an example and not by way of limitation, user 112 may be uploading data as part of the transaction 4140 with resource 145. TBAC module 110 may complete the upload before terminating access to resource 145.

In particular embodiments, TBAC module 110 may halt the transaction 4140 prior to terminating access to resource 145. As an example and not by way of limitation, user 112 may be transferring funds as part of the transaction 4140 with resource 145. TBAC module 110 may halt the funds transfer before terminating access to resource 145. TBAC module 110 may then continue the transaction 4140 if access to resource 145 is subsequently reestablished. To continue the example, TBAC module 110 may continue the funds transfer after access to resource 145 has been reestablished.

In particular embodiments, TBAC module 110 may reestablish access to resource 145 in response to receiving a particular token 115. The particular token 115 may be a subject token 115k, network token 115f, resource token 115c, event token 115x, or any other appropriate token 115. The particular token 115 may indicate that the event indicated by event token 115x has been resolved. The at least one session rule 4130 may specify that access to resource 145 may be reestablished if the particular token 115 is present. After receiving the particular token 115, TBAC module 110 may apply the at least one session rule 4130 to determine that access to resource 145 should be reestablished. TBAC module 110 may then reestablish access to the resource 145. In particular embodiments, TBAC module 110 may reestablish access by generating the session token 115j and then granting access to resource 145.

As an example and not by way of limitation, the at least one session rule 4130 may specify that access to resource 145 may be reestablished if user 112 performs biometric authentication. TBAC module 110 may then receive a subject token 115k indicating that user 112 has performed biometric authentication. TBAC module 110 may then apply the at least one session rule 4130 to determine that access to the resource 145 should be reestablished. TBAC module 110 may then reestablish access to the resource 145. As another example and not by way of limitation, the at least one session rule 4130 may specify that access to resource 145 may be reestablished if a virus infecting an element of system 100 has been removed. TBAC module 110 may then receive a token 115 indicating that the virus has been removed. TBAC module 110 may then apply the at least one session rule 4130 to determine that access to resource 145 should be reestablished. TBAC module 110 may then reestablish access to the resource 145. Although this disclosure describes TBAC module 110 reestablishing access in response to particular actions or events, this disclosure contemplates TBAC module 110 reestablishing access in response to any appropriate action or event. Other examples of actions and events will be discussed further with respect to FIGS. 59-68.

In particular embodiments, another element of system 100 such as resource provider 140 may grant, deny, or terminate access to resource 145. TBAC module 110 may instruct that element of system 100 whether to grant, deny, or terminate access. In particular embodiments, TBAC module 110 may generate a decision token 115n representing a determination made by TBAC module 110. For example, in response to determining that access to resource 145 should be granted, TBAC module 110 may generate a decision token 115n indicating that access to resource 145 should be granted. As another example, in response to determining that access to resource 145 should be terminated, TBAC module 110 may generate a decision token 115n indicating that access to resource 145 should be terminated.

As another example, user 112 may decide to terminate access to resource 145. TBAC module 110 may receive a token 115 such as a subject token 115k indicating that user 112 wants to terminate access to resource 145. In response, TBAC module 110 may generate a decision token 115n indicating that access to resource 145 should be terminated.

In particular embodiments, TBAC module 110 may transmit decision token 115n to an appropriate element of system 100, such as resource provider 140. In response to receiving decision token 115n, the appropriate element of system 100 may carry out the decision indicated by decision token 115n. For example, in response to receiving decision token 115n, resource provider 140 may grant, deny, terminate, and/or take any other appropriate action with respect to resource 145 as indicated by decision token 115n.

The illustration of system 100 in FIG. 41 does not specifically illustrate all of the elements from the illustration of system 100 in FIG. 1 so that particular aspects of system 100 may be emphasized. However, system 100 of FIG. 41 includes all the elements of system 100 in FIG. 1.

FIG. 42 is a flowchart illustrating a method 4200 of performing session validation. TBAC module 110 may perform method 4200. TBAC module 110 may begin by storing a subject token 115k, network token 115f, among others as appropriate, in step 4205. In step 4210 TBAC module 110 may determine that access to a resource 145 has been requested. In particular embodiments, TBAC module 110 may receive a resource token 115c indicating that access to resource 145 has been requested. In response to receiving resource token 115c, TBAC module 110 may determine that access to resource 145 has been requested.

TBAC module 110 may continue to step 4215 and access session rules 4130. In particular embodiments, TBAC module 110 may use one or more of the previously described tokens 115 to access session rules 4130, and to determine at least one session rule 4130 applicable to resource 145. The at least one session rule 4130 may specify that access to resource 145 may be granted if a particular token 115 is present. In step 4220, TBAC module 110 may determine whether the particular token 115 specified by the at least one session rule 4130 is present.

If the particular token 115 is not present, TBAC module 110 may continue to step 4231 and request the token 115 specified by the at least one session rule 4130. In step 4232, TBAC module 110 may receive a token 115 in response to that request. TBAC module 110 may then determine whether the received token 115 is the token 115 specified by the at least one session rule 4130 in step 4233. If the received token 115 is the specified token 115, TBAC module 110 may continue to step 4225. If not, TBAC module 110 may deny access to the resource 145 in step 4235.

If the particular token 115 specified by the at least one session rule 4130 is present, TBAC module 110 may generate a session token 115j in step 4225. In particular embodiments, TBAC module 110 may generate session token 115j by combining the particular token 115 specified by the at least one session rule 4130 with one or more of the tokens 115 stored in step 4205. For example, TBAC module 110 may hash the particular token 115 with a subject token 115k stored in step 4205 to generate session token 115j. Hashing the particular token 115 with a subject token 115k may generate a session token 115j that can be easily associated with the particular token 115 and the subject token 115k. For example, hashing the particular token 115 with the subject token 115k may generate a session token 115j that represents information from both subject token 115k and the particular token 115. By examining the information represented by session token 115j, TBAC module 110 may associate session token 115j to the particular token 115 and to the subject token 115k. TBAC module 110 may then continue to step 4230 to grant access to resource 145. As part of granting access to resource 145, TBAC module 110 may correlate session token 115j with one or more of the tokens 115 stored in step 4205.

In particular embodiments, user 112 may decide to terminate access to resource 145. In step 4240, TBAC module 110 may determine whether user 112 wants to terminate access to resource 145. TBAC module 110 may receive a request from user 112 and/or device 114 to terminate access to resource 145. In response, TBAC module 110 may terminate the session token in step 4241. In particular embodiments, TBAC module 110 may terminate session token 115j by deleting session token 115j. In other embodiments, TBAC module 110 may terminate session token 115j by uncorrelating it with one or more stored tokens 115. TBAC module 110 may also modify session token 115j to terminate session token 115j. In step 4242, TBAC module 110 may then terminate access to resource 145. In this manner, TBAC module 110 may terminate access to resource 145 in response to a request from user 112 and/or device 114.

If user 112 does not want to terminate access, TBAC module 110 may determine that an event affecting the risk associated with granting access to resource 145 has occurred. In particular embodiments, TBAC module 110 may receive an event token 115x indicating the occurrence of an event affecting the risk associated with granting access to resource 145. In response to receiving event token 115x, TBAC module 110 may determine that the event has occurred.

TBAC module 110 may then continue to step 4245 to determine whether access to resource 145 should be terminated due to the event. In particular embodiments, the at least one session rule 4130 may specify whether access should be terminated due to the event. If the at least one session rule 4130 specifies that access should be terminated due to the event, TBAC module 110 may apply the at least one session rule 4130 to terminate access. If access to resource 145 should not be terminated, TBAC module 110 may continue granting access to resource 145 in step 4246.

If access to resource 145 should be terminated, TBAC module 110 may continue to step 4250 to determine whether there is an incomplete transaction 4140 associated with resource 145. If there is an incomplete transaction 4140, TBAC module 110 may complete the transaction 4140 in step 4255. In particular embodiments, instead of completing the transaction 4140, TBAC module 110 may halt the transaction 4140.

If there is not an incomplete transaction 4140, or after completing and/or halting the transaction 4140, TBAC module 110 may continue to terminate the session token 115j in step 4260. In particular embodiments, TBAC module 110 may terminate session token 115j by deleting session token 115j. In other embodiments, TBAC module 110 may terminate session token 115j by uncorrelating it with one or more stored tokens 115. TBAC module 110 may also modify session token 115j to terminate session token 115j. In step 4265

TBAC module 110 may then terminate access to resource 145. In this manner, TBAC module 110 may terminate access to resource 145 in response to the occurrence of the event.

After access has been terminated, TBAC module 110 may receive a token 115 indicating that the event affecting the risk associated with granting access to the resource 145 has been resolved in step 4266. In step 4270, TBAC module 110 may determine whether access to resource 145 should be reestablished in response to receiving that token 115. In particular embodiments, the at least one session rule 4130 may specify that access to resource 145 may be reestablished if a particular token 115, such as a subject token 115k, is present. TBAC module 110 may receive the particular token 115 in step 4266, and apply the at least one session rule 4130 to determine that access to resource 145 should be reestablished. TBAC module 110 may then reestablish access to the resource 145 by generating a session token 115j in step 4225. However, if TBAC module 110 determines that access should not be reestablished, TBAC module 110 end method 4200.

FIGS. 59-68 are flowcharts describing particular methods involving session validation, In general, TBAC module 110 may perform certain variations of session validation as described with respect to FIGS. 41 and 42. These variations may affect the generation of the session token 115j or the termination of session token 115j.

Variations that affect the generation of session token 115j include accessing protected resources, uncontrolled devices, accessing mainframe resources, accessing third party resources, third party session validation, network session validation, and object transaction session validation. During accessing protected resources, TBAC module 110 may generate a session token 115j based at least upon a subject token 115k associated with device 114. This function is discussed further with respect to FIG. 59. During session validation of uncontrolled devices, TBAC module 110 may generate a session token 115j based at least upon a subject token 115k associated with the unsecured device and another subject token 115k indicating a timeout. This function will be discussed further with respect to FIG. 60. During accessing mainframe resources, TBAC module 110 may generate a session token 115j based at least upon a token 115 indicating a password and a geographic location of device 114. This function will be discussed further with respect to FIG. 61. During accessing third party resources, TBAC module 110 may generate a session token 115j based at least upon a token 115 associated with a subscriber identity module of device 114.

This function will be discussed further with respect to FIG. 62. During third party session validation, TBAC module 110 may generate a session token 115j based at least upon a token 115 requested from an entity due to the geographic location of device 114. This function will be discussed further with respect to FIG. 63. During network session validation, TBAC module 110 may generate a session token 115j based at least upon a token 115 indicating that the resource 145 is associated with a virtual private network. This function will be discussed further with respect to FIG. 64. During object transaction session validation, TBAC module 110 may detect a transaction and generate a session token 115j based on a token 115 associated with the transaction. This function will be discussed further with respect to FIG. 68.

Variations that affect the termination of session token 115j include emergency session validation, subject recognition session validation, and object security session validation. During emergency session validation, TBAC module 110 may terminate session token 115j based at least upon a token 115 indicating that an emergency has been declared. This function will be discussed further with respect to FIG. 65. During subject recognition session validation, TBAC module 110 may terminate session token 115j based at least upon a token 115 indicating that a face or a voice other than the authorized user's has been detected. This function will be discussed further with respect to FIG. 66. During object security session validation, TBAC module 110 may terminate session token 115j based at least upon a token 115 indicating an alarm associated with device 114 has triggered. This function will be discussed further with respect to FIG. 67.

Figure 59:
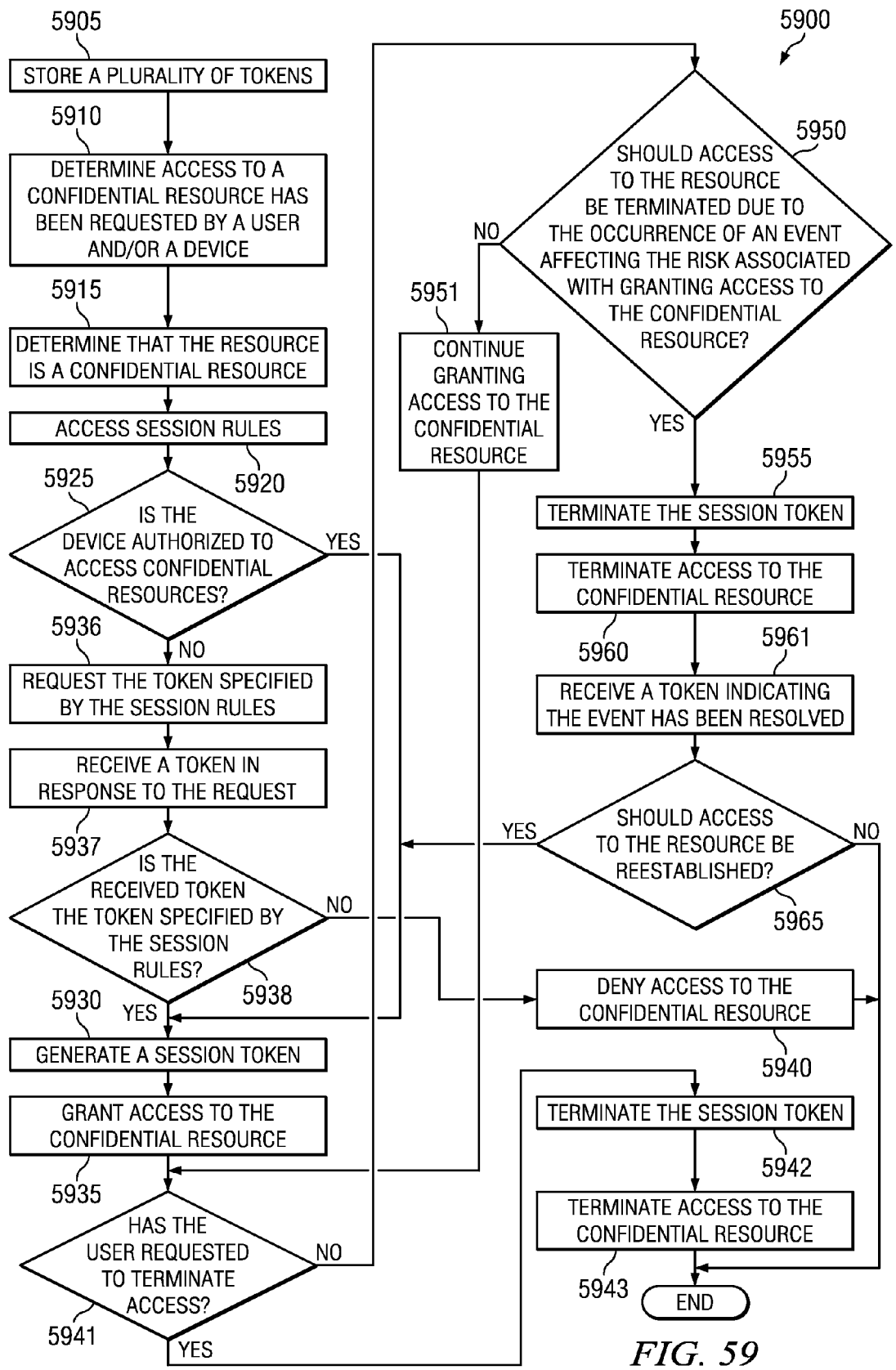
FIG. 59 is a flowchart illustrating a method of performing session validation to access protected resources.

FIG. 59 illustrates a method of performing session validation to access protected resources. In general, TBAC module 110 may receive requests for resources 145 that are protected, such as confidential resources, from a device 114. TBAC module 110 may grant access to the protected resource 145 if the device 114 has been authorized to access the protected resource 145. More details will be provided in the description of FIG. 59.

FIG. 59 is a flowchart illustrating a method 5900 of performing session validation to access protected resources 145. TBAC module 110 may perform method 5900. TBAC module 110 may begin by storing a plurality of tokens 115 in step 5905. In step 5910 TBAC module 110 may determine that a device 114 has requested access to a resource 145. In particular embodiments, TBAC module 110 may receive a resource token 115c indicating that user 112 and/or device 114 has requested access to resource 145. TBAC module 110 may determine that user 112 and/or device 114 has requested access to resource 145 in response to receiving resource token 115c.

In step 5915, TBAC module 110 may determine that the resource 145 is a confidential resource 145. In particular embodiments, resource token 115c may indicate that resource 145 is a confidential resource 145. TBAC module 110 may determine that resource 145 is a confidential resource 145 based on resource token 115c. Examples of confidential resources 145 may include documents that include confidential or secret information or any other type of resource 145 that includes confidential or secret information. Owners and/or administrators of resource 145 may designate resource 145 as a confidential resource 145 to restrict access to resource 145 to a limited group of users 112 and/or devices 114. This limited group of users 112 and/or devices 114 may be allowed to access additional resources 145, such as confidential resources 145, to which general users 112 and/or devices 114 may not have access. For example, a company may keep a database that logs conversations amongst its officers. The company may wish to designate the database as confidential in order to limit access to the database to its officers. As another example, the company may want to limit access to the company network passwords to its IT staff. The company may designate the network passwords as confidential so that general employees and officers cannot access them. Although this disclosure describes a confidential resource 145 as particular resources 145, this disclosure contemplates confidential resource 145 being any resource 145 that general users 112 and/or devices 114 of system 100 are restricted from accessing.

In step 5920, TBAC module 110 may access session rules 4130. In particular embodiments, TBAC module 110 may use the plurality of tokens 115 and the resource token 115c to access session rules 4130. TBAC module 110 may use one or more of these tokens to determine at least one session rule 4130 applicable to resource 145. In particular embodiments, the at least one session rule 4130 may specify that access to resource 145 may be granted if a particular token 115 is present. The particular token 115 may indicate that the device 114 is authorized to access confidential resources 145.

As an example and not by way of limitation, confidential resource 145 may be owned by a company. The company may wish to grant only company-provisioned devices 114 access to confidential resource 145. A company-provisioned device 114 may be a device 114 that the company has provisioned with the necessary security features to access confidential resources 145. A company-provisioned device 114 may also be a device 114 that the company has examined and determined to have the necessary security features to access confidential resources 114. As a result, the at least one session rule 4130 may specify that access to confidential resource 145 may be granted if a particular token 115 indicating that the device 114 is a company-provisioned device is present.

For example, the company may keep confidential sales data for use by its sales force. The company may designate the sales data as confidential and set up the at least one session rule 4130 applicable to the sales data to limit access to laptops, phones, and other mobile devices that the company has provisioned to its sales force. When an employee on the sales force requests access to the sales data from his company laptop, TBAC module 110 may determine that the requesting device 114 is a laptop provisioned by the company to its sales force. TBAC module 110 may then apply the at least one session rule 4130 and grant access to the sales data. When the employee on the sale forces requests access to the sales data from his personal laptop, TBAC module 110 may determine that the requesting device 114 is not a company-provisioned device 114. TBAC module 110 may then apply the at least one session rule 4130 and deny access to the sales data.

In step 5925, TBAC module 110 may apply the at least one session rule 4130 to determine whether the device 114 is authorized to access confidential resources 145. In particular embodiments, TBAC module 110 may make this determination by determining whether a token 115 indicating that device 114 is authorized to access confidential resources 145 is present. To continue a previous example, to determine whether device 114 is authorized to access confidential resources 145, TBAC module 110 may determine whether a particular token 115 such as subject token 115k indicating that the device 114 is a company-provisioned device is present.

If TBAC module 110 determines that the device 114 is not authorized to access confidential resources 145, TBAC module 110 may request the particular token 115 in step 5936. Any appropriate element of system 100 such as the token providers may respond to the request. TBAC module 110 may receive a token 115 in response to the request in step 5937. In step 5938, TBAC module 110 may determine whether the received token 115 is the particular token 115. If not, TBAC module 110 deny access to the resource 145 in step 5940. If the received token 115 is the particular token 115, and thus the device 114 is authorized to access confidential resources 145, then TBAC module 110 may continue to step 5930.

If TBAC module 110 determines that the device 114 is authorized to access confidential resources 145, TBAC module 110 may generate a session token 115j in step 5930. In particular embodiments, the at least one session rule 4130 may specify that session token 115j should be generated based at least upon the particular token 115 indicating that device 114 is authorized to access confidential resources 145 and one or more of the plurality of tokens stored in step 5905. For example, the at least one session rule may specify that session token 115j should be generated by combining the particular token 115 and one or more of the plurality of tokens stored in step 5905. As another example, the at least one session rule 4130 may specify that session token 115j should be generated by hashing the particular token 115 and one or more of the plurality of the tokens stored in step 5905.

In step 5935, TBAC module 110 may grant access to resource 145. In particular embodiments, TBAC module 110 may correlate session token 115j with one or more of the plurality of tokens 115 stored in step 5905 in conjunction with granting access to the resource 145. In this manner, TBAC module 110 may generate a session associated with accessing a confidential resource 145.

In particular embodiments, user 112 may decide to terminate access to confidential resource 145. In step 5941, TBAC module 110 may determine whether user 112 has requested to terminate access to resource 145. TBAC module 110 may receive a request from user 112 and/or device 114 to terminate access to resource 145. In response, TBAC module 110 may terminate the session token in step 5942. In particular embodiments, TBAC module 110 may terminate session token 115j by deleting session token 115j. In other embodiments, TBAC module 110 may terminate session token 115j by uncorrelating it with one or more stored tokens 115. TBAC module 110 may also modify session token 115j to terminate session token 115j. In step 5943, TBAC module 110 may then terminate access to resource 145. In this manner, TBAC module 110 may terminate access to resource 145 in response to a request from user 112 and/or device 114.

TBAC module 110 may determine that an event affecting the risk associated with granting access to the confidential resource 145 has occurred. In particular embodiments, TBAC module 110 may receive an event token 115x indicating the occurrence of the event. TBAC module 110 may determine that the event has occurred in response to receiving event token 115x. For example, event token 115x may indicate that the company-provisioned device 114 accessing the confidential resource 145 has been infected by a virus or that the company-provisioned device 114 has not received the latest software and security updates.

In step 5950, TBAC module 110 may determine whether access to the resource 145 should be terminated due to the event. In particular embodiments, the at least one session rule 4130 may specify whether access to the resource 145 should be terminated in response to the event. Terminating access to resource 145 may be desirable if the event increases the risk associated with granting access to the resource to an unacceptable level. TBAC module 110 may apply the at least one session rule 4130 to determine whether access to the resource 145 should be terminated. If access to the resource 145 should not be terminated, TBAC module 110 may continue granting access to the resource in 5935.

If access to the resource 145 should be terminated, TBAC module 110 may terminate the session token 115j in step 5955. In particular embodiments, terminating the session token 115j may include deleting the session token 115j, uncorrelating session token 115j from one or more of the plurality of tokens 115 stored in step 5905, modifying session token 115j, and/or any other appropriate action taken with respect to session token 115j. TBAC module 110 may then terminate access to the confidential resource 145 in step 5960. In this manner, TBAC module 110 may terminate access to confidential resource 145 in response to the occurrence of the event.

In step 5965, TBAC module 110 may determine whether access to the confidential resource 145 should be reestablished. In particular embodiments, the at least one session rule 4130 may specify that access to resource 145 should be reestablished if a token 115 indicating that the event has been resolved is present. For example, TBAC module 110 may receive a token 115 indicating that the company-provisioned device is no longer infected by a virus or that the company-provisioned has installed the latest software and security updates. TBAC module 110 may receive the token 115 in step 5961 and apply the at least one session rule 4130 to determine that access to resource 145 should be reestablished. If TBAC module 110 determines that access to resource 145 should be reestablished, TBAC module 110 may continue to step 5930. However, if TBAC module 110 determines that access to the resource 145 should not be reestablished, TBAC module 110 may end method 5900.

Figure 60:
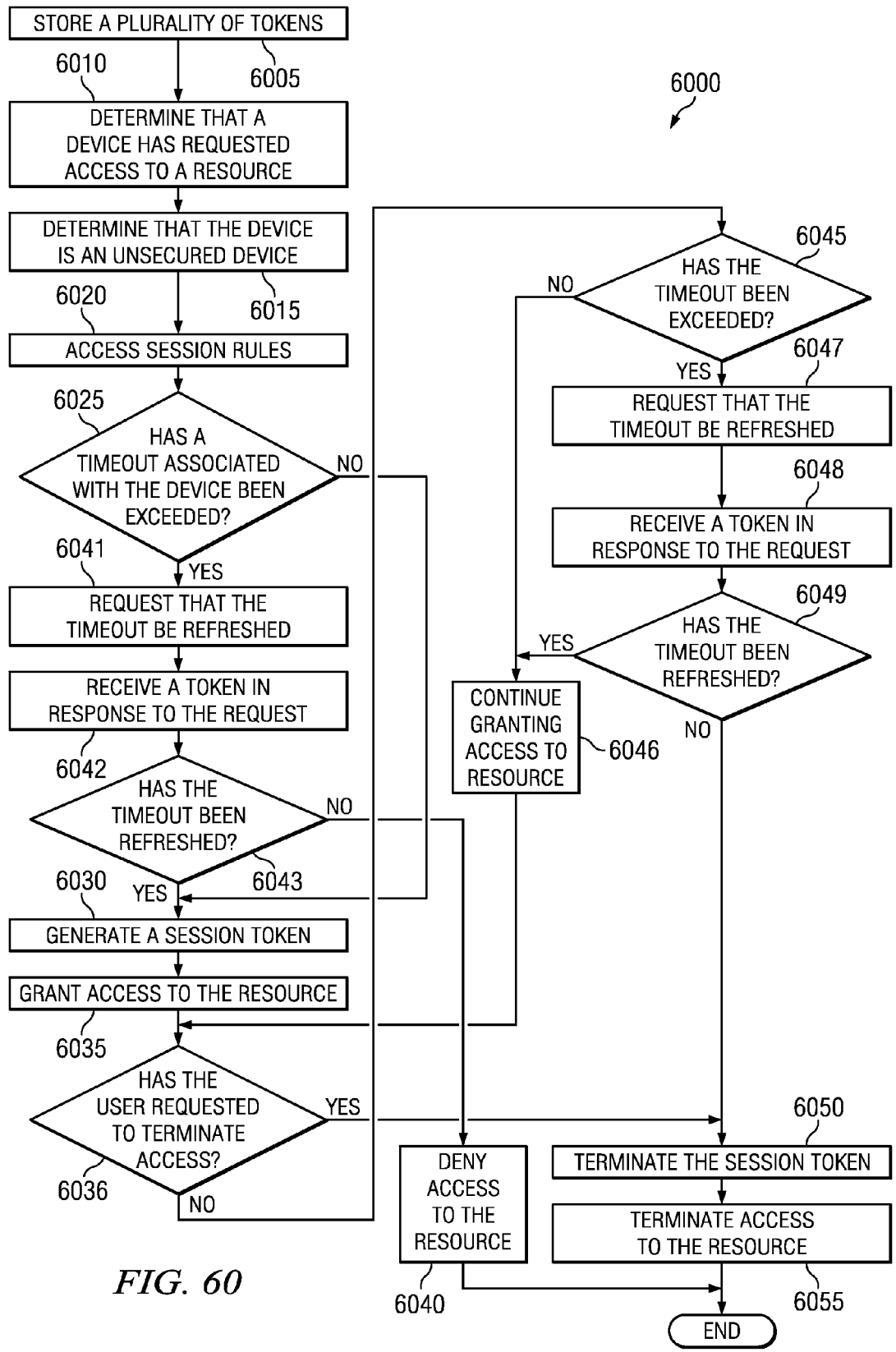
FIG. 60 is a flowchart illustrating a method of performing session validation for uncontrolled devices.

FIG. 60 illustrates a method of performing session validation for uncontrolled devices. In general, TBAC module 110 may receive requests for resource 145 from uncontrolled devices 114, such as Internet kiosks and public workstations. TBAC module 110 may grant access to the uncontrolled devices 114 if the uncontrolled device 114 has not exceeded a timeout. More details will be provided in the description of FIG. 60.

FIG. 60 illustrates a method 6000 of performing session validation for uncontrolled devices 114. TBAC module 110 may perform method 6000. TBAC module 110 may begin by storing a plurality of tokens 115 in step 6005. In step 6010 TBAC module 110 may determine that a device 114 has requested access to a resource 145. In particular embodiments, TBAC module 110 may receive a resource token 115c indicating that device 114 has requested access to resource 145. Resource 145 may be any appropriate resource 145. TBAC module 110 may determine that device 114 has requested access to resource 145 in response to receiving resource token 115c.

In step 6015, TBAC module 110 may determine that the device 114 is an unsecured device 114. In particular embodiments, TBAC module 110 may determine that the device 114 is an unsecured device 114 based on a subject token 115k associated with device 114. TBAC module 110 may receive subject token 115k from a token provider such as private token provider 128 or public token provider 126. Examples of unsecured devices include internet kiosks, public work stations, devices 114 with few security features, and/or devices 114 that are accessible by the public such as library computers, ATMs, and rental laptops. Unsecured devices 114 may also be devices 114 that lack the ability to authenticate users 112 such as cash registers. In particular embodiments, it may be desirable to limit the access granted to unsecured devices 114 in order to reduce security risks associated with granting access to an unsecured device 114. For example, unsecured devices 114 are more prone to being exposed to hackers and thieves. By limiting access to resource 145, it may reduce the time that hackers and thieves have to hack and steal information.

In step 6020, TBAC module 110 may access session rules 4130. In particular embodiments, TBAC module 110 may use resource token 115c, subject token 115k, or one or more of the plurality of tokens 115 stored in step 6005 to access session rules 4130. TBAC module 110 may use one or more of these tokens 115 to determine at least one session rule 4130 applicable to resource 145.

In particular embodiments, the at least one session rule 4130 may specify that access to resource 145 by unsecured devices 114 should be limited. For example, the at least one session rule 4130 may specify that unsecured devices 114 should only be allowed to access resource 145 for a certain period of time. In particular embodiments, this period of time may be based upon the device 114, the user 112, and/or the resource 145. For example, the at least one session rule 4130 may limit access to a bank account from unsecured devices 114 to a few minutes because the information contained in the bank account may be sensitive and confidential. As another example, the at least one session rule 4130 may limit access to a book from unsecured devices to a few hours because the book may not contain sensitive or confidential information. In both these examples, a user 112 who identifies himself as an administrator may be granted more time to these resources 145 than a general user 112. In particular embodiments, the at least one session rule 4130 may specify a timeout associated with the resource 145 and the unsecured device 114 that limits the amount of time unsecured device 114 may access resource 145.

In step 6025, TBAC module 110 may apply the at least one session rule 4130 and determine whether a timeout associated with the device 114 has been exceeded. In particular embodiments, TBAC module 110 may determine whether the timeout has exceeded based on a subject token 115k associated with device 114. The subject token 115k may indicate an amount of time that unsecured device 114 has been accessing resource 145 or an amount of time that unsecured device 114 has been active. TBAC module 110 may compare this time with the timeout indicated by the at least one session rule 4130 to determine whether the timeout has been exceeded.

If TBAC module 110 determines that the timeout has been exceeded, TBAC module 110 may continue to step 6041 to request that the timeout be refreshed. In particular embodiments, TBAC module 110 may make this request by requesting a token 115 indicating that the timeout has been refreshed. User 112 and/or device 114 may perform a series of steps to refresh the timeout. For example, user 112 may answer a prompt to refresh the timeout. As another example, user 112 and/or device 114 may perform a form of authentication, such as supplying a password, to refresh the timeout. After the timeout has been refreshed, TBAC module 110 may receive the token 115 indicating that the timeout has been refreshed in step 6042.

After TBAC module 110 receives the token 115, TBAC module 110 may determine, based on the received token 115, whether the timeout has been refreshed in step 6043. If the timeout has not been refreshed, TBAC module 110 may deny access to resource 145 in step 6040. If the timeout has been refreshed, TBAC module 110 may continue to step 6030.

If TBAC module 110 determines that the timeout has not been exceeded or that the timeout has been refreshed, TBAC module 110 may generate a session token 115j in step 6030. In particular embodiments, the at least one session rule 4130 may specify that session token 115j should be generated based at least upon the resource token 115c, subject token 115k, and/or one or more of the plurality of tokens stored in step 6005. For example, the at least one session rule may specify that session token 115j should be generated by hashing resource token 115c and subject token 115k. As another example, the at least one session rule 4130 may specify that session token 115j should be generated by hashing resource token 115c, subject token 115k, and one or more of the plurality of tokens 115 stored in step 6005, such as a network token 115f. TBAC module 110 may then grant access to resource 145 in step 6035.

In particular embodiments, user 112 may decide to terminate access to resource 145. In step 6036, TBAC module 110 may determine whether user 112 has requested to terminate access to resource 145. TBAC module 110 may receive a request from user 112 and/or device 114 to terminate access to resource 145. In particular embodiments, TBAC module 110 may receive a token 115 indicating that user 112 and/or device 114 have requested to terminate access. In response, TBAC module 110 may terminate the session token in step

6050. In particular embodiments, TBAC module 110 may terminate session token 115*j* by deleting session token 115*j*. In other embodiments, TBAC module 110 may terminate session token 115*j* by uncorrelating it with one or more stored tokens 115. TBAC module 110 may also modify session token 115*j* to terminate session token 115*j*. In step 6055, TBAC module 110 may then terminate access to resource 145. In this manner, TBAC module 110 may terminate access to resource 145 in response to a request from user 112 and/or device 114.

In step 6045, TBAC module 110 may determine whether the timeout has been exceeded. In particular embodiments, TBAC module 110 may apply the at least one session rule 4130 to determine whether the timeout has been exceeded. TBAC module 110 may compare a time indicated by a subject token 115*k* associated with device 114 to a timeout indicated by the at least one session rule 4130 to determine whether the timeout has been exceeded. If TBAC module 110 determines that the timeout has not been exceeded, TBAC module 110 may continue granting access to the resource 145.

If TBAC module 110 determines that the timeout has been exceeded, TBAC module 110 may continue to step 6047 to request that the timeout be refreshed. In particular embodiments, TBAC module 110 may make this request by requesting a token 115 indicating that the timeout has been refreshed. User 112 and/or device 114 may perform a series of steps to refresh the timeout. For example, user 112 may answer a prompt to refresh the timeout. As another example, user 112 and/or device 114 may perform a form of authentication, such as supplying a password, to refresh the timeout. After the timeout has been refreshed, TBAC module 110 may receive the token 115 indicating that the timeout has been refreshed in step 6048.

After TBAC module 110 receives the token 115, TBAC module 110 may determine, based on the received token 115, whether the timeout has been refreshed in step 6049. If the timeout has not been refreshed, TBAC module 110 may continue to step 6050. If the timeout has been refreshed, TBAC module 110 may continue granting access to resource 145 in step 6046.

Figure 61:
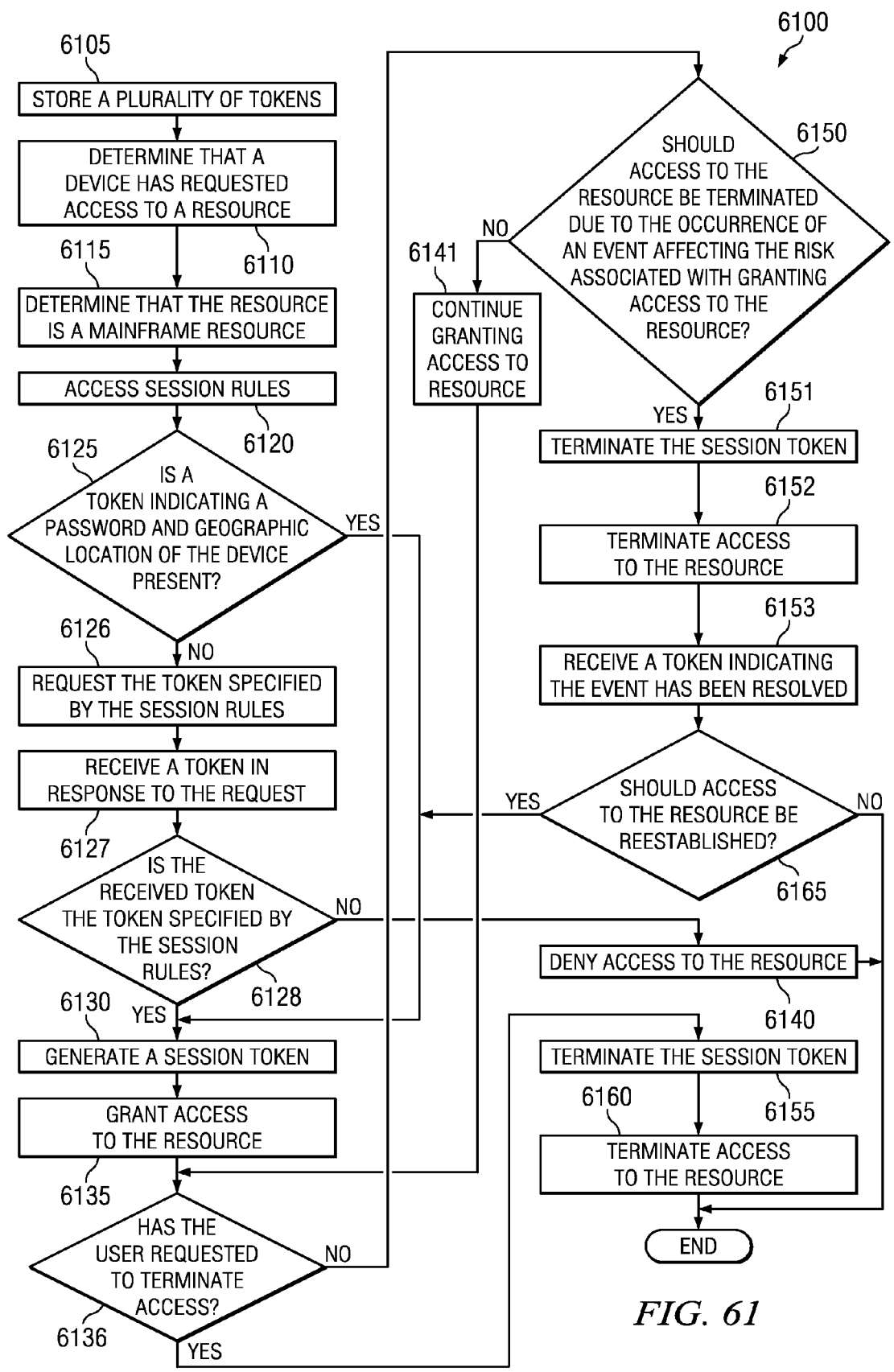
FIG. 61 is a flowchart illustrating a method of performing session validation to access mainframe resources.

FIG. 61 illustrates a method of performing session validation to access mainframe resources. In general, TBAC module 110 may receive, from a device 114, requests for a resource 145 associated with a mainframe. TBAC module 110 may grant access to the resource 145 if a password and a geographic location associated with the device have been provided. More details will be provided in the description of FIG. 61.

FIG. 61 illustrates a method 6100 of performing session validation to access mainframe resources 145. TBAC module 110 may perform method 6100. TBAC module 110 may begin by storing a plurality of tokens 115 in step 6105. In step 6110, TBAC module 110 may determine that a device 114 has requested access to a resource 145. In particular embodiments, TBAC module 110 may receive a resource token 115*c* indicating that device 114 has requested access to resource 145. TBAC module 110 may determine that device 114 has requested access to resource 145 in response to receiving resource token 115*c*.

In step 6115, TBAC module 110 may determine that resource 145 is a mainframe resource 145. In particular embodiments, resource token 115*c* may indicate that resource 145 is a mainframe resource 145. TBAC module 110 may determine that resource 145 is a mainframe resource 145 based on resource token 115*c*. A mainframe resource 145 may be a resource 145 that is generally accessed by a mainframe such as for example administrative tools, hardware management tools, diagnostic tools, and software management tools. Although this disclosure describes particular examples of mainframe resources 145, this disclosure contemplates any suitable mainframe resources 145.

In particular embodiments, it may be desirable to limit access to mainframe resources 145 in order to reduce the risk that mainframe settings and functions are tampered. Furthermore, mainframe resources may be costly, so it may be desirable to restrict access so that general users 112 do not waste mainframe resources 145. TBAC module 110 may limit who and from where these resources 145 may be accessed. For example, TBAC module 110 may limit access to mainframe resources 145 to administrators from the administrators' offices. As another example, TBAC module 110 may limit access to mainframe resources 145 to IT staff from a mainframe room. In this manner, TBAC module 110 may reduce the risk that an improper or unauthorized change occurs at the hands of a hacker or a tamperer. TBAC module 110 may receive and/or store a subject token 115*k* that indicates information related to who and from where resource 145 may be accessed.

In step 6120, TBAC module 110 may access session rules 4130. In particular embodiments, TBAC module 110 may use resource token 115*c*, subject token 115*k*, and one or more of the plurality of tokens 115 stored in step 6105 to access session rules 4130. TBAC module 110 may use one or more of these tokens 115 to determine at least one session rule 4130 applicable to resource 145.

In particular embodiments, the at least one session rule 4130 may specify that access to the mainframe resource 145 may be granted if a token 115 indicating a password and a geographic location of a device 114 used to request access to the resource 145 is present. When determining access to a mainframe resource 145, the password may identify a user 112 who may be authorized to access the mainframe resource 145. The geographic location of the device 114 may be used to determine from where the request is being made. For example, the at least one session rule 4130 may specify that access to mainframe resources 145 may only be granted to administrators from the administrators' offices. The password may be used to identify the administrator and the geographic location may be used to determine if the request is coming from the administrator's office. If a token 115 indicating a password identifying the administrator and that the request for access was made from the administrator's office is present, then TBAC module 110 may grant access to mainframe resource 145 according to the at least one session rule. Although this disclosure describes the at least one session rule 4130 and the token 115 indicating particular examples of users 112 and geographic locations, this disclosure contemplates the at least one session rule 4130 and the token 115 indicating any appropriate user 112 and any appropriate geographic location.

In step 6125, TBAC module 110 may determine whether the token 115 indicating a password and geographic location of the device 114 is present. In particular embodiments, TBAC module 110 may apply the at least one session rule 4130 to determine whether the token 115 is present. If the token 115 is not present, TBAC module 110 may request the token 115 in step 6126. TBAC module 110 may receive a token 115 such as a subject token 115*k* in response to the request in step 6127. If the received token 115 is not the token 115 specified by the at least one session rule 4130, then TBAC module 110 may deny access to the resource 145 in step 6140. If the received token 115 is the specified token 115, then TBAC module 110 may continue to step 6130.

If the token 115 is present, TBAC module 110 may generate a session token 115*j* in step 6130. In particular embodiments, the at least one session rule 4130 may specify that session token 115*j* should be generated based at least upon the resource token 115*c* and one or more of the plurality of tokens stored in step 6105. For example, the at least one session rule may specify that session token 115*j* should be generated by hashing resource token 115*c* and subject token 115*k*. As another example, the at least one session rule 4130 may specify that session token 115*j* should be generated by hashing resource token 115*c*, subject token 115*k*, and one or more of the plurality of tokens 115 stored in step 6105, such as network token 115*f*. TBAC module 110 may then grant access to resource 145 in step 6135.

In particular embodiments, user 112 may decide to terminate access to resource 145. In step 6136, TBAC module 110 may determine whether user 112 has requested to terminate access to resource 145. TBAC module 110 may receive a request from user 112 and/or device 114 to terminate access to resource 145. In particular embodiments, TBAC module 110 may receive a token 115 indicating that user 112 and/or device 114 have requested to terminate access. In response, TBAC module 110 may terminate the session token in step 6155. In particular embodiments, TBAC module 110 may terminate session token 115*j* by deleting session token 115*j*. In other embodiments, TBAC module 110 may terminate session token 115*j* by uncorrelating it with one or more stored tokens 115. TBAC module 110 may also modify session token 115*j* to terminate session token 115*j*. In step 6160, TBAC module 110 may then terminate access to resource 145. In this manner, TBAC module 110 may terminate access to resource 145 in response to a request from user 112 and/or device 114.

TBAC module 110 may determine that an event affecting the risk associated with granting access to resource 145 has occurred. In particular embodiments, TBAC module 110 may receive an event token 115*x* indicating the occurrence of an event affecting the risk associated with granting access to resource 145. For example, TBAC module 110 may receive an event token 115*x* indicating that an alarm in the mainframe room has triggered thus increasing the risk that unauthorized access to mainframe resource 145 is occurring. As another example, TBAC module 110 may receive an event token 115*x* indicating that a session has been idle for too long thus increasing the chances that mainframe resources 145 are being wasted. In response to receiving event token 115*x*, TBAC module 110 may determine that the event has occurred.

TBAC module 110 may then continue to step 6150 to determine whether access to resource 145 should be terminated due to the event. In particular embodiments, the at least one session rule 4130 may specify whether access should be terminated due to the event. TBAC module 110 may apply the at least one session rule 4130 to determine whether to terminate access to resource 145. If access to resource 145 should not be terminated, TBAC module 110 may continue granting access to resource 145 in step 6141.

If access to resource 145 should be terminated, TBAC module 110 may continue to terminate the session token 115*j* in step 6151. In step 6152, TBAC module 110 may then terminate access to resource 145. In this manner, TBAC module 110 may terminate access to resource 145 in response to the occurrence of the event.

In particular embodiments, TBAC module 110 may receive a token 115 indicating that the event has been resolved in step 6153. For example, TBAC module 110 may receive a subject token 115*k* indicating that a user 112 and/or device 114 has performed a form of re-authentication to refresh an idle session. As another example, TBAC module 110 may receive a token 115 indicating that a previously triggered alarm has been resolved.

In step 6165, TBAC module 110 may determine whether access to resource 145 should be reestablished in response to receiving the token 115 indicating that the event has been resolved. In particular embodiments, the at least one session rule 4130 may specify that access to resource 145 may be reestablished if the token 115 is present. TBAC module 110 may receive the particular token 115 and apply the at least one session rule 4130 to determine that access to resource 145 should be reestablished. If the token 115 is present, TBAC module may continue to step 6130. However, if TBAC module 110 determines that access should not be reestablished, TBAC module 110 may conclude method 6100.

Figure 62:
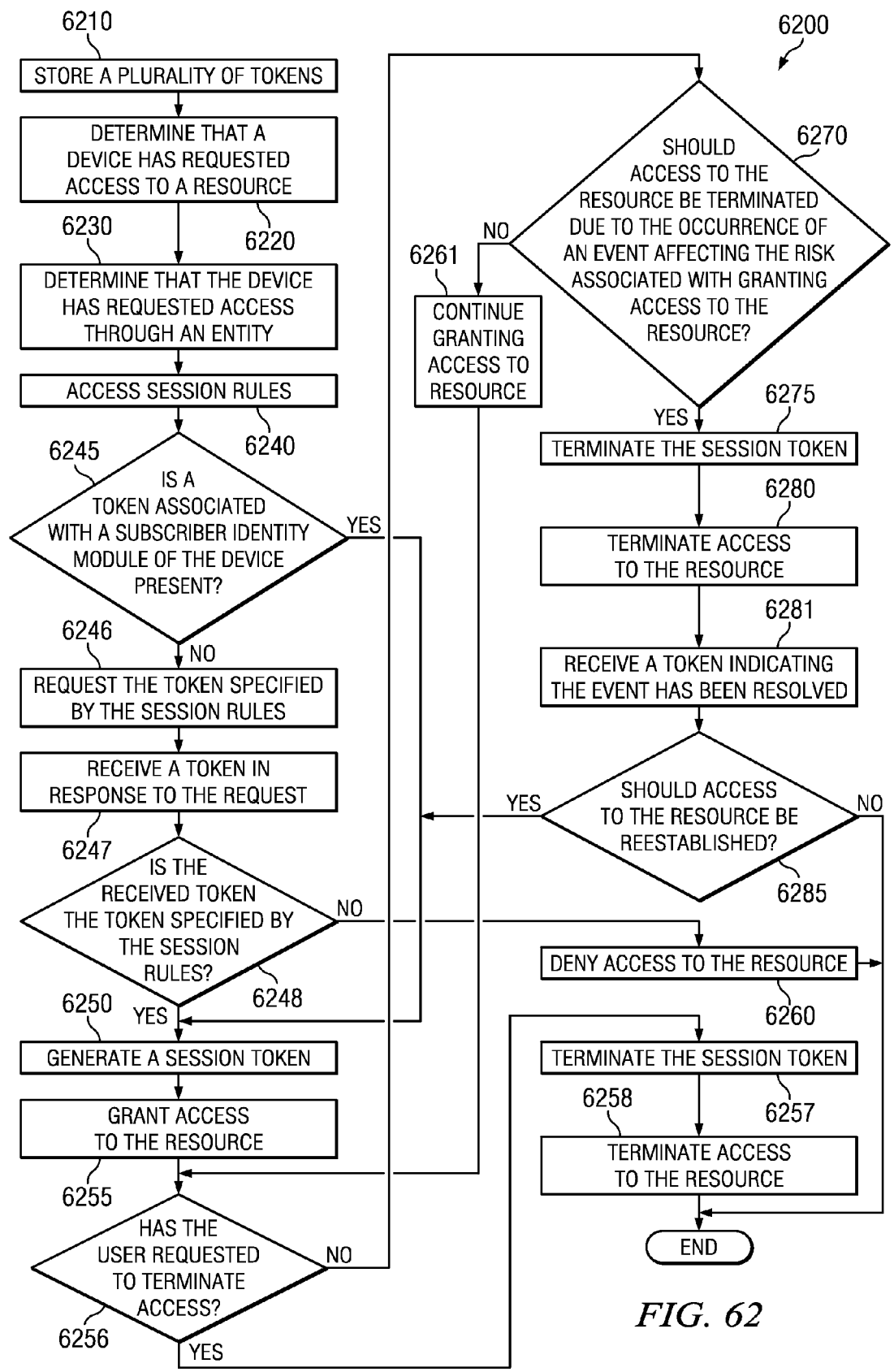
FIG. 62 is a flowchart illustrating a method of performing session validation to access third party resources.

FIG. 62 illustrates a method of performing session validation to access third party resources. In general, TBAC module 110 may be notified by an entity that a device 114 has requested access to a resource 145 through the entity. TBAC module 110 may grant access to the resource if the device 114 has been properly identified by its subscriber identity module. More details will be provided in the description of FIG. 62.

FIG. 62 illustrates a method 6200 of performing session invalidation to access third party resources 145. TBAC module 110 may perform method 6200. TBAC module 110 may begin by storing a plurality of tokens 115 in step 6210. In step 6220, TBAC module 110 may determine that a device 114 has requested access to a resource 145. In particular embodiments, TBAC module 110 may receive a resource token 115*c* indicating that device 114 has requested access to resource 145. TBAC module 110 may determine that device 114 has requested access to resource 145 in response to receiving resource token 115*c*.

In step 6230, TBAC module 110 may determine that device 114 has requested access to resource 145 through an entity. In particular embodiments, resource 145 may be under the control or ownership of the entity, and resource token 115*c* may have been generated and sent by a process initiated by the entity. As an example and not by way of limitation, a vendor may request payment from a distributor. The distributor may then forward the vendor's payment request to TBAC module 110. TBAC module 110 may then determine whether the vendor's payment request should be allowed. As another example, a customer may want to make a purchase from a store. The store may forward the customer's purchase request to TBAC module 110 to determine if the purchase should be allowed. Although this disclosure describes requests for particular transactions sent by particular entities, this disclosure contemplates any appropriate request sent by any appropriate entity.

In particular embodiments, it may be desirable for the entity to rely on TBAC module 110 to determine whether the request should be allowed so that the entity does not have to invest in its own access control system. It may also be desirable for the entity to rely on TBAC module 110 to determine whether the request should be allowed because the entity's access control system may not be as robust as TBAC module 110. For example, the entity may rely upon a username and password authentication scheme to determine whether requests should be allowed. However, TBAC module 110 may consider usernames, passwords, environment, context, resource integrity, and many other factors to determine whether access should be granted.

In step 6240, TBAC module 110 may access session rules 4130. In particular embodiments, TBAC module 110 may use resource token 115*c* and one or more of the plurality of tokens stored in step 6210 to access session rules 4130. TBAC module 110 may use one or more of these tokens 115 to determine at least one session rule 4130 applicable to resource 145.

In particular embodiments, the at least one session rule 4130 may specify that access to resource 145 may be granted if a token 115 associated with a subscriber identity module of the device 114 is present. Even though device 114 may have provided some form of authentication to access resource 145, if the device 114 includes a subscriber identity module then authentication provided by device 114 may be more reliable. Although this disclosure describes the at least one session rule 4130 specifying a particular condition for granting access to resource 145, this disclosure contemplates the at least one session rule 4130 specifying any appropriate conditions to grant access to resource 145. For example, TBAC module 110 may consider a form of authentication associated with resource 145, such as Kerberos authentication, to determine whether access should be granted. As another example, TBAC module 110 may consider a form of encryption associated with network 120 to determine whether access should be granted. A subscriber identity module of device 114 is described as an example of one of several factors that TBAC module 110 may consider to determine whether access may be granted.

In step 6245, TBAC module 110 may apply the at least one session rule 4130 to determine whether a token 115, such as subject token 115k, associated with a subscriber identity module of the device 114 is present. If the token 115 is present and hence device 114 is associated with a subscriber identity module, TBAC module 110 may provide greater assurance to the entity that the device 114 is authorized to access resource 145. If the token 115 is not present, TBAC module 110 may request the token 115 in step 6246. After making the request, TBAC module 110 may receive a token 115 from a token provider such as private token provider 128 or public token provider 126 in step 6247. TBAC module 110 may then determine if the received token 115 is the token 115 specified by the at least one session rule 4130. If it is, TBAC module 110 may continue to step 6250. If not, TBAC module 110 may deny access to resource 145 in step 6260.

If the token 115 is present or has been received, TBAC module 110 may generate a session token 115j in step 6250. In particular embodiments, the at least one session rule 4130 may specify that session token 115j should be generated based at least upon the resource token 115c and one or more of the plurality of tokens stored in step 6210. For example, the at least one session rule may specify that session token 115j should be generated by hashing resource token 115c and subject token 115k. As another example, the at least one session rule 4130 may specify that session token 115j should be generated by hashing resource token 115c, subject token 115k, and one or more of the plurality of tokens 115 stored in step 6210, such as subject token 115k. TBAC module 110 may then grant access to resource 145 in step 6255.

In particular embodiments, user 112 may decide to terminate access to resource 145. In step 6256, TBAC module 110 may determine whether user 112 has requested to terminate access to resource 145. TBAC module 110 may receive a request from user 112 and/or device 114 to terminate access to resource 145. In particular embodiments, TBAC module 110 may receive a token 115 indicating that user 112 and/or device 114 have requested to terminate access. In response, TBAC module 110 may terminate the session token in step 6257. In particular embodiments, TBAC module 110 may terminate session token 115j by deleting session token 115j. In other embodiments, TBAC module 110 may terminate session token 115j by uncorrelating it with one or more stored tokens 115. TBAC module 110 may also modify session token 115j to terminate session token 115j. In step 6258, TBAC module 110 may then terminate access to resource 145. In this manner, TBAC module 110 may terminate access to resource 145 in response to a request from user 112 and/or device 114.

In particular embodiments, TBAC module 110 may determine that an event affecting the risk associated with granting access to resource 145 has occurred. In particular embodiments, TBAC module 110 may receive an event token 115x indicating the occurrence of an event affecting the risk associated with granting access to resource 145. For example, event token 115x may indicate that a security breach has occurred at the entity thus increasing the risk that the request sent by the entity was incorrect or falsified. As another example, event token 115x may indicate that device 114 has been infected by a virus thus increasing the chances that subject token 115k associated with the subscriber identity module of device 114 is falsified or erroneous. In response to receiving event token 115x, TBAC module 110 may determine that the event has occurred.

TBAC module 110 may then continue to step 6270 to determine whether access to resource 145 should be terminated due to the event. In particular embodiments, the at least one session rule 4130 may specify whether access should be terminated due to the event. TBAC module 110 may apply the at least one session rule 4130 to determine whether to terminate access to resource 145. If access to resource 145 should not be terminated, TBAC module 110 may continue granting access to resource 145 in step 6261.

If access to resource 145 should be terminated, TBAC module 110 may continue to terminate the session token 115j in step 6275. In step 6280, TBAC module 110 may then terminate access to resource 145. In this manner, TBAC module 110 may terminate access to resource 145 in response to the occurrence of the event.

In particular embodiments, TBAC module 110 may receive a token 115 indicating that the event has been resolved in step 6281. For example, the token 115 may indicate that a virus on device 114 has been removed or that a security breach associated with the entity has been resolved. After the event has been resolved, access to resource 145 may be reestablished.

In step 6285, TBAC module 110 may determine whether access to resource 145 should be reestablished. In particular embodiments, the at least one session rule 4130 may specify that access to resource 145 may be reestablished if a particular token 115, such as a subject token 115k, indicating that the event has been resolved is present. TBAC module 110 may receive the particular token 115 and apply the at least one session rule 4130 to determine that access to resource 145 should be reestablished. If access should be reestablished, TBAC module 110 may continue to step 6250. However, if TBAC module 110 determines that access should not be reestablished, TBAC module 110 may conclude method 6200.

Figure 63:
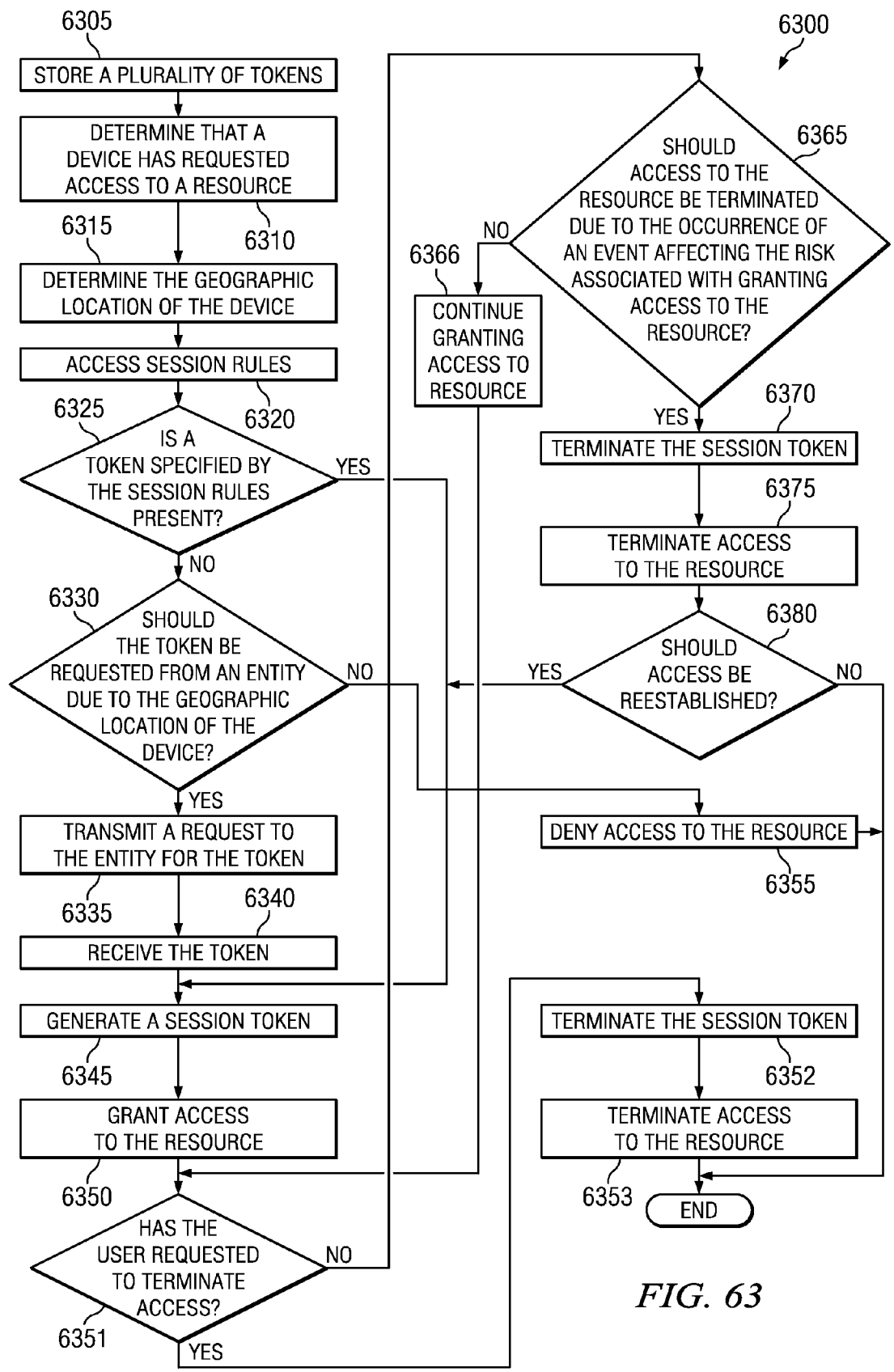
FIG. 63 is a flowchart illustrating a method of performing third party session validation.

FIG. 63 illustrates a method of performing third party session validation. In general, TBAC module 110 may receive a request from a device 114 to access a resource 145. TBAC module 110 may determine that, based on the geographic location of the device 114, a third party should authenticate the device 114 before access may be granted. More details will be provided in the description of FIG. 63.

FIG. 63 illustrates a method 6300 of performing third party session validation. TBAC module 110 may perform method 6300. TBAC module 110 may begin by storing a plurality of tokens 115 in step 6305. In step 6310, TBAC module 110 may determine that a device 114 has requested access to a resource 145. In particular embodiments, TBAC module 110 may receive a resource token 115c indicating that device 114 has requested access to resource 145. TBAC module 110 may determine that device 114 has requested access to resource 145 in response to receiving resource token 115c.

In step 6315, TBAC module 110 may determine the geographic location of the device 114. In particular embodiments, TBAC module 110 may determine the geographic location of the device 114 based on a subject token 115k associated with device 114. As an example and not by way of limitation, TBAC module 110 may determine that device 114 is located in a different country than TBAC module 110 based on subject token 115k. In particular embodiments, it may be desirable to determine the geographic location of device 114. Devices 114 in different countries than TBAC module 110 may utilize different communication and security standards than TBAC module 110. By determining the geographic location of device 114, TBAC module 110 may be able to process communications from device 114 effectively. Furthermore, by determining the geographic location of device 114, TBAC module 110 may be able to employ the appropriate security processes.

In step 6320, TBAC module 110 may access session rules 4130. In particular embodiments, TBAC module 110 may use resource token 115c and one or more of the plurality of tokens 115 stored in step 6305 to access session rules 4130. TBAC module 110 may use one or more of these tokens 115 to determine at least one session rule 4130 applicable to resource 145.

In particular embodiments, the at least one session rule 4130 may specify that access to resource 145 may be granted if a particular token 115 is present. Moreover, the at least one session rule 4130 may specify an entity from which the token 115 may be requested if the token 115 is not present and if the geographic location of the device 114 necessitates the request. As an example and not by way of limitation, the at least one session rule 4130 may specify that the token 115 should be requested from an alternative service provider if the token 115 is not present and if the device is located in a different country than TBAC module 110. In particular embodiments, device 114 may not be able to directly communicate with an element of system 100 if device 114 is in a different country than system 100 because of differences in communication or security standards. Device 114 may communicate instead with alternative service provider, which can account for the different communication and security standards to communicate with system 100.

In step 6325, TBAC module 110 may apply the at least one session rule 4130 and determine whether the token 115 specified by the at least one session rule 4130 is present. If the token 115 is present, TBAC module 110 may continue to generate a session token 115j in step 6345. For example, alternative service provider may have already provided the token 115.

If the token 115 is not present, TBAC module 110 may apply the at least one session rule 4130 to determine whether the token 115 should be requested from an entity, such as an alternative service provider, due to the geographic location of the device 114 in step 6330. If TBAC module 110 determines that the token 115 should not be requested from an entity, TBAC module 110 may conclude by denying access to the resource 145 in step 6355.

If TBAC module 110 determines that the token 115 should be requested from an entity, TBAC module 110 may transmit a request for the token 115 to the entity in step 6335. In step 6340, TBAC module 110 may receive the token 115 in response to the request to the entity. As an example and not by way of limitation, the at least one session rule 4130 may specify that the token 115 should be requested from an alternative service provider if device 114 is in a different country than TBAC module 110. TBAC module 110 may determine, based on subject token 115k, that device 114 is in a different country. TBAC module 110 may also determine that the token 115 specified by the at least one session rule 4130 is not present. In response to these determinations, TBAC module 110 may then request and receive the token 115 from the alternative service provider.

TBAC module 110 may then continue to generate a session token 115j in step 6345. In particular embodiments, TBAC module 110 may generate session token 115j by combining the particular token 115 specified by the at least one session rule 4130 with one or more of the tokens 115 stored in step 6305. For example, TBAC module 110 may hash the particular token 115 with a subject token 115k stored in step 6305 to generate session token 115j. TBAC module 110 may then continue to step 6350 to grant access to resource 145. As part of granting access to resource 145, TBAC module 110 may correlate session token 115j with one or more of the tokens 115 stored in step 6305.

In particular embodiments, a user 112 associated with device 114 may decide to terminate access to resource 145. In step 6351, TBAC module 110 may determine whether user 112 has requested to terminate access to resource 145. TBAC module 110 may receive a request from user 112 and/or device 114 to terminate access to resource 145. In particular embodiments, TBAC module 110 may receive a token 115 indicating that user 112 and/or device 114 have requested to terminate access. In response, TBAC module 110 may terminate the session token in step 6352. In particular embodiments, TBAC module 110 may terminate session token 115j by deleting session token 115j. In other embodiments, TBAC module 110 may terminate session token 115j by uncorrelating it with one or more stored tokens 115. TBAC module 110 may also modify session token 115j to terminate session token 115j. In step 6353, TBAC module 110 may then terminate access to resource 145. In this manner, TBAC module 110 may terminate access to resource 145 in response to a request from user 112 and/or device 114.

In particular embodiments, TBAC module 110 may determine that an event affecting the risk associated with granting access to resource 145 has occurred. In particular embodiments, TBAC module 110 may receive an event token 115x indicating the occurrence of an event affecting the risk associated with granting access to resource 145. For example, event token 115x may indicate that a security breach associated with the alternative service provider has occurred thus increasing the risk that communications from device 114 have been compromised en route to system 100. As another example, event token 115x may indicate that device 114 has moved to a location that cannot communicate with the alternative service provider and thus device 114 would be subject to differences in communication and security standards. In response to receiving event token 115x, TBAC module 110 may determine that the event has occurred.

TBAC module 110 may then continue to step 6365 to determine whether access to resource 145 should be terminated due to the event. In particular embodiments, the at least one session rule 4130 may specify whether access should be terminated due to the event. TBAC module 110 may apply the at least one session rule 4130 to determine whether to terminate access to resource 145. If access to resource 145 should not be terminated, TBAC module 110 may continue granting access to resource 145 in step 6366.

If access to resource 145 should be terminated, TBAC module 110 may continue to terminate the session token 115*j* in step 6370. In step 6375, TBAC module 110 may then terminate access to resource 145. In this manner, TBAC module 110 may terminate access to resource 145 in response to the occurrence of the event.

In step 6380, TBAC module 110 may determine whether access to resource 145 should be reestablished. In particular embodiments, the at least one session rule 4130 may specify that access to resource 145 may be reestablished if a particular token 115, such as a subject token 115*k*, indicating that the event has been resolved is present. For example, the particular token 115 may indicate that a security breach associated with the alternative service provider has been resolved. As another example, the particular token 115 may indicate that device 114 has reestablished communication with the alternative service provider. TBAC module 110 may receive the particular token 115 and apply the at least one session rule 4130 to determine that access to resource 145 should be reestablished. TBAC module 110 may then continue to step 6345. However, if TBAC module 110 determines that access should not be reestablished, TBAC module 110 may conclude method 6300.

Figure 64:
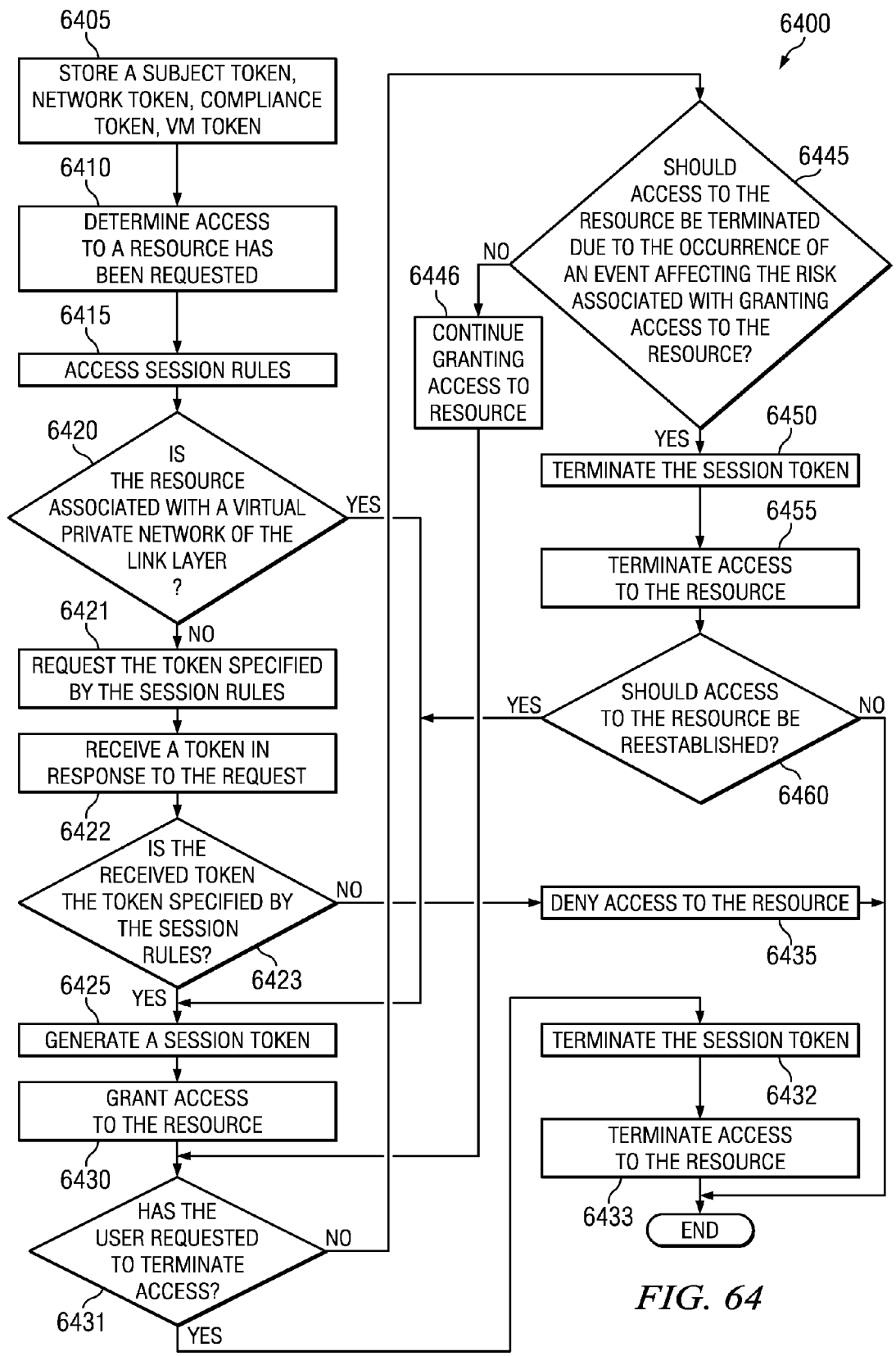
FIG. 64 is a flowchart illustrating a method of performing network session validation.

FIG. 64 illustrates a method of performing network session validation. In general, TBAC module 110 may receive requests for a resource 145. TBAC module 110 may grant access to the resource 145 if the resource 145 is associated with a virtual private network. More details will be provided in the description of FIG. 64.

FIG. 64 illustrates a method 6400 of performing network session validation. TBAC module 110 may perform method 6400. TBAC module 110 may begin by storing subject token 115*k*, network token 115*f*, among others as appropriate, in step 6405. In step 6410, TBAC module 110 may determine that access to a resource 145 has been requested. In particular embodiments, TBAC module 110 may receive a resource token 115*c* indicating that access to resource 145 has been requested. TBAC module 110 may determine that access to the resource 145 has been requested in response to receiving resource token 115*c*.

In step 6415, TBAC module 110 may access session rules 4130. In particular embodiments, TBAC module 110 may use resource token 115*c* and one or more of the tokens 115 stored in step 6405 to access session rules 4130. TBAC module 110 may use one or more of these tokens 115 to determine at least one session rule applicable to resource 145.

In particular embodiments, the at least one session rule 4130 may specify that access to resource 145 may be granted if a token 115 indicating that the resource 145 is associated with a virtual private network of the link layer of the open systems interconnection model is present. A virtual private network associated with resource 145 may provide more secure access to resource 145. As an example and not by way of limitation, a virtual private network associated with resource 145 may make it more difficult for resource 145 to be hacked or spoofed. A virtual private network also loosens geographical constraints on accessing resource 145. For example, if resource 145 is associated with a virtual private network, it is not necessary for a device 114 requesting access to resource 145 to be located on the same network 120 as resource 145.

In particular embodiments, the token 115 may further indicate particular aspects of features associated with the virtual private network. For example, the token 115 may also indicate a connection strength and connection speed associated with the virtual private network. The token 115 may also indicate the physical and/or ip addresses of the networks 120 forming the virtual private network. As another example, the token 115 may also indicate the ip addresses of the device 114 and/or resource 145. Although this disclosure describes the token 115 indicating particular aspects and/or features associated with the virtual private network, this disclosure contemplates the token 115 indicating any appropriate aspects and/or features associated with the virtual private network.

In step 6420, TBAC module 110 may apply the at least one session rule 4130 to determine whether the token 115 indicating that resource 145 is associated with a virtual private network of the link layer is present. If TBAC module 110 determines that the token 115 is not present and, TBAC module 110 may request token 115 in step 6421. After requesting token 115, TBAC module 110 may receive a token 115 in response to the request in step 6422. In step 6423, TBAC module 110 may determine whether the received token 115 is the token 115 specified by the at least one session rule 4130. If the received token 115 is not the token 115 specified by the at least one session rule 4130, TBAC module 110 may conclude by denying access to the resource 145 in step 6435. If the received token 115 is the token 115 specified by the at least one session rule 4130, TBAC module 110 may continue to step 6424.

If TBAC module 110 determines that the token 115 is present or received, then TBAC module 110 may generate a session token 115*j* in step 6425. In particular embodiments, TBAC module 110 may generate session token 115*j* by combining the particular token 115 specified by the at least one session rule 4130 with one or more of the tokens 115 stored in step 6405. For example, TBAC module 110 may hash the particular token 115 with a subject token 115*k* stored in step 6405 to generate session token 115*j*. TBAC module 110 may then continue to step 6430 to grant access to resource 145. As part of granting access to resource 145, TBAC module 110 may correlate session token 115*j* with one or more of the tokens 115 stored in step 6405.

In particular embodiments, a user 112 associated with device 114 may decide to terminate access to resource 145. In step 6431, TBAC module 110 may determine whether user 112 has requested to terminate access to resource 145. TBAC module 110 may receive a request from user 112 and/or device 114 to terminate access to resource 145. In particular embodiments, TBAC module 110 may receive a token 115 indicating that user 112 and/or device 114 have requested to terminate access. In response, TBAC module 110 may terminate the session token in step 6432. In particular embodiments, TBAC module 110 may terminate session token 115*j* by deleting session token 115*j*. In other embodiments, TBAC module 110 may terminate session token 115*j* by uncorrelating it with one or more stored tokens 115. TBAC module 110 may also modify session token 115*j* to terminate session token 115*j*. In step 6433, TBAC module 110 may then terminate access to resource 145. In this manner, TBAC module 110 may terminate access to resource 145 in response to a request from user 112 and/or device 114.

In particular embodiments, TBAC module 110 may determine that an event affecting the risk associated with granting access to resource 145 has occurred. In particular embodiments, TBAC module 110 may receive an event token 115*x* indicating the occurrence of an event affecting the risk associated with granting access to resource 145. For example, event token 115*x* may indicate that a connection associated with device 114 has experienced a security breach, thus increasing the risk of unauthorized or inappropriate communications over the virtual private network. As another example, event token 115*x* may indicate that resource 145 has been exposed to a virus thus increasing the risk that device 114 may be exposed as a result of accessing resource 145. In response to receiving event token 115x, TBAC module 110 may determine that the event has occurred.

TBAC module 110 may then continue to step 6445 to determine whether access to resource 145 should be terminated due to the event. In particular embodiments, the at least one session rule 4130 may specify whether access should be terminated due to the event. TBAC module 110 may apply the at least one session rule 4130 to determine whether to terminate access to resource 145. If access to resource 145 should not be terminated, TBAC module 110 may continue granting access to resource 145 in step 6446.

If access to resource 145 should be terminated, TBAC module 110 may continue to terminate the session token 115j in step 6450. In step 6455, TBAC module 110 may then terminate access to resource 145. In this manner, TBAC module 110 may terminate access to resource 145 in response to the occurrence of the event.

In step 6460, TBAC module 110 may determine whether access to resource 145 should be reestablished. In particular embodiments, the at least one session rule 4130 may specify that access to resource 145 may be reestablished if a particular token 115, such as a subject token 115k, indicating that the event has been resolved is present. For example, the particular token 115 may indicate that a security breach associated with device 114 has been resolved. As another example, the particular token 115 may indicate that a virus associated with resource 145 has been removed. TBAC module 110 may receive the particular token 115 and apply the at least one session rule 4130 to determine that access to resource 145 should be reestablished. TBAC module 110 may then reestablish access to the resource 145 by continuing to step 6425. However, if TBAC module 110 determines that access should not be reestablished, TBAC module 110 may conclude method 6400.

Figure 65:
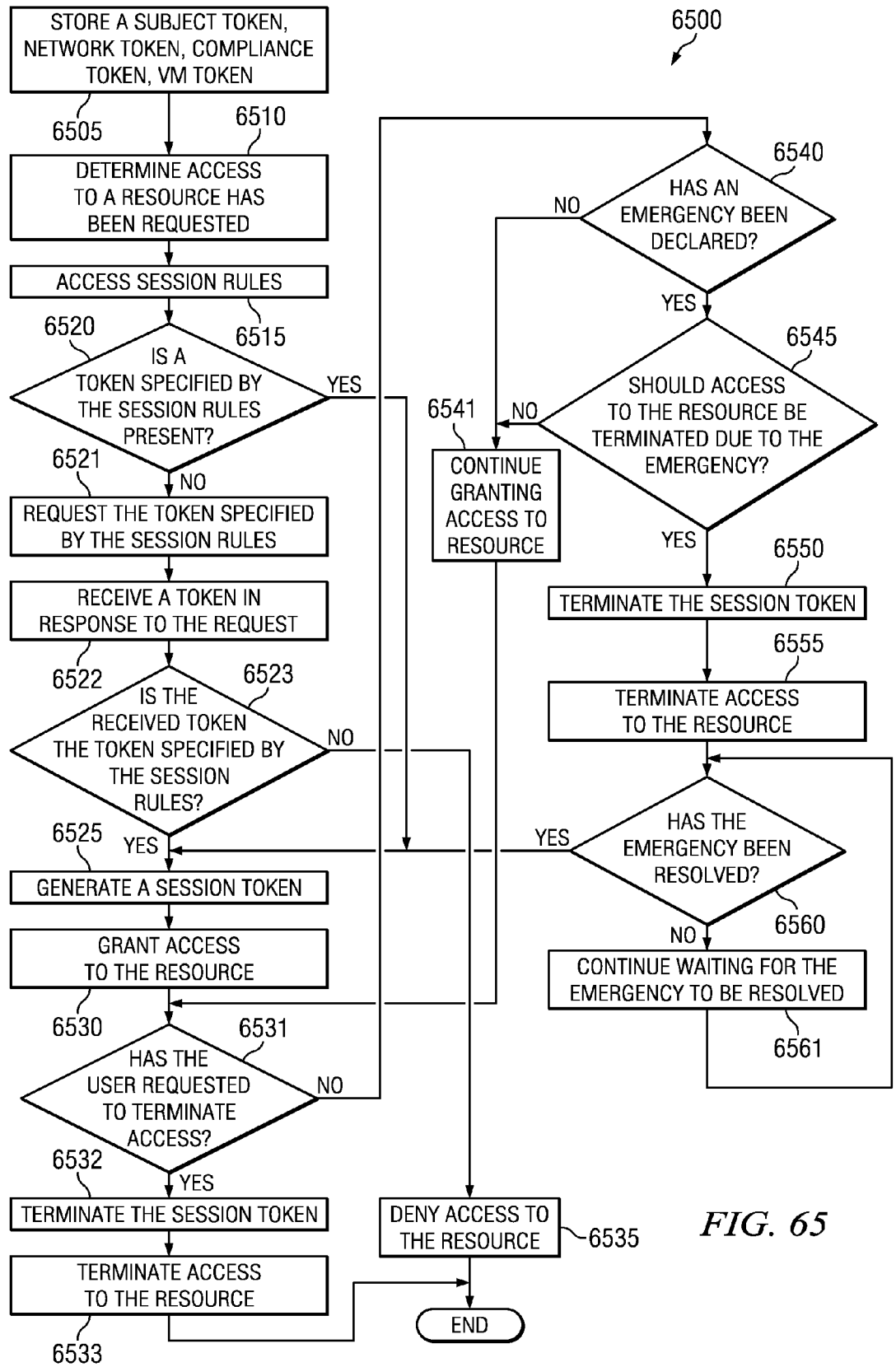
FIG. 65 is a flowchart illustrating a method of performing emergency session validation.

FIG. 65 illustrates a method of performing emergency session validation. In general, TBAC module 110 may limit or terminate access to a resource 145 when an emergency has been declared. More details will be provided in the description of FIG. 65.

FIG. 65 illustrates a method 6500 of performing emergency session validation. TBAC module 110 may perform method 6500. TBAC module 110 may begin by storing a subject token 115k, network token 115f, among others as appropriate, in step 6505. In step 6510, TBAC module 110 may determine that access to a resource 145 has been requested by a user 112. In particular embodiments, TBAC module 110 may receive a resource token 115c indicating that user 112 has requested access to resource 145. In response to receiving resource token 115c, TBAC module 110 may determine that access to resource 145 has been requested.

TBAC module 110 may continue to step 6515 and access session rules 4130. In particular embodiments, TBAC module 110 may use one or more of the previously described tokens 115 to access session rules 4130, and to determine at least one session rule 4130 applicable to resource 145. The at least one session rule 4130 may specify that access to resource 145 may be granted if a particular token 115 is present. In step 6520, TBAC module 110 may determine whether the particular token 115 specified by the at least one session rule 4130 is present.

If the particular token 115 is not present, TBAC module 110 may request the particular token 115 in step 6521. After making the request, TBAC module 110 may receive a token 115 in step 6522. In step 6523, TBAC module 110 may determine whether the received token 115 is the particular token 115. If it is not, TBAC module 110 may deny access to the resource 145 in step 6535. If the received token 115 is the particular token 115, TBAC module 110 may continue to step 6525.

If the particular token 115 specified by the at least one session rule 4130 is present or has been received, TBAC module 110 may generate a session token 115j in step 6525. In particular embodiments, TBAC module 110 may generate session token 115j by combining the particular token 115 specified by the at least one session rule 4130 with one or more of the tokens 115 stored in step 6505. For example, TBAC module 110 may hash the particular token 115 with a subject token 115k stored in step 6505 to generate session token 115j. TBAC module 110 may then continue to step 6530 to grant access to resource 145. As part of granting access to resource 145, TBAC module 110 may correlate session token 115j with one or more of the tokens 115 stored in step 6505.

In particular embodiments, the user 112 may decide to terminate access to resource 145. In step 6531, TBAC module 110 may determine whether user 112 has requested to terminate access to resource 145. TBAC module 110 may receive a request from user 112 and/or a device 114 associated with user 112 to terminate access to resource 145. In particular embodiments, TBAC module 110 may receive a token 115 indicating that user 112 and/or device 114 have requested to terminate access. In response, TBAC module 110 may terminate the session token in step 6532. In particular embodiments, TBAC module 110 may terminate session token 115j by deleting session token 115j. In other embodiments, TBAC module 110 may terminate session token 115j by uncorrelating it with one or more stored tokens 115. TBAC module 110 may also modify session token 115j to terminate session token 115j. In step 6533, TBAC module 110 may then terminate access to resource 145. In this manner, TBAC module 110 may terminate access to resource 145 in response to a request from user 112 and/or device 114.

In step 6540, TBAC module 110 may determine whether an emergency has been declared. In particular embodiments, TBAC module 110 may receive an event token 115x indicating that an emergency has been declared. TBAC module 110 may determine that an emergency has been declared in response to receiving event token 115x. In particular embodiments, the emergency may be associated with user 112. For example, user 112 may be in physical danger or may be injured. User 112 and/or device 114 may declare an emergency by performing a series of instructions. As an example and not by way of limitation, user 112 may declare an emergency by dialing an emergency number on device 114. As another example and not by way of limitation, user 112 may declare an emergency by pressing a particular series of buttons on device 114. If TBAC module 110 determines that an emergency has not been declared, TBAC module 110 may continue granting access to resource 145 in step 6541. If TBAC module 110 determines that an emergency has been declared, TBAC module 110 may continue to step 6545.

In particular embodiments, the at least one session rule 4130 may specify that access to the resource 145 should be terminated when a token 115, such as an event token 115x indicating that an emergency is declared is present. As an example and not by way limitation, the at least one session rule 4130 may specify that access to resource 145 should be terminated when a token 115 indicating that user 112 has dialed an emergency number on device 114 is present. In particular embodiments, it may be desirable to limit or restrict access to resource 145 during an emergency to free up capacity and/or processing power in any appropriate element of system 100. Freeing up capacity and/or processing power in appropriate elements of system 100 may be necessary to quickly and efficiently handle the emergency. For example, accessing resource 145 may consume significant amounts of capacity and/or processing power associated with resource provider 145. However, that processing power and/or capacity may be necessary to handle the emergency promptly and efficiently. TBAC module 110 may determine that access to resource 145 may be terminated in order to free up the processing power and capacity associated with resource provider 145 so that the emergency can be handled appropriately.

In step 6545, TBAC module 110 may apply the at least one session rule 4130 to determine whether access to resource 145 should be terminated due to the emergency. If TBAC module 110 determines that access to resource 145 should not be terminated due to the emergency, TBAC module 110 may continue granting access to resource 145 in step 6541. For example, if TBAC module 110 determines that sufficient capacity and/or processing power is available to handle the emergency without terminating access to resource 145, TBAC module 110 may not terminate access to resource 145. As another example, if TBAC module 110 determines that access to resource 145 is necessary to handle the emergency, TBAC module 110 may not terminate access to resource 145.

If TBAC module 110 determines that access should be terminated, then TBAC module 110 may terminate the session token 115$j$ in step 6550. In step 6455, TBAC module 110 may then terminate access to resource 145. In this manner, TBAC module 110 may terminate access to resource 145 in response to the emergency.

In step 6560, TBAC module 110 may determine whether the emergency has been resolved. In particular embodiments, the at least one session rule 4130 may specify that access to resource 145 may be reestablished if a token 115 indicating that the emergency has been resolved is present. Once the emergency has been resolved, it may be desirable to use capacity and processing power in particular elements of system 100 to access resource 145. In particular embodiments, TBAC module 110 may receive a token 115 indicating that the emergency has been resolved. TBAC module 110 may determine that the emergency has been resolved in response to receiving the token 115. If TBAC module 110 determines that the token 115 is not present and hence that the emergency has not been resolved, TBAC module 110 may continue waiting for the emergency to be resolved in step 6561. If TBAC module 110 determines that the token 115 is present and hence that the emergency has been resolved, TBAC module 110 may reestablish access to the resource by continuing to step 6525.

Figure 66:
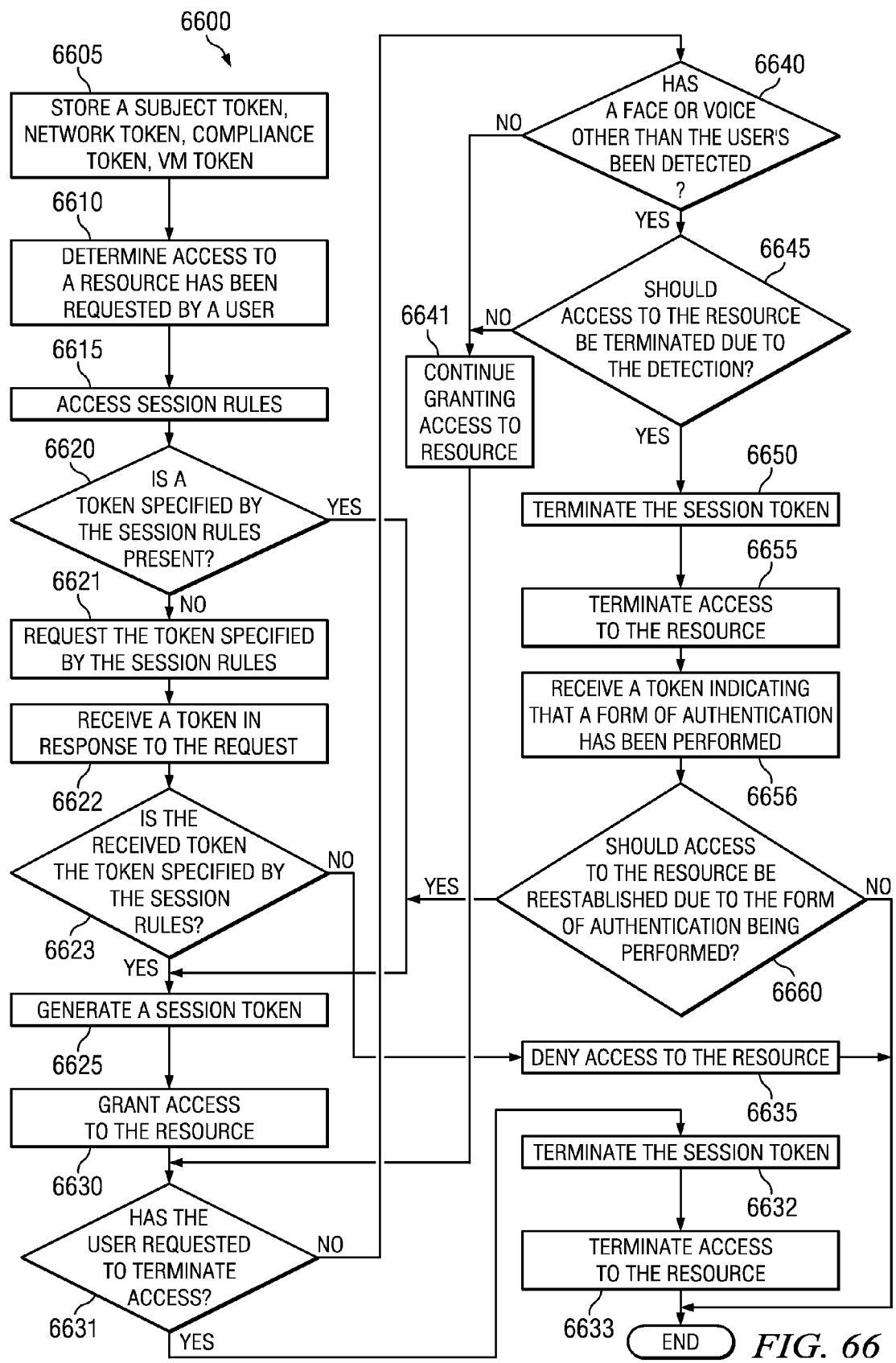
FIG. 66 is a flowchart illustrating a method of performing subject recognition session validation.

FIG. 66 illustrates a method of performing subject recognition session validation. In general, TBAC module 110 may limit or terminate access to a resource 145 when a face or a voice other than that of an authorized user's is detected. More details will be provided in the description of FIG. 66.

FIG. 66 illustrates a method 6600 of performing subject recognition session validation. TBAC module 110 may perform method 6600. TBAC module 110 may begin by storing a subject token 115$k$, network token 115$f$, among others as appropriate, in step 6605. In step 6610, TBAC module 110 may determine that access to a resource 145 has been requested by a user 112. In particular embodiments, TBAC module 110 may receive a resource token 115$c$ indicating that user 112 has requested access to resource 145. In response to receiving resource token 115$c$, TBAC module 110 may determine that access to resource 145 has been requested.

TBAC module 110 may continue to step 6615 and access session rules 4130. In particular embodiments, TBAC module 110 may use one or more of the previously described tokens 115 to access session rules 4130, and to determine at least one session rule 4130 applicable to resource 145. The at least one session rule 4130 may specify that access to resource 145 may be granted if a particular token 115 is present. In step 6620, TBAC module 110 may determine whether the particular token 115 specified by the at least one session rule 4130 is present. If the particular token 115 is not present, TBAC module 110 may request the particular token 115 in step 6621. After making the request, TBAC module 110 may receive a token 115 in step 6622. In step 6623, TBAC module 110 may determine whether the received token is the particular token 115. If not, TBAC module 110 may deny access to the resource 145 in step 6635.

If the particular token 115 specified by the at least one session rule 4130 is present, TBAC module 110 may generate a session token 115$j$ in step 6625. In particular embodiments, TBAC module 110 may generate session token 115$j$ by combining the particular token 115 specified by the at least one session rule 4130 with one or more of the tokens 115 stored in step 6605. For example, TBAC module 110 may hash the particular token 115 with a subject token 115$k$ stored in step 6605 to generate session token 115$j$. TBAC module 110 may then continue to step 6630 to grant access to resource 145. As part of granting access to resource 145, TBAC module 110 may correlate session token 115$j$ with one or more of the tokens 115 stored in step 6605.

In particular embodiments, the user 112 may decide to terminate access to resource 145. In step 6631, TBAC module 110 may determine whether user 112 has requested to terminate access to resource 145. TBAC module 110 may receive a request from user 112 and/or a device 114 associated with user 112 to terminate access to resource 145. In particular embodiments, TBAC module 110 may receive a token 115 indicating that user 112 and/or device 114 have requested to terminate access. In response, TBAC module 110 may terminate the session token in step 6632. In particular embodiments, TBAC module 110 may terminate session token 115$j$ by deleting session token 115$j$. In other embodiments, TBAC module 110 may terminate session token 115$j$ by uncorrelating it with one or more stored tokens 115. TBAC module 110 may also modify session token 115$j$ to terminate session token 115$j$. In step 6633, TBAC module 110 may then terminate access to resource 145. In this manner, TBAC module 110 may terminate access to resource 145 in response to a request from user 112 and/or device 114.

In particular embodiments, the at least one session rule 4130 may specify that access to the resource 145 may be terminated if a token 115, such as an event token 115$x$, indicating that a face or a voice other than the user's has been detected is present. Faces and voices may be detected through facial and voice recognition software. If a face or a voice other than the user's has been detected, it may indicate that unauthorized access to resource 145 may be occurring. Terminating access to resource 145 may stop the unauthorized access. Facial and voice recognition software associated with device 114 may be utilized to detect faces and/or voices other than the user's.

In step 6640, TBAC module 110 may determine that a face and/or a voice other than the user's has been detected. In particular embodiments, TBAC module 110 may receive an event token 115$x$ indicating that a face and/or a voice other than the user's has been detected. TBAC module 110 may determine that a face and/or a voice other than the user's has been detected in response to receiving event token 115$x$. If TBAC module 110 determines that event token 115$x$ is not present and hence that a face and/or a voice other than the user's has not been detected, TBAC module 110 may continue granting access to the resource 145 in step 6641.

If TBAC module 110 determines that event token 115x is present and hence that a face or a voice other than the user's has been detected, TBAC module 110 may continue to determine whether access to the resource 145 should be terminated due to the detection in step 6645. In particular embodiments, the at least one session rule 4130 may specify whether access to resource 145 should be terminated when a face and/or a voice other than the user's has been detected. For example, the at least one session rule 4130 may specify that access to a movie should not be terminated if a face and/or a voice other than the user's is detected, because movies are typically watched with others and there is no security threat posed by other users 112 seeing the movie. As another example, the at least one session rule 4130 may specify that access to a checking account should be terminated if a face and/or a voice other than the user's is detected, because the checking account may contain private or confidential information regarding the user 112 that should not be seen by others. TBAC module 110 may apply the at least one session rule 4130 to determine whether to terminate access due to the detection. If TBAC module 110 determines that access should not be terminated, TBAC module 110 may continue granting access to resource 145 in step 6641.

If TBAC module 110 determines that access should be terminated, TBAC module 110 may terminate the session token 115j in step 6650. In step 6655, TBAC module 110 may then terminate access to resource 145. In this manner, TBAC module 110 may terminate access to resource 145 in response to the detection of a face or voice other than the user's.

In particular embodiments, the at least one session rule 4130 may specify that access to the resource 145 may be reestablished under certain conditions. As an example and not by way of limitation, the at least one session rule 4130 may specify that access to the resource may be reestablished if a form of authentication such as biometric authentication is performed. By performing the form of authentication, user 112 would be notifying system 100 that user 112 is allowing the other person to potentially view information related to resource 145. As another example and not by way of limitation, the at least one session rule 4130 may specify that access to resource 145 may be reestablished if a face or a voice other than the user's is no longer detected. In particular embodiments, TBAC module 110 may receive a token 115 indicating that the form of authentication has been performed in step 6656. In other embodiments, the token 115 may indicate that the face and/or voice other than the user's is no longer detected.

In step 6660, TBAC module 110 may apply the at least one session rule 4130 to determine whether access to resource 145 should be reestablished. In particular embodiments, the at least one session rule 4130 may specify a condition under which access to resource 145 may be reestablished. For example, the at least one session rule 4130 may specify that access to resource 145 may be reestablished if a token 115 indicating that a form of authentication has been performed is present. As another example, the at least one session rule 4130 may specify that access to resource 145 may be reestablished if a token 115 indicating that the face and/or voice other than the user's is no longer detected is present. TBAC module 110 may determine that access to resource 145 should be reestablished in response to receiving token 115. If TBAC module 110 determines that access should be reestablished, TBAC module 110 may continue to step 6625. If TBAC module 110 determines that access should not be reestablished, TBAC module 110 may conclude method 6600.

Figure 67:
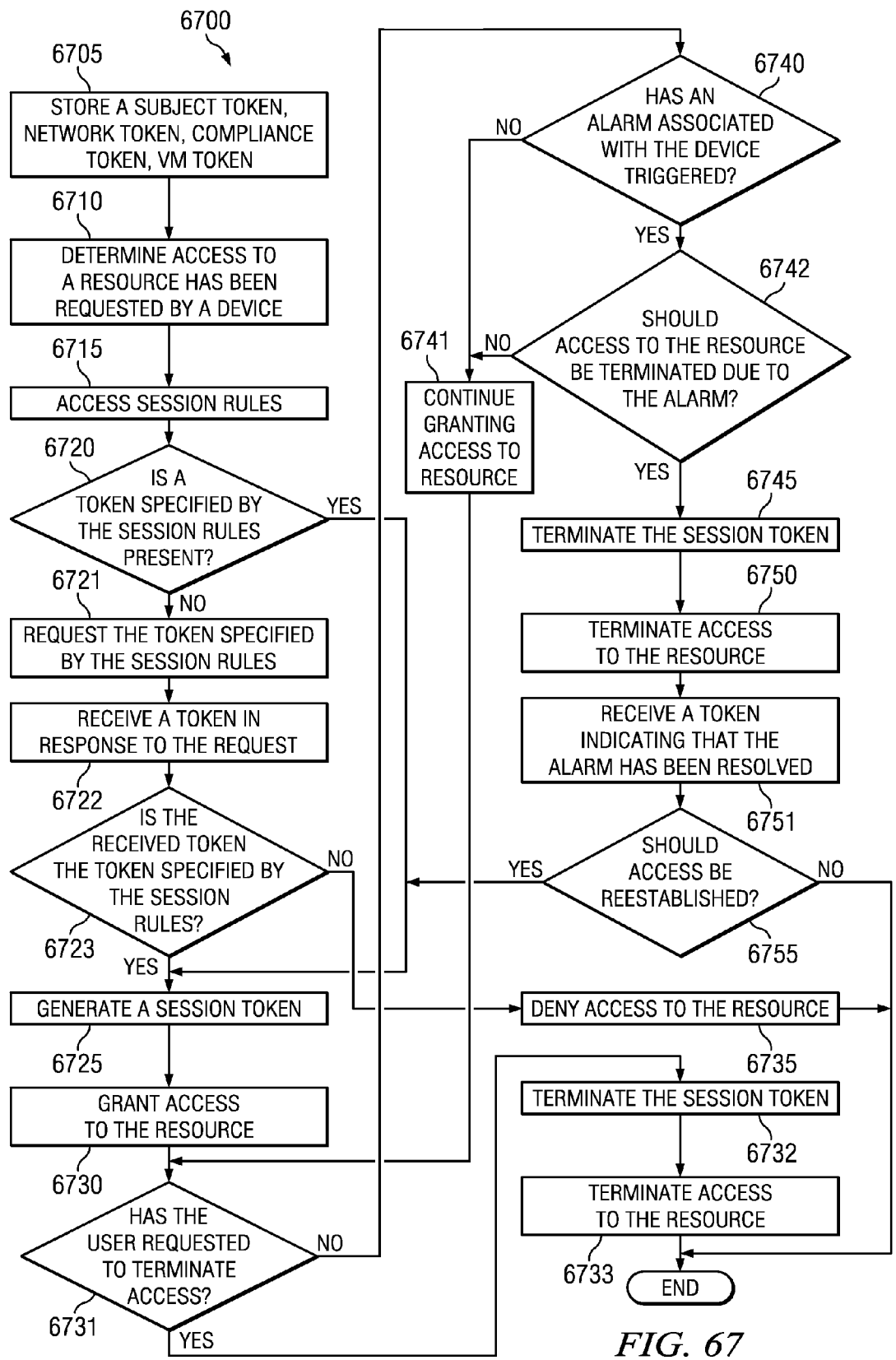
FIG. 67 is a flowchart illustrating a method of performing object security session validation.

FIG. 67 illustrates a method of performing object security session validation. In general, TBAC module 110 may limit or terminate access to a resource 145 when an alarm triggers. More details will be provided in the description of FIG. 67.

FIG. 67 illustrates a method 6700 of performing object security session validation. TBAC module 110 may perform method 6700. TBAC module 110 may begin by storing a subject token 115k, network token 115f, among others as appropriate, in step 6705. In step 6710, TBAC module 110 may determine that access to a resource 145 has been requested by a device 114. In particular embodiments, TBAC module 110 may receive a resource token 115c indicating that device 114 has requested access to resource 145. In particular embodiments, device 114 may be an automobile, a house, a boat, and any other suitable device 114 that can be associated with an alarm. In response to receiving resource token 115c, TBAC module 110 may determine that access to resource 145 has been requested.

TBAC module 110 may continue to step 6715 and access session rules 4130. In particular embodiments, TBAC module 110 may use one or more of the previously described tokens 115 to access session rules 4130, and to determine at least one session rule 4130 applicable to resource 145. The at least one session rule 4130 may specify that access to resource 145 may be granted if a particular token 115 is present. In step 6720, TBAC module 110 may determine whether the particular token 115 specified by the at least one session rule 4130 is present. If the particular token 115 is not present, TBAC module 110 may request the particular token 115 in step 6721. After the request has been made, TBAC module 110 may receive a token 115 in step 6722. In step 6723, TBAC module 110 may determine whether the received token 115 is the particular token 115. If it is, TBAC module may continue to step 6725. If not, TBAC module 110 may deny access to the resource 145 in step 6735.

If the particular token 115 specified by the at least one session rule 4130 is present or has been received, TBAC module 110 may generate a session token 115j in step 6725. In particular embodiments, TBAC module 110 may generate session token 115j by combining the particular token 115 specified by the at least one session rule 4130 with one or more of the tokens 115 stored in step 6705. For example, TBAC module 110 may hash the particular token 115 with a subject token 115k stored in step 6705 to generate session token 115j. TBAC module 110 may then continue to step 6730 to grant access to resource 145. As part of granting access to resource 145, TBAC module 110 may correlate session token 115j with one or more of the tokens 115 stored in step 6705.

In particular embodiments, the user 112 may decide to terminate access to resource 145. In step 6731, TBAC module 110 may determine whether user 112 has requested to terminate access to resource 145. TBAC module 110 may receive a request from user 112 and/or a device 114 associated with user 112 to terminate access to resource 145. In particular embodiments, TBAC module 110 may receive a token 115 indicating that user 112 and/or device 114 have requested to terminate access. In response, TBAC module 110 may terminate the session token in step 6732. In particular embodiments, TBAC module 110 may terminate session token 115j by deleting session token 115j. In other embodiments, TBAC module 110 may terminate session token 115j by uncorrelating it with one or more stored tokens 115. TBAC module 110 may also modify session token 115j to terminate session token 115j. In step 6733, TBAC module 110 may then terminate access to resource 145. In this manner, TBAC module 110 may terminate access to resource 145 in response to a request from user 112 and/or device 114.

In particular embodiments, the at least one session rule 4130 may specify that access to resource 145 may be terminated if a token 115, such as an event token 115x, indicating an alarm associated with the device 145 has been triggered is present. In step 6740, TBAC module 110 may determine whether the alarm associated with the device 114 has triggered. In particular embodiments, TBAC module 110 may make this determination based on a token 115 such as event token 115x. If the alarm has not triggered, TBAC module 110 may continue granting access to resource 145 in step 6741. If the alarm has triggered, TBAC module 110 may continue to step 6742. When an alarm associated with device 114 triggers, it may indicate that unauthorized access of resource 145 is occurring. Terminating access to resource 145 may prevent the unauthorized access from continuing. Examples of alarms associated with device 114 may include car alarms, home alarms, anti-theft alarms, and/or any other appropriate alarms. In particular embodiments, TBAC module 110 may terminate access to resource 145 in response to the alarm triggering to prevent unauthorized access to resource 145. For example, a car may be accessing information from an account associated with the owner of the car when the car's alarm triggers. The triggering may have occurred as a result of someone attempting to break into the car. In response to the alarm triggering, TBAC module 110 may terminate the car's access to the account to protect the driver's information.

In step 6742, TBAC module 110 may determine whether access to the resource 145 should be terminated. In particular embodiments, the at least one session rule 4130 may specify that access to resource 145 should be terminated if TBAC module 110 determines that an alarm associated with device 114 has triggered. TBAC module 110 may apply the at least one session rule 4130 to determine whether access should be terminated due to the alarm associated with the device 114 being triggered. In particular embodiments, TBAC module 110 may determine that the alarm has triggered in response to receiving event token 115x. If TBAC module 110 determines that the event token 115x is not present and hence that the alarm associated with device 114 has not triggered, TBAC module 110 may continue granting access to resource 145 in step 6741.

If TBAC module 110 determines that event token 115x is present and hence that the alarm associated with device 114 has triggered, TBAC module 110 may terminate the session token 115j in step 6745. In step 6750, TBAC module 110 may then terminate access to resource 145. In this manner, TBAC module 110 may terminate access to resource 145 in response to the triggering of an alarm.

In particular embodiments, TBAC module 110 may receive a token 115 indicating that the alarm has been resolved in step 6751. In particular embodiments, the at least one session rule 4130 may specify that access to the resource 145 may be reestablished if the alarm has been resolved. Resolving the alarm may indicate that the intrusion has ceased and/or that the alarm was determined to be a false alarm. In either case, unauthorized access to resource 145 may have ceased. Although this disclosure describes particular events resolving the alarm, this disclosure contemplates any appropriate events resolving the alarm. For example, a user 112 associated with device 114 may have entered a password to silence the alarm.

In step 6755, TBAC module 110 may apply the at least one session rule 4130 to determine whether access should be reestablished. In particular embodiments, TBAC module 110 may have received the token 115 indicating that the alarm has been resolved. TBAC module 110 may determine that the alarm has been resolved in response to receiving the token 115. If TBAC module 110 determines that the token 115 is not present and hence that the alarm has not been resolved, TBAC module 110 may conclude method 6700. If TBAC module 110 determines that the token 115 is present and hence that the alarm has been resolved, TBAC module 110 may continue to step 6725.

Figure 68:
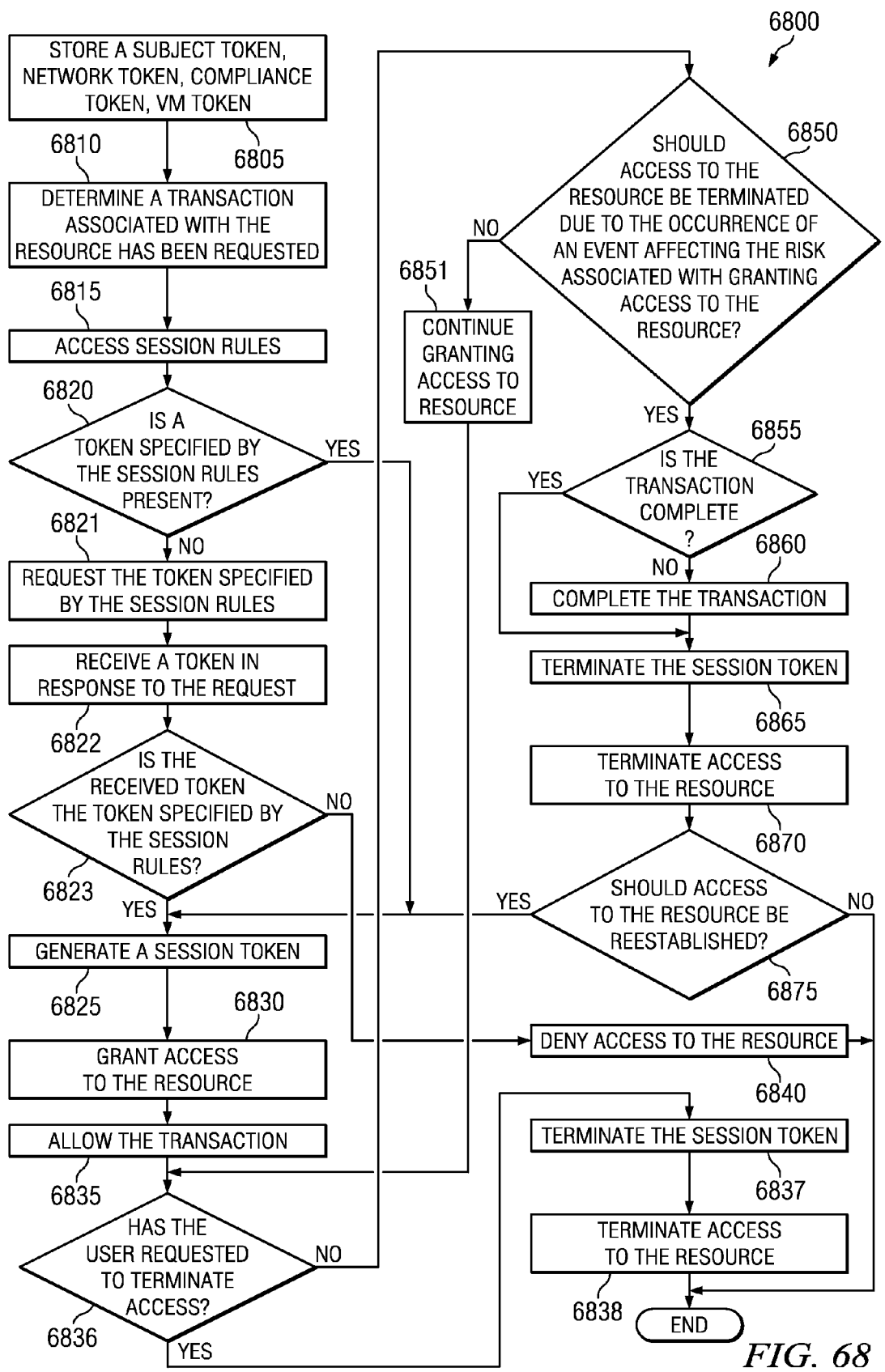
FIG. 68 is a flowchart illustrating a method of performing object transaction session validation.

FIG. 68 illustrates a method of performing object transaction session validation. In general, TBAC module 110 may perform session validation to process transactions. More details will be provided in the description of FIG. 68.

FIG. 68 illustrates a method 6800 of performing object transaction session validation. TBAC module 110 may perform method 6800. TBAC module 110 may begin by storing a subject token 115k, network token 115f, among others as appropriate, in step 6705. In step 6810 TBAC module 110 may determine that a transaction associated with resource 145 has been requested. In particular embodiments, TBAC module 110 may receive a resource token 115c indicating that a transaction associated with resource 145 has been requested. TBAC module 110 may determine the transaction associated with resource 145 has been requested in response to receiving resource token 115c. As an example, TBAC module 110 may determine that a purchase transaction has been requested. TBAC module 110 may further determine that a funds transfer has been requested.

In particular embodiments, the request for the transaction may be made a device 114 such as a computer, laptop, mobile phone, automobile, house, boat, and any other appropriate device 114. The transaction may be any suitable type of transaction including financial transactions, purchase transactions, and data transfer transaction. As an example, a car may use an RFID tag to request a purchase transaction regarding a parking spot. The car may park in the spot and the RFID tag may transmit a purchase transaction with the owner of the spot. Funds may then be debited directly from an account associated with a user 112 of the car. As another example, a user 112 may wish to purchase an item from a store. The user 112 may pay for the item by requesting a purchase transaction from the user's phone. Funds may then be debited directly from an account associated with the user 112.

TBAC module 110 may continue to step 6815 and access session rules 4130. In particular embodiments, TBAC module 110 may use one or more of the previously described tokens 115 to access session rules 4130, and to determine at least one session rule 4130 applicable to resource 145. The at least one session rule 4130 may specify that access to resource 145 may be granted if a particular token 115 is present. In step 6820, TBAC module 110 may determine whether the particular token 115 specified by the at least one session rule 4130 is present. If the particular token 115 is not present, TBAC module 110 may request the particular token 115 in step 6821. After the request has been made, TBAC module 110 may receive a token 115 in step 6822. In step 6823, TBAC module 110 may determine whether the received token 115 is the particular token 115. If it is, TBAC module 110 may continue to step 6825. If not, TBAC module may deny access to the resource 145 in step 6840.

If the particular token 115 specified by the at least one session rule 4130 is present or has been received, TBAC module 110 may generate a session token 115j in step 6825. In particular embodiments, TBAC module 110 may generate session token 115j by combining the particular token 115 specified by the at least one session rule 4130 with one or more of the tokens 115 stored in step 6805. For example, TBAC module 110 may hash the particular token 115 with a subject token 115k stored in step 6805 to generate session token 115j. TBAC module 110 may then continue to step 6830 to grant access to resource 145. As part of granting access to resource 145, TBAC module 110 may correlate session token 115j with one or more of the tokens 115 stored in step 6805. After granting access to resource 145, TBAC module 110 may allow the transaction associated with resource 145 in step 6835. In particular embodiments, after TBAC module 110 allows the transaction, an element of system 100 may begin processing the transaction.

In particular embodiments, the user 112 may decide to terminate access to resource 145. In step 6836, TBAC module 110 may determine whether user 112 has requested to terminate access to resource 145. TBAC module 110 may receive a request from user 112 and/or a device 114 associated with user 112 to terminate access to resource 145. In particular embodiments, TBAC module 110 may receive a token 115 indicating that user 112 and/or device 114 have requested to terminate access. In response, TBAC module 110 may terminate the session token in step 6837.

In particular embodiments, TBAC module 110 may terminate session token 115j by deleting session token 115j. In other embodiments, TBAC module 110 may terminate session token 115j by uncorrelating it with one or more stored tokens 115. TBAC module 110 may also modify session token 115j to terminate session token 115j. In step 6838, TBAC module 110 may then terminate access to resource 145. In this manner, TBAC module 110 may terminate access to resource 145 in response to a request from user 112 and/or device 114.

In particular embodiments, TBAC module 110 may determine that an event affecting the risk associated with granting access to resource 145 has occurred. TBAC module 110 may receive an event token 115x indicating the occurrence of an event affecting the risk associated with granting access to resource 145. For example, even token 115x may indicate that device 114 has been exposed to potential unauthorized access. Examples of unauthorized accesses may include a car getting broken into and a computer getting hacked. As another example, event token 115x may indicate that resource 145 has been infected by a virus thus increasing the risk that device 114 may be exposed to the virus if access to resource 145 continues. In response to receiving event token 115x, TBAC module 110 may determine that the event has occurred.

TBAC module 110 may then continue to step 6850 to determine whether access to resource 145 should be terminated due to the event. In particular embodiments, the at least one session rule 4130 may specify whether access should be terminated due to the event. For example, the at least one session rule 4130 may specify that access should be terminated if event token 115x indicating that unauthorized access has occurred is present. As another example, the at least one session rule 4130 may specify that access should be terminated if event token 115x indicating that resource 145 has been infected by a virus is present. TBAC module 110 may apply the at least one session rule 4130 to determine whether to terminate access to resource 145. If access to resource 145 should not be terminated, TBAC module 110 may continue granting access to resource 145 in step 6851.

If access to resource 145 should be terminated, TBAC module 110 may continue to step 6855 to determine whether the transaction is incomplete. If the transaction is incomplete, TBAC module 110 may complete the transaction in step 6860. For example, a purchase transaction may not be finished processing when TBAC module 110 determines that access should be terminated. Before TBAC module 110 terminates the session token 115j, it may let the purchase transaction finish processing. In particular embodiments, instead of completing the transaction, TBAC module 110 may halt the transaction. For example, certain transactions like data transfer transactions may take longer than other transactions like purchase transactions. TBAC module 110 may determine to halt these transactions rather than letting them complete before terminating session token 115j.

If there the transaction is complete, or after completing and/or halting the transaction, TBAC module 110 may continue to terminate the session token 115j in step 6865. In step 6870, TBAC module 110 may then terminate access to resource 145. In this manner, TBAC module 110 may terminate access to resource 145 in response to the occurrence of the event.

In step 6875, TBAC module 110 may determine whether access to resource 145 should be reestablished. In particular embodiments, the at least one session rule 4130 may specify that access to resource 145 may be reestablished if a particular token 115, such as a subject token 115k, is present. The token 115 may indicate that the event has been resolved. For example, the token 115 may indicate that the unauthorized access associated with device 114 has ceased or that the virus associated with device 114 has been removed. TBAC module 110 may receive the particular token 115 and apply the at least one session rule 4130 to determine that access to resource 145 should be reestablished. In particular embodiments, if TBAC module 110 had halted the transaction, TBAC module 110 may continue the transaction after access to resource 145 has been reestablished. If access should be reestablished, TBAC module 110 may continue to step 6825. However, if TBAC module 110 determines that access should not be reestablished, TBAC module 110 may conclude method 6800.

The descriptions of FIGS. 59-68 do not describe all the functionality associated with session validation described with respect to FIGS. 41 and 42 in order to emphasize particular aspects of session validation. However, this disclosure contemplates the system 100 performing any number and combination of functions associated with session validation in conjunction with the functionality described with respect to FIGS. 59-68.

Figure 43:
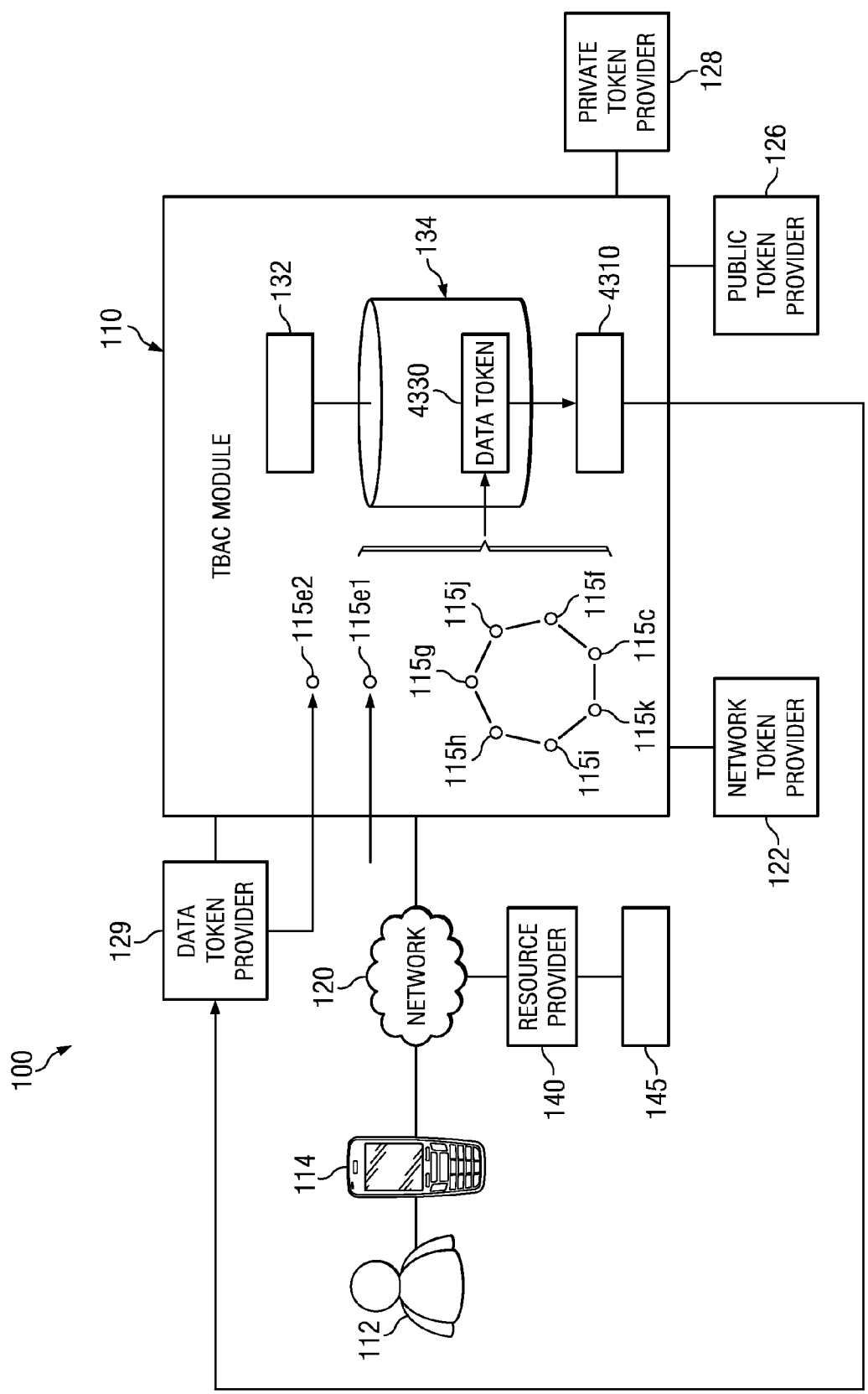
FIG. 43 illustrates the system of FIG. 1 performing data tokenization.
Figure 44:
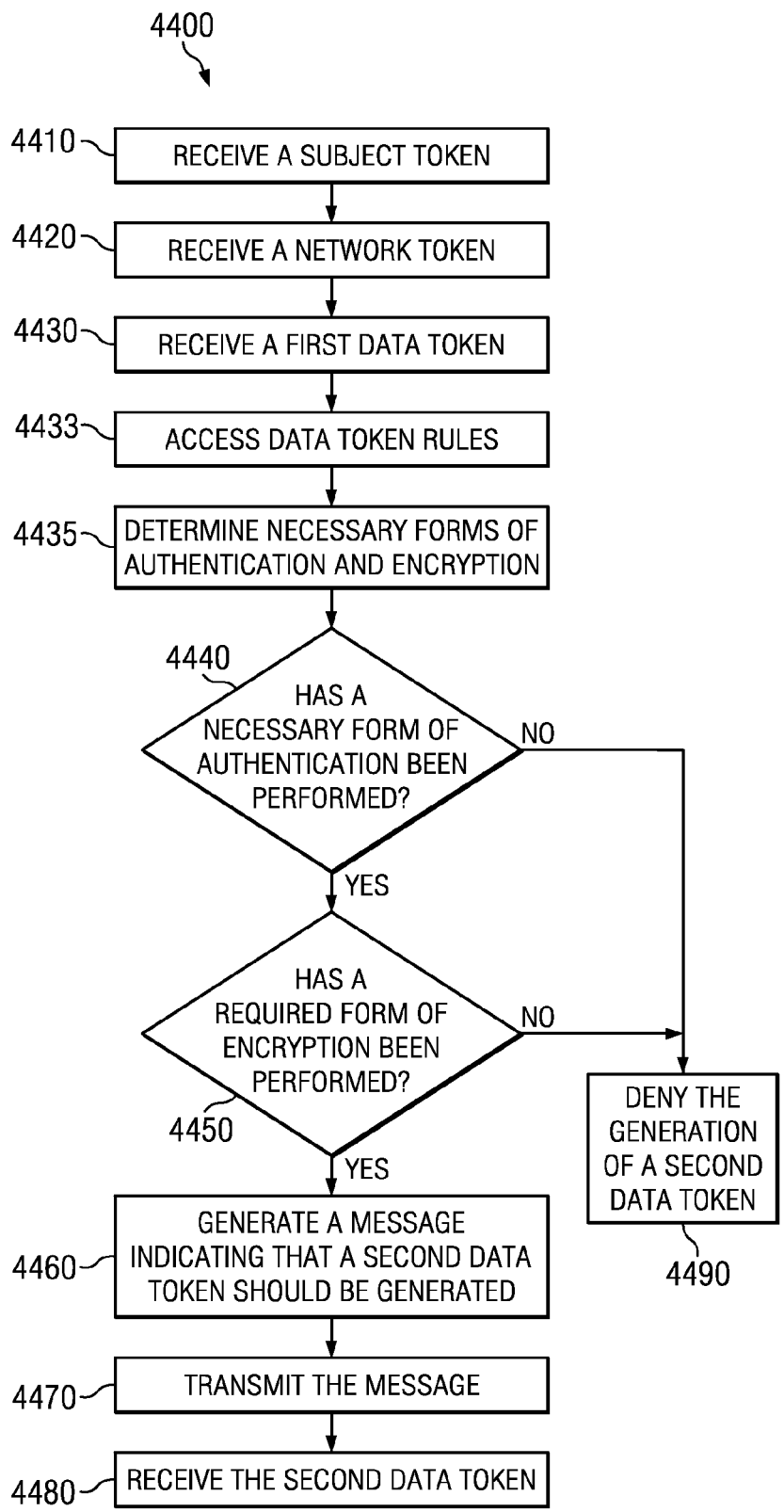
FIG. 44 is a flowchart illustrating a method of data tokenization.

FIGS. 43 and 44 illustrate the system 100 performing data tokenization. In general, a user 112 may request a resource 145 that requires data external to the resource 145. The external data may be retrieved from an external source, and a data token 115e representing the external data may be generated. The process of determining whether to initiate the data tokenization process is discussed further with respect to FIGS. 43 and 44.

TBAC module 110 may detect a request for external data. In response, TBAC module 110 may determine whether to initiate the data tokenization process. The determination may be based at least in part upon the credentials of user 112 and/or device 114. After data tokenization is initiated, TBAC module 110 may receive a data token 115e representing the data.

FIG. 43 illustrates the system 100 of FIG. 1 performing data tokenization. As provided in FIG. 43, TBAC module 110 may correlate subject token 115k, network token 115f, and resource token 115c, among others as appropriate with session token 115j. TBAC module 110 may have received subject token 115k from a token provider such as, for example, private token provider 128 and public token provider 126. In particular embodiments, subject token 115k may be associated with user 112 and/or device 114, and may indicate a form of authentication, such as biometric authentication, that has been performed by user 112 and/or device 114. In particular embodiments, TBAC module 110 may have received network token 115f from a token provider such as, for example, network provider 122. Network token 115f may be associated with network 120 and may indicate a form of encryption performed by network 120.

In particular embodiments, resource token 115c may be associated with resource 145. Resource 145 may require data that is external to the resource. For example, resource 145 may contain data fields that require data from an external database in order to be filled in. Access to resource 145 may be meaningless if the external data is not provided. However, accessing the external data may require particular forms of authentication or encryption to be performed.

In particular embodiments, TBAC module 110 may facilitate the process of providing the external data through a process called data tokenization. To start, TBAC module 110 may receive a first data token 115e1 indicating that external data has been requested. First data token 115e1 may be provided by a token provider such as, for example, data token provider 129. In particular embodiments, user 112 and/or device 114 may request access to resource 145. In response to the request for resource 145, a token provider such as data token provider 129 may generate first data token 115e1 and transmit first data token 115e1 to TBAC module 110.

In particular embodiments, TBAC module 110 may store dataToken rules 4330 in memory 134. In particular embodiments, TBAC module 110 may use first data token 115e1, subject token 115k, network token 115f, among others as appropriate to access dataToken rule 4330. In particular embodiments, TBAC module 110 may use these tokens 115 to determine at least one dataToken rule 4330. As an example and not by way of limitation, TBAC module 110 may use first data token 115e1, subject token 115k, and network token 115f to determine at least one dataToken rules 4330 applicable to the external data requested represented by first data token 115e1, to user 112 and/or device 114 represented by subject token 115k, and to network 120 represented by network token 115f. The at least one dataToken rule 4330 may specify the conditions under which the external data may be provided to user 112 and/or device 114 over network 120. In particular embodiments, the at least one dataToken rule 4330 may specify that external data may be provided if particular forms of authentication and/or particular forms of encryption have been performed. As an example and not by way of limitation, dataToken rule 4330 may specify that external data may be provided if user 112 and/or device 114f perform biometric authentication. As another example and not by way of limitation, dataToken rule 4330 may specify that external data may be provided if device 114 authenticates itself with a proper subscriber identity module. As another example and not by way of limitation, dataToken rule 4330 may specify that external data may be provided if network 120 performs a particular form of encryption such as for example, Wi-Fi Protected Access. Subject token 115k and network token 115f may indicate the forms of authentication and encryption that have been performed. Although this disclosure describes dataToken rule 4330 specifying particular forms of authentication and/or encryption, this disclosure contemplates dataToken rule 4330 specifying any appropriate forms of authentication and/or encryption.

If the conditions specified by dataToken rule 4330 have been met, TBAC module 110 may generate a message 4310. In particular embodiments, message 4310 may indicate that a second data token 115e2 should be generated. Second data token 115e2 may represent the external data itself. Second data token 115e2 may also represent particular attributes of the data, such as for example, the size of the data and a form of encryption performed on the data. In particular embodiments, TBAC module 110 may transmit message 4310 to a token provider such as data token provider 129. In response, TBAC module 110 may receive second data token 115e2 from a token provider such as data token provider 129. In particular embodiments, TBAC module 110 may generate second data token 115e2 after the determination that the conditions specified by dataToken rule 4330 have been met. TBAC module 110 may send second data token 115e2 to resource provider 140 for resource 145.

The illustration of system 100 in FIG. 43 does not specifically illustrate all the elements from the illustration of system 100 of FIG. 1 so that particular aspects of system 100 may be emphasized. However, system 100 of FIG. 43 includes all the elements of system 100 in FIG. 1.

FIG. 44 is a flowchart illustrating a method 4400 of data tokenization. TBAC module 110 may perform method 4400. TBAC module 110 may begin by receiving a subject token 115k in step 4410. Subject token 115k may indicate a form of authentication performed by user 112 and/or device 114. TBAC module 110 may continue by receiving a network token 115f in step 4420. Network token 115f may indicate a form of encryption performed by network 120. TBAC module 110 may then receive a first data token 115e1 in step 4430. First data token 115e1 may indicate that external data has been requested.

In response to receiving first data token 115e1, TBAC module 110 may access dataToken rules 4330 in step 4433. In particular embodiments, TBAC module 110 may use subject token 115k, network token 115f, and first data token 115e1 to determine at least one dataToken rule 4330 applicable to the external data, user 112 and/or device 114, and network 120 represented by first data token 115e1, subject token 115k, and network token 115f respectively. TBAC module 110 may then use the at least one dataToken rule 4330 to determine necessary forms of authentication and encryption in step 4435. In particular embodiments, external data may not be provided unless the necessary forms of authentication and encryption have been performed. In step 4440, TBAC module 110 may determine if a necessary form of authentication has been performed. In particular embodiments, this determination may be based on subject token 115k. If the necessary form of authentication has not been performed, TBAC module 110 may deny the generation of a second data token in step 4490. If the necessary form of authentication has been performed, TBAC module 110 may continue to determine if a necessary form of encryption has been performed in step 4450. In particular embodiments, this determination may be based on network token 115f. If the necessary form of encryption has not been performed, TBAC module 110 may deny the generation of a second data token in step 4490.

If the necessary forms of authentication and encryption have been performed, TBAC module 110 may continue by generating a message 4310 indicating that a second data token 115e2 should be generated in step 4460. TBAC module 110 may continue by transmitting the message 4310 in step 4470. In particular embodiments, TBAC module 110 may transmit the message to a token provider such as data token provider 129. In response, the token provider may generate second data token 115e2. TBAC module 110 may receive the second data token 115e2 in step 4480. In other embodiments, TBAC module 110 may generate second data token 115e2. In particular embodiments, second data token 115e2 may represent the external data.

Figure 45:
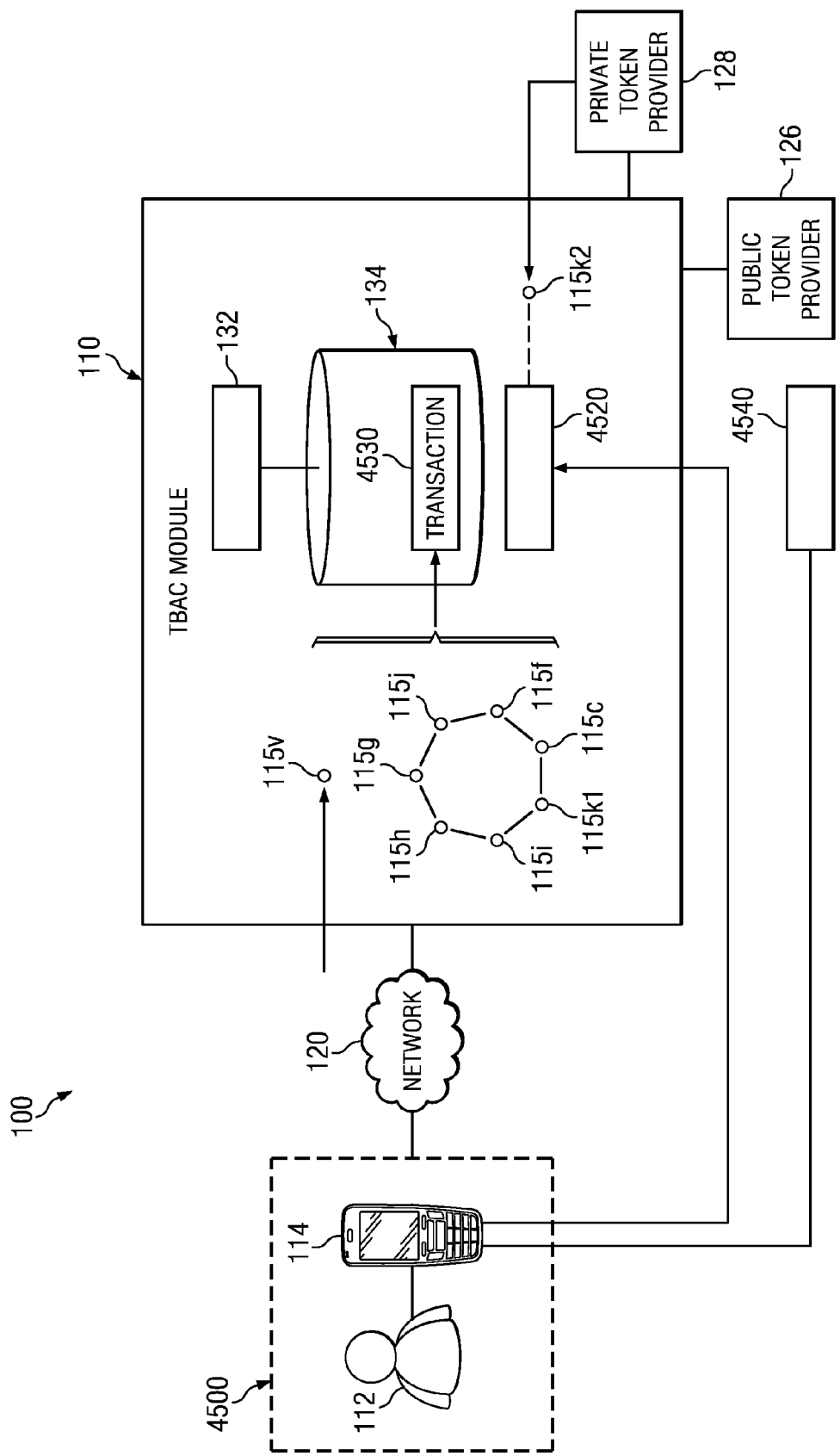
FIG. 45 illustrates the system of FIG. 1 handling transaction tokens.
Figure 46:
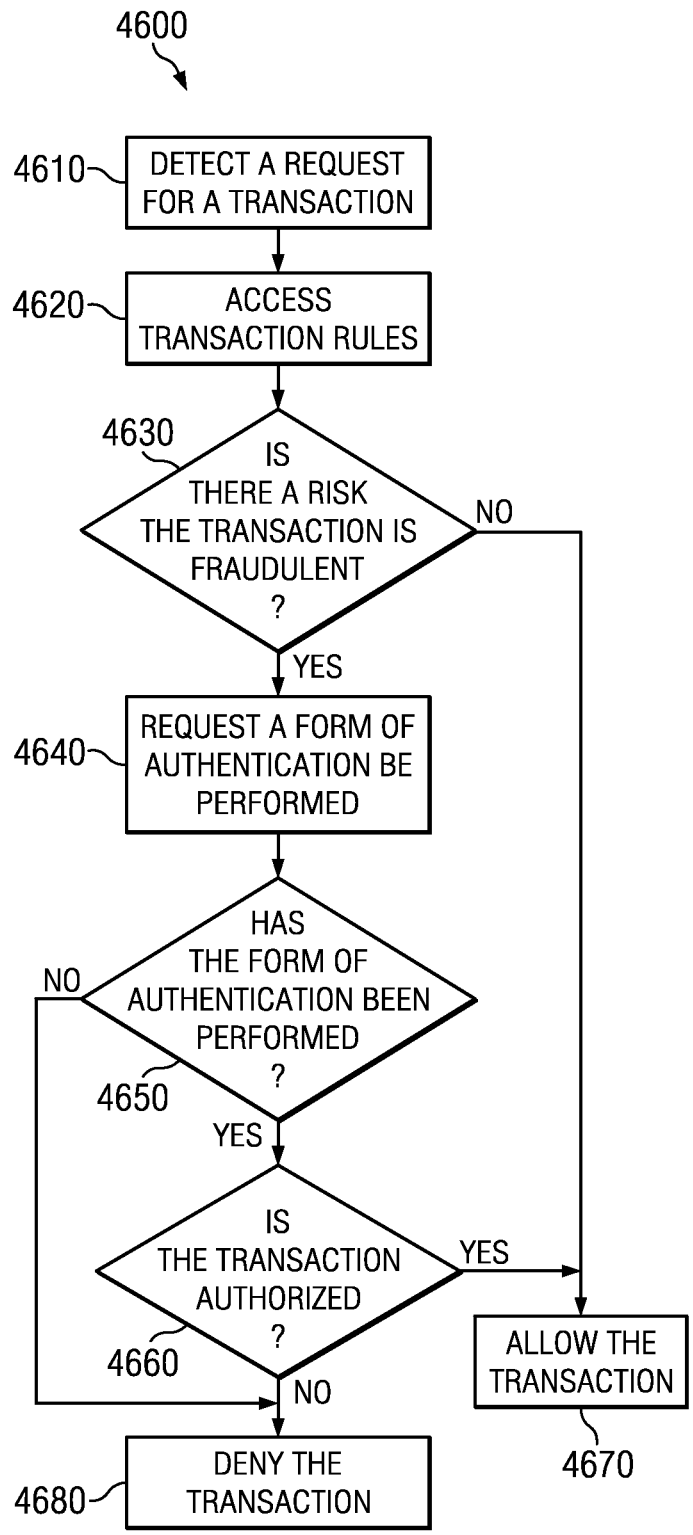
FIG. 46 is a flowchart illustrating a method of handling transaction tokens.

FIGS. 45 and 46 illustrate system 100 handling transaction tokens. In general, when user 112 and/or device 114 requests a transaction to be performed, an associated transaction token may be generated. Using this transaction token, user 112 and/or device 114 may be authenticated, and authorization to perform the transaction may be determined. This process of handling the transaction token is discussed further with respect to FIGS. 45 and 46.

TBAC module 110 may receive a transaction token indicating a requested transaction. A transaction may include any transfer of financial information from one party to another. Examples of transactions may include purchases, payments, and fund transfers. In response to receiving the transaction token, TBAC module 110 may determine whether a user and/or a device associated with the transaction have been authenticated. TBAC module 110 may further determine whether an entity associated with the user and/or the device has authorized the user and/or the device to perform the transaction. TBAC module 110 may then allow or deny the transaction as appropriate.

FIG. 45 illustrates the system 100 of FIG. 1 handling transaction tokens 115*v*. As provided by FIG. 45, TBAC module 110 may have correlated first subject token 115*k*1, resource token 115*c*, network token 115*f*, among others as appropriate to session token 115*j*. First subject token 115*k*1 may be associated with a user 112, a device 114, and/or an entity 4500. Furthermore, user 112 and device 114 may be associated with entity 4500. In particular embodiments, user 112 may use device 114 to request a transaction 4540. As an example and not by way of limitation, entity 4500 may be a department store and a manager at the department store may be using a computer associated with the department store to send a financial payment to a supplier.

In particular embodiments, TBAC module 110 may receive a transaction token 115*v* associated with the transaction 4540. Transaction token 115*v* may indicate entity 4500 associated with the transaction 4540. TBAC module 110 may use transaction token 115*v* to determine first subject token 115*k*1 associated with the user 112 and device 114 that requested transaction 4540. TBAC module 110 may use the transaction token 115*v*, first subject token 115*k*1, resource token 115*c*, network token 115*f*, among others as appropriate to access transaction rules 4530 stored in memory 134. In particular embodiments, transaction rules 4530 may specify whether there is an unacceptable risk that transaction 4540 is fraudulent. As an example and not by way of limitation, transaction rules 4530 may specify that transaction 4540 has an unacceptable risk of being fraudulent if transaction 4540 involves an amount of money greater than an amount specified by transaction rules 4530. As another example and not by way of limitation, transaction rules 4530 may specify that transaction 4540 has an unacceptable risk of being fraudulent if the frequency of fraudulent transactions associated with user 112 and/or device 114 is too high. In particular embodiments, TBAC module 110 may deny transaction 4540 if the risk that transaction 4540 is fraudulent is too high.

In particular embodiments, the risk that transaction 4540 is fraudulent may be reduced if the user 112 and/or the device 114 perform particular forms of authentication specified by transaction rules 4530. As an example and not by way of limitation, the risk that transaction 4540 is fraudulent may be reduced if user 112 and/or device 114 perform biometric authentication. In particular embodiments, TBAC module 110 may request user 112 and/or device 114 to perform a form of authentication. In response to performing the form of authentication, TBAC module 110 may receive credentials 4520. In particular embodiments, device 114 may provide TBAC module 110 with credentials 4520. TBAC module 110 may also receive second subject token 115*k*2 associated with credentials 4520. Second subject token 115*k*2 may further indicate that the form of authentication requested by TBAC module 110 has been performed. TBAC module 110 may receive second subject token 115*k*2 from a token provider such as, for example, private token provider 128 and public token provider 126. Based at least in part upon second subject token 115*k*2, TBAC module 110 may determine that user 112 and device 114 are associated with entity 4500.

In particular embodiments, the risk that transaction 4540 is fraudulent may be further reduced if TBAC module 110 determines that entity 4500 has authorized user 112 and device 114 to perform the transaction 4540. TBAC module 110 may determine that user 112 and/or device 114 are authorized to perform the transaction 4540 based on second subject token 115*k*2. As an example and not by way of limitation, based on second subject token 115*k*2, TBAC module 110 may determine that user 112 and device 114 are associated with a department store and that the department store has authorized user 112 to use device 114 to pay a supplier a large sum of money on behalf of the department store. In response to this determination, TBAC module 110 may determine that the risk that transaction 4540 is fraudulent has been reduced. In particular embodiments, TBAC module 110 may allow transaction 4540 when the risk that transaction 4540 is fraudulent has reduced to an acceptable level based on transaction rule 4530.

In particular embodiments, user 112 and/or device 114 may request a transaction without being associated with entity 4500. As an example and not by way of limitation, user 112 may be using his mobile phone to purchase an item. When user requests the purchase, transaction token 115*v* may be generated and transmitted to TBAC module 110. Based at least in part upon transaction token 115*v*, TBAC module 110 may determine at least one transaction rule 4530 applicable to the user 112 and his transaction 4540. TBAC module 110 may then determine, based on the rule, whether the risk that the purchase request is fraudulent is unacceptably high. If it is, TBAC module 110 may deny the purchase. Otherwise, TBAC module 110 may allow the purchase.

The illustration of system 100 in FIG. 45 does not specifically illustrate all the elements from the illustration of system 100 in FIG. 1 so that particular aspects of system 100 may be emphasized. However, system 100 of FIG. 45 includes all the elements of system 100 in FIG. 1.

FIG. 46 is a flowchart illustrating a method 4600 of handling transaction tokens 115*v*. TBAC module 110 may perform method 4600. TBAC module 110 may begin by detecting a request for a transaction 4540 in step 4610. In particular embodiments, TBAC module 110 may receive a transaction token 115*v* associated with the request for the transaction 4540. Transaction token 115*v* may be generated in response to user 112 and/or device 114 requesting transaction 4540. In step 4620 TBAC module 110 may access transaction rules 4530. In particular embodiments, TBAC module 110 may use transaction token 115*v* to access transaction rules 4530. Transaction rules 4530 may specify whether there is an unacceptable risk that transaction 4540 is unacceptable. In step 4630 TBAC module 110 may determine if there is a risk that the transaction 4540 is fraudulent based upon a particular transaction rule 4530.

In particular embodiments, if there is no risk that the transaction 4540 is fraudulent or if the risk is acceptably low, TBAC module 110 may allow the transaction 4540 in step 4670. However, if the risk is unacceptably high, TBAC module 110 may request a form of authentication be performed in step 4640. In step 4650 TBAC module 110 may determine if the form of authentication has been performed. In particular embodiments, TBAC module 110 may make this determination based on a received second subject token 115k2 associated with the form of authentication being performed. If the form of authentication has not been performed, TBAC module 110 may deny the transaction 4540 in step 4680. If the form of authentication has been performed, TBAC module 110 may continue to step 4660 to determine if the transaction 4540 is authorized. In particular embodiments, the form of authentication may identify a user 112 and a device 114 associated with an entity 4500. However, the entity 4500 may not have authorized user 112 and device 114 to perform the transaction 4540. In that case, TBAC module 110 may deny the transaction in step 4680. However, if user 112 and device 114 are authorized to perform the transaction 4540, then TBAC module 110 may allow the transaction in step 4670.

FIGS. 47-54 illustrate the system 100 of FIG. 1 making access decisions based on various access values such as assurance level, trust level, integrity level, and risk level. These access values represent various aspects of user 112, device 114, resource 145, and/or network 120 that affect the security risks associated with granting access to resource 145. The process of making access decisions using these access values will be discussed further with respect to FIGS. 47-54.

TBAC module 110 may make access decisions using various access values such as assurance level, trust level, and integrity level. TBAC module 110 may determine these values based on token based rules, subject tokens 115k, resource tokens 115c, network tokens 115f, and any other appropriate tokens 115. TBAC module 110 may make access decisions using these access values whether alone or in combination with each other.

Assurance levels are the access values associated with users 112 and/or devices 114. Assurance levels may represent a measure of the risk associated with granting user 112 and/or device 114 access to resource 145. Particular forms of authentication and particular security features associated with user 112 and/or device 114 may influence this risk and therefore, the access level. The process of determining and using access levels to make access decisions is discussed with respect to FIGS. 47 and 48.

Trust levels are the access values associated with resource 145. Trust levels may represent a measure of the risk associated with granting access to resource 145. Particular forms of authentication and particular security features associated with resource 145 may influence this risk and therefore, the trust level. The process of determining and using trust levels to make access decisions is discussed with respect to FIGS. 49 and 50.

Integrity levels are the access values associated with network 120. Integrity levels may represent a measure of the risk associated with granting access to resource 145 over network 120. Particular forms of encryption and particular security features associated with network 120 may influence this risk and therefore, the integrity level. The process of determining and using integrity levels to make access decisions is discussed with respect to FIGS. 51 and 52.

Risk levels are the access values associated with the overall risk associated with granting user 112 and/or device 114 access resource 145 over network 120. Risk levels may be derived from assurance levels, trust levels, and/or integrity levels. Therefore, any changes, features, forms of authentication, forms of encryption, or any aspect associated with user 112, device 114, resource 145, and network 120 may influence the risk levels. The process of determining and using risk levels to make access decisions is discussed with respect to FIGS. 53 and 54.

Figure 47:
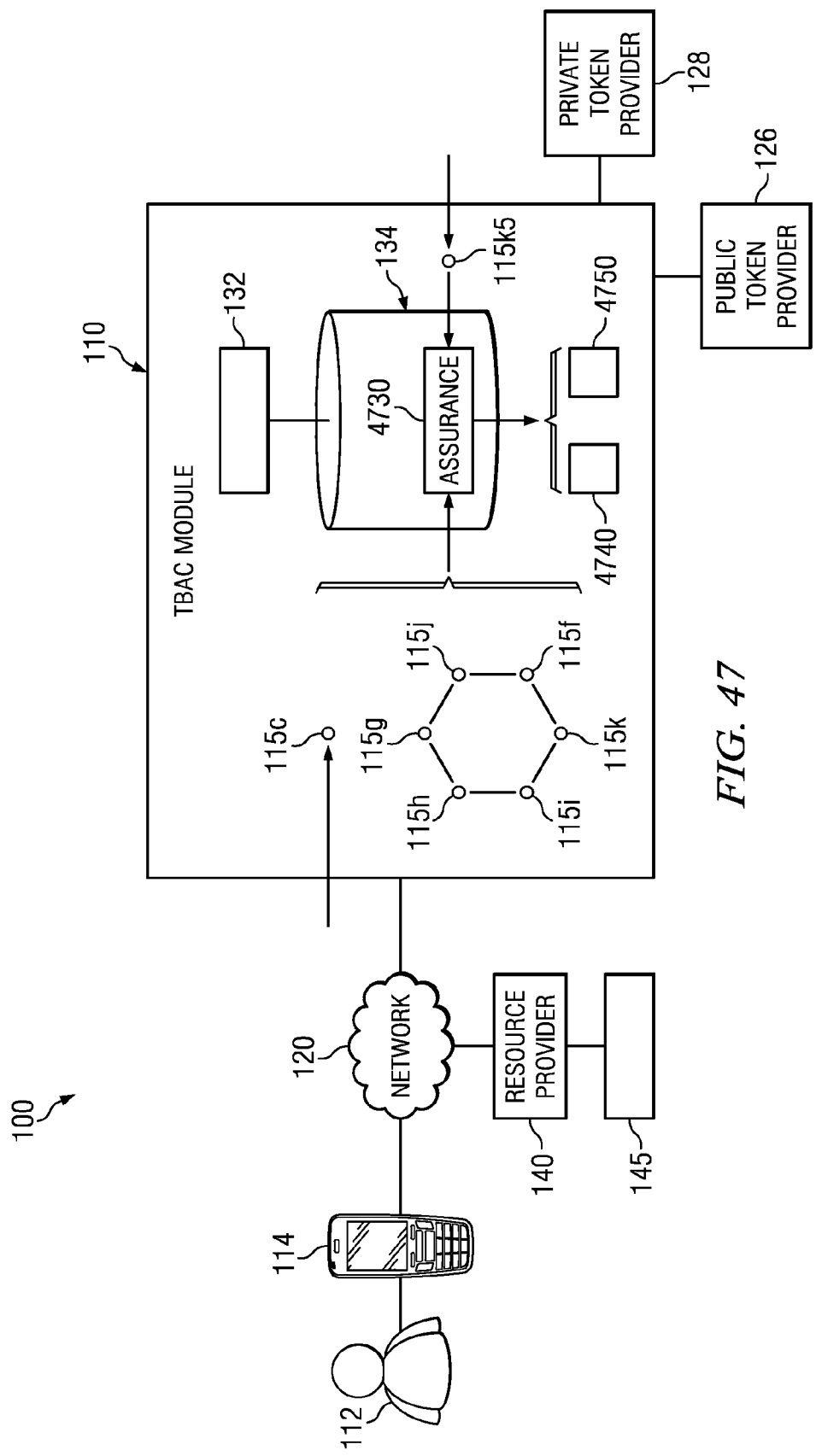
FIG. 47 illustrates the system of FIG. 1 determining assurance levels.
Figure 48:
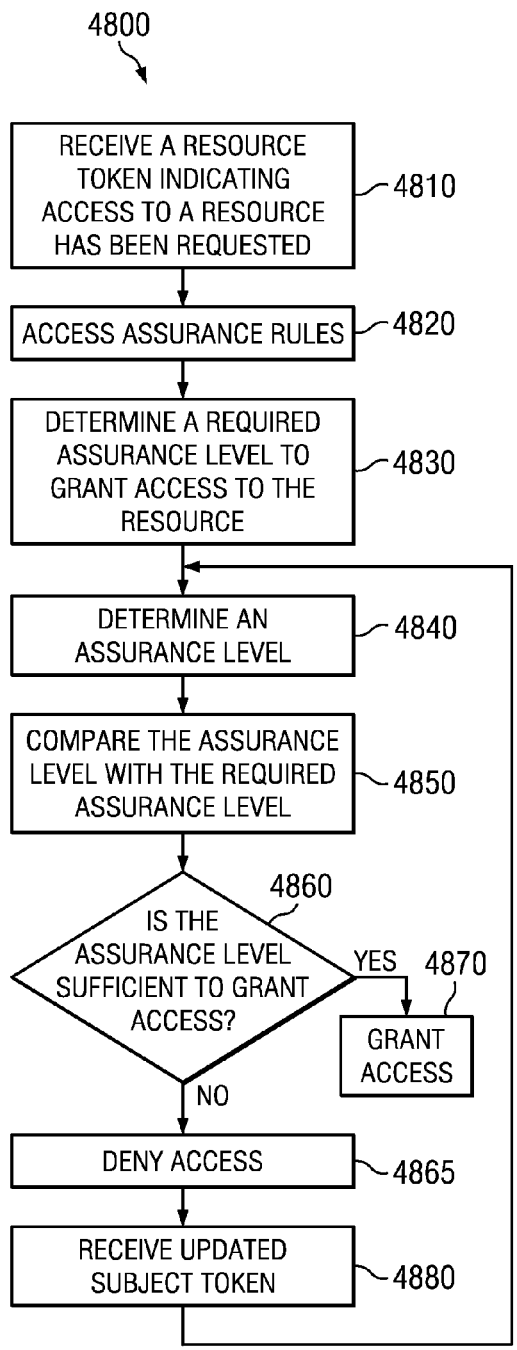
FIG. 48 is a flowchart illustrating a method of determining assurance levels.

FIGS. 47-48 illustrate the system 100 of FIG. 1 determining assurance levels. Assurance levels may correspond to the risk that user 112 and/or device 114 have been incorrectly identified. TBAC module 110 may use the assurance level to make an access decision in order to avoid granting access to an inappropriate user 112 and/or device 114. The process of determining and making access decisions based on assurance levels is discussed further with respect to FIGS. 47-48.

FIG. 47 illustrates the system 100 of FIG. 1 determining assurance levels 4750. As provided by FIG. 47, TBAC module 110 may correlate subject token 115k, network token 115f, among others as appropriate with session token 115j. TBAC module 110 may receive resource token 115c associated with resource 145. In particular embodiments, resource token 115c may indicate that user 112 and/or device 114 have requested access to resource 145. To determine whether to grant user 112 and/or device 114 access to resource 145, TBAC module 110 may determine an assurance level 4750 and compare assurance level 4750 with a required assurance level 4740.

To determine assurance level 4750, TBAC module 110 may utilize assurance rules 4730 stored in memory 134. In particular embodiments, TBAC module 110 may use resource token 115c, subject token 115k, among others as appropriate to access assurance rules 4730. Based on one or more of these tokens 115, TBAC module 110 may determine at least one assurance rule 4730 applicable to resource 145, user 112, and/or device 114. The at least one assurance rule 4730 may specify a required assurance level 4740 associated with resource 145. In particular embodiments, assurance level 4750 may be compared with required assurance level 4740 to determine if access to resource 145 may be granted. The at least one assurance rule 4730 may further specify how to determine assurance level 4750. In particular embodiments, the at least one assurance rule 4730 may associate different assurance levels 4750 with different numbers and combinations of subject tokens 115k. TBAC module 110 may examine the subject tokens 115k associated with user 112 and device 114 and then determine if any of the combinations of subject tokens 115k specified by assurance rules 4730 are present. Based on the combinations of subject tokens 115k that are present, TBAC module 110 may apply the at least one assurance rule 4730 and determine an assurance level 4750 associated with user 112 and device 114.

In particular embodiments, TBAC module 110 may determine whether to grant or deny access to resource 145 associated with resource token 115c by comparing assurance level 4750 with required assurance level 4740. As an example and not by way of limitation, TBAC module 110 may deny access to resource 145 if assurance level 4750 is less than required assurance level 4740. Although this disclosure describes TBAC module 110 denying access to resource 145 if assurance level 4750 is less than required assurance level 4740, one of ordinary skill in the art would understand that TBAC module 110 may be modified to deny access to resource 145 if assurance level 4750 is greater than or equal to required assurance level 4740. Furthermore, the values of assurance level 4750 and required assurance level 4740 may be alphanumeric, symbolic, or any appropriate values recognized and comparable by TBAC module 110.

In particular embodiments, TBAC module 110 may redetermine assurance level 4750 when a change to subject tokens 115k occurs. TBAC module 110 may receive an updated subject token 115k5 from a token provider such as a private token provider 128 or public token provider 126. Based on updated subject token 115k5, TBAC module 110 may update assurance level 4750. After updating assurance level 4750, TBAC module 110 may determine whether to grant or deny access to resource 145. As an example and not by way of limitation, updated subject token 115k5 may indicate that user 112 and/or device 114 have performed a form of authentication, such as biometric authentication. Updated subject token 115k5 may therefore reduce the risk that user 112 and/or device 114 have been incorrectly identified. TBAC module 110 may update assurance level 4750 accordingly, and then compare assurance level 4750 to required assurance level 4740. TBAC module 110 may determine, based at least in part upon the at least one assurance rule 4730, that assurance level 4750 is sufficient to grant access to resource 145 after the update. TBAC module 110 may then grant access to resource 145.

In particular embodiments, the assurance level 4750 may correspond to the risk that user 112 and/or device 114 have been incorrectly identified. An incorrect identification may lead TBAC module 110 to receive subject tokens 115k indicating a different user 112 and/or device 114 have requested access to resource 145. An incorrect identification may also result from a different user 112 stealing an account associated with user 112. Various subject tokens 115k may reduce this risk. As an example and not by way of limitation, a subject token 115k may indicate that user 112 and/or device 114 have performed biometric authentication, thus increasing the chances that user 112 and/or device 114 have been correctly identified. Likewise, a subject token 115k that indicates that an account associated with user 112 has not been compromised by a hacker or a thief may also increase the chance that user 112 and/or device 114 have been correctly identified. Similarly, subject tokens 115k associated with identification devices of device 114 may reduce the risk that device 114 has been incorrectly identified. As an example and not by way of limitation, subject tokens 115k associated with a trusted platform module security device of the device 114 and/or a subscriber identity module of device 114. These devices may enable device 114 to provide more reliable forms of authentication for various elements of system 100.

Likewise, subject tokens 115k associated with security features of device 114 may further reduce the risk that device 114 has been incorrectly identified. As an example and not by way of limitation, subject tokens 115k that indicate that device 114 is not affected by a virus. This subject token 115k may therefore make authentication performed by the device 114 to be more reliable because any credentials passed by the device will not have been influenced by a virus on the device 114. Therefore, this subject token 115k may reduce the risk that device 114 has been incorrectly identified. As another example and not by way of limitation, subject token 115k may indicate that device 114 is associated with a firewall. The firewall may make authentication sent from device 114 to be more reliable because the firewall may filter out corrupted information sent from device 114. Therefore, this subject token 115k may reduce the risk that device 114 has been incorrectly identified. As yet another example and not by way of limitation, subject token 115k may indicate that device 114 is operable to perform biometric authentication. In particular environments, a biometric authentication enabled device may provide more reliable authentication than devices 114 that cannot perform biometric authentication. Therefore, this subject token 115k may reduce the risk that user 112 and/or device 114 have been incorrectly identified. Although this disclosure describes subject tokens 115k indicating particular actions or features associated with user 112 and/or device 114 that reduce the risk that user 112 and/or device 114 have been incorrectly identified, this disclosure contemplates subject tokens 115k or any combination of subject tokens 115k indicating any appropriate feature or action associated with user 112 and/or device 114 that reduces the risk that user 112 and/or device 114 have been incorrectly identified.

In particular embodiments, assurance level 4750 may correspond with the number of subject tokens 115k present in a particular combination of subject tokens 115k. As an example and not by way of limitation, a first combination of subject tokens 115k may include a subject token 115k that indicates that the user 112 and/or device 114 have performed biometric authentication and a subject token 115k that indicates that device 114 has a firewall. That first combination may be associated with a better assurance level 4750 than a second combination of subject tokens 115k that only includes a subject token 115k that indicates that device 114 is not infected by a virus. As another example and not by way of limitation, a first combination of subject tokens 115k that includes five subject tokens 115k may be associated with a better assurance level 4750 than a second combination of subject tokens 115k that only includes two subject tokens 115k. In this manner, TBAC module 110 may abstract into an assurance level 4750 various actions and features of user 112 and/or device 114 that reduce the risk that user 112 and/or device 114 have been incorrectly identified.

The illustration of system 100 in FIG. 47 does not specifically illustrate all of the elements from the illustration of system 100 in FIG. 1 so that particular aspects of system 100 may be emphasized. However, system 100 of FIG. 47 includes all the elements of system 100 in FIG. 1.

FIG. 48 is a flowchart illustrating a method 4800 of determining assurance levels 4750. TBAC module 110 may perform method 4800. As provided by FIG. 48, TBAC module 110 may begin by receiving a resource token 115c indicating access to a resource 145 has been requested in step 4810. TBAC module 110 may then access assurance rules 4730 in step 4820. In particular embodiments, TBAC module 110 may use resource token 115c and subject tokens 115k, among others as appropriate, to access assurance rules 4730. TBAC module 110 may use these tokens 115 to determine at least one assurance rule 4730 applicable to resource 145. In particular embodiments, the at least one assurance rule 4730 may specify a required assurance level 4750 necessary to grant access to resource 145 and may associate assurance levels 4750 with particular combinations of subject tokens 115k.

In step 4830, TBAC module 110 may determine a required assurance level 4740 necessary to grant access to the resource 145. In particular embodiments, the at least one assurance rule 4730 may specify the required assurance level 4740. In step 4840, TBAC module 110 may determine an assurance level 4750. In particular embodiments, the assurance level 4750 may correspond with particular combinations of subject tokens 115k specified by the at least one assurance rule 4730. As an example and not by way of limitation, the at least one assurance rule 4730 may associate a first combination of subject tokens 115k with a particular assurance level 4750, and may associate a second combination of subject tokens 115k with a different assurance level 4750 because the first and second combinations of subject tokens 115k may include different subject tokens 115k.

TBAC module 110 may compare the assurance level 4750 with the required assurance level 4740 in step 4850. In step 4860, TBAC module 110 may determine whether the assurance level 4750 is sufficient to grant access to resource 145. As an example and not by way of limitation, TBAC module 110 may grant access to resource 145 in step 4870 if assurance level 4750 is greater than or equal to the required assurance level 4740. If TBAC module 110 determines that assurance level 4750 is insufficient to grant access to resource 145, TBAC module 110 may deny access to resource 145 in step 4865. TBAC module 110 may then receive an updated subject token 115k5 in step 4880. Updated subject token 115k5 may indicate an action or a feature associated with user 112 and/or device 114 that reduces the risk that user 112 and/or device 114 have been incorrectly identified. After receiving updated subject token 115k5, TBAC module 110 may return to step 4840 to determine the assurance level 4750 based on the updated subject token 115k5.

Figure 50:
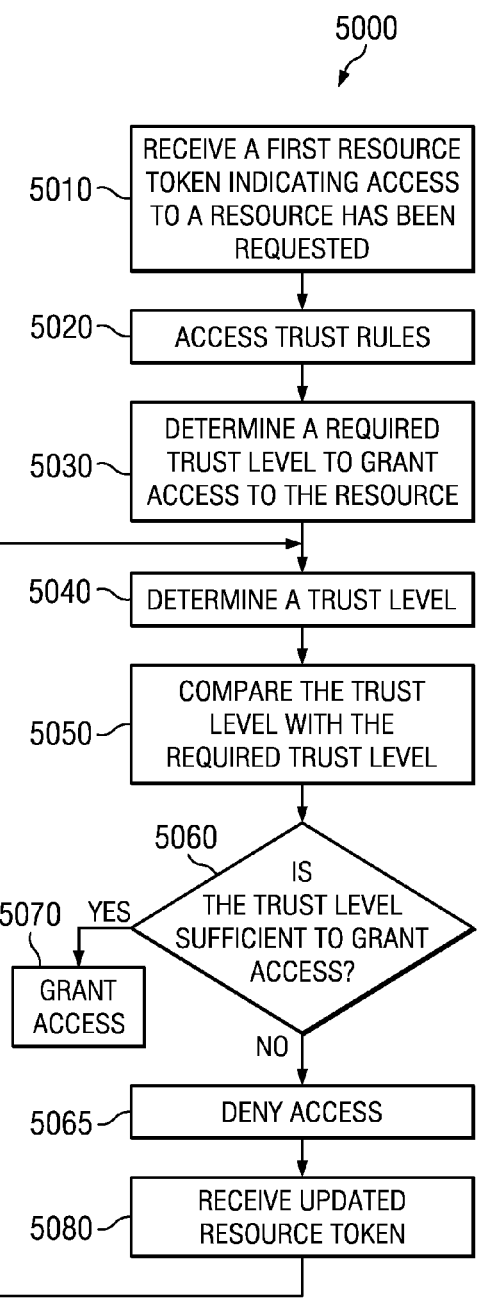
FIG. 50 is a flowchart illustrating a method of determining trust levels.
Figure 49:
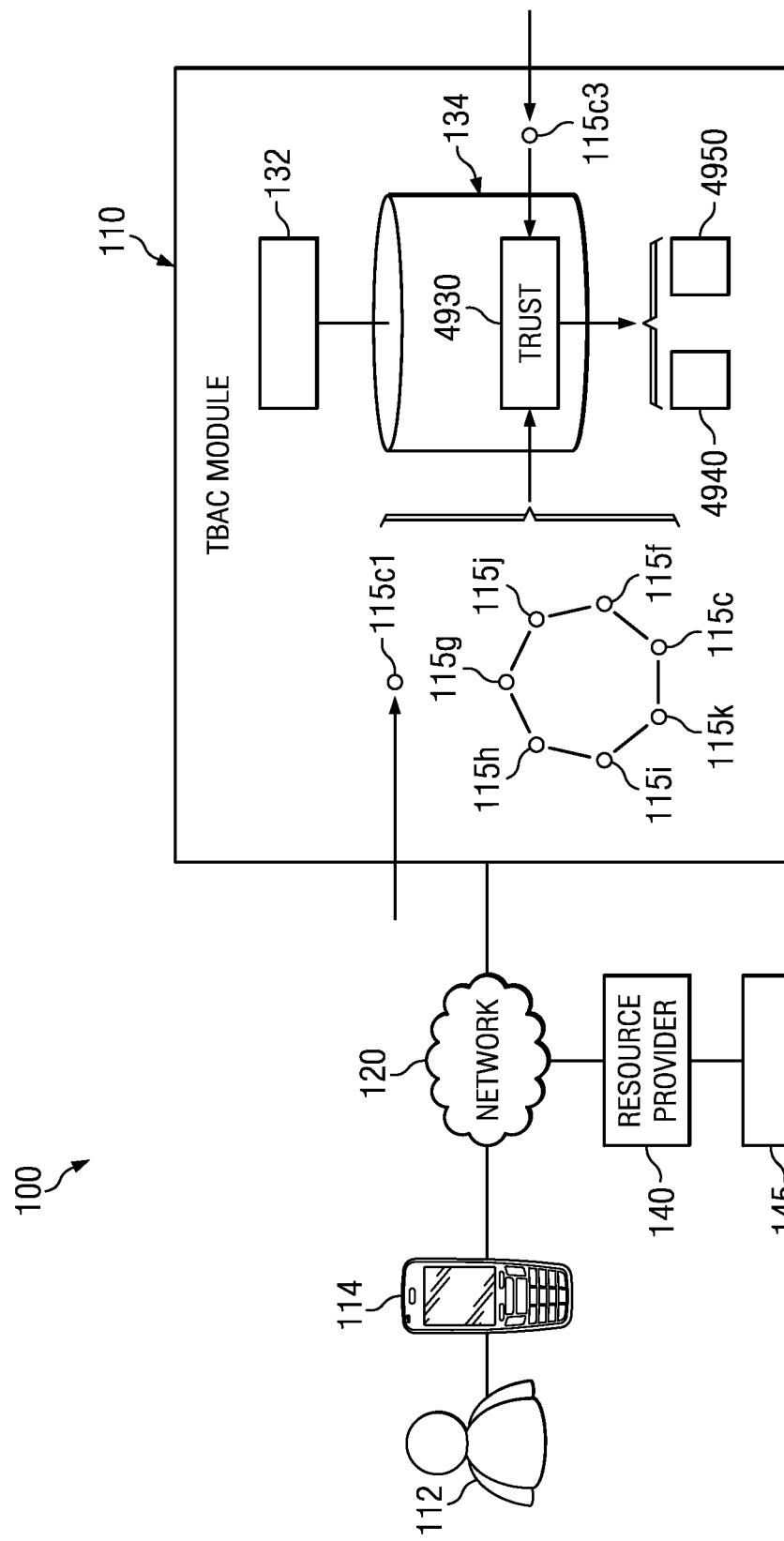
FIG. 49 illustrates the system of FIG. 1 determining trust levels.

FIGS. 49-50 illustrate the system 100 of FIG. 1 determining trust levels. Trust levels may correspond to the risk that resource 145 is incorrect or has been compromised. TBAC module 110 may use the trust level to make an access decision in order to avoid granting access to an unrequested resource 145 or to a resource 145 that may corrupt device 114. The process of determining and making access decisions based on trust levels is discussed further with respect to FIGS. 49-50.

FIG. 49 illustrates the system 100 of FIG. 1 determining trust levels 4950. As provided by FIG. 49, TBAC module 110 may correlate resource token 115c, network token 115f, subject token 115k among others as appropriate with session token 115j. TBAC module 110 may receive first resource token 115c1 associated with resource 145. In particular embodiments, first resource token 115c1 may indicate that user 112 and/or device 114 have requested access to resource 145. To determine whether to grant user 112 and/or device 114 access to resource 145, TBAC module 110 may determine a trust level 4950, and compare trust level 4950 with a required trust level 4940.

To determine trust level 4950, TBAC module 110 may utilize trust rules 4930 stored in memory 134. In particular embodiments, TBAC module 110 may use resource token 115c and first resource token 115c, subject token 115k, among others as appropriate to access trust rules 4930. Based on these tokens 115, TBAC module 110 may determine at least one trust rule 4930 applicable to resource 145, user 112, and/or device 114. The at least one trust rule 4930 may specify a required trust level 4940 associated with resource 145. In particular embodiments, trust level 4950 may be compared with required trust level 4940 to determine if access to resource 145 may be granted. The at least one trust rule 4930 may further specify how to determine trust level 4950. In particular embodiments, the at least one trust rule 4930 may associate different trust levels 4950 with different numbers and combinations of resource tokens 115c. TBAC module 110 may examine the resource tokens 115c associated with resource 145 and then determine if any of the combinations of resource tokens 115c specified by trust rules 4930 are present. Based on the combinations of resource tokens 115c that are present, TBAC module 110 may apply the at least one trust rule 4930 and determine a trust level 4950 associated with resource 145.

In particular embodiments, TBAC module 110 may determine whether to grant or deny access to resource 145 associated with resource token 115c by comparing trust level 4950 with required trust level 4940. As an example and not by way of limitation, TBAC module 110 may deny access to resource 145 if trust level 4950 is less than required trust level 4940. Although this disclosure describes TBAC module 110 denying access to resource 145 if trust level 4950 is less than required trust level 4940, one of ordinary skill in the art would understand that TBAC module 110 may be modified to deny access to resource 145 if trust level 4950 is greater than or equal to required trust level 4940. Furthermore, the values of trust level 4950 and required trust level 4940 may be alphanumeric, symbolic, or any appropriate values recognized and comparable by TBAC module 110.

In particular embodiments, TBAC module 110 may redetermine trust level 4950 when a change to resource tokens 115c occurs. TBAC module 110 may receive an updated resource token 115c3. Based on updated resource token 115c3, TBAC module 110 may update trust level 4950. After updating trust level 4950, TBAC module 110 may determine whether to grant or deny access to resource 145. As an example and not by way of limitation, updated resource token 115c3 may indicate that a form of authentication associated with the resource 145, such as Kerberos authentication, has been performed. Updated resource token 115c3 may therefore reduce the risk that resource 145 is not the resource 145 requested by user 112 and/or device 114. As another example and not by way of limitation, updated resource token 115c3 may indicate that a security feature associated with resource 145, such as firewall or an antivirus, has not been compromised. Updated resource token 115c3 may therefore reduce the risk of resource 145 corrupting device 114. Based at least in part upon updated resource token 115c3 and the at least one trust rule 4930, TBAC module 110 may update trust level 4950 accordingly, and then compare trust level 4950 to required trust level 4940. TBAC module 110 may determine, based at least in part upon the at least one trust rule 4930, that trust level 4950 is sufficient to grant access to resource 145 after the update. TBAC module 110 may then grant access to resource 145.

In particular embodiments, the trust level 4950 may correspond to the risk that resource 145 is not the resource 145 that user 112 and/or device 114 requested. Various resource tokens 115c may reduce this risk. As an example and not by way of limitation, a resource token 115c may indicate that a form of authentication associated with the resource, such as Kerberos authentication, has been performed. As another example and not by way of limitation, a resource token 115c may indicate that resource 145 is associated with a digital certificate. As yet another example, resource token 115c may indicate that the resource is associated with a trusted platform module security device or a virtual private network. Kerberos authentication, digital certificates, trusted platform module security devices, and virtual private networks may make authentication provided by resource 145 more reliable and trustworthy. In this manner, these resource tokens 115c reduce the risk that resource 145 is not the resource requested by user 112 and/or device 114. TBAC module 110 may use these resource tokens 145c in determining trust level 4950.

In particular embodiments, the trust level 4950 may correspond to the risk that resource 145 is compromised or that security associated with resource 145 is compromised such that accessing resource 145 may corrupt device 114. Various resource tokens 115c may reduce this risk. As an example and not by way of limitation, a resource token 115c may indicate that the resource 145 is associated with a firewall or an antivirus. As another example and not by way of limitation, resource token 15c may indicate that the resource 145 has not been infected by a virus. If resource 145 has been infected by a virus, then granting access to resource 145 may lead device 114 to also be infected or affected by the virus. In this manner, these resource tokens 115c reduce the risk that accessing resource 145 may corrupt device 114. TBAC module 110 may use these resource tokens 145c in determining trust level 4950. Although this disclosure describes resource tokens 115c indicating particular actions or features associated with resource 145 that reduce the risk that resource 145 is incorrect or compromised, this disclosure contemplates resource tokens 115c or any combination of resource tokens 115c indicating any appropriate feature or action associated with resource 145 that reduce the risk that resource 145 is incorrect or compromised.

In particular embodiments, trust level 4950 may correspond with the number of resource tokens 115c present in a particular combination of resource tokens 115c. As an example and not by way of limitation, a first combination of resource tokens 115c may include a resource token 115c that indicates that the Kerberos authentication associated with the resource 145 has been performed, and a resource token 115c that indicates that the resource 145 is associated with a firewall. That first combination may be associated with a better trust level 4950 than a second combination of resource tokens 115c that only includes a resource token 115c that indicates that resource 145 is not infected by a virus. In this manner, TBAC module 110 may abstract into a trust level 4950, various actions and features associated with resource 145 that reduce the risk that resource 145 is incorrect and/or compromised.

The illustration of system 100 in FIG. 49 does not specifically illustrate all of the elements from the illustration of system 100 in FIG. 1 so that particular aspects of system 100 may be emphasized. However, system 100 of FIG. 49 includes all the elements of system 100 in FIG. 1.

FIG. 50 is a flowchart illustrating a method 5000 of determining trust levels 4950. TBAC module 110 may perform method 5000. As provided by FIG. 50, TBAC module 110 may begin by receiving a first resource token 115c1 indicating access to a resource 145 has been requested in step 5010. TBAC module 110 may then access trust rules 4930 in step 5020. In particular embodiments, TBAC module 110 may use resource tokens 115c and first resource token 115c1, and subject tokens 115k, among others as appropriate, to access trust rules 4930. TBAC module 110 may use these tokens 115 to determine at least one trust rule 4930 applicable to resource 145. In particular embodiments, the at least one trust rule 4930 may specify a required trust level 4940 necessary to grant access to resource 145, and may associate trust levels 4950 to particular combinations of resource tokens 115c.

In step 5030, TBAC module 110 may determine a required trust level 4940 necessary to grant access to the resource 145. In particular embodiments, the at least one trust rule 4930 may specify the required trust level 4940. In step 5040, TBAC module 110 may determine a trust level 4950. In particular embodiments, the trust level 4950 may correspond with particular combinations of resource tokens 115c specified by the at least one trust rule 4930. TBAC module 110 may determine that a particular combination of resource tokens 115c specified by the at least one trust rule 4930 is present, and determine the associated trust level 4950 specified by the at least one rule 4930. TBAC module 110 may compare the trust level 4950 with the required trust level 4940 in step 5050. In step 5060, TBAC module 110 may determine whether the trust level 4950 is sufficient to grant access to resource 145. As an example and not by way of limitation, TBAC module 110 may grant access to resource 145 in step 5070 if trust level 4950 is greater than or equal to the required trust level 4940. If TBAC module 110 determines that trust level 4950 is insufficient to grant access to resource 145, TBAC module 110 may deny access to resource 145 in step 5065. TBAC module 110 may then receive an updated resource token 115c3 in step 5080. Updated resource token 115c3 may indicate an action or a feature associated with resource 145 that reduces the risk that resource 145 is incorrect or compromised. After receiving updated resource token 115c3, TBAC module 110 may return to step 5040 to determine the trust level 4950 based on the updated resource token 115c3.

Figure 51:
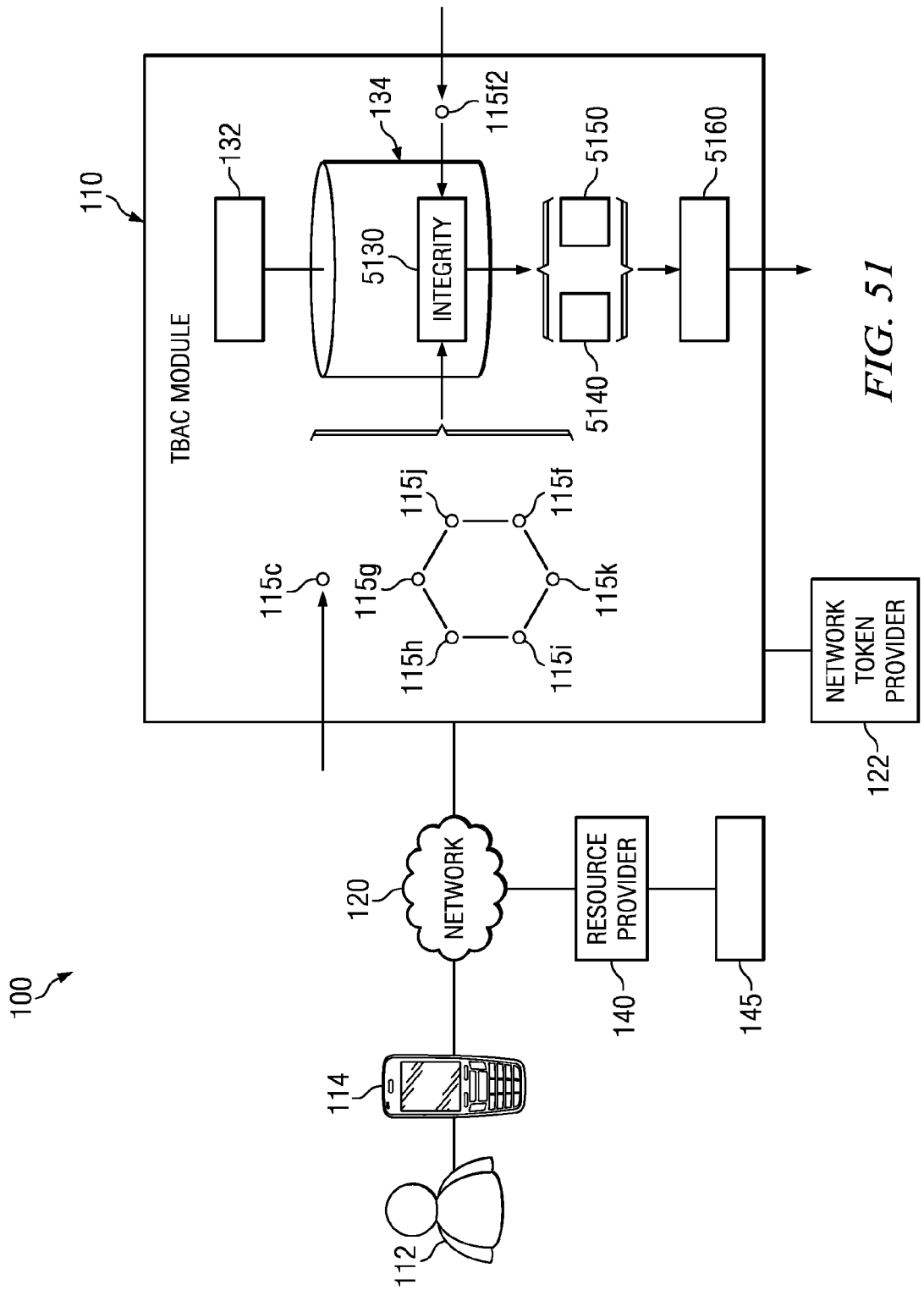
FIG. 51 illustrates the system of FIG. 1 determining integrity levels.
Figure 52:
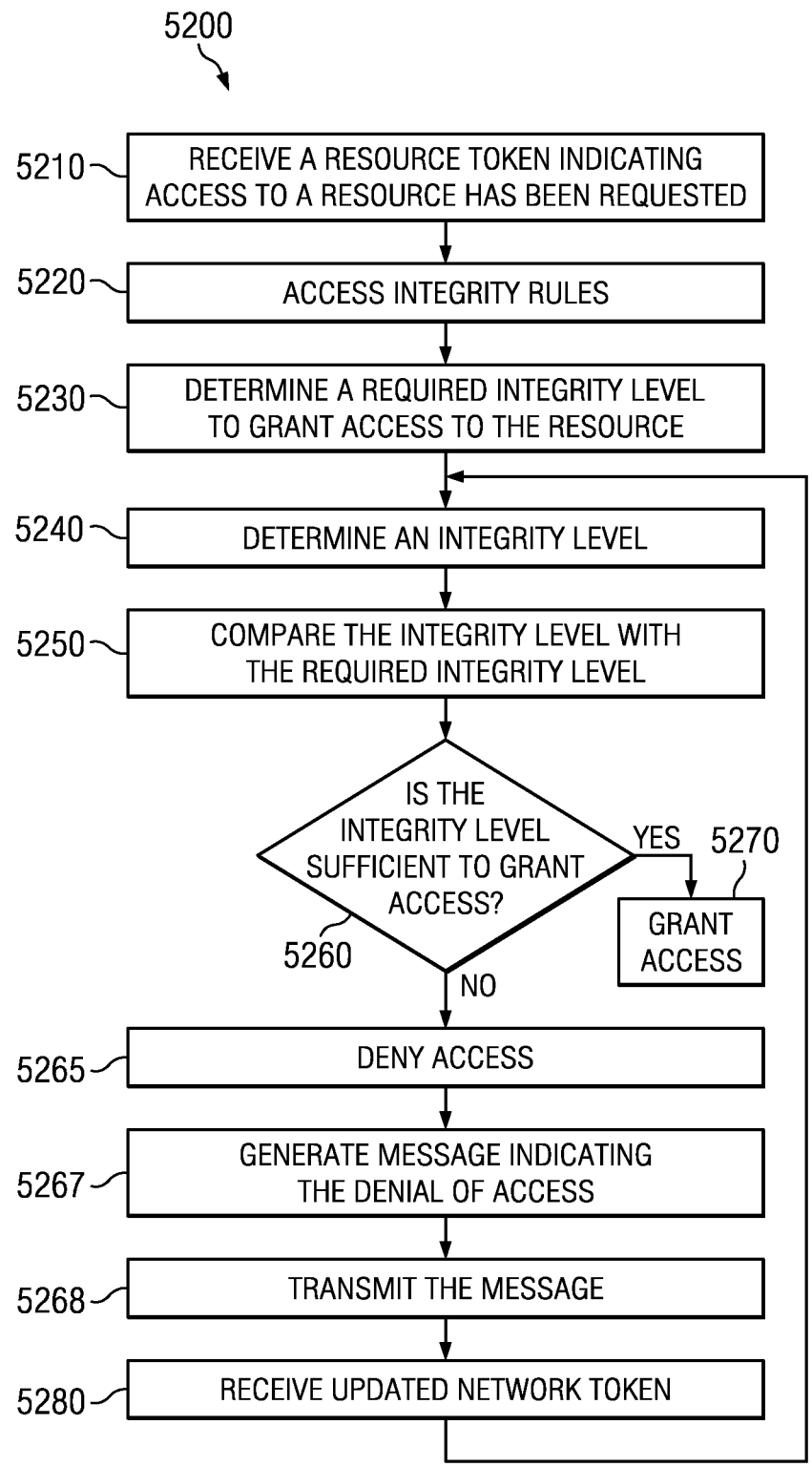
FIG. 52 is a flowchart illustrating a method of determining integrity levels.

FIGS. 51-52 illustrate the system 100 of FIG. 1 determining integrity levels. Integrity levels may correspond to the integrity of the data trafficked over network 120. TBAC module 110 may use the integrity level to make an access decision in order to avoid granting access to a resource over an insecure network 120. The process of determining and making access decisions based on integrity levels is discussed further with respect to FIGS. 51-52.

FIG. 51 illustrates the system 100 of FIG. 1 determining integrity levels 5150. As provided by FIG. 51, TBAC module 110 may correlate subject token 115k, network token 115f, among others as appropriate with session token 115j. TBAC module 110 may receive resource token 115c associated with resource 145. In particular embodiments, resource token 115c may indicate that user 112 and/or device 114 have requested access to resource 145. To determine whether to grant access to resource 145 over network 120, TBAC module 110 may determine an integrity level 5150 and compare integrity level 5150 with a required integrity level 5140.

To determine integrity level 5150, TBAC module 110 may utilize integrity rules 5130 stored in memory 134. In particular embodiments, TBAC module 110 may use resource token 115c, network token 115f, among others as appropriate to access integrity rules 5130. Based on these tokens 115, TBAC module 110 may determine at least one integrity rule 5130 applicable to resource 145 and network 120. The at least one integrity rule 5130 may specify a required integrity level 5140 associated with network 120. In particular embodiments, integrity level 5150 may be compared with required integrity level 5140 to determine if access over network 120 may be granted. The at least one integrity rule 5130 may further specify how to determine integrity level 5150. In particular embodiments, the at least one integrity rule 5130 may associate different integrity levels 5150 with different combinations of network tokens 115f. TBAC module 110 may examine the network tokens 115f associated with network 120 and then determine if any of the combinations of network tokens 115f specified by integrity rules 5130 are present. Based on the combinations of network tokens 115f that are present, TBAC module 110 may apply the at least one integrity rule 5130 and determine an integrity level 5150 associated with user network 120.

In particular embodiments, TBAC module 110 may determine whether to grant or deny access to resource 145 associated with resource token 115c by comparing integrity level 5150 with required integrity level 5140. As an example and not by way of limitation, TBAC module 110 may deny access to resource 145 if integrity level 5150 is less than required integrity level 5140. Although this disclosure describes TBAC module 110 denying access to resource 145 if integrity level 5150 is less than required integrity level 5140, one of ordinary skill in the art would understand that TBAC module 110 may be modified to deny access to resource 145 if integrity level 5150 is greater than or equal to required integrity level 5140. Furthermore, the values of integrity level 5150 and required integrity level 5140 may be alphanumeric, symbolic, or any appropriate values recognized and comparable by TBAC module 110.

In particular embodiments, TBAC module 110 may generate a message 5160 in response to denying access to resource 145. Message 5160 may indicate the denial of access, and may further indicate the reason for the denial, such as for example, that a connection associated with network 120 is not secure. TBAC module 110 may transmit the message to an element of system 100, such as for example device 114, to notify the element of the issues associated with network 120. In this manner, the appropriate element of system 100 may remedy the issues associated with network 120.

In particular embodiments, TBAC module 110 may redetermine integrity level 5150 when a change to network tokens 115f occurs. TBAC module 110 may receive an updated network token 115f2 in response to transmitting message 5160. Updated network token 115f2 may come from a token provider such as network token provider 122. Updated network token 115f2 may indicate an action or feature of network 120 that increases the integrity of the data trafficked over network 120, such as for example that a connection associated with network 120 is a dedicated connection. As another example and not by way of limitation, updated network token 115f may indicate that network 120 performs a form of encryption, such as Wi-Fi Protected Access. Based on updated network token 115f2, TBAC module 110 may update integrity level 5150. TBAC module 110 may update integrity level 5150 accordingly, and then compare integrity level 5150 to required integrity level 5140. TBAC module 110 may determine that after the update, integrity level 5150 is sufficient to grant access to resource 145. TBAC module 110 may then grant access to resource 145.

In particular embodiments, the integrity level 5150 may correspond to the integrity of the data trafficked over network 120. Various network tokens 115f may increase this integrity. As an example and not by way of limitation, a network token 115f may indicate that the network 120 performs a form of encryption, such as Wi-Fi Protected Access encryption, thus increasing the integrity of the data trafficked over the network 120. Likewise, a network token 115f that indicates that network 120 supports dedicated connections may also increase the integrity of the data trafficked over the network 120. Similarly, network tokens 115f indicating that network 120 includes a terminal node controller may also increase the integrity of the data trafficked over the network 120. Similarly, network tokens 115k indicating that the network performs transport layer security or host identity protocol may increase the integrity of the data trafficked over the network 120. As another example and not by way of limitation, network tokens 115f that indicate that network 120 has a firewall or is not affected by a virus may increase the integrity of the data trafficked over network 120. Although this disclosure describes network tokens 115f indicating particular actions or features associated with network 120 that increase the integrity of data trafficked over network 120, this disclosure contemplates network tokens 115f or any combination of network tokens 115f indicating any appropriate feature or action associated with network 120 that increase the integrity of data trafficked over network 120.

In particular embodiments, integrity level 5150 may correspond with the number of network tokens 115f present in a particular combination of network tokens 115f. As an example and not by way of limitation, a first combination of network tokens 115f may include a network token 115f that indicates that network 120 supports dedicated connections and a network token 115f that indicates that network 120 provides transport layer security. That first combination may be associated with a better integrity level 5150 than a second combination of network tokens 115f that only includes a network token 115f that indicates that network 120 has a firewall. In this manner, TBAC module 110 may abstract into an integrity level 5150 various actions and features of network 120 that increase the integrity of the data trafficked over network 120.

The illustration of system 100 in FIG. 51 does not specifically illustrate all of the elements from the illustration of system 100 in FIG. 1 so that particular aspects of system 100 may be emphasized. However, system 100 of FIG. 51 includes all the elements of system 100 in FIG. 1.

FIG. 52 is a flowchart illustrating a method 5200 of determining integrity levels 5150. TBAC module 110 may perform method 5200. As provided by FIG. 52, TBAC module 110 may begin by receiving a resource token 115c indicating access to a resource 145 has been requested in step 5210. TBAC module 110 may then access integrity rules 5130 in step 5220. In particular embodiments, TBAC module 110 may use resource token 115c and network tokens 115f, among others as appropriate, to access integrity rules 5130. TBAC module 110 may use these tokens 115 to determine at least one integrity rule 5130 applicable to resource 145. In particular embodiments, the at least one integrity rule 5130 may specify a required integrity level 5140 necessary to grant access to resource 145 over network 120, and may associate integrity levels 5150 to particular combinations of network tokens 115f.

In step 5230, TBAC module 110 may determine a required integrity level 5140 necessary to grant access to the resource 145. In particular embodiments, the at least one integrity rule 5130 may specify the required integrity level 5140. In step 5240 TBAC module 110 may determine an integrity level 5150. In particular embodiments, the integrity level 5150 may correspond with particular combinations of network tokens 115f specified by the at least one integrity rule 5130. TBAC module 110 may compare the integrity level 5150 with the required integrity level 5140 in step 5250. In step 5260, TBAC module 110 may determine whether the integrity level 5150 is sufficient to grant access to resource 145. As an example and not by way of limitation, TBAC module 110 may grant access to resource 145 in step 5270 if integrity level 5150 is greater than or equal to the required integrity level 5140.

If TBAC module 110 determines that integrity level 5150 is insufficient to grant access to resource 145, TBAC module 110 may deny access to resource 145 in step 5265. In response to denying access, TBAC module 110 may generate a message 5160 indicating the denial of access in step 5267. In particular embodiments, message 5160 may further indicate the reason for the denial. TBAC module 110 may then transmit the message in step 5268. In particular embodiments, TBAC module 110 may transmit the message to an appropriate element of system 100 that can resolve the issue with network 120 supporting the denial of access. After transmitting the message 5160, TBAC module 110 may then receive an updated network token 115f2 in step 5280. Updated network token 115f2 may indicate an action or a feature associated with network 120 that increases the integrity of data trafficked over network 120. After receiving updated network token 115f2, TBAC module 110 may return to step 5240 to determine the integrity level 5150 based on the updated network token 115f2.

Figure 53:
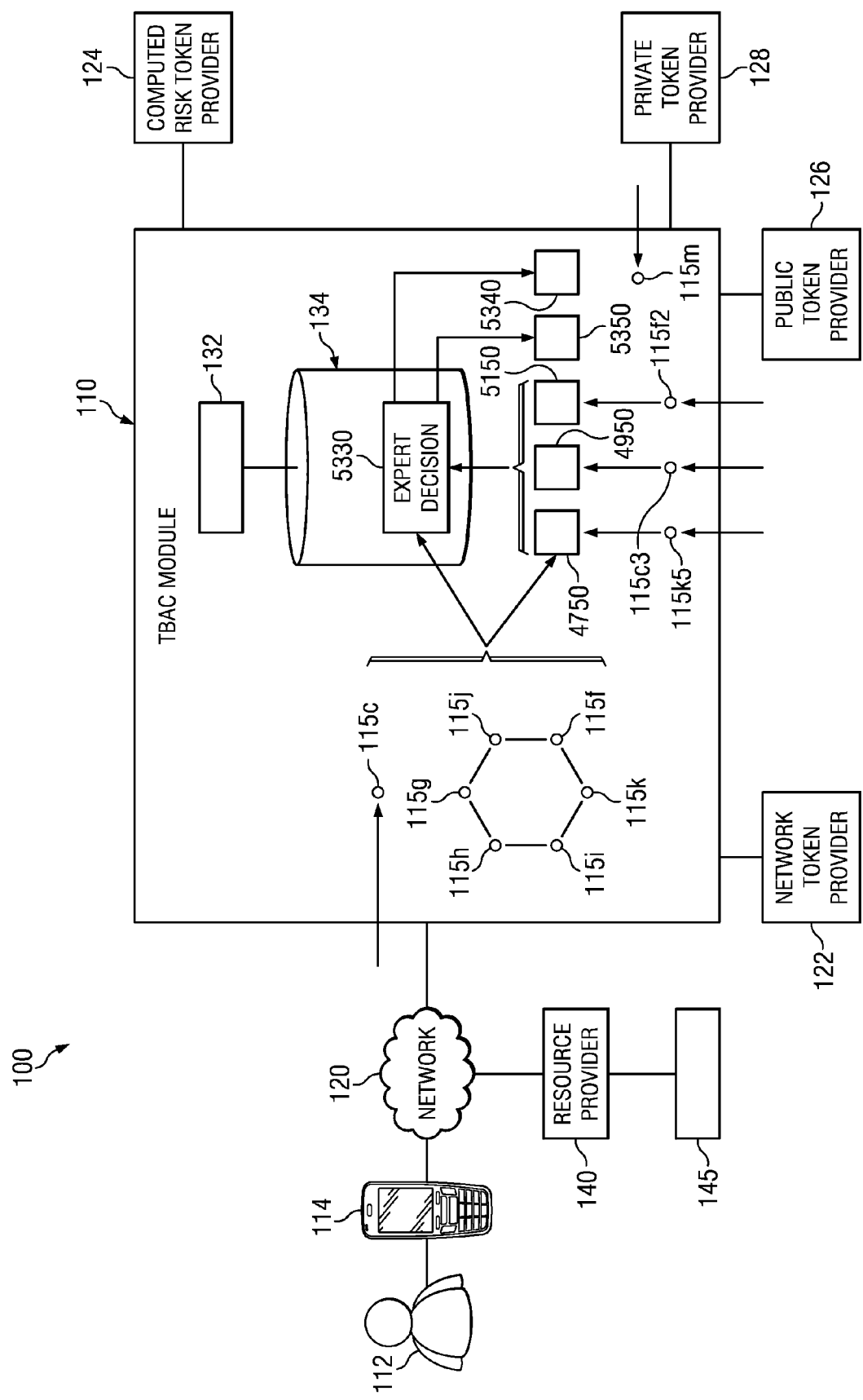
FIG. 53 illustrates the system of FIG. 1 performing expert decisioning.
Figure 54:
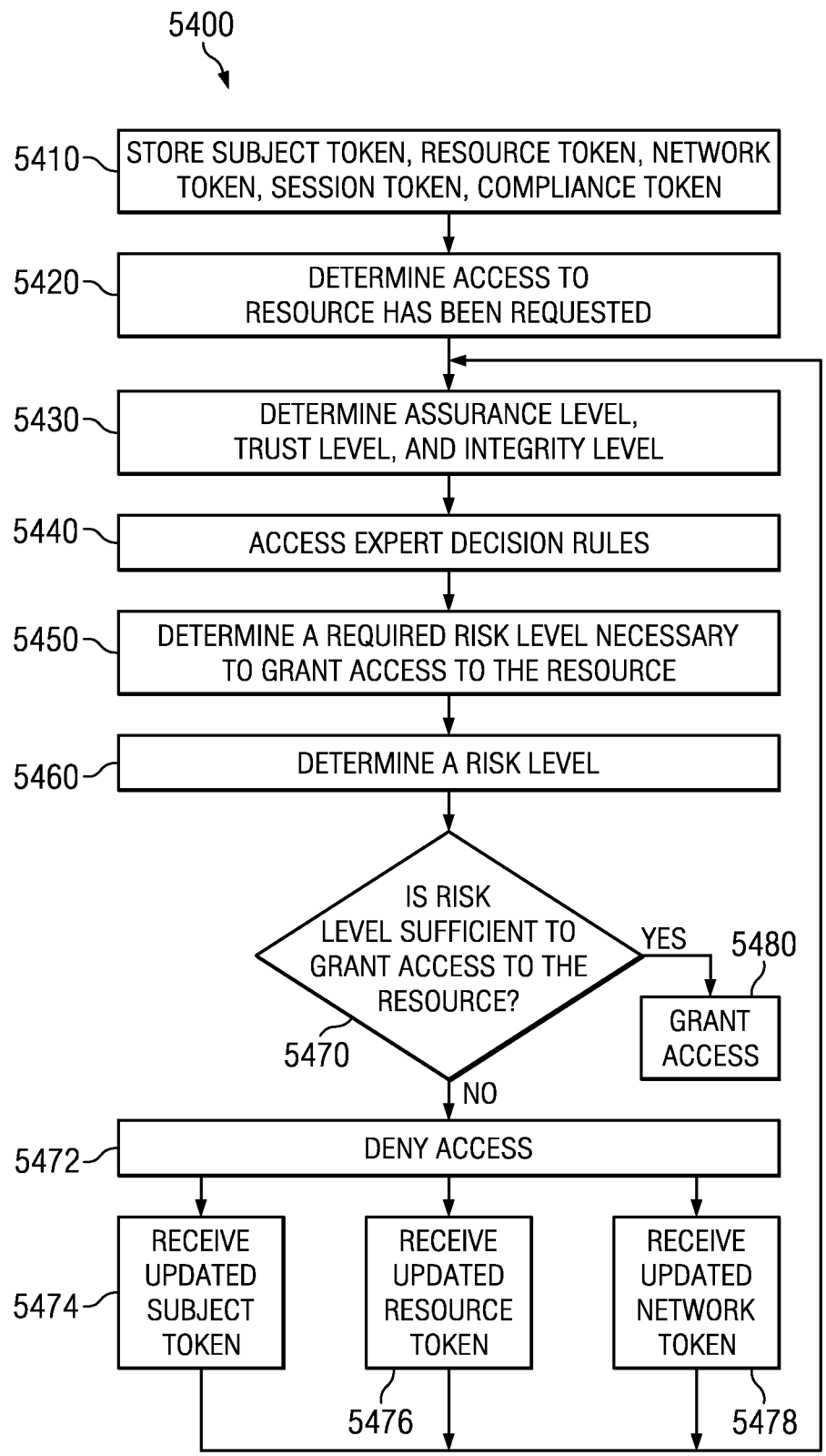
FIG. 54 is a flowchart illustrating a method of performing expert decisioning.

FIGS. 53-54 illustrate the system 100 of FIG. 1 performing expert decisioning. In general, access decisions may be made based upon access values that were determined from other access values. For example, system 100 may determine a risk level by combining an assurance level 4750, trust level 4950, and integrity level 5150 as described with respect to FIGS. 47-52. Access decisions may then be made based on the risk level. The process of making access decisions based on access values determined from other access values is known as expert decisioning and is discussed further with respect to FIGS. 53-54.

TBAC module 110 may determine particular access values based on tokens 115. For example, TBAC module 110 may determine assurance levels 4750, trust levels 4950, and/or integrity levels 5150 using subject tokens 115k, resource tokens 115c, network tokens 115f, among others as appropriate as described above with respect to FIGS. 47-52. TBAC module 110 may further determine and make access decisions based upon access values that are determined from these previously determined access values. For example, TBAC module 110 may use assurance levels 4750, trust levels 4950, and/or integrity levels 5150 to determine a risk level. TBAC module 110 may then use the risk level to make an access decision.

FIG. 53 illustrates the system 100 of FIG. 1 performing expert decisioning. As provided by FIG. 43, TBAC module 110 may correlate subject token 115k, network token 115f, among others as appropriate, with session token 115j. In particular embodiments, TBAC module 110 may receive resource token 115c indicating that access to resource 145 has been requested. TBAC module 110 may determine that access has been requested in response to receiving resource token 115c.

In particular embodiments, TBAC module 110 may use subject token 115k, resource 115c, and network 115f to determine access values such as assurance level 4750, trust level 4950, and integrity level 5150. TBAC module 110 may use subject token 115k, among others as appropriate, to determine assurance level 4750 as described above with respect to FIGS. 47 and 48. TBAC module 110 may use resource token 115c, among others as appropriate, to determine trust level 4950 as described above with respect to FIGS. 49 and 50. TBAC module 110 may use network token 115f, among others as appropriate, to determine integrity level 5150 as described above with respect to FIGS. 51 and 52.

In particular embodiments, TBAC module 110 may store expert decision rules 5330 in memory 134. TBAC module 110 may use tokens 115, assurance level 4750, trust level 4950, integrity level 5150, and any other appropriate access values to access expert decision rules 5330. In particular embodiments, in response to receiving resource token 115c and determining that access to resource 145 has been requested, TBAC module 110 may use tokens 115, such as resource token 115c, and the appropriate access values to determine at least one expert decision rule 5330 applicable to resource 145. The at least one expert decision rule 5330 may specify a required risk level 5340 necessary to grant access to resource 145. The at least one expert decision rule 5330 may further associate risk levels 5350 with particular combinations of access values. As an example and not by way of limitation, the at least one expert decision rule 5330 may associate a particular risk level 5350 with a particular combination of values for assurance level 4750, trust level 4950, and integrity level 5150. TBAC module 110 may examine access values such as assurance level 4750, trust level 4950, and integrity 5150 to determine if any of the combinations of access values specified by the least one expert decision rule 5330 are present. Based on the combinations of access values that are present, TBAC module 110 may apply the at least one expert decision rule 5330 and determine a risk level 5350.

In particular embodiments, TBAC module 110 may determine whether to grant or deny access to resource 145 associated with resource token 115c by comparing risk level 5350 with required risk level 5340. As an example and not by way of limitation, TBAC module 110 may deny access to resource 145 if risk level 5350 is less than required risk level 5340. Although this disclosure describes TBAC module 110 denying access to resource 145 if risk level 5350 is less than required risk level 5340, one of ordinary skill in the art would understand that TBAC module 110 may be modified to deny access to resource 145 if risk level 5350 is greater than or equal to required risk level 5340. Furthermore, the values of risk level 5350 and required risk level 5340 may be alphanumeric, symbolic, or any appropriate values recognized and comparable by TBAC module 110.

In particular embodiments, TBAC module 110 may redetermine risk level 5350 when a change to access values occurs. As an example and not by way of limitation, TBAC module 110 may receive updated subject token 115k5 and update assurance level 4750 as described above with respect to FIGS. 47 and 48. As another example and not by way of limitation, TBAC module 110 may receive updated resource token 115c3 and update trust level 4950 as described above with respect to FIGS. 49 and 50. As yet another example and not by way of limitation, TBAC module 110 may receive updated network token 115f2 and update integrity level 5150 as described above with respect to FIGS. 51 and 52. Based on an update to an access value such as the assurance level 4750, trust level 4950, and/or integrity level 5150, TBAC module 110 may update risk level 5350. After updating risk level 5350, TBAC module 110 may determine whether to grant or deny access to resource 145 by comparing the updated risk level 5350 to required risk level 5340. TBAC module 110 may determine based at least in part upon the at least one expert decision rule 5330 that risk level 5350 is sufficient to grant access to resource 145 after the update. TBAC module 110 may then grant access to resource 145.

In particular embodiments, the value of risk level 5350 may correspond to the value of access values such as assurance level 4750, trust level 4950, and/or integrity level 5150. As an example and not by way of limitation, an increase in assurance level 4750 may decrease risk level 5350. As another example and not by way of limitation, an increase in assurance level 4750 and integrity level 5150 and a decrease in trust level 4950 may correspond to an overall increase in risk level 5350. In particular embodiments, value of risk level 5350 may correspond to the magnitude of the values of access values such as assurance level 4750, trust level 4950, and/or integrity level 5150. In the previous example, the magnitudes of the increases to assurance level 4750 and integrity level 5150 may have been small compared to the magnitude of the decrease in trust level 4950. As a result, the risk level 5350 may experience an overall increase. Although this disclosure describes risk level 5350 increasing and decreasing as a result of particular changes to assurance level 4750, trust level 4950, and/or integrity level 5150, this disclosure contemplates any appropriate update such as increase, decrease, or staying the same to risk level 5350 as a result of any appropriate update to any appropriate access value.

In particular embodiments, risk level 5350 may indicate a risk associated with granting user 112 and/or device 114 access to resource 145 over network 120. Therefore, any risks associated with user 112, device 114, resource 145, and/or network 120 may influence risk level 5350. When these risks are present, TBAC module 110 may determine appropriate assurance levels 4750, trust levels 4950, and/or integrity levels 5150 pursuant to those risks. TBAC module 110 may then determine risk level 5350 based on these assurance levels 4750, trust levels 4950, and/or integrity levels 5150. TBAC module 110 may then determine whether to grant access to resource 145 by comparing risk level 5350 with required risk level 5340.

In particular embodiments, risk token 115m may be generated based on risk level 5350. Risk token 115m may represent the risk associated with granting user 112 and/or device 114 access to resource 145 over network 120. Risk token 115m may be generated by a token provider such as computed risk token provider 124. In particular embodiments, TBAC module 110 may also generate risk token 115*m*.

The illustration of system 100 in FIG. 53 does not specifically illustrate all of the elements from the illustration of system 100 in FIG. 1 so that particular aspects of system 100 may be emphasized. However, system 100 of FIG. 53 includes all the elements of system 100 in FIG. 1. Although this disclosure describes TBAC module 110 determining risk levels 5350 using assurance levels 4750, trust levels 4950, and/or integrity levels 5150, this disclosure contemplates TBAC module 110 determining any appropriate access value using any appropriate number of access values.

FIG. 54 is a flowchart illustrating a method 5400 of performing expert decisioning. TBAC module 110 may perform method 5400. As provided by FIG. 54, TBAC module 110 may begin by storing subject token 115*k*, resource token 115*c*, network token 115*f*, among others as appropriate in step 5410. In step 5420 TBAC module 110 may determine that access to resource 145 has been requested. In particular embodiments, TBAC module 110 may determine that access to resource 145 has been requested in response to receiving resource token 115*c* associated with resource 145. TBAC module 110 may continue to step 5430 to determine assurance level 4750, trust level 4950, and integrity level 5150. TBAC module 110 may determine these access values as described above with regards to FIGS. 47 through 52.

TBAC module 110 may then use these access values to access expert decision rules 5330 in step 5440. In particular embodiments, TBAC module 110 may determine at least one expert decision rule 5330 applicable to resource 145. In particular embodiments, the at least one expert decision rule 5330 may specify a required risk level 5340 necessary to grant access to resource 145, and may associate risk levels 5350 with particular combinations of access values such as assurance level 4750, trust level 4950, and/or integrity level 5150. In step 5450, TBAC module 110 may determine a required risk level 5340 necessary to grant access to the resource 145 based on the at least one expert decision rule 5330. In particular embodiments, the at least one expert decision rule 5330 may specify the required risk level 5340. In step 5460 TBAC module 110 may determine a risk level 5350. In particular embodiments, TBAC module 110 may determine risk level 5350 by first determining whether a particular combination of access values such as assurance level 4750, trust level 4950, and/or integrity level 5150 specified by the at least one expert decision rule 5330 is present. TBAC module 110 may then use the risk level 5350 associated with that particular combination of access values as specified by the at least one expert decision rule 5330.

In step 5470, TBAC module 110 may determine whether the risk level 5350 is sufficient to grant access to the resource 145. In particular embodiments, TBAC module 110 may compare risk level 5350 to required risk level 5340 to determine whether risk level 5350 is sufficient to grant access to resource 145. If risk level 5350 is sufficient, TBAC module 110 may grant access in step 5480. If risk level 5350 is insufficient to grant access to the resource 145, then TBAC module 110 may deny access in step 5472.

TBAC module 110 may continue by redetermining various access values based on changes to user 112, device 114, resource 145, and/or network 120. In step 5474 TBAC module 110 may receive an updated subject token 115*k*5 associated with user 112 and/or device 114. In step 5476 TBAC module 110 may receive an updated resource token 115*c*3 associated with resource 145. In step 5478 TBAC module 110 may receive an updated network token 115*f*2 associated with network 120. After receiving any of these updated tokens 115, TBAC module 110 may continue to step 5430 to determine an assurance level 4750, trust level 4950, and/or integrity level 5150.

Figure 55:
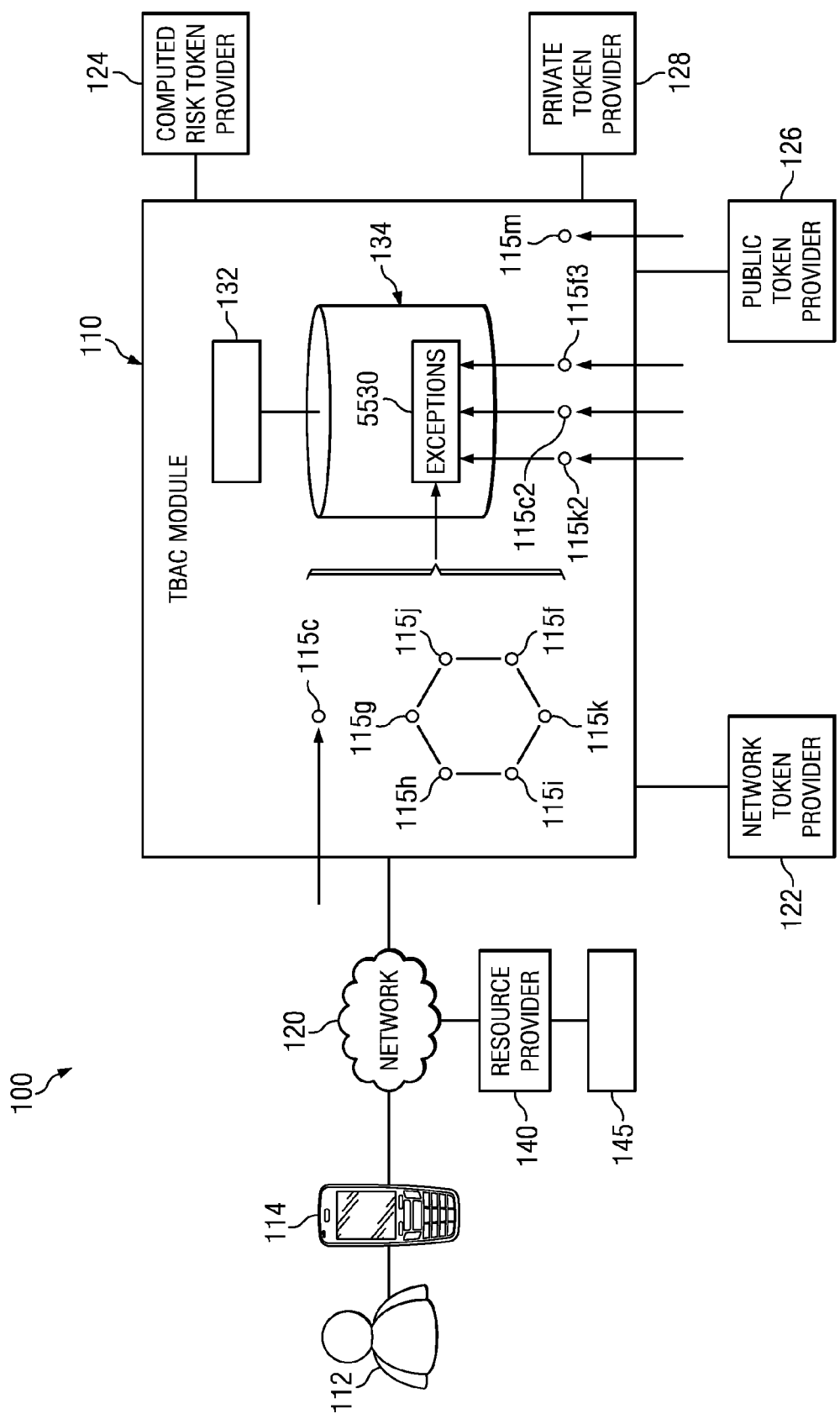
FIG. 55 illustrates the system of FIG. 1 making access decisions using exceptions.
Figure 56:
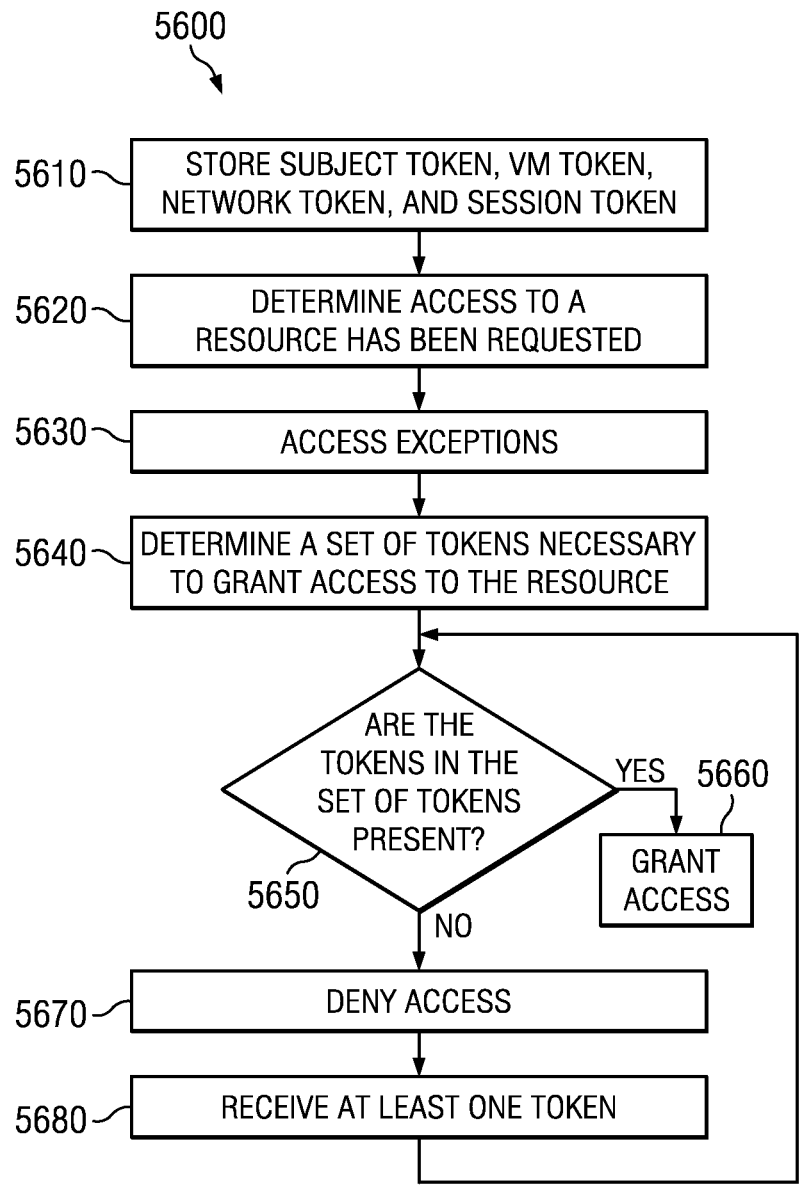
FIG. 56 is a flowchart illustrating a method of making access decisions using exceptions.

FIGS. 55 and 56 illustrate the system 100 of FIG. 1 making access decisions using exceptions. In general, exceptions may exist for any token-based rule. The process of handling these exceptions and using them to make access decisions will be discussed with respect to FIGS. 55 and 56.

TBAC module 110 may use tokens 115 to determine token-based rules and exceptions. A token-based rule may specify that the TBAC module 110 should make a particular access decision, but a corresponding exception may specify the opposite decision. TBAC module 110 may override the token-based rule and make an access decision according to the exception.

FIG. 55 illustrates the system 100 of FIG. 1 making access decisions using exceptions. As provided by FIG. 55, TBAC module 110 may correlate subject token 115*k*, network token 115*f*, among others as appropriate, to session token 115*j*. In particular embodiments, TBAC module 110 may receive resource token 115*c* associated with resource 145. Resource token 115*c* may indicate that user 112 and/or device 114 have requested access to resource 145. TBAC module 110 may determine that user 112 and/or device 114 have requested access to resource 145 in response to receiving resource token 115*c*.

In particular embodiments, TBAC module 110 may use exceptions 5530 stored in memory 134 to determine whether to grant or deny access to resource 145. Exceptions 5530 may specify access decisions that do not conform to those specified by token-based rules also stored in memory 134 such as DDD1 rules 1930, RRR3 rules 2130, expert decision rules 5330, or any other appropriate rules discussed with respect to other figures. In this manner, TBAC module 110 may make access decisions using exceptions to general rules.

In particular embodiments, TBAC module 110 may use resource token 115*c*, subject token 115*k*, network 115*f*, among others as appropriate, to access exceptions 5530. Using these tokens 115, TBAC module 110 may determine at least one exception 5530 applicable to resource 145. The at least one exception 5530 may specify that access to resource 145 may be granted if a token 115 or a set of tokens 115 are present. As an example and not by way of limitation, the at least one exception 5530 may specify that access to resource 145 may be granted if a particular subject token 115*k* and a particular network token 115*f* are present. Although this disclosure describes an exception 5530 conditioning access on the presence of particular types of tokens, this disclosure contemplates the at least one exception 5530 conditioning access on any number or any appropriate types of tokens 115.

After determining the at least one exception 5530, TBAC module 110 may examine the tokens 115 that are present to determine if the tokens 115 specified by the at least one exception 5530 are present. If the tokens 115 are present, TBAC module 110 may grant access to resource 145. However, if the tokens 115 are not present then TBAC module 110 may deny access to resource 145. Although this disclosure describes TBAC module 110 granting access if particular tokens 115 are present based on the at least one exception 5530, this disclosure contemplates TBAC module 110 making any appropriate response based on the presence of tokens 115 and the at least one exception 5530. For example, TBAC module 110 may deny access to resource 145 if particular tokens 115 are present based on the at least one exception 5530.

As an example and not by way of limitation, TBAC module 110 may determine that user 112 and/or device 114 have requested access to resource 145 over network 120. TBAC module 110 may determine a token-based rule applicable to this resource request. The token-based rule may specify that access should not be granted over network 120 because network 120 is an unsecured network. However, TBAC module 110 may also determine an exception 5530 applicable to this resource request. The exception 5530 may specify that an administrator may be granted access over this network 120. Based on the exception 5530, TBAC module 110 may examine subject tokens 115*k* and determine that user 112 is an administrator. TBAC module 110 may then grant user 112 and/or device 114 access to resource 145 over network 120 despite the general rule that access should not be granted over network 120.

In particular embodiments, TBAC module 110 may deny access to resource 145 if a particular token specified by the at least one exception 5530 is not present. As an example and not by way of limitation, the at least one exception 5530 may specify that access to resource 145 may be granted if a particular subject token 115*k* is present. However, TBAC module 110 may determine that that particular subject token 115*k* is not present and deny access to resource 145. In particular embodiments, TBAC module 110 may later receive the particular token 115 specified by the at least one exception 5530. As an example and not by way of limitation, TBAC module 110 may later receive a second subject token 115*k*2, second resource token 115*c*2, second network token 115*f*3, and/or risk token 115*m*. TBAC module 110 may then grant access to resource 145 in response to receiving the particular token 115.

As an example and not by way of limitation, TBAC module 110 may receive second subject token 115*k*2 from a token provider such as private token provider 128 or public token provider 126. Second subject token 115*k*2 may indicate that a form of authentication, such as biometric authentication and/or password authentication, has been performed. Second subject token 115*k*2 may specify that device 114 comprises a particular security feature such as, for example, a subscriber identity module and/or a trusted platform module security device. After receiving second subject token 115*k*2, TBAC module 110 may determine that the particular tokens 115 specified by exception 5530 are present. TBAC module 110 may then grant access to resource 145. In this manner, TBAC module 110 may make access decisions using exceptions 5530 that condition access based on particular types of subject tokens 115*k*.

As another example and not by way of limitation, TBAC module 110 may receive second resource token 115*c*2. Second resource token 115*c*2 may indicate that a form of authentication associated with resource 145, such as Kerberos authentication, has been performed. Second resource token 115*c*2 may indicate that resource 145 is associated with particular security features. For example, second resource token 115*c*2 may indicate that resource 145 is associated with a virtual private network or with a trusted platform module security device. As another example, second resource token 115*c*2 may indicate that resource 145 is associated with a firewall or with a digital certificate. After receiving second resource token 115*c*2, TBAC module 110 may determine that the particular tokens 115 specified by exception 5530 are present. TBAC module 110 may then grant access to resource 145. In this manner, TBAC module 110 may make access decisions using exceptions 5530 that condition access to resource 145 based on particular types of resource tokens 115*c*.

As another example and not by way of limitation, TBAC module 110 may receive second network token 115*f*3 from a token provider such as network token provider 122. Second network token 115*f*3 may indicate that network 120 performs a form of encryption such as Wi-Fi Protected Access. Second network token 115*f*3 may indicate particular security features associated with network 120. For example, second network token 115*f*3 may indicate that network 120 is operable to support dedicated connections or to perform the host identity protocol. As another example, second network token 115*f*3 may indicate that network 120 is associated with a firewall. After receiving second network token 115*f*3, TBAC module 110 may determine that the particular tokens 115 specified by exception 5530 are present. TBAC module 110 may then grant access to resource 145. In this manner, TBAC module 110 may make access decisions using exceptions 5530 that condition access to resource 145 based on particular types of network tokens 115*f*.

As another example and not by way of limitation, TBAC module 110 may receive risk token 115*m* from a token provider such as the computed risk token provider 124. Risk token 115*m* may indicate the risk associated with granting access to resource 145. In particular embodiments, this risk may be increased or reduced based on the performance of particular forms of authentication and/or encryption. This risk may be further influenced by particular security features associated with resource 145, device 114, and/or network 120. After receiving risk token 115*m*, TBAC module 110 may determine that the particular tokens 115 specified by exception 5530 are present. TBAC module 110 may then grant access to resource 145. In this manner, TBAC module 110 may make access decisions using exceptions 5530 that condition access to resource 145 based on risk token 115*m*.

The illustration of system 100 in FIG. 55 does not specifically illustrate all of the elements from the illustration of system 100 in FIG. 1 so that particular aspects of system 100 may be emphasized. However, system 100 of FIG. 55 includes all the elements of system 100 in FIG. 1.

FIG. 56 is a flowchart illustrating a method 5600 of making access decisions using exceptions 5530. TBAC module 110 may perform method 5600. TBAC module 110 may begin by storing subject tokens 115*k*, network tokens 115*f*, among others as appropriate in step 5610. In step 5620, TBAC module 110 may determine that access to a resource 145 has been requested. In particular embodiments, TBAC module 110 may receive a resource token 115*c* indicating that access to resource 145 has been requested. TBAC module 110 may determine that access has been requested in response to receiving resource token 115*c*. In step 5630 TBAC module 110 may use resource token 115*c*, subject token 115*k*, network token 115*f*, among others as appropriate, to access exceptions 5530 stored in memory 134. In particular embodiments, TBAC module 110 may use these tokens 115 to determine at least one exception 5530 applicable to resource 145. In step 5640, TBAC module 110 may determine a set of tokens 115 necessary to grant access to resource 145 based on the at least one exception 5530.

In step 5650, TBAC module 110 may determine if the tokens 115 in the set of tokens 115 are present. If the tokens 115 are present, TBAC module 110 may grant access in step 5660. However, if the tokens 115 are not present, TBAC module 110 may deny access in step 5670. After denying access, TBAC module 110 may receive at least one token 115 in step 5680. As an example and not by way of limitation, TBAC module 110 may receive second subject token 115*k*2, second resource token 115*c*2, second network token 115*f*3, and/or risk token 115*m*. After receiving this at least one token 115, TBAC module 110 may return to step 5650 to determine if the tokens 115 in the set of tokens 115 are present. In particular embodiments, TBAC module 110 may determine that the tokens 115 in the set of tokens 115 are now present and grant access to resource 145 in step 5660.

Figure 57:
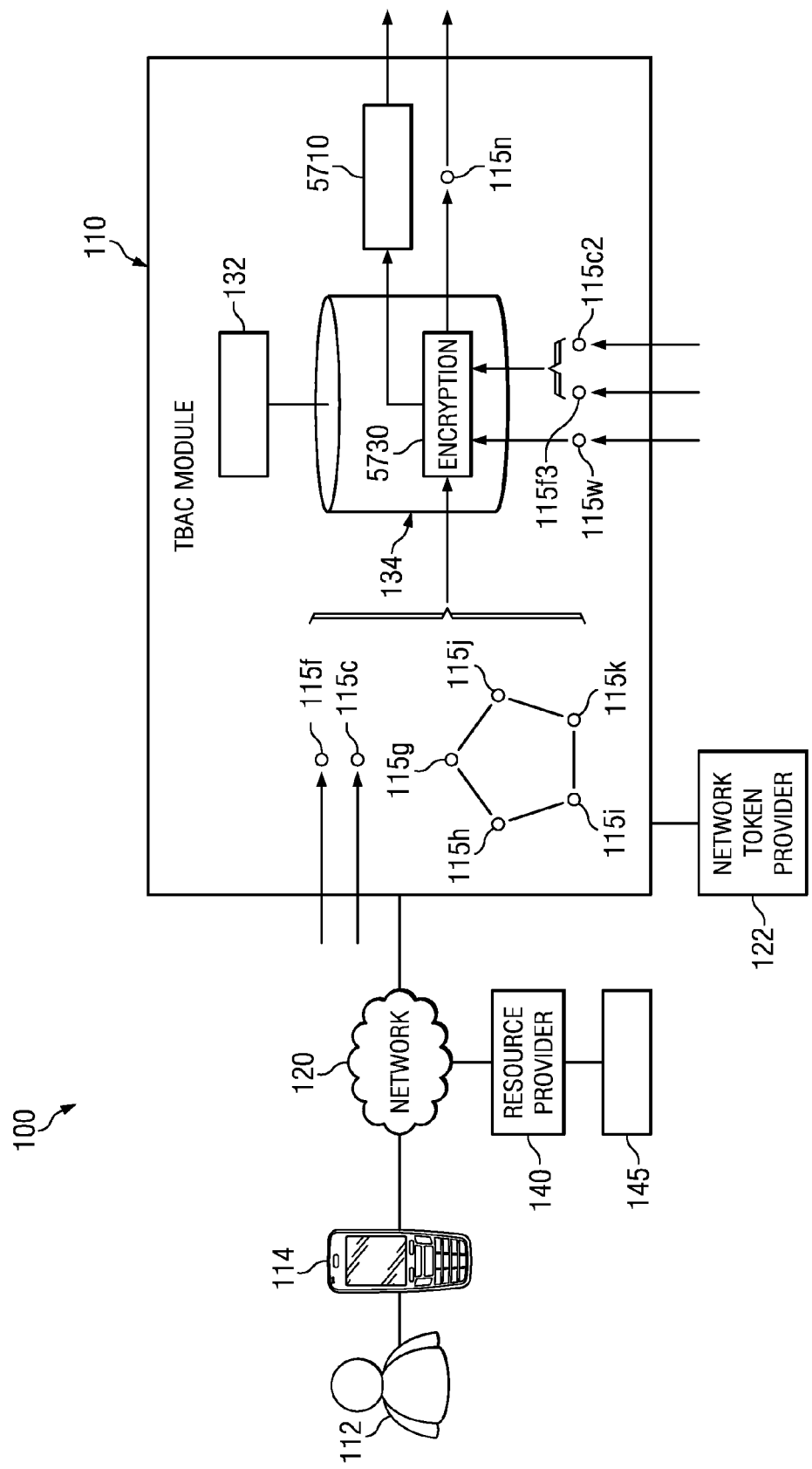
FIG. 57 illustrates the system of FIG. 1 performing end-to-end encryption.
Figure 58:
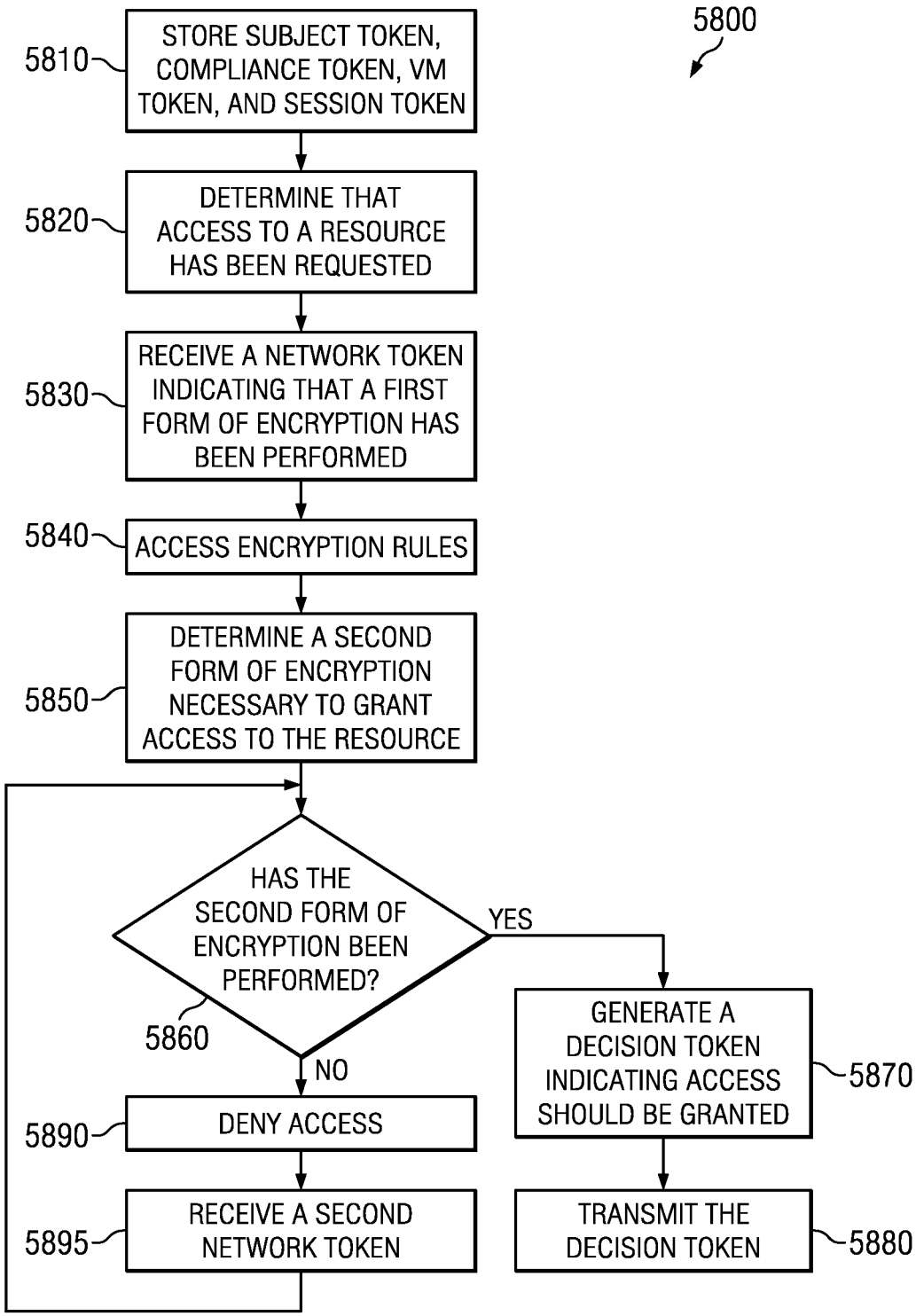
FIG. 58 is a flowchart illustrating a method of performing end-to-end encryption.

FIGS. 57 and 58 illustrate the system 100 of FIG. 1 performing end-to-end encryption. In general, various forms of encryption may be performed prior to granting access to a resource 145. The process of determining whether particular forms of encryption should be performed or have been performed is known as end-to-end encryption and will be discussed with respect to FIGS. 57 and 58.

TBAC module 110 may determine the forms of encryption that have been performed and the forms of encryption that should be performed. After TBAC module 110 determines that the forms of encryptions that should be performed have been performed, TBAC module 110 may grant access to a requested resource 145.

FIG. 57 illustrates the system 100 of FIG. 1 performing end-to-end encryption. As provided by FIG. 57, TBAC module 110 may correlate subject token 115$k$, among others as appropriate, to session token 115$j$. Subject token 115$k$ may be associated with user 112 and/or device 114. In particular embodiments, TBAC module 110 may receive resource token 115$c$ indicating that user 112 and/or device 114 have requested access to resource 145. TBAC module 110 may determine that access to resource 145 has been requested in response to receiving resource token 115$c$.

In particular embodiments, TBAC module 110 may receive network token 115$f$ associated with network 120. Network token 115$f$ may indicate that network 120 has performed or may perform a first form of encryption such as the host identity protocol. Although this disclosure describes TBAC module 110 receiving a particular token 115 that indicates a particular form of encryption has been or may be performed, this disclosure contemplates TBAC module 110 receiving any appropriate token 115 indicating any appropriate form of encryption has been or may be performed. Although this disclosure describes network 120 performing a particular form of encryption, this disclosure contemplates any appropriate element of system 100 whether alone or in combination with other appropriate elements of system 100 performing any appropriate form of encryption.

In particular embodiments, TBAC module 110 may use network token 115$f$, resource token 115$c$, subject token 115$k$, among others as appropriate, to access encryption rules 5730 stored in memory 134. TBAC module 110 may use one or more of these tokens 115 to determine at least one encryption rule 5730 applicable to resource 145. The at least one encryption rule 5730 may specify forms of encryption that are necessary to grant access to resource 145. As an example and not by way of limitation, the at least one encryption rule 5730 may specify that performing the host identity protocol and Wi-Fi Protected Access are necessary to grant access to resource 145.

TBAC module 110 may determine that a token 115 indicates that a form of encryption specified by the at least one encryption rule 5730 has been performed. For example, TBAC module 110 may determine that network token 115$f$ indicates that the host identity protocol has been or may be performed by network 120.

TBAC module 110 may then determine, based on the at least one encryption rule 5730, that a second form of encryption should be performed before access to resource 145 may be granted. For example, based on the at least one encryption rule 5730, TBAC module 110 may then determine that Wi-Fi Protected Access should also be performed before access to resource 145 may be granted. However, if TBAC module 110 determines that the tokens 115 that are present do not indicate that Wi-Fi Protected Access has been performed, then TBAC module 110 may deny access to resource 145 in response. Although this disclosure describes the at least one encryption rule 5730 specifying a particular number of particular forms of encryption, this disclosure contemplates the at least one encryption rule 5730 specifying any appropriate number and combination of any appropriate forms of encryption. For example, the forms of encryption may be associated with different layers of the open systems interconnection model; one form of encryption specified by the at least one encryption rule 5730 may be associated with a lower layer of the model than another form of encryption specified by the at least one encryption rule 5730.

In particular embodiments, TBAC module 110 may receive a second token 115 such as second network token 115$f$3 or second resource token 115$c$2. The second token 115 may indicate that a second form of encryption has been or may be performed. As an example and not by way of limitation, second network token 115$f$3 may indicate that network 120 performs Wi-Fi Protected Access. As another example and not by way of limitation, second resource token 115$c$3 may indicate that information within the resource 145 has been encrypted. In response to receiving second network token 115$f$3, TBAC module 110 may determine that Wi-Fi Protected Access has been performed by network 120. After receiving the second token 115, TBAC module 110 may determine that the forms of encryption necessary to grant access to resource 145 have been performed based on the at least one encryption rule 5730. In response to that determination, TBAC module 110 may generate a decision token 115$n$ representing the decision that access to resource 145 may be granted. TBAC module 110 may then transmit decision token 115$n$ to the appropriate element of system 100, such as resource provider 140, so that access to resource 145 may be granted to user 112 and/or device 114 over network 120.

In particular embodiments, the at least one encryption rule 5730 may specify additional forms of encryption necessary to grant access to resource 145. As an example and not by way of limitation, the at least one encryption rule 5730 may specify that internet protocol security should be performed before granting access to resource 145. Based on the at least one encryption rule 5730, TBAC module 110 may determine that internet protocol security should be performed before granting access to resource 145. In response, TBAC module 110 may generate message 5710. In particular embodiments, message 5710 may indicate that internet protocol security should be performed before TBAC module 110 may grant access to resource 145. TBAC module 110 may then transmit message 5710 to the appropriate element of system 100. As an example and not by way of limitation, TBAC module 110 may transmit message 5710 to network 120 to determine if network 120 performs internet protocol security.

In particular embodiments, encryption rules 5730 may be used to decrypt tokens 115. For example, TBAC module 110 may receive an encrypted token 115$w$. TBAC module 110 may use the encrypted token 115$w$ to access encryption rules 5730. In particular embodiments, TBAC module 110 may determine at least one encryption rule 5730 applicable to encrypted token 115$w$. The at least one encryption rule 5730 may specify forms of encryption that have been performed on encrypted token 115$w$. For example, TBAC module 110 may use the at least one encryption rule 5730 to determine that a first form of encryption and a second form of encryption have been performed on encrypted token 115$w$. TBAC module 110 may then determine the necessary steps to decrypt encrypted token 115$w$. For example, TBAC module 110 may determine, based on the at least one encryption rule 5730, that a first form of decryption and a second form of decryption should be performed on encrypted token 115w. TBAC module 110 may examine encrypted token 115w and determine that the first form of decryption has been performed on encrypted token 115w. In response to that determination, TBAC module 110 may determine that the second form of decryption should now be performed on encrypted token 115w. After the second form of decryption has been performed, TBAC module 110 may determine that encrypted token 115w is no longer encrypted. TBAC module 110 may then determine the information represented by the resulting token 115.

Although this disclosure describes TBAC module 110 receiving particular types of tokens 115 that indicate particular forms of encryption, this disclosure contemplates TBAC module 110 receiving any appropriate type of token 115 indicating any appropriate form of encryption. The illustration of system 100 in FIG. 57 does not specifically illustrate all the elements from the illustration of system 100 in FIG. 57 so that particular aspects of system 100 may be emphasized. However, system 100 of FIG. 57 includes all the elements of system 100 in FIG. 1.

FIG. 58 is a flowchart illustrating a method 5800 of performing end-to-end encryption. TBAC module 110 may perform method 5800. TBAC module 110 may begin by storing subject tokens 115k, session token 115j, among others as appropriate, in step 5810. In step 5820 TBAC module 110 may determine that access to a resource 145 has been requested. In particular embodiments, TBAC module 110 may receive a resource token 115c associated with resource 145. TBAC module 110 may determine that access to resource 145 has been requested in response to receiving resource token 115c. TBAC module 110 may continue to step 5830 to receive a network token 115f indicating that a first form of encryption has been performed. Network token 115f may be received from a token provider such as network provider 122.

In step 5840 TBAC module 110 may use network token 115f, resource token 115c, subject token 115k, among others as appropriate, to access encryption rules 5730. Based on these tokens 115, TBAC module 110 may determine at least one encryption rule 5730 applicable to resource 145. In particular embodiments, the at least one encryption rule 5730 may specify the forms of encryption necessary to grant access to resource 145. Based on the at least one encryption rule 5730, TBAC module 110 may determine a second form of encryption necessary to grant access to resource 145 in step 5850. In step 5860 TBAC module 110 may determine whether the second form of encryption has been performed. In particular embodiments, TBAC module 110 may examine various tokens 115 such as network token 115f to determine whether the second form of encryption has been performed. If the second form of encryption has been performed, TBAC module 110 may generate a decision token 115n indicating that access to resource 145 should be granted in step 5870. Then in step 5880 TBAC module 110 may transmit the decision token 115n to an appropriate element of system 100 such as resource provider 140 so that access to resource 145 may be granted.

If TBAC module 110 determines that the second form of encryption has not been performed, TBAC module 110 may deny access in step 5890. After denying access, TBAC module 110 may receive a second token 115 such as second network token 115f3 or second resource token 115c2 in step 5895. The second token 115 may indicate that the second form of encryption has been performed. TBAC module 110 may then return to step 5860 to determine if the second form of encryption has been performed based on the second token 115.

Although this disclosure describes system 100 using singular tokens 115a-x to perform the described functions, this disclosure contemplates system 100 using any suitable number and combination of tokens 115a-x to perform the described functions.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus comprising:
a memory operable to:
    store a plurality of token-based rules, wherein a token-based rule facilitates access to a resource; and
    store a plurality of resource tokens associated with the resource; and
a processor communicatively coupled to the memory and operable to:
    receive a first resource token indicating that access to the resource has been requested;
    determine, based at least in part upon the first resource token, at least one token-based rule from the plurality of token-based rules, wherein:
        the at least one token-based rule associates a first access value with at least one resource token, wherein the at least one resource token indicates at least one of:
            that the resource is associated with a trusted platform module security device; and
            that the resource is associated with a virtual private network;
        the first access value indicates the risk associated with granting access to the resource; and
        the at least one token-based rule specifies at least one condition under which access to the resource should be granted, the first access value associated with the at least one condition;
    determine that the at least one resource token associated with the first access value is included in the plurality of resource tokens;
    determine, based at least in part upon the at least one token-based rule, a second access value associated with the at least one resource token in response to the determination that the plurality of resource tokens comprises the at least one resource token, wherein the second access value indicates a chance that at least one of that access is granted to an unrequested resource and that the resource corrupts the device;
    determine, based at least upon the at least one token-based rule, that the second access value is insufficient to grant access to the resource by comparing the second access value with the first access value;
    determine, in response to the determination that the value of the second, access value is insufficient to grant access to the resource, that access to the resource should be denied;
    communicate a first decision token indicating that access by at least one of the user and the device to the resource should be denied;
    receive an updated resource token;

redetermine the second access value based at least in part upon the updated resource token;
determine, based at least in part upon the at least one token-based rule, that the redetermined second access value is sufficient to grant access to the resource by comparing the redetermined second access value with the first access value; and
communicate a second decision token indicating that access by at least one of the user and the device to the resource should be granted.

2. The apparatus of claim 1, wherein the processor is further operable to:
receive an updated resource token indicating that a form of authentication associated with the resource has been performed;
redetermine the value of the second access value based at least in part upon the updated resource token; and
determine, based at least in part upon the at least one token-based rule, that the redetermined value of the second access value is sufficient to grant access to the resource.

3. The apparatus of claim 1, wherein the processor is further operable to:
receive an updated resource token indicating that security associated with the resource has not been compromised;
redetermine the value of the second access value based at least in part upon the updated resource token; and
determine, based at least in part upon the at least one token-based rule, that the redetermined value of the second access value is sufficient to grant access to the resource.

4. The apparatus of claim 1, wherein the at least one resource token indicates at least one of:
that the resource has performed Kerberos authentication; and
that the resource is associated with a digital certificate.

5. The apparatus of claim 1, wherein the at least one resource token indicates at least one of:
that the resource is associated with a firewall; and
that the resource is not infected by a virus.

6. The apparatus of claim 1, wherein:
the at least one token-based rule associates the second access value with a combination of resource tokens; and
the value of the second access value corresponds to the number of resource tokens included in the combination of resource tokens.

7. A method comprising:
storing, by a memory, a plurality of token-based rules, wherein a token-based rule facilitates access to a resource;
storing, by the memory, a plurality of resource tokens associated with the resource;
receiving, by a processor communicatively coupled to the memory, a first resource token indicating that access to the resource has been requested;
determining, by the processor, based at least in part upon the first resource token, at least one token-based rule from the plurality of token-based rules, wherein:
the at least one token-based rule associates a first access value with at least one resource token, wherein the at least one resource token indicates at least one of:
that the resource is associated with a trusted platform module security device; and
that the resource is associated with a virtual private network;
the first access value indicates the risk associated with granting access to the resource; and
the at least one token-based rule specifies at least one condition under which access to the resource should be granted, the first access value associated with the at least one condition;
determining, by the processor, that the at least one resource token associated with the first access value is included in the plurality of resource tokens;
determining, by the processor, based at least in part upon the at least one token-based rule, a second access value associated with the at least one resource token in response to the determination that the plurality of resource tokens comprises the at least one resource token, wherein the second access value indicates a chance that at least one of that access is granted to an unrequested resource and that the resource corrupts the device;
determining, by the processor, based at least upon the at least one token-based rule, that the second access value is insufficient to grant access to the resource by comparing the second access value with the first access value;
determining, by the processor, in response to the determination that the value of the second access value is insufficient to grant access to the resource, that access to the resource should be denied;
communicating a first decision token indicating that access by at least one of the user and the device to the resource should be denied;
receiving an updated resource token;
redetermining, by the processor, the second access value based at least in part upon the updated resource token;
determining, by the processor, based at least in part upon the at least one token-based rule, that the redetermined second access value is sufficient to grant access to the resource by comparing the redetermined second access value with the first access value; and
communicating a second decision token indicating that access by at least one of the user and the device to the resource should be granted.

8. The method of claim 7, further comprising:
receiving, by the processor, an updated resource token indicating that a form of authentication associated with the resource has been performed;
redetermining, by the processor, the value of the second access value based at least in part upon the updated resource token; and
determining, by the processor, based at least in part upon the at least one token-based rule, that the redetermined value of the second access value is sufficient to grant access to the resource.

9. The method of claim 7, further comprising:
receiving, by the processor, an updated resource token indicating that security associated with the resource has not been compromised;
redetermining, by the processor, the value of the second access value based at least in part upon the updated resource token; and
determining, by the processor, based at least in part upon the at least one token-based rule, that the redetermined value of the second access value is sufficient to grant access to the resource.

10. The method of claim 7, wherein the at least one resource token indicates at least one of:
that the resource has performed Kerberos authentication; and
that the resource is associated with a digital certificate.

11. The method of claim 7, wherein the at least one resource token indicates at least one of:

that the resource is associated with a firewall; and
that the resource is not infected by a virus.

12. The method of claim 7, wherein:
the at least one token-based rule associates the second access value with a combination of resource tokens; and
the value of the second access value corresponds to the number of resource tokens included in the combination of resource tokens.

13. One or more computer-readable non-transitory storage media embodying software that is operable when executed to:
store a plurality of token-based rules, wherein a token-based rule facilitates access to a resource;
store a plurality of resource tokens associated with the resource;
receive a first resource token indicating that access to the resource has been requested;
determine, based at least in part upon the first resource token, at least one token-based rule from the plurality of token-based rules, wherein:
the at least one token-based rule associates a first access value with at least one resource token, wherein the at least one resource token indicates at least one of:
that the resource is associated with a trusted platform module security device; and
that the resource is associated with a virtual private network;
the first access value indicates the risk associated with granting access to the resource; and
the at least one token-based rule specifies at least one condition under which access to the resource should be granted, the first access value associated with the at least one condition;
determine that the at least one resource token associated with the first access value is included in the plurality of resource tokens;
determine, based at least in part upon the at least one token-based rule, a second access value associated with the at least one resource token in response to the determination that the plurality of resource tokens comprises the at least one resource token, wherein the second access value indicates a chance that at least one of that access is granted to an unrequested resource and that the resource corrupts the device;
determine, based at least upon the at least one token-based rule, that the second access value is insufficient to grant access to the resource by comparing the second access value with the first access value;
determine, in response to the determination that the value of the second access value is insufficient to grant access to the resource, that access to the resource should be denied;
communicate a first decision token indicating that access by at least one of the user and the device to the resource should be denied;
receive an updated resource token;
redetermine the second access value based at least in part upon the updated resource token;
determine, based at least in part upon the at least one token-based rule, that the redetermined second access value is sufficient to grant access to the resource by comparing the redetermined second access value with the first access value; and
communicate a second decision token indicating that access by at least one of the user and the device to the resource should be granted.

14. The media of claim 13 embodying software further operable when executed to:
receive an updated resource token indicating that a form of authentication associated with the resource has been performed;
redetermine the value of the second access value based at least in part upon the updated resource token; and
determine, based at least in part upon the at least one token-based rule, that the redetermined value of the second access value is sufficient to grant access to the resource.

15. The media of claim 13 embodying software further operable when executed to:
receive an updated resource token indicating that security associated with the resource has not been compromised;
redetermine the value of the second access value based at least in part upon the updated resource token; and
determine, based at least in part upon the at least one token-based rule, that the redetermined value of the second access value is sufficient to grant access to the resource.

16. The media of claim 13, wherein the at least one resource token indicates at least one of:
that the resource has performed Kerberos authentication; and
that the resource is associated with a digital certificate.

17. The media of claim 13, wherein the at least one resource token indicates at least one of:
that the resource is associated with a firewall; and
that the resource is not infected by a virus.

18. The media of claim 13, wherein:
the at least one token-based rule associates the second access value with a combination of resource tokens; and
the value of the second access value corresponds to the number of resource tokens included in the combination of resource tokens.

* * * * *